US012809728B2

(12) United States Patent
Liu et al.

(10) Patent No.: US 12,809,728 B2
(45) Date of Patent: Nov. 24, 2026

(54) NEURAL NETWORK QUANTIZATION PARAMETER DETERMINATION METHOD AND RELATED PRODUCTS

(71) Applicant: Shanghai Cambricon Information Technology Co., Ltd, Shanghai (CN)

(72) Inventors: Shaoli Liu, Shanghai (CN); Xiaofu Meng, Shanghai (CN); Xishan Zhang, Shanghai (CN); Jiaming Guo, Shanghai (CN); Di Huang, Shanghai (CN); Yao Zhang, Shanghai (CN); Yu Chen, Shanghai (CN); Chang Liu, Shanghai (CN)

(73) Assignee: Shanghai Cambricon Information Technology Co., Ltd, Shanghai (CN)

( * ) Notice: Subject to any disclaimer, the term of this patent is extended or adjusted under 35 U.S.C. 154(b) by 0 days.

(21) Appl. No.: 18/820,594

(22) Filed: Aug. 30, 2024

(65) Prior Publication Data

US 2025/0053485 A1 Feb. 13, 2025

Related U.S. Application Data

(63) Continuation of application No. 17/547,972, filed on Dec. 10, 2021, now Pat. No. 12,093,148, which is a
(Continued)

(30) Foreign Application Priority Data

Jun. 12, 2019 (CN) ......................... 201910505239.7
Jun. 14, 2019 (CN) ......................... 201910515355.7
(Continued)

(51) Int. Cl.
*G06F 11/14* (2026.01)
*G06N 3/047* (2023.01)
*G06N 3/08* (2023.01)

(52) U.S. Cl.
CPC ......... *G06F 11/1476* (2013.01); *G06N 3/047* (2023.01); *G06N 3/08* (2013.01); *G06F 2201/81* (2013.01); *G06F 2201/865* (2013.01)

(58) Field of Classification Search
CPC ............. G06F 11/1476; G06F 2201/81; G06F 2201/865; G06N 3/047; G06N 3/08;
(Continued)

(56) References Cited

U.S. PATENT DOCUMENTS 12,001,955 B2 * 6/2024 Liu ........................ G06N 3/063
2014/0046885 A1 2/2014 Majumdar et al.
(Continued)

FOREIGN PATENT DOCUMENTS

CN 108229681 A 6/2018
CN 108345939 A 7/2018
(Continued)

OTHER PUBLICATIONS

Dylan Malone Stuart and Ian Taras; Investigating the Effects of Dynamic Precision Scaling on Neural Network Training; Dated Jan. 25, 2018; pp. 1-8.
(Continued)

*Primary Examiner* — Yair Leibovich
(74) *Attorney, Agent, or Firm* — Letao Qin

(57) ABSTRACT

The technical solution involves a board card including a storage component, an interface apparatus, a control component, and an artificial intelligence chip. The artificial intelligence chip is connected to the storage component, the control component, and the interface apparatus, respectively; the storage component is used to store data; the interface apparatus is used to implement data transfer between the artificial intelligence chip and an external device; and the control component is used to monitor a state
(Continued)

of the artificial intelligence chip. The board card is used to perform an artificial intelligence operation.

18 Claims, 70 Drawing Sheets

Related U.S. Application Data continuation of application No. PCT/CN2019/106801, filed on Sep. 19, 2019.

(30) Foreign Application Priority Data

Jun. 18, 2019 (CN) ......................... 201910528537.8
Jun. 27, 2019 (CN) ......................... 201910570125.0

(58) Field of Classification Search
CPC ...... G06N 3/045; G06N 3/0464; G06N 3/048; G06N 3/0495; G06N 3/063; G06N 3/09; G06N 3/084; G06N 5/02
USPC ............................................................ 706/15
See application file for complete search history.

(56) References Cited

U.S. PATENT DOCUMENTS

| | | | |
|---|---|---|---|
| 2016/0078361 | A1 | 3/2016 | Brueckner et al. |
| 2016/0328647 | A1 | 11/2016 | Lin et al. |
| 2018/0005111 | A1 | 1/2018 | Chaudhari et al. |
| 2018/0107925 | A1 | 4/2018 | Choi et al. |
| 2019/0050710 | A1 | 2/2019 | Wang et al. |
| 2019/0122100 | A1 | 4/2019 | Kang et al. |
| 2019/0164057 | A1 | 5/2019 | Doshi |
| 2019/0303765 | A1 | 10/2019 | Gou et al. |
| 2019/0339937 | A1 | 11/2019 | Lo et al. |
| 2020/0090031 | A1 * | 3/2020 | Jakkam Reddi ....... G06N 20/00 |
| 2020/0302283 | A1 | 9/2020 | Zhu et al. |
| 2020/0334525 | A1 | 10/2020 | Tsai et al. |
| 2021/0192349 | A1 | 6/2021 | Lian et al. |
| 2021/0374540 | A1 | 12/2021 | Yuan et al. |

FOREIGN PATENT DOCUMENTS

| | | | |
|---|---|---|---|
| CN | 108427990 | A | 8/2018 |
| CN | 109190754 | A | 1/2019 |
| CN | 109472353 | A | 3/2019 |
| CN | 109740754 | A | 5/2019 |
| CN | 109740739 | A | 4/2020 |
| JP | 2010233691 | A | 10/2010 |
| JP | 2013191642 | A | 10/2012 |
| KR | 20190034985 | A | 4/2019 |
| KR | 20190054454 | A | 5/2019 |
| WO | 2017/168427 | A1 | 10/2017 |
| WO | 2018192500 | A1 | 10/2018 |

OTHER PUBLICATIONS

Chinese 2nd Office Action issued on Apr. 26, 2024, relating to corresponding counterpart Chinese Application No. 201910888552.3; 10 total pages, including English translation.

Chinese 2nd Office Action issued on Jun. 1, 2024, relating to corresponding counterpart Chinese Application No. 201910888599.X; 8 total pages, including English translation.

Yan JL, Zhang Y, Tu FB, et al., Research on low-power neural network computing accelerator, Sci Sin Inform, 2019, 49: 314-333, doi: 10.1360/N112018-00282.

Wang, Peisong, et al. "Two-step quantization for low-bit neural networks." Proceedings of the IEEE Conference on computer vision and pattern recognition. 2018. (Year: 2018) 9 pages.

Final Office Action received in U.S. Appl. No. 17/622,647, mailed on Nov. 6, 2025 (47 pages).

Lin Darryl D et al: "Fixed Point Quantization of Deep Convolutional Networks", arXiv.org, Jun. 19, 2016 (Jun. 19, 2016), XP093369467, Retrieved from the Internet: URL:https://proceedings.mlr.press/v48/linb16.pdf.

25217875.1 EPO Office Action dated Feb. 27, 2026. (9 pages).

U.S. Appl. No. 17/622,647 Office Action dated Mar. 18, 2026. (65 pages).

Sungho Shin et al: "Fixed-point optimization of deep neural networks with adaptive step size retraining", Arxiv.org, Cornell University Library, 201 Olin Library Cornell University Ithaca, NY 14853, Feb. 27, 2017 (Feb. 27, 2017), XP080748708, DOI: 10.1109/ICASSP.2017.7952347.

25217875.1 European search report dated Feb. 5, 2026. (11 pages).

European search report dated Jun. 5, 2026.

* cited by examiner

500A

500B

800L

NEURAL NETWORK QUANTIZATION PARAMETER DETERMINATION METHOD AND RELATED PRODUCTS

CROSS-REFERENCE TO RELATED APPLICATIONS

The present application is a continuation application of U.S. application Ser. No. 17/547,972 filed on Dec. 10, 2021, which is a continuation of International Application No. PCT/CN2019/106801 filed on Sep. 19, 2019, and claiming priority to Chinese Application CN201910505239.7 filed on Jun. 12, 2019, Chinese Application CN201910528537.8 filed on Jun. 18, 2019, Chinese Application CN201910570125.0 filed on Jun. 27, 2019, and Chinese Application CN201910515355.7 filed on Jun. 14, 2019. All of the aforementioned applications are hereby incorporated by reference in their entireties.

TECHNICAL FIELD

The embodiments of the present disclosure relate to a neural network quantization parameter determination method and related products.

BACKGROUND

A neural network (NN) is a mathematical or computational model that imitates structures and functions of a biological neural network. By training sample data, the neural network continuously revises weights and thresholds of the network to reduce an error function along a direction of negative gradient and approach an expected output. The neural network is a widely used recognition and classification model, which is mostly used for function approximation, model recognition and classification, data compression, time series prediction, and the like.

In practical applications, the neural network usually uses data of 32 bits. The data in the existing neural network occupies a number of bits, which requires a large storage space and high processing bandwidth in spite of ensuring precision, thereby increasing the cost.

SUMMARY

To solve the above technical problems, the present disclosure provides a method and related products for adjusting data bit width.

To achieve the above objective, the present disclosure provides a method for adjusting data bit width. The method may include:

- obtaining a data bit width used to perform a quantization on data to be quantized, where the data bit width indicates the bit width of the quantized data after the data to be quantized being quantized;
- performing a quantization on a group of data to be quantized based on the data bit width to convert a group of data to be quantized to a group of quantized data, where the group of quantized data has the data bit width;
- comparing the group of data to be quantized the group of quantized data to determine a quantization error correlated with the data bit width; and
- adjusting the data bit width based on the determined quantization error.

To achieve this goal, the present disclosure provides devices to adjust the data bit width, including a memory and a processor. The memory stores computer programs which are able to be run on processors. The steps of the method in any example mentioned above may be implemented when the processor executes the computer program.

To achieve this goal, the present disclosure provides a computer readable storage medium. A computer program may be stored in the computer readable storage medium. The steps of the method in any example mentioned above may be implemented when the processor executes the computer program.

To achieve this goal, the present disclosure provides a device for adjusting data bit width. The device may include:

- an obtaining unit configured to obtain a data bit width used to perform a quantization on data to be quantized, where the data bit width indicates the bit width of the quantized data after the data to be quantized being quantized;
- a quantization unit configured to perform a quantization on a group of data to be quantized based on the data bit width to convert a group of data to be quantized to a group of quantized data, where the group of quantized data has the data bit width;
- a determination unit configured to compare the group of data to be quantized the group of quantized data to determine a quantization error correlated with the data bit width; and
- an adjustment unit configured to adjust the data bit width based on the determined quantization error.

In the process of a neural network operation, a data bit width is determined during quantization by using technical solutions in the present disclosure. The data bit width is used by an artificial intelligence processor to quantize data involved in the process of the neural network operation and convert high-precision data into low-precision fixed-point data, which may reduce storage space of data involved in the process of neural network operation. For example, a conversion from float32 to fix8 may reduce a model parameter by four times. Smaller data storage space enables neural network deployment to occupy smaller space, thus the on-chip memory of an artificial intelligence processor chip may accommodate more data, which may reduce memory access data in the artificial intelligence processor chip and improve computation performance.

BRIEF DESCRIPTION OF THE DRAWINGS

To describe technical solutions of embodiments of the present disclosure more clearly, accompanied drawings in the embodiments of the present disclosure will be briefly described hereinafter. Apparently, the described accompanied drawings below merely show embodiments of the present disclosure and are not intended to be considered as limitations of the present disclosure.

To solve the problem of neural network quantization, the following schemes (201910505239.7) are provided, which include FIGS. 2-1 to 2-31.

Figure 1:
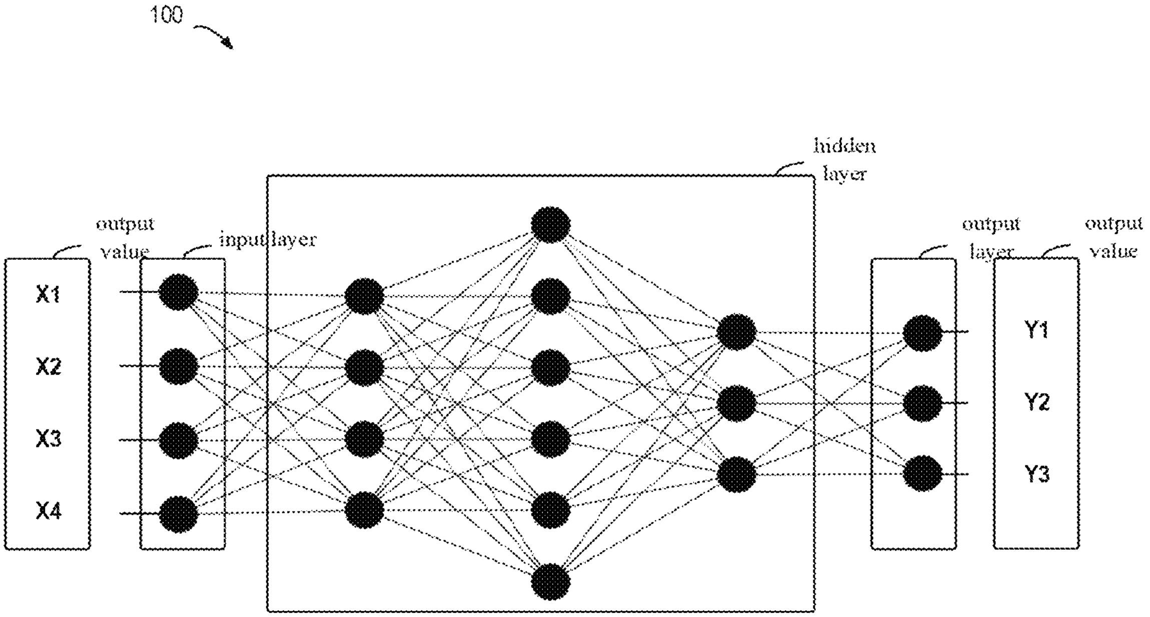
FIG. 1 is a schematic structural diagram of a neural network according to an embodiment of the present disclosure.
Figure 2:
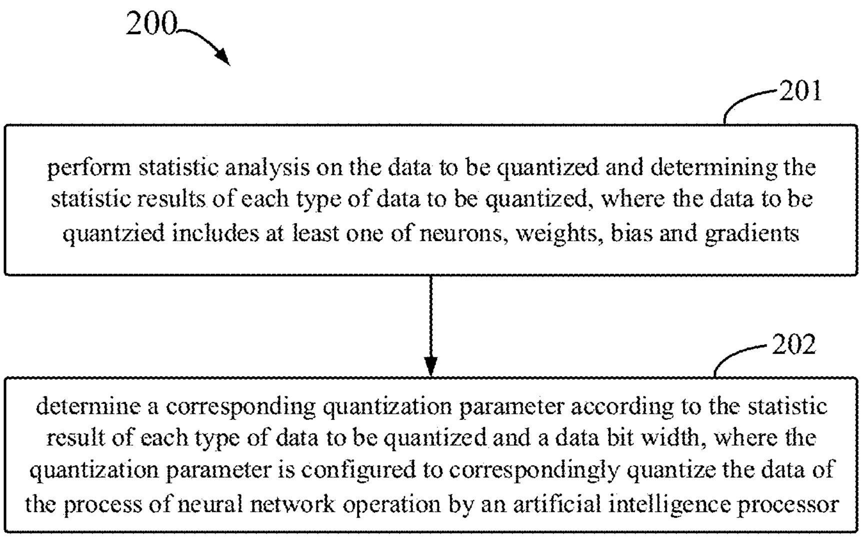
FIG. 2 is a flowchart illustrating a neural network quantization parameter determination method according to an embodiment of the present disclosure.
Figures 1, 2:
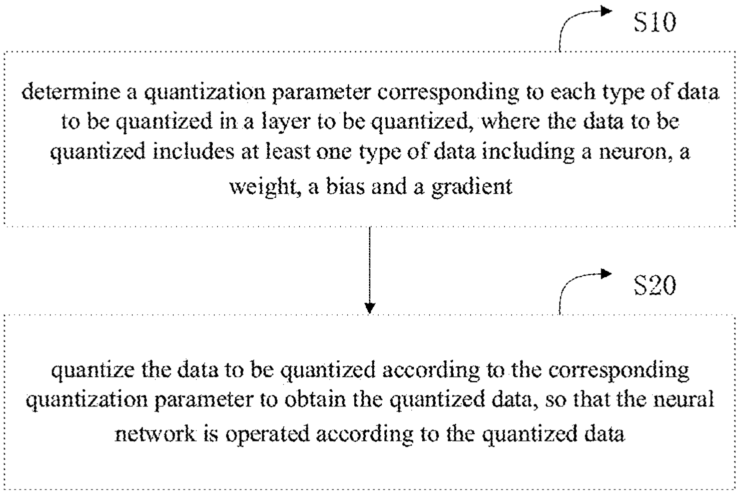
Figure 2:
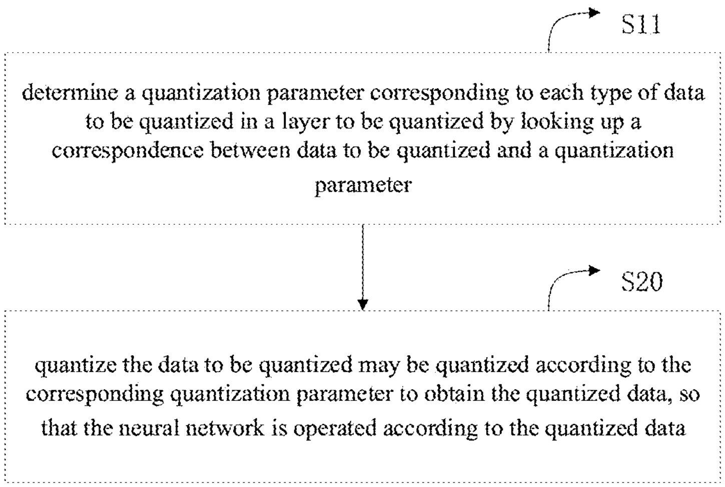
Figures 2, 3:
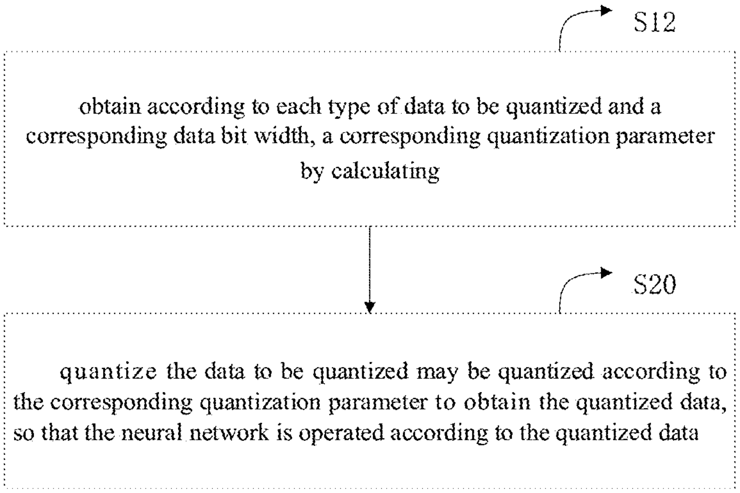
FIG. 3 is a schematic diagram of a symmetrical fixed-point data representation according to an embodiment of the present disclosure.
Figures 2, 3, 4:
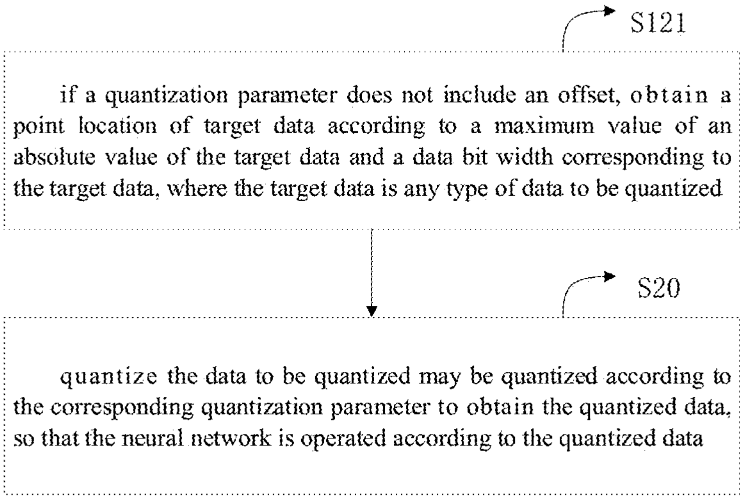
FIG. 4 is a schematic diagram of a symmetrical fixed-point data representation with an introduced offset according to an embodiment of the present disclosure.

FIG. 2-1 is a flowchart illustrating a neural network quantization method according to an embodiment of the present disclosure;

FIG. 2-2 is a flowchart illustrating a neural network quantization method according to an embodiment of the present disclosure;

FIG. 2-3 is a flowchart illustrating a neural network quantization method according to an embodiment of the present disclosure;

FIG. 2-4 is a flowchart illustrating a neural network quantization method according to an embodiment of the present disclosure;

FIG. 2-5 is a schematic diagram of a correspondence of data before and after quantization when quantization parameters do not include an offset in the neural network quantization method according to an embodiment of the present disclosure;

FIG. 2-6 is a flowchart illustrating a neural network quantization method according to an embodiment of the present disclosure;

FIG. 2-7 is a schematic diagram of a correspondence of data before and after quantization when quantization parameters include an offset in the neural network quantization method according to an embodiment of the present disclosure;

FIG. 2-8 is a flowchart illustrating a neural network quantization method according to an embodiment of the present disclosure;

FIG. 2-9 is a flowchart illustrating a neural network quantization method according to an embodiment of the present disclosure;

FIG. 2-10 is a flowchart illustrating a neural network quantization method according to an embodiment of the present disclosure;

FIG. 2-11 is a flowchart illustrating a neural network quantization method according to an embodiment of the present disclosure;

FIG. 2-12 is a flowchart illustrating a neural network quantization method according to an embodiment of the present disclosure;

FIG. 2-13 is a flowchart illustrating a neural network quantization method according to an embodiment of the present disclosure;

FIG. 2-14 is a flowchart illustrating a neural network quantization method according to an embodiment of the present disclosure;

FIG. 2-15 is a flowchart illustrating a neural network quantization method according to an embodiment of the present disclosure;

FIG. 2-16 is a flowchart illustrating a neural network quantization method according to an embodiment of the present disclosure;

FIG. 2-17 is a flowchart illustrating a neural network quantization method according to an embodiment of the present disclosure;

FIG. 2-18 is a flowchart illustrating a neural network quantization method according to an embodiment of the present disclosure;

FIG. 2-19 is a flowchart illustrating a neural network quantization method according to an embodiment of the present disclosure;

FIG. 2-20 is a flowchart illustrating a neural network quantization method according to an embodiment of the present disclosure;

FIG. 2-21 is a flowchart illustrating a neural network quantization method according to an embodiment of the present disclosure;

FIG. 2-22 is a flowchart illustrating a neural network quantization method according to an embodiment of the present disclosure;

FIG. 2-23 is a flowchart illustrating a neural network quantization method according to an embodiment of the present disclosure;

FIG. 2-24 is a flowchart illustrating a neural network quantization method according to an embodiment of the present disclosure;

FIG. 2-25 is a flowchart illustrating a neural network quantization method according to an embodiment of the present disclosure;

FIG. 2-26 is a schematic diagram of a neural network quantization device according to an embodiment of the present disclosure;

FIG. 2-27 is a schematic diagram of a neural network quantization device according to an embodiment of the present disclosure;

FIG. 2-28 is a schematic diagram of a neural network quantization device according to an embodiment of the present disclosure;

FIG. 2-29 is a schematic diagram of a neural network quantization device according to an embodiment of the present disclosure;

FIG. 2-30 is a schematic diagram of a neural network quantization device according to an embodiment of the present disclosure;

FIG. 2-31 is a structural block diagram of a board card according to an embodiment of the present disclosure.

To solve the problem of adjusting quantization parameters, the following scheme (201910528537.8) is provided, which includes FIGS. 3-1 to 3-25.

Figures 2, 3, 4, 5:
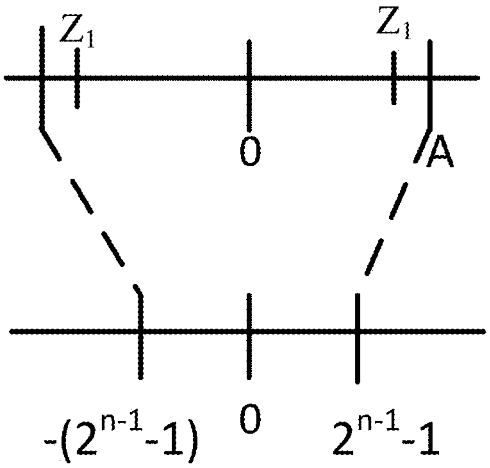

FIG. 3-1 is a schematic diagram of application environment of a method for adjusting quantization parameters according to an embodiment of the present disclosure;

FIG. 3-2 is a schematic diagram of a correspondence between data to be quantized and quantization data according to an embodiment of the present disclosure;

FIG. 3-3 is a schematic diagram of conversion of data to be quantized according to an embodiment of the present disclosure;

FIG. 3-4 is a flowchart illustrating a method for adjusting quantization parameters according to an embodiment of the present disclosure;

FIG. 3-5 is a schematic diagram of a variation trend of data to be quantized during operation according to an embodiment of the present disclosure;

FIG. 3-6 is a flowchart illustrating a method for determining a target iteration interval in a method for adjusting parameters according to an embodiment of the present disclosure;

FIG. 3-7 is a flowchart illustrating a method for determining a point location variation range according to an embodiment of the present disclosure;

FIG. 3-8 is a flowchart illustrating a method for determining a second mean value according to an embodiment of the present disclosure;

FIG. 3-9 is a flowchart illustrating a method for adjusting data bit width according to an embodiment of the present disclosure;

FIG. 3-10 is a flowchart illustrating a method for adjusting data bit width according to another embodiment of the present disclosure;

FIG. 3-11 is a flowchart illustrating a method for adjusting data bit width according to still another embodiment of the present disclosure;

FIG. 3-12 is a flowchart illustrating a method for adjusting data bit width according to yet another embodiment of the present disclosure;

FIG. 3-13 is a flowchart illustrating a method for determining a second mean value according to another embodiment of the present disclosure;

FIG. 3-14 is a flowchart illustrating a method for adjusting quantization parameters according to another embodiment of the present disclosure;

FIG. 3-15 is a flowchart illustrating adjustment of quantization parameters in a method for adjusting quantization parameters according to an embodiment of the present disclosure;

FIG. 3-16 is a flowchart illustrating a method for determining a target iteration interval in a method for adjusting parameters according to another embodiment of the present disclosure;

FIG. 3-17 is a flowchart illustrating a method for determining a target iteration interval in a method for adjusting parameters according to still another embodiment of the present disclosure;

FIG. 3-18 is a flowchart illustrating a method for adjusting quantization parameters according to still another embodiment of the present disclosure;

FIG. 3-19 is a flowchart illustrating a method for adjusting quantization parameters according to yet another embodiment of the present disclosure;

FIG. 3-20 is a structural block diagram of a quantization parameter adjustment device according to an embodiment of the present disclosure;

FIG. 3-21 is a structural block diagram of a quantization parameter adjustment device according to an embodiment of the present disclosure;

FIG. 3-22 is a structural block diagram of a quantization parameter adjustment device according to an embodiment of the present disclosure;

FIG. 3-23 is a structural block diagram of a quantization parameter adjustment device according to an embodiment of the present disclosure;

FIG. 3-24 is a structural block diagram of a quantization parameter adjustment device according to an embodiment of the present disclosure;

FIG. 3-25 is a structural block diagram of a board card according to an embodiment of the present disclosure.

DETAILED DESCRIPTION OF THE EMBODIMENTS

Technical solutions in embodiments of the present disclosure will be described clearly and completely hereinafter with reference to the drawings in the embodiments of the present disclosure. Obviously, the embodiments to be described are merely some rather than all examples of the present disclosure. All other embodiments obtained by those of ordinary skill in the art based on the embodiments of the present disclosure without creative efforts shall fall within the protection scope of the present disclosure.

It should be understood that the terms such as "first", "second", "third", "fourth" and the like used in the specification, the claims, and the accompanied drawings of the present disclosure are used for distinguishing between different objects rather than describing a particular order. The terms "include" and "comprise" used in the specification and claims are intended to indicate existence of the described features, whole body, steps, operations, elements, and/or components, but do not exclude the existence or addition of one or more other features, whole body, steps, operations, elements, components, and/or collections thereof.

It should also be understood that the terms used in the specification of the present disclosure are merely intended to describe specific embodiments rather than to limit the present disclosure. As used in the specification and claims of the present disclosure, singular forms of "a", "one", and "the" are intended to include plural forms unless the context clearly indicates other circumstances. It should be further understood that the term "and/or" used in the specification and claims of the present disclosure refers to any combination and all possible combinations of one or more listed relevant items.

As used in the specification and claims of the present disclosure, the term "if" may be interpreted as "when", "once", "in response to determining", or "in response to detecting" according to the context. Similarly, phrases such as "if . . . is determined" or "if [the described conditions or events] are detected" may be interpreted as "once . . . is determined", "in response to determining", "once [the described conditions or events] are detected", or "in response to detecting [the described conditions or events]".

Definitions of Technical Terms

Floating-point number: according to the IEEE floating-point standard, a floating-point number is a number represented in a form of V=(−1)/\sign*mantissa*2/\E The above "sign" refers to a sign bit, 0 refers to a positive number and 1 refers to a negative number; E refers to an exponent, which means weighting a floating-point number and the weight is an E-th power of 2 (possibly a negative power); and mantissa refers to a mantissa, where mantissa is a binary fraction whose range is 1~2−ε or 0−ε. A floating-point number represented in a computer is divided into three fields, where the fields are encoded separately:

- a single sign bit s directly encodes a sign s;
- a k-bit exponent field encodes the exponent, and exp=e (k−1) . . . e(1)e(0);
- an n-bit decimal number field mantissa encodes the mantissa, but encoding results depend on whether results in the exponent stage are all 0.

Fixed-point number: a fixed-point number is composed of three parts: a shared exponent, a sign bit, and a mantissa. The shared exponent refers to an exponent that is shared within a set of real numbers that need to be quantized; the sign bit determines whether a fixed-point number is positive or negative; the mantissa determines a count of valid digits of a fixed-point number, which is also known as precision. For example, for an 8-bit fixed-point number, a numerical computation method is as follows: value=$(-1)^{sign}\times(\text{mantissa})\times 2^{(exponent-127)}$.

Binary fraction: any decimal number may be represented by a formula $\Sigma j*10^i$. For example, a decimal number 12.34 may be represented by the formula 1 as follows: $12.34=1*10^1+2*10^0+3*10^{-1}+4*10^{-2}$, where a left side of the decimal point is a positive power of 10, and a right side of the decimal point is a negative power of 10. Similarly, a binary fraction may also be represented in this way, in which the left side of the decimal point is a positive power of 2 and the right side of the decimal point is a negative power of 2. For example, a decimal number 5.75 may be represented as $5.75=1*2^2+0*2^1+1*2^0+1*2^{-1}1+1*2^{-2}$, so 5.75 may be represented as a binary fraction 101.11.

Overflow: in a fixed-point computation unit, representation of a number has a certain range. In a computation process, if a size of a number exceeds the representation range of a fixed-point number, it is called "overflow".

KL divergence (Kullback-Leibler divergence): It is also known as relative entropy, information divergence, and information gain. KL divergence is an asymmetrical measure of difference between two probability distributions P and Q. KL divergence is used to measure an average count of extra bits required to encode samples from P by using encoding based on Q. Typically, P represents actual distribution of data, Q represents theoretical distribution of data, model distribution of data, or approximate distribution of P.

Data bit width: a count of bits used to represent data.

Quantization: a process of converting high-precision numbers usually represented by 32 bits or 64 bits into fixed-point numbers that occupy less memory space, which may cause certain loss in precision.

Descriptions of a neural network quantization parameter determination method and related products will be illustrated in detail with reference to the accompanied drawings.

A neural network (NN) is a mathematical model which imitates structures and functions of a biological neural network, and is calculated by plenty of connected neurons. Therefore, a neural network is a computational model composed of plenty of connected nodes (or called "neurons"). Each node represents a specific output function called activation function. A connection between each two neurons represents a weighted value that passes through the connection signal and is called a weight. The weight may be viewed as "memory" of a neural network. An output of a neural network varies according to different connection methods between neurons, different weights, and different activation functions. A neuron is a basic unit of the neural network, which obtains a certain count of inputs and a bias. The certain count of inputs and the bias are multiplied by a weight when a signal (value) arrives. The connection refers to connecting one neuron to another neuron in another layer or a same layer, and the connection is accompanied by an associated weight. In addition, the bias is an extra input of the neuron, which is always 1 and has its own connection weight. This ensures that the neuron may be activated even if all inputs are empty (all 0).

In applications, if no non-linear function is applied to the neuron in the neural network, the neural network is only a linear function and is not powerful than a single neuron. If an output result of a neural network is between 0 and 1, for example, in a case of cat-dog identification, an output close to 0 may be regarded as a cat and an output close to 1 may be regarded as a dog. An activation function such as a sigmoid activation function is introduced into the neural network to realize the cat-dog identification. Regarding the activation function, it only should be known that a return value of the activation function is a number between 0 and 1. Therefore, the activation function is configured to introduce non-linearity into the neural network, which may narrow down the range of a neural network computation result. In fact, how the activation function is represented is not important, and what is important is to parameterize a non-linear function by some weights, thus the non-linear function may be changed by changing the weights.

As shown in FIG. 1, FIG. 1 is a schematic structural diagram of a neural network. The neural network shown in FIG. 1 contains three layers: an input layer, a hidden layer, and an output layer. The hidden layer shown in FIG. 1 contains five layers. A leftmost layer in the neural network is called the input layer and a neuron in the input layer is called an input neuron. As a first layer in the neural network, the input layer receives input signals (values) and transmits the signals (values) to a next layer. The input layer generally does not perform operations on the input signals (values), and has no associated weight or bias. The neural network shown in FIG. 1 contains four input signals: x1, x2, x3, and x4.

The hidden layer includes neurons (nodes) used to apply different transformations to input data. The neural network shown in FIG. 1 contains five hidden layers. A first hidden layer contains four neurons (nodes), a second hidden layer contains five neurons, a third hidden layer contains six neurons, a fourth hidden layer contains four neurons, and a fifth hidden layer contains three neurons. Finally, the hidden layer transfers operation values of the neurons to the output layer. In the neural network shown in FIG. 1, each of the neurons in the five hidden layers is fully connected; in other words, each of the neurons in each hidden layer is connected with each neuron in the next layer. It should be noted that in some neural networks, the hidden layers may not be fully connected.

A rightmost layer of the neural network shown in FIG. 1 is called the output layer, and a neuron in the output layer is called an output neuron. The output layer receives an output from the last hidden layer. In the neural network shown in FIG. 1, the output layer contains three neurons and three output signals (y1, y2, and y3).

In practical applications, plenty of sample data (including input and output) are given in advance to train an initial neural network. After training, a trained neural network is obtained, and the trained neural network may give a right output for the input in real environment in the future.

Before the discussion of neural network training, a loss function needs to be defined. A loss function is a function measuring performance of a neural network when the neural network performs a specific task.

In some embodiments, the loss function may be obtained as follows: transferring each piece of sample data along the neural network in the process of training a certain neural network to obtain an output value, performing subtraction on the output value and an expected value to obtain a difference, and then squaring the difference. The loss function obtained in the manner is the difference between the expected value and the true value. The purpose of training a neural network is to reduce the difference or a value of the loss function. In some embodiments, the loss function may be represented as:

$$L(y, \hat{y}) = \frac{1}{m}\sum_{i=1}^{m}(y_i - \hat{y}_i)^2$$

In the formula, y represents an expected value, $\hat{y}$ represents an actual result obtained by each piece of sample data in a sample data set transferring through the neural network, i represents an index of each piece of sample data in the sample data set, $L(y, \hat{y})$ represents an error value between the expected value y and the actual result $\hat{y}$, and m represents a count of sample data in the sample data set. Taking the cat-dog identification as an example, in a data set composed of pictures of cats and dogs, a corresponding label of a picture of dog is 1 and a corresponding label of a picture of cat is 0. The label corresponds to the expected value y in the above formula. The purpose of sending each sample image to the neural network is to obtain a recognition result through the neural network. In order to calculate the loss function, each sample image in the sample data set must be traversed to obtain the actual result $\hat{y}$ corresponding to each sample image, and then calculate the loss function according to the above definition. The value of the loss function being large means that the training of the neural network has not been finished and the weight needs to be adjusted.

At the beginning of neural network training, the weight needs to be initialized randomly. It is apparent that an initialized neural network may not provide a good result. In the training process, if starting from a neural network with low precision, a network with high precision may be obtained through training.

The training process of the neural network includes two stages. The first stage is to perform a forward processing on a signal, which includes sending the signal from the input layer to the output layer through the hidden layer. The second stage is to perform a back propagation on a gradient, which includes propagating the gradient from the output layer to the hidden layer, and finally to the input layer, and sequentially adjusting weights and biases of each layer in the neural network according to the gradient.

In the process of forward processing, an input value is input into the input layer in the neural network and an output (called a predicted value) is obtained from the output layer in the neural network. When the input value is input into the input layer in the neural network, the input layer does not perform any operation. In the hidden layer, the second hidden layer obtains a predicted intermediate result value from the first hidden layer to perform a computation operation and an activation operation, and then sends the obtained predicted intermediate result value to the next hidden layer. The same operations are performed in the following layers to obtain the output value in the output layer in the neural network.

After the forward processing, an output value called an expected value is obtained. In order to calculate the error, the predicted value is compared with an actual output value to obtain a corresponding error. A chain rule of calculus is used in the back propagation. In the chain rule, derivatives of errors corresponding to the weights of the last layer in the neural network are calculated first. The derivatives are called gradients, which are then used to calculate the gradients of the penultimate layer in the neural network. The process is repeated until the gradient corresponding to each weight in the neural network is obtained. Finally, the corresponding gradient is subtracted from each weight in the neural network and then the weight is updated once to reduce errors.

For a neural network, fine-tuning refers to loading a trained neural network. The process of fine-tuning also includes two stages, which are the same as those of training. The first stage is to perform the forward processing on a signal, and the second stage is to perform the back propagation on a gradient to update weights in the trained neural network. The difference between training and fine-tuning is that training refers to randomly processing an initialized neural network and starts from the beginning, while fine-tuning does not start with a randomly selected neural network.

In the process of training or fine-tuning a neural network, weights in the neural network are updated based on gradients once every time the neural network performs a forward processing on a signal and performs a corresponding back propagation on an error, and the whole process is called an iteration. To obtain a neural network with expected precision, a very large sample data set is needed in the process of training. In this case, it is impossible to input the entire sample data set into a computer at once. Therefore, in order to solve the problem, the sample data set needs to be divided into a plurality of blocks and then each block of the sample data set is passed to the computer. After the forward processing is performed on each block of the sample data set, the weights in the neural network are correspondingly updated once. When the neural network performs a forward processing on a complete sample data set and returns a weight update correspondingly, the process is called an epoch. In practice, it is not enough to transmit a complete data set in the neural network only once. It is necessary to transmit the complete data set in the same neural network a plurality of times, in other words, a plurality of epochs are needed to obtain a neural network with expected precision.

In the process of training or fine-tuning of the neural network, faster speed and higher accuracy are generally expected. Since data in the neural network is represented in a high-precision data format such as floating-point numbers, all the data involved in the process of training or fine-tuning is in the high-precision data format and then the trained neural network is quantized. For example, when quantized objects are weights of a whole neural network and the quantized weights are 8-bit fixed-point numbers, since a neural network usually contains millions of connections, almost all the space is occupied by weights that are connected with neurons. The weights are different floating-point numbers. The weights of each layer tend to be normally distributed in a certain interval, such as (−3.0, 3.0). A maximum value and a minimum value corresponding to the weights of each layer in the neural network are stored, and the value of each floating-point number is represented by an 8-bit fixed-point number. The interval within the range of the maximum value and the minimum value is linearly divided into 256 quantization intervals, in which each quantization interval is represented by an 8-bit fixed-point number. For example, in an interval of (−3.0, 3.0), byte 0 represents −3.0 and byte 255 represents 3.0. Similarly, byte 128 represents 0.

For data represented in a high-precision data format such as a floating-point number, based on rules of computation representation of floating-point and fixed-point numbers according to a computer architecture, for a fixed-point computation and a floating-point computation of the same length, a floating-point computation model is more complex and needs more logic devices to build a floating-point computation unit. In other words, a volume of the floating-point computation unit is larger than the volume of a fixed-point computation unit. Moreover, the floating-point computation unit needs to consume more resources to process, so that a gap of power consumption between the fixed-point computation and the floating-point computation is usually an order of magnitude. Therefore, the floating-point computation unit occupies many times more chip area and consumes many times more power than the fixed-point computation unit.

However, the floating-point computation has its own advantages. Firstly, although the fixed-point computation is straightforward, a fixed position of decimals determines an integer part and a decimal part with a fixed number of bits, which may be inconvenient to simultaneously represent a large number or a small number, and may lead to overflow.

In addition, when an artificial intelligence processor chip is used for training or fine-tuning, the floating-point computation unit may be more suitable than the fixed-point computation unit, because in a neural network with supervised learning, only the floating-point computation unit is capable of recording and capturing tiny increments in training. Therefore, how computation capability of chip training may be improved substantially without increasing the artificial intelligence chip area and power consumption is an urgent problem to be solved.

For those skilled in the art, based on practice, training with low bit-width fixed-point numbers requires fixed-point numbers greater than 8-bit to perform the back propagation on gradients, which may lead to a complex process of training with low bit-width fixed-point numbers. Therefore, how a floating-point computation unit may be replaced with a fixed-point computation unit to achieve fast speed of the fixed-point computation and how peak computation power of an artificial intelligence processor chip may be improved while the precision of the floating-point computation is satisfied are technical problems to be solved in the specification.

As described above, high tolerance for input noise is a feature of a neural network. When identifying an object in a picture, the neural network may be capable of ignoring primary noise and focusing on important similarities. In this way, the neural network may be capable of taking the low-precision computation as a source of noise and still producing accurate prediction results in a numerical format that contains little information. It is necessary to find a universal data representation to perform low-precision training or fine-tuning, thereby not only reducing data overflow, but also better representing data near 0 within the target interval. Therefore, the data representation needs to have the adaptability to be adjusted within the training or fine-tuning process.

Based on the above description, FIG. 2 is a flowchart illustrating a neural network quantization parameter determination method according to an embodiment of the present disclosure. The quantization parameter determined by the technical solution shown in FIG. 2 is used for data representation of data to be quantized to determine quantized fixed-point numbers. The quantized fixed-point numbers are used for training, fine-tuning, or inference of a neural network. The method may include:

a step 201: counting data to be quantized and determining a statistical result of each type of data to be quantized, where the data to be quantized includes at least one type of neurons, weights, gradients, and biases of the neural network.

As mentioned above, in the process of training or fine-tuning of a neural network, each layer of the neural network includes four types of data: neurons, weights, gradients, and biases. In the inference process, each layer of the neural network includes three types of data: neurons, weights, and biases. The data are all represented in a high-precision data format. The floating-point numbers are taken as an example of high-precision data in the specification. It should be made clear that the floating-point numbers is only a partial, not exhaustive list, of examples. It should be noted that those skilled in the art may make modifications or variations within the spirit and principle of the disclosure, for example, high-precision data may be high bit-width fixed-point numbers with a wide range of representation, in which a lowest precision represented by the high bit-width fixed-point numbers is low enough, and the high bit-width fixed-point numbers may be converted into low bit-width fixed-point numbers by using the technical solution in the present disclosure. However, as long as functions and technical effects realized by the modifications or variations are similar to those of the present disclosure, the modifications or variations shall fall within the scope of protection of the present disclosure.

No matter what a neural network structure it is, in the process of training or fine-tuning a neural network, the data to be quantized includes at least one type of neurons, weights, gradients, and biases of the neural network. In the inference process, the data to be quantized includes at least one type of neurons, weights, and biases of the neural network. If the data to be quantized are the weights, the data to be quantized may be all or part of the weights of a certain layer in the neural network. If the certain layer is a convolution layer, the data to be quantized may be all or part of the weights with a channel as a unit in the convolution layer, in which the channel refers to all or part of the channels of the convolution layer. It should be noted that only the convolution layer has a concept of channels. In the convolution layer, only the layered weights are quantized in a channel manner.

The following example is that the data to be quantized is the neurons and the weights of a target layer in the neural network, and the technical solution is described in detail below. In this step, the neurons and the weights of each layer in the target layer are analyzed respectively to obtain a maximum value and a minimum value of each type of the data to be quantized, and a maximum absolute value of each type of the data to be quantized may also be obtained. The target layer, as a layer needed to be quantized in the neural network, may be one layer or a plurality of layers. Taking one layer as a unit, the maximum absolute value of the data to be quantized may be determined by the maximum value and the minimum value of each type of the data to be quantized; the maximum absolute value of each type of the data to be quantized may be further obtained by calculating the absolute value of each type of the data to be quantized to obtain results and then traversing the results.

In practical applications, a reason why obtaining the maximum absolute value of each type of the data to be quantized according to the maximum value and the minimum value of each type of the data to be quantized is that, during quantization, the maximum value and the minimum value corresponding to the data to be quantized of each layer in the target layer are normally stored, which means that there is no need to consume more resources to calculate the absolute value of the data to be quantized and the maximum absolute value may be obtained directly according to the stored maximum and minimum value corresponding to the data to be quantized.

The method further includes a step 202: determining a corresponding quantization parameter by using the statistical result of each type of the data to be quantized and a data bit width, where the quantization parameter is used by an artificial intelligence processor to perform corresponding quantization on the data involved in a process of neural network operation.

In this step, the quantization parameter may include the following six situations. Situation one: The quantization parameter is a point location parameter s.

In the situation, a following formula (1) may be used to quantize the data to be quantized to obtain quantized data $I_x$:

$$I_x = \text{round}\left(\frac{F_x}{2^s}\right) \tag{1}$$

In the formula, s refers to the point location parameter; $I_x$ refers to an n-bit binary representation value of data x after quantization; $F_x$ refers to a floating-point value of the data x before quantization; and round refers to a rounding calculation.

It should be noted that here is not limited to the calculation round and may refer to performing other rounding calculations such as the ceiling calculation, the flooring calculation, the fix calculation, and the like to replace the round calculation in the formula (1).

In the situation, a maximum value A of a floating-point number may be represented by an n-bit fixed-point number as $2^s(2^{n-1}-1)$, then a maximum value in a number field of the data to be quantized may be represented by an n-bit fixed-point number as $2^s(2^{n-1}-1)$, and a minimum value in the number field of the data to be quantized may be represented by an n-bit fixed-point number as $-2^s(2^{s-1}-1)$ The formula (1) shows that when the data to be quantized is quantized with the quantization parameter corresponding to the first situation, a quantization interval is $2^s$ and is marked as C.

If Z is set to be a maximum absolute value of all floating-point numbers in the number field of the data to be quantized, Z needs to be included in A and greater than A/2, so a following formula (2) needs to be satisfied:

$$2^s(2^{n-1}-1) \geq Z > 2^{s-1}(2^{n-1}-1) \tag{2}$$

Therefore, $$\log_2\left(\frac{Z}{2^{n-1}-1}\right) - 1 > s \geq \log_2\left(\frac{Z}{2^{n-1}-1}\right),$$

$$\text{then } s = \text{ceil}\left(\log_2\left(\frac{Z}{2^{n-1}-1}\right)\right), \text{ and } A = 2^{\text{ceil}\left(\log_2\frac{Z}{2^{n-1}-1}\right)}(2^{n-1}-1).$$

According to a formula (3), the n-bit binary representation value $I_x$ of the data x after quantization is quantized inversely to obtain inverse-quantized data $\hat{F}_x$, where a data format of the inverse-quantized data $\hat{F}_x$ is the same as that of the corresponding data $F_x$ before quantization, both of which are floating-point values.

$$\hat{F}_x = \text{round}\left(\frac{F_x}{2^s}\right) \times 2^s. \tag{3}$$

Situation two: the quantization parameter is a first scaling factor $f_1$. In the situation, a following formula (4) may be used to quantize the data to be quantized to obtain quantized data $I_x$:

$$I_x = \text{round}\left(\frac{F_x}{f_1}\right). \tag{4}$$

In the formula, $f_1$ refers to the first scaling factor; $I_x$ refers to the n-bit binary representation value of the data x after quantization; $F_x$ refers to the floating-point value of the data x before quantization; and round refers to the rounding calculation. It should be noted that here is not limited to the calculation round and may refer to performing other rounding calculations such as the ceiling calculation, the flooring calculation, the fix calculation, and the like to replace the calculation round in the formula (4). The formula (4) shows that when the data to be quantized is quantized with the quantization parameter corresponding to the second situation, the quantization interval is and is marked as C.

For the first scaling factor $f_1$, a situation is that the point location parameter s is a known fixed value that does not change. Given $2^s=T$, in which T is a fixed value, a maximum value A of a floating-point number may be represented by an n-bit fixed-point number as $(2^{n-1}-1)\times T$. In the situation, the maximum value A depends on the data bit width n. Given that Z is a maximum absolute value of all numbers in the number field of the data to be quantized, $$f_1 = \frac{Z}{2^{n-1}-1},$$

and at this time, $Z=(2^{n-1}-1)\times f_1$. The maximum value in the number field of the data to be quantized may be represented by an n-bit fixed-point number as $(2^{n-1}-1)\times f_1$, and the minimum value in the number field of the data to be quantized may be represented by an n-bit fixed-point number as $-(2^{n-1}-1)\times f_1$. In another situation, $2^s\times f_2$ is considered as the first scaling factor $f_1$ as a whole in engineering applications. In this situation, the independent point location parameter s may be considered as not existed. $f_2$ is a second scaling factor. Given that Z is a maximum absolute value of all numbers in the number field of the data to be quantized, $$f_1 = \frac{Z}{2^{n-1}-1},$$

and at this time, $Z=(2^{n-1}-1)\times f_1$. The maximum value in the number field of the data to be quantized may be represented by an n-bit fixed-point number as $(2^{n-1}-1)\times f_1$, and the minimum value in the number field of the data to be quantized may be represented by an n-bit fixed-point number as $-(2^{n-1}-1)\times f_1$.

According to a formula (5), the n-bit binary representation value of the data x after quantization is quantized inversely to obtain inverse-quantized data $\hat{F}_x$, where a data format of the inverse-quantized data $\hat{F}_x$ is the same as that of the corresponding data $F_x$ before quantization, both of which are floating-point values.

$$\hat{F}_x = \text{round}\left(\frac{F_x}{f_1}\right) \times f_1 \tag{5}$$

Situation three: The quantization parameter is the point location parameter s and the second scaling factor $f_2$. In this situation, a following formula (6) may be used to quantize the data to be quantized to obtain quantized data $I_x$:

$$I_x = \text{round}\left(\frac{F_x}{2^s \times f_2}\right) \tag{6}$$

In the formula, s refers to the point location parameter, $f_2$ refers to the second scaling factor, and $$f_2 = \frac{Z}{2^s(2^{n-1}-1)};$$

$I_x$ refers to the n-bit binary representation value of the data x after quantization; $F_x$ refers to the floating-point value of the data x before quantization; and round refers to the rounding calculation. It should be noted that this is not limited to the calculation round and may refer to performing other rounding calculations such as the ceiling calculation, the flooring calculation, the fix calculation, and the like to replace the calculation round in the formula (6). The maximum value A in the number field of the data to be quantized may be represented by an n-bit fixed-point number as $2^s(2^{n-1}-1)$. The formula (6) shows that when the data to be quantized is quantized with the quantization parameter corresponding to the third situation, the quantization interval $2^s\times f_2$ is and is marked as C.

Given that Z is the maximum absolute value of all numbers in the number field of the data to be quantized, according to the formula (2), $$1 \geq \frac{Z}{2^s(2^{n-1}-1)} > \frac{1}{2},$$

in other words, $$1 \geq \frac{Z}{A} > \frac{1}{2} \text{ and } 1 \geq f > \frac{1}{2}.$$

When $$f_2 = \frac{Z}{2^s(2^{n-1}-1)} = \frac{Z}{A},$$

according to the formula (2), Z may not affect a precision representation. When $f_2=1$, according to the formula (6) and formula (1), $$s = \text{ceil}\left(\log_2\left(\frac{Z}{2^{n-1}-1}\right)\right).$$

The maximum value in the number field of the data to be quantized may be represented by an n-bit fixed-point number as $(2^{n-1}-1)\times 2^s \times f_2$, and the minimum value in the number field of the data to be quantized may be represented by an n-bit fixed-point number as $-(2^{n-1}-1)\times 2^s \times f_2$.

According to a formula (7), the n-bit binary representation value $I_x$ of the data x after quantization is quantized inversely to obtain inverse-quantized data $\hat{F}_x$, where a data format of the inverse-quantized data $\hat{F}_x$ is the same as that of the corresponding data $F_x$ before quantization, both of which are floating-point values.

$$\hat{F}_x = \text{round}\left(\frac{F_x}{2^s \times f_2}\right)\times 2^s \times f_2 \tag{7}$$

As shown in FIG. 3, FIG. 3 is a schematic diagram of a symmetrical fixed-point data representation. The number field of the data to be quantized shown in FIG. 3 is distributed with "0" being a center of symmetry. Z refers to a maximum absolute value of all floating-point numbers in the number field of the data to be quantized, in FIG. 3, A refers to a maximum value of a floating-point number that may be represented by an n-bit fixed-point number, and the floating-point number A is converted into a fixed-point number as $2^{n-1}-1$. To avoid overflow, A needs to include Z. In practice, floating-point numbers involved in the process of neural network operation tend to be normally distributed in a certain interval, but may not be distributed with "0" being the center of symmetry. Therefore, the floating-point numbers being represented by fixed-point numbers may lead to overflow. To improve the situation, an offset is introduced into the quantization parameter, as shown in FIG. 4. In FIG. 4, the number field of the data to be quantized is not distributed with "0" being the center of symmetry. $Z_{min}$ refers to the minimum value of all floating-point numbers in the number field of the data to be quantized and $Z_{max}$ refers to the maximum value of all floating-point numbers in the number field of the data to be quantized. P is a center point between $Z_{min}$ and $Z_{max}$. The whole number field of the data to be quantized is shifted to make the shifted number field of the data to be quantized distributed with "0" being the center of symmetry, and the maximum absolute value in the shifted number field of the data to be quantized is Z.

As shown in FIG. 4, the offset refers to a horizontal distance between the point "0" and the point "P", and the distance is called an offset O, where $$O = \frac{Z_{min} + Z_{max}}{2} \text{ and } Z = \frac{Z_{max} - Z_{min}}{2}.$$

Based on the description of the offset O, a fourth situation of the quantization parameter appears.

Situation four: the quantization parameter includes the point location parameter and the offset.

In this situation, a following formula (8) may be used to quantize the data to be quantized to obtain quantized data $I_x$:

$$I_x = \text{round}\left(\frac{F_x - O}{2^s}\right) \tag{8}$$

In the formula, s refers to the point location parameter; O refers to the offset, and $$O = \frac{Z_{min} + Z_{max}}{2};$$

$I_x$ refers to the n-bit binary representation value of the data x after quantization; $F_x$ refers to the floating-point value of the data x before quantization; and round refers to the rounding calculation.

It should be noted that here is not limited to the calculation round and may refer to performing other rounding calculations such as the ceiling calculation, the flooring calculation, the fix calculation, and the like to replace the calculation round in the formula (8). In this situation, a maximum value A of a floating-point number may be represented by an n-bit fixed-point number as $2^s(2^{n-1}-1)$, then a maximum value in a number field of the data to be quantized may be represented by an n-bit fixed-point number as $2^s(2^{n-1}-1)+O$, and a minimum value in the number field of the data to be quantized may be represented by an n-bit fixed-point number as $-2^s(2^{n-1}-1)+O$. The formula (8) shows that when the data to be quantized is quantized with the quantization parameter corresponding to the fourth situation, a quantization interval is $2^s$ and is marked as C.

Given that Z is the maximum absolute value of all numbers in the number field of the data to be quantized and $Z=Z_{max}-Z_{min}/2$, min Z needs to be included in A and greater than A/2. According to the formula (2), $$\log_2\left(\frac{Z}{2^{n-1}-1}\right) - 1 > s \ge \log_2\left(\frac{Z}{2^{n-1}-1}\right),$$

$$s = \text{ceil}\left(\log_2\left(\frac{Z}{2^{n-1}-1}\right)\right), \text{ and } A = 2^{\text{ceil}\left(\log_2\frac{Z}{2^{n-1}-1}\right)}\left(2^{n-1}-1\right).$$

According to a formula (9), the n-bit binary representation value $I_x$ of the data x after quantization is quantized inversely to obtain inverse-quantized data $\hat{F}_x$, where a data format of the inverse-quantized data $\hat{F}_x$ is the same as that of the corresponding data $F_x$ before quantization, both of which are floating-point values.

$$\hat{F}_x = \text{round}\left(\frac{F_x - O}{2^s}\right)\times 2^s + O \tag{9}$$

Based on the description of the offset O, a fifth situation of the quantization parameter appears. Situation five: The quantization parameter includes the first scaling factor $f_1$ and the offset O. In this situation, a following formula (10) may be used to quantize the data to be quantized to obtain quantized data $I_x$:

$$I_x = \text{round}\left(\frac{F_x - O}{f_1}\right) \tag{10}$$

In the formula, $f_1$ refers to the first scaling factor; O refers to the offset; $I_x$ refers to the n-bit binary representation value of the data x after quantization; $F_x$ refers to the floating-point value of the data x before quantization; and round refers to the rounding calculation. It should be noted that here is not limited to the calculation round and may refer to performing other rounding calculations such as the ceiling calculation, the flooring calculation, the fix calculation, and the like to replace the calculation round in the formula (10). In one situation, the point location parameter s is a known fixed value that does not change. Given $2^s$=T and T is a fixed value, the maximum value A of a floating-point number may be represented by an n-bit fixed-point number as $(2^{n-1}-1)\times T$. In the situation, the maximum value A depends on the data bit width n. Given that Z is a maximum absolute value of all numbers in the number field of the data to be quantized, $$f_1 = \frac{Z}{2^{n-1}-1},$$

and at this time, $Z=(2^{n-1}-1)\times f_1$. The maximum value in the number field of the data to be quantized may be represented by an n-bit fixed-point number as $(2^{n-1}-1)\times f_1$, and the minimum value in the number field of the data to be quantized may be represented by an n-bit fixed-point number as $-(2^{n-1}-1)\times f_1$. In another situation, $2^s\times f_2$ is considered as the first scaling factor $f_1$ as a whole in engineering applications. In this situation, the independent point location parameter s may be considered as not existed. $f_2$ is a second scaling factor. Given that Z is a maximum absolute value of all numbers in the number field of the data to be quantized, $$f_1 = \frac{Z}{2^{n-1}-1}$$

and at this time, $Z=(2^{n-1}-1)\times f_1$. The maximum value in the number field of the data to be quantized may be represented by an n-bit fixed-point number as $(2^{n-1}-1)\times f_1+O$, and the minimum value in the number field of the data to be quantized may be represented by an n-bit fixed-point number as $-(2^{n-1}-1)\times f_1+O$.

The formula (10) shows that when the data to be quantized is quantized with the quantization parameter corresponding to the fifth situation, the quantization interval is $f_1$ and is marked as C.

According to a formula (11), the n-bit binary representation value $I_x$ of the data x after quantization is quantized inversely to obtain inverse-quantized data $\hat{F}_x$, where a data format of the inverse-quantized data $\hat{F}_x$ is the same as that of the corresponding data $F_x$ before quantization, both of which are floating-point values.

$$\hat{F}_x = \text{round}\left(\frac{F_x - O}{f_1}\right)\times f_1 + O \tag{11}$$

Based on the description of the offset O, a sixth situation of the quantization parameter appears. Situation six: The quantization parameter includes the point location parameter, the second scaling factor $f_2$ and the offset O. In this situation, a following formula (12) may be used to quantize the data to be quantized to obtain quantized data $I_x$:

$$I_x = \text{round}\left(\frac{F_x - O}{2^s \times f_2}\right) \tag{12}$$

In the formula, s refers to the point location parameter; O refers to the offset; $f_2$ refers to the second scaling factor, and $$f_2 = \frac{Z}{2^s\left(2^{n-1}-1\right)};$$

$$Z = \frac{Z_{max} - Z_{min}}{2};$$

$I_x$ refers to the n-bit binary representation value of the data x after quantization; $F_x$ refers to the floating-point value of the data x before quantization; and round refers to the rounding calculation. It should be noted that this is not limited to the calculation round and may refer to performing other rounding calculations such as the ceiling calculation, the flooring calculation, the fix calculation, and the like to replace the calculation round in the formula (12). The maximum value A in the number field of the data to be quantized may be represented by an n-bit fixed-point number as $2^s(2^{n-1}-1)$. The formula (12) shows that when the data to be quantized is quantized with the quantization parameter corresponding to the sixth situation, the quantization interval is $2^s\times f_2$ and is marked as C.

Given that Z is the maximum absolute value of all numbers in the number field of the data to be quantized, according to the formula (2), $$1 \geq \frac{Z}{2^s\left(2^{n-1}-1\right)} > \frac{1}{2};$$

in other words, $$1 \geq \frac{Z}{A} > \frac{1}{2}$$

and $$1 \geq f_2 > \frac{1}{2}.$$

When $$f_2 = \frac{Z}{2^s\left(2^{n-1}-1\right)} = \frac{Z}{A},$$

according to the formula (2), Z may not affect a precision representation. When $f_2$=1, $$s = \text{ceil}\left(\log_2\left(\frac{Z_{max} - Z_{min}}{2\left(2^{n-1}-1\right)}\right)\right).$$

The maximum value in the number field of the data to be quantized may be represented by an n-bit fixed-point number as $(2^{n-1}-1)\times 2^s\times f_2+O$, and the minimum value in the number field of the data to be quantized may be represented by an n-bit fixed-point number as $-(2^{n-1}-1)\times 2^s\times f_2+O$.

According to a formula (13), the n-bit binary representation value $I_x$ of the data x after quantization is quantized inversely to obtain inverse-quantized data $\hat{F}_x$, where a data format of the inverse-quantized data $\hat{F}_x$ is the same as that of the corresponding data $F_x$ before quantization, both of which are floating-point values.

$$\hat{F}_x = \text{round}\left(\frac{F_x}{2^s \times f_2}\right) \times 2^s \times f_2 + O \quad (13)$$

The determination process of six types of quantization parameters are described in detail above, and are merely exemplary descriptions. The types of the quantization parameters in different embodiments may be different from the description above. According to the formula (1) to the formula (13), both the point location parameter and the scaling factors are related to the data bit width. Different data bit width may lead to different point location parameters and scaling factors, which may affect the quantization precision. In the process of training or fine-tuning, within a certain range of iteration times, quantization by using the same bit width may have little effect on the overall precision of the neural network operation. If a count of iterations exceeds a certain number, quantization by using the same data bit width may not meet the training or fine-tuning requirements on precision, which requires adjustment of the data bit width n with the training or the fine-tuning process. Simply, the data bit width n may be set artificially. Within different ranges of iterations times, a preset corresponding bit width n may be used. However, as mentioned above, the process of training by using low bit-width fixed-point numbers is complex. Therefore, the adjustment method of artificially presetting the data bit width basically may not meet the requirements of practical applications.

In the present technical solution, the data bit width n is adjusted according to the quantization error $diff_{bit}$. Furthermore, the quantization error $diff_{bit}$ is compared with a threshold to obtain a comparison result. The threshold includes a first threshold and a second threshold, and the first threshold is greater than the second threshold. The comparison result may include three situations. If the quantization error $diff_{bit}$ is greater than or equal to the first threshold (situation one), the data bit width may be increased. If the quantization error $diff_{bit}$ is less than or equal to the second threshold (situation two), the data bit width may be reduced. If the quantization error $diff_{bit}$ is between the first threshold and the second threshold (situation three), the data bit width remains unchanged. In practical applications, the first threshold and the second threshold may be empirical values or variable hyper-parameters. Conventional optimization methods for hyper-parameters are suitable for both the first threshold and the second threshold, which will not be described further.

It should be emphasized that the data bit width may be adjusted according to a fixed bit stride, or according to a variable stride based on the difference between the quantization error and an error threshold. The data bit width may be adjusted to be longer or shorter according to actual needs in the process of neural network operation. For example, the data bit width n in a current convolution layer is 16, and is then adjusted to 12 according to the quantization error $diff_{bit}$. In practical applications, the need for precision in the process of neural network operation may be met when the value of the data bit width n is 12 instead of necessarily being 16. In this way, the fixed-point computation speed may be greatly improved within a tolerance range of precision, which improves the resource utilization rate of an artificial intelligence processor chip.

For the quantization error $diff_{bit}$, the quantization error is determined according to the quantized data and the corresponding pre-quantized data.

In practical applications, there are three quantization error determination methods, all of which may be applied to the present technical solution.

The first method is to determine the quantization error according to a formula (14) based on the quantization interval, the count of quantized data, and the corresponding pre-quantized data.

$$diff_{bit} = \log_2\left(\frac{C * 2^{-1} * m}{\sum_i |F_i|}\right) \quad (14)$$

In the formula, C refers to the corresponding quantization interval during quantization, m refers to the number of quantized data obtained after quantization, and $F_i$ refers to the corresponding floating-point value of the data to be quantized, where i is a subscript of data in a set of the data to be quantized.

The second method is to determine the quantization error $diff_{bit}$ according to a formula (15) based on the quantized data and the corresponding inverse-quantized data.

$$diff_{bit} = \log_2\left(\frac{\sum_i |\hat{F}_i| - \sum_i |F_i|}{\sum_i |F_i|} + 1\right) \quad (15)$$

In the formula, $F_i$ refers to the corresponding floating-point value of the data to be quantized, where i is the subscript of data in the set of the data to be quantized. $\hat{F}_i$ refers to the inverse-quantized data corresponding to the floating-point value.

The third method is to determine the quantization error $diff_{bit}$ according to a formula (16) based on the quantized data and the corresponding inverse-quantized data.

$$diff_{bit} = \log_2\left(\frac{\sum_i |\hat{F}_i - F_i|}{\sum_i |F_i|} + 1\right) \quad (16)$$

In the formula, $F_i$ refers to the corresponding floating-point value of the data to be quantized, where i is the subscript of data in the set of the data to be quantized. $\hat{F}_i$ refers to the inverse-quantized data corresponding to the floating-point value.

It should be emphasized that the above methods of obtaining the quantization error $diff_{bit}$ are only an incomplete, not exhaustive, list of examples. Those of ordinary skill in the art may make modifications or variations within the spirit and principle of the disclosure. As long as functions and technical effects realized by the modifications or variations support determining the quantization error according to the quantized data and the corresponding pre-quantized data are similar to those of the present disclosure, the modifications or variations shall fall within the scope of protection of the present disclosure.

Figure 5A:
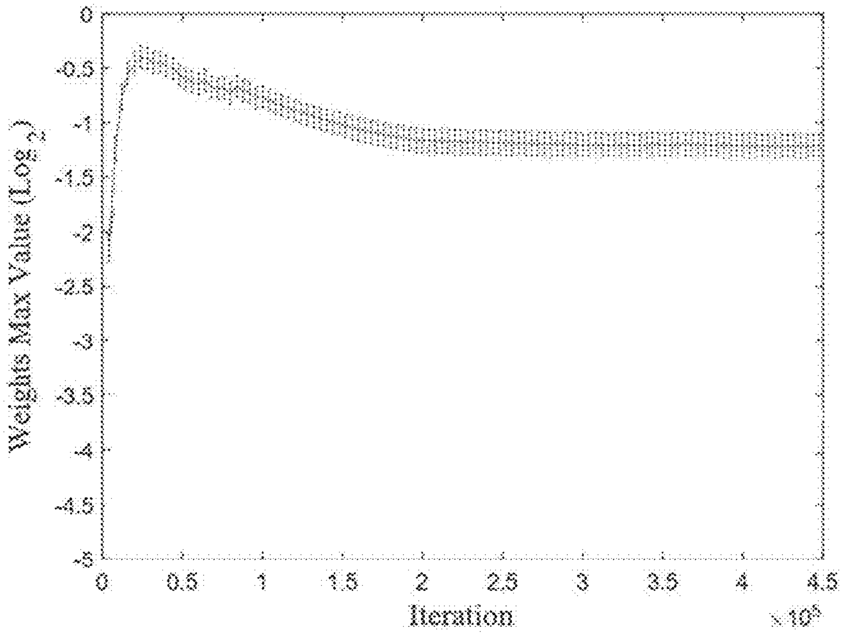
FIG. 5A is a curve illustrating a weight variation range of a neural network in the training process according to an embodiment of the present disclosure.
Figure 5B:
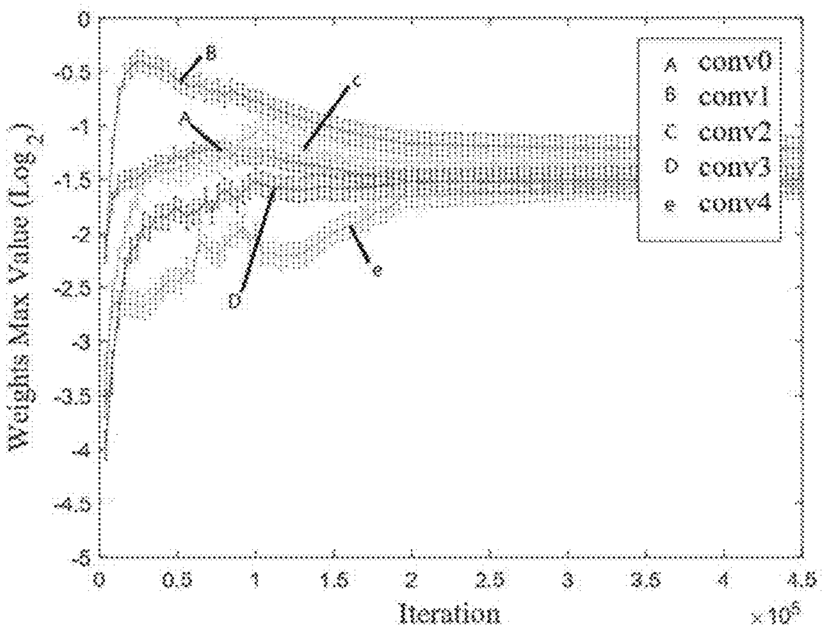
FIG. 5B is another curve illustrating a weight variation range of a neural network in the training process according to an embodiment of the present disclosure.
Figure 6:
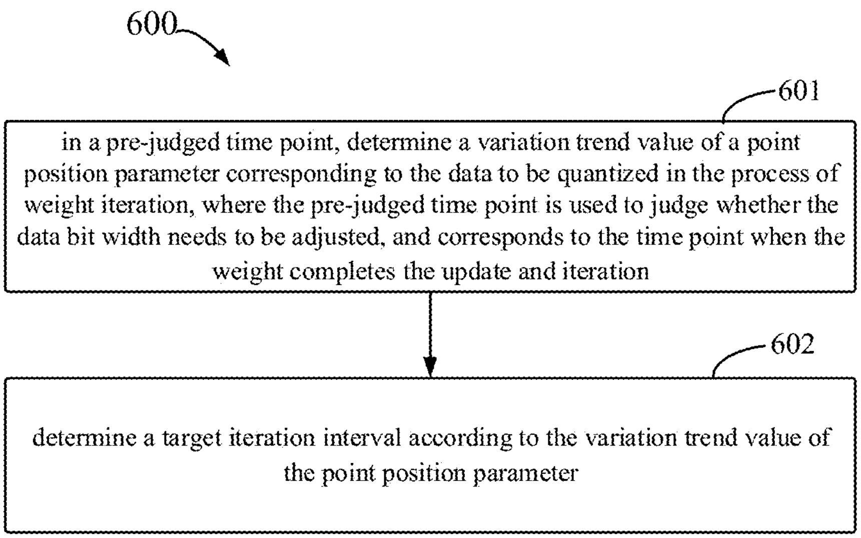
Figure 7:
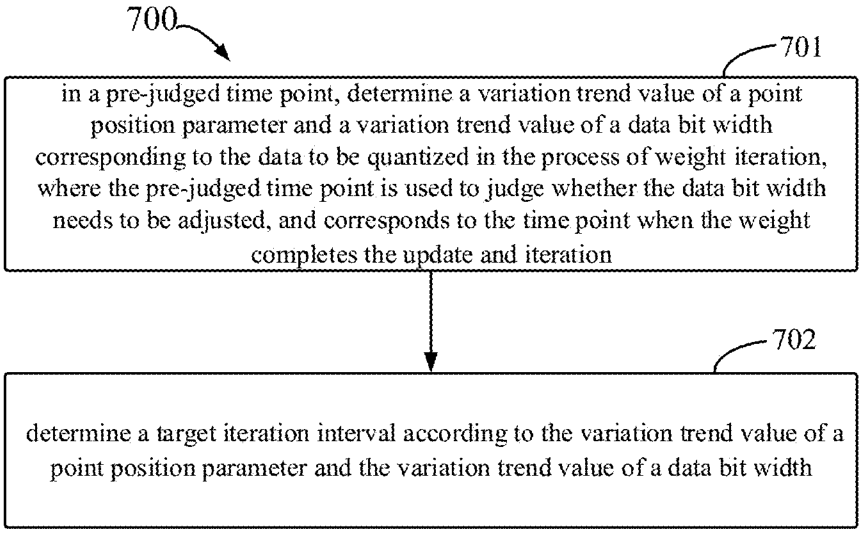

For the data bit width, FIG. 5*a* is a curve illustrating a weight variation range of a neural network in the training process. FIG. 5*b* is another curve illustrating a weight variation range of the neural network in the training process. In FIG. 5*a* and FIG. 5*b*, the abscissa represents a count of iterations, and the ordinate represents a maximum value of a weight after calculating a logarithm. The variation range curve of weight shown in FIG. 5*a* illustrates the weight variation situation of any convolution layer in the neural network corresponding to different iterations in the same epoch. In FIG. 5*b*, a conv0 layer corresponds to a weight variation range curve A; a conv1 layer corresponds to a weight variation range curve B; a conv2 layer corresponds to a weight variation range curve C; a conv3 layer corresponds to a weight variation range curve D; and the conv4 layer corresponds to the weight variation range curve e. According to FIG. 5*a* and FIG. 5*b*, in a same epoch, the variation range of the weight in each iteration is large in an initial stage of training, while in middle and later stages of training, the variation range of the weight in each iteration is not large. In such case, in the middle and later stages of training, since the variation range of the weight is not large before and after each iteration, the weight of corresponding layers in each iteration have similarity within a certain iteration interval, and the data involved in the neural network training process in each layer may be quantized by using the data bit width used in the quantization of the corresponding layer in the previous iteration.

However, in the initial stage of training, since the variation range of the weight is large before and after each iteration, in order to achieve the precision of the floating-point computation required for quantization, in each iteration in the initial stage of training, the weight of the corresponding layer in the current iteration is quantized by using the data bit width used in the quantization of the corresponding layer in the previous iteration, or the weight of the current layer is quantized based on the preset data bit width n of the current layer to obtain quantized fixed-point numbers. According to the quantized weight and the corresponding pre-quantized weight, the quantization error $diff_{bit}$ is determined. According to the comparison result of the quantization error $diff_{bit}$ and the threshold, the data bit width n used in the quantization of the corresponding layer in the previous iteration or the preset data bit width n of the current layer is adjusted, and the adjusted data bit width is applied to the quantization of the weight of the corresponding layer in the current iteration. Furthermore, in the process of training or fine-tuning, the weights between each layer in the neural network are independent of each other and have no similarity, which makes neurons between each layer independent of each other and have no similarity. Therefore, in the process of training or fine-tuning of the neural network, the data bit width of each layer in each iteration of the neural network is only suitable to be used in the corresponding neural network layer.

The weight is used as an example above. In the process of neural network training or fine-tuning, the corresponding bit width of the neuron and the gradient may be treated similarly or processed similarly, which will not be further described.

In the inference process of a neural network, the weights between each layer in the neural network are independent of each other and have no similarity, which makes neurons between each layer independent of each other and have no similarity. Therefore, in the inference process of the neural network, the data bit width of each layer in the neural network is applied to the corresponding layer. In practical applications, in the inference process, the input neuron of each layer may not be the same or similar. Moreover, since the weights between each layer in the neural network are independent of each other, the input neurons of each of the hidden layers in the neural network are different. During quantization, it may be not suitable for the data bit width used by the input neuron of the upper layer to be applied to the input neuron of the current layer. Therefore, in order to achieve the precision of floating-point computation required for quantization, in the inference process, the input neuron of the current layer is quantized by using the data bit width used in the quantization of the upper layer, or the input neuron of the current layer is quantized based on the preset data bit width n of the current layer to obtain quantized fixed-point numbers. According to the pre-quantized input neuron and the corresponding quantized input neuron, the quantization error $diff_{bit}$ is determined. According to the comparison result of the quantization error $diff_{bit}$ and the threshold, the data bit width n used in the quantization of the upper layer or the preset data bit width n of the current layer is adjusted, and the adjusted data bit width is applied to the quantization of the input neuron of the corresponding layer in the current iteration. The corresponding data bit width of the weight may be adjusted similarly, which will not be further described.

For the quantization parameter, it may be seen from FIG. 5*a* that in a same epoch, the variation range of the weight in each iteration is large in the initial stage of training, while in the middle and later stages of training, since the variation range of the weight is not large before and after each iteration, the weights of corresponding layers in each iteration have similarity within a certain iteration interval, which means that data in each layer in the current iteration may be quantized by using the data bit width used in the quantization of the corresponding layer in the previous iteration. In the situation, in the middle and later stages of training, the quantization parameter may not need to be determined in each iteration, and determination of the quantization parameter in each layer in each iteration of the neural network in the initial stage of training may still achieve the precision of the floating-point computation required for quantization, which greatly increases the quantization efficiency. Furthermore, in the process of training or fine-tuning, the weights between each layer in the neural network are independent of each other and have no similarity, which makes neurons between each layer independent of each other and have no similarity. Therefore, in the process of training or fine-tuning of the neural network, the quantization parameters of each layer in each iteration of the neural network are applied to data to be quantized of the corresponding layer.

The weights are used as an example above. In the process of training or fine-tuning of the neural network, the corresponding quantization parameters of the neuron data and the gradient data may be processed similarly, which will not be further described.

In the inference process of a neural network, the weights between each layer in the neural network are independent of each other and have no similarity, which makes neurons between each layer independent of each other and have no similarity. Therefore, in the inference process of the neural network, the quantization parameters of each layer in the neural network are applied to the data to be quantized of the corresponding layer. For example, if a current layer of the neural network is a convolution layer and s quantization parameter of the data to be quantized of the current convolution layer is obtained according to the data to be quantized in the convolution layer based on the technical solution shown in FIG. 2, the quantization parameter may be applied only to the current convolution layer but not to other layers in the neural network, even if the other layers are convolution layers.

To sum up, an extension strategy of the data bit width and the quantization parameter is determined based on the similarity between data. If the similarity exists between data, the data bit width and the quantization parameter may be continuously used. If no similarity exists between data, the data bit width or the quantization parameter needs to be adjusted. The similarity between data is usually measured by KL divergence or by a following formula (17).

$$\text{abs}\max(A) \approx \text{abs}\max(B) \square \text{mean}(A) \approx \text{mean}(B) \tag{17}$$

In some embodiments, if data A and data B satisfy the formula (17), the data A and the data B are determined to have similarity.

It should be noted that the above determination method of the quantization error, the adjustment method of the data bit width, and the extension strategy of the data bit width and the quantization parameter are only a partial, not exhaustive, list of examples. For example, the above determination method of the quantization error, the adjustment method of the data bit width, and the extension strategy of the data bit width and the quantization parameter are all applicable to the fine-tuning process of a neural network. Moreover, for the measurement of similarity between data, the above methods of measuring similarity by KL divergence and the formula (17) are only a partial, not exhaustive, list of examples, such as a histogram matching method, a matrix decomposition method, an image similarity calculation method based on feature points, a proximity measurement standard method, and the like. Those of ordinary skill in the art may make modifications or variations within the spirit and principle of the disclosure. As long as functions and technical effects realized by the modifications or variations are similar to those of the present disclosure, the modifications or variations shall fall within the scope of protection of the present disclosure In summary, in the middle and later stages of training, since the variation range of the weight is not large before and after each iteration, the weights of the corresponding layer in each iteration have similarity within a certain iteration interval. In order to make the technical solution more universal in training or fine-tuning and achieve reasonable utilization of the resources of the artificial intelligence processor chip, a strategy is needed to determine an iteration interval to make the data bit width n of the corresponding layer in each iteration remain unchanged within the iteration interval. If the iteration interval is exceeded, the data bit width n changes, then it is not necessary to determine in each iteration whether the data bit width n needs to be adjusted or not. The quantization parameter may be processed similarly, which may improve the peak computation power of an artificial intelligence processor chip while simultaneously ensuring the precision of floating-point computation required for quantization.

Figures 2, 3, 4, 5, 6:
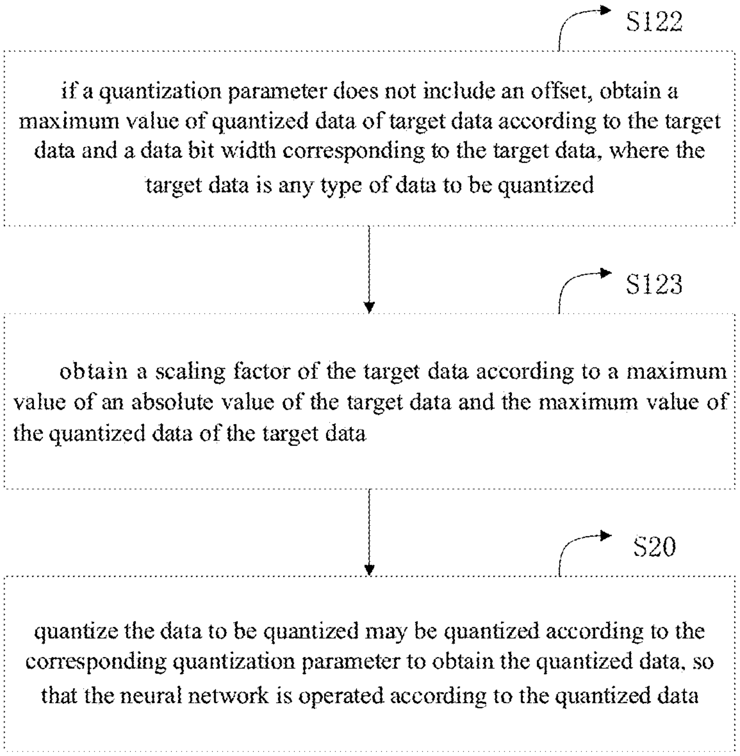
FIG. 6 is a flowchart illustrating a target iteration interval determination method according to an embodiment of the present disclosure.

FIG. 6 is a flowchart illustrating a target iteration interval determination method. In the technical solution shown in FIG. 6, the target iteration interval includes at least one weight update iteration, and the same bit width is used in the quantization process within the same target iteration interval. The steps of determining the target iteration interval include:

- a step 601: at a predicted time point, determining a variation trend value of a point location parameter corresponding to the data to be quantized in the weight iteration process, where the predicted time point is used to judge whether the data bit width needs to be adjusted or not, and the predicted time point corresponds to the time point when the weight update iteration is completed.

In the step, according to a formula (18), the variation trend value of the point location parameter is determined according to a moving mean value of the point location parameter corresponding to a current predicted time point in the weight iteration process and a moving mean value of the point location parameter corresponding to a previous predicted time point in the weight iteration process, or according to the moving mean value of the point location parameter corresponding to the current predicted time point in the weight iteration process and the point location parameter corresponding to the previous predicted time point in the weight iteration process. The formula (18) is represented as:

$$diff_{update1} = \left|M^{(t)} - M^{(t-1)}\right| = \alpha\left|s^{(t)} - M^{(t-1)}\right| \tag{18}$$

In the formula (18), M refers to the moving mean value of the point location parameter s, which increases with the training iteration, where $M^{(t)}$ refers to the moving mean value of the point location parameter s corresponding to a t-th predicted time point, which increases with the training iteration and $M^{(t)}$ is obtained according to a formula (19); $s^{(t)}$ refers to the point location parameter s corresponding to the t-th predicted time point; $M^{(t-1)}$ refers to the moving mean value of the point location parameter s corresponding to a t−1-th predicted time point; and a refers to a hyper-parameter. $diff_{update1}$ measures the variation trend of the point location parameter s. The variation of the point location parameter s is reflected in the variation of the maximum value $Z_{max}$ of the current data to be quantized. A greater $diff_{update1}$ indicates a larger variation range of numerical values and requires an update frequency with a shorter interval, which means a smaller target iteration interval.

$$M^{(t)} \leftarrow \alpha \times s^{(t-1)} + (1-\alpha) \times M^{(t-1)} \tag{19}$$

The method further includes: a step 602: determining a corresponding target iteration interval according to the variation trend value of the point location parameter.

In the present technical solution, the target iteration interval is determined according to a formula (20). For the target iteration interval, the same data bit width is used in the quantization process within a same target iteration interval, and the data bit width used in the quantization process within different target iteration intervals may be the same or different.

$$I = \frac{\beta}{diff_{update1}} - \gamma \tag{20}$$

In the formula (20), I refers to the target iteration interval. $diff_{update1}$ refers to the variation trend value of the point location parameter; β and γ may be empirical values or variable hyper-parameters. Conventional optimization methods for hyper-parameters are suitable for both β and γ, which will not be described further.

In the present technical solution, the predicted time point includes a first predicted time point. The first predicted time point is determined according to the target iteration interval. Specifically, the weight of the corresponding layer in the current iteration is quantized by using the data bit width used in the quantization of the corresponding layer in the previous iteration at the t-th predicted time point in the training or fine-tuning process to obtain a quantized fixed-point number. The quantization error is $diff_{bit}$ determined according to the pre-quantized weight and the corresponding quantized weight. The quantization error $diff_{bit}$ is compared with the first threshold and the second threshold respectively to obtain a comparison result, and the comparison result is used to determine whether the data bit width used in the quantization of the corresponding layer in the previous iteration needs to be adjusted or not. If the t-th first predicted time point corresponds to a 100th iteration and the data bit width used in a 99th iteration is n1, the quantization error $diff_{bit}$ is determined according to the data bit width n1 in the 100th iteration, and then the quantization error $diff_{bit}$ is compared with the first threshold and the second threshold to obtain a comparison result. If it is determined according to the comparison result that the data bit width n1 does not need to be adjusted, the target iteration interval is determined to be 8 iterations according to the formula (20). If the 100th iteration is used as an initial iteration within the current target iteration interval, the 100th iteration to a 107th iteration are used as the current target iteration interval; and if the 100th iteration is used as a last iteration within the previous target iteration interval, a 101st iteration to a 108th iteration are used as the current target iteration interval. During quantization within the current target iteration interval, the data bit width n1 used in the previous target iteration interval is still used in each iteration. In the situation, the data bit widths used in quantization within different target iteration intervals may be identical. If the 100th iteration to the 107th iteration are used as the current target iteration interval, the 108th iteration in a next target iteration interval is used as a t+1-th first predicted time point; and if the 101st iteration to the 108th iteration are used as the current target iteration interval, the 108th iteration in the current target iteration interval is used as the t+1th first predicted time point. At the t+1th first predicted time point, the quantization error $diff_{bit}$ is determined according to the data bit width n1, and the quantization error $diff_{bit}$ is compared with the first threshold and the second threshold to obtain a comparison result. It is determined according to the comparison result that the data bit width n1 needs to be adjusted to n2, and the target iteration interval is determined to be 55 iterations according to the formula (20). Then from the 108th iteration to the 163th iteration or from the 109th iteration to the 163th iteration are used as the target iteration interval, and the data bit width n2 is used in each iteration during quantization within the target iteration interval. In the situation, the data bit widths used in quantization between different target iteration intervals may be different.

In the present technical solution, no matter whether the first predicted time point is the initial iteration or the last iteration within the target iteration interval, the formula (18) is suitable to be used to obtain the variation trend value of the point location parameter. If the current first predicted time point is the initial iteration within the current target iteration interval, then in the formula (18), $M^{(t)}$ refers to a moving mean value of the point location parameter s corresponding to the corresponding time point of the initial iteration within the current target iteration interval, which increases with the training iteration; $s^{(t)}$ refers to the point location parameter s corresponding to the corresponding time point of the initial iteration of the current target iteration interval; and $M^{(t-1)}$ refers to the moving mean value of the point location parameter s corresponding to the corresponding time point of the initial iteration within the previous target iteration interval, which increases with the training iteration. If the current first predicted time point is the last iteration within the current target iteration interval, then in the formula (18), $M^{(t)}$ refers to the moving mean value of the point location parameter corresponding to the corresponding time point of the last iteration within the current target iteration interval, which increases with the training iteration; $s^{(t)}$ refers to the point location parameter s corresponding to the corresponding time point of the last iteration within the current target iteration interval; and $M^{(t-1)}$ refers to the moving mean value of the point location parameter s corresponding to the corresponding time point of the last iteration within the previous target iteration interval, which increases with the training iteration.

In the present technical solution, on the basis of including the first predicted time point, the predicted time point may further include a second predicted time point. The second predicted time point is determined according to a curve of data variation range. Based on the variation range of big data in the training process of a neural network, the curve of data variation range as shown in FIG. 5*a* is obtained.

Taking weight as an example, it may be seen from the curve of data variation range shown in FIG. 5*a* that during the iteration interval period from the beginning of training to the T-th iteration, the data variation range is large in each weight update. During quantization at the current predicted time point, data is first quantized in the current iteration by using the data bit width n1 used in the previous iteration, and then the corresponding quantization error is determined by the obtained quantization result and the corresponding pre-quantized data. The quantization error is compared with the first threshold and the second threshold respectively to obtain a comparison result, and the data bit width n1 is adjusted according to the comparison result to obtain a data bit width n2. The data bit width n2 is used to quantize the weight to be quantized involved in the current iteration. Then the target iteration interval is determined according to the formula (20) to determine a first predicted time point, and whether and how to adjust the data bit width are determined at the first predicted time point. Then a next target iteration interval is determined according to the formula (20) to obtain a next first predicted time point. During the iteration interval period from the beginning of training to the T-th iteration, the weight variation range is large before and after each iteration, thus the weight of the corresponding layers in each iteration have no similarity. In order to ensure precision, during quantization, data of each layer in the current iteration may not continue to use the corresponding quantization parameter of the corresponding layer in the previous iteration. In the first T iterations, the data bit width may be adjusted in each iteration. In the situation, the data bit width used by each iteration in the first T iterations is different, and the target iteration interval is one iteration. In order to optimize resource utilization of an artificial intelligence processor chip, the target iteration interval in the first T iterations may be preset according to rules revealed in the curve of data variation range shown in FIG. 5*a*. In other words, the target iteration interval of the first T iterations may be preset according to the curve of data variation range without a need to use the formula (20) to determine the time point of weight update iteration completion corresponding to each iteration in the first T iterations as the second predicted time point. Therefore, the resources of the artificial intelligence processor chip may be utilized more reasonably. In the curve of data variation range shown in FIG. 5*a*, the variation range is not large from the T-th iteration, thus in the middle and later stages of training, it is not necessary to determine the quantization parameter in each iteration. In the T-th or the T+1th iteration, a quantization error is determined by using the pre-quantized data and the quantized data corresponding to the current iteration. Whether and how to adjust the data bit width are determined by the quantization error, and the target iteration interval is determined according to the formula (20). If the target iteration interval is determined to be 55 iterations, it requires that the corresponding time point of 55 iterations after the T-th or the T+1th iteration should be used as the first predicted time point to determine whether and how to adjust the data bit width, and to determine the next target iteration interval according to the formula (20) so as to determine the next first predicted time point until the computation of all iterations within the same epoch is completed. On this basis, after each epoch, the data bit width or the quantization parameter may be adaptively adjusted, and finally the quantized data may be used to obtain a neural network with an expected precision.

In particular, if a value of T is determined to be 130 according to the curve of weight variation range shown in FIG. 5*a* (the value does not correspond to FIG. 5*a*, it is only for convenience of description to assume that the value of T is 130, and the value is not limited to the assumed value), a 130th iteration in the training process is used as the second predicted time point and the current first predicted time point is the 100th iteration in the training process. The target iteration interval is determined to be 35 iterations according to the formula (20) in the 100th iteration. Within the target iteration interval, when training to the 130th iteration and reaching the second predicted time point, it is needed to determine whether and how to adjust the data bit width at the corresponding time point of the 130th iteration, and to determine the target iteration interval according to the formula (20). If the target iteration interval in the situation is determined to be 42 iterations, from the 130th iteration to the 172nd iteration is viewed as the target iteration interval, and the 135th iteration corresponding to the first predicted time point determined when the target iteration interval is 35 iterations is within the target iteration interval of 42 iterations. In the 135th iteration, whether and how to adjust the data bit width may be determined according to formula (20). It is also possible to determine whether and how to adjust the data bit width directly in the 172nd iteration rather than in the 135th iteration. In conclusion, whether to perform evaluation and prediction in the 135th iteration or not are both suitable for the present technical solution.

To summarize, the second predicted time point may be preset according to the curve of data variation range. In the initial stage of training or fine-tuning, it is not necessary to use resources of an artificial intelligence processor chip to determine a target iteration interval. At the preset second predicted time point, the data bit width is directly adjusted according to the quantization error, and the adjusted data is used to quantize the data to be quantized involved in the current iteration. In the middle and later stages of training or fine-tuning, the target iteration interval is obtained according to the formula (20) to determine the corresponding first predicted time point, and determine whether and how to adjust the data bit width at each first predicted time point. Therefore, resources of an artificial intelligence processor chip may be reasonably utilized while simultaneously ensuring the precision of floating-point computation required for quantization, which may greatly improve quantization efficiency.

Figures 2, 3, 4, 5, 6, 7:
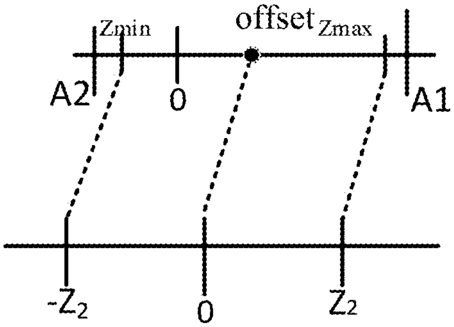
FIG. 7 is another flowchart illustrating a target iteration interval determination method according to an embodiment of the present disclosure.

In practice, in order to obtain a more accurate target iteration interval of data bit width, not only a variation trend value $diff_{update1}$ of a point location parameter should be considered, but also both the variation trend value $diff_{update1}$ of a point location parameter and the variation trend value $diff_{update1}$ of the data bit width should be considered simultaneously. As shown in FIG. 7, a flow chart illustrates a target iteration interval determination method. The steps of determining the target iteration interval include:

a step 701: at a predicted time point, determining a variation trend value of a point location parameter and a variation trend value of a data bit width that correspond to the data to be quantized involved in the weight iteration process, where at the predicted time point is used to judge whether the data bit width needs to be adjusted or not, and the predicted time point corresponds to the time point when the weight update iteration is completed.

It should be emphasized that the technical solution shown in FIG. 6 for determining the target iteration interval of the data bit width based on the variation trend value of the point location parameter is applicable to the technical solution shown in FIG. 7, which will not be described further.

In the step, the variation trend value of the data bit width is determined by using the corresponding quantization error according to a formula (21).

$$diff_{update2} = \delta * diff_{bit}^{2} \tag{21}$$

In the formula (21), 0 refers to a hyper-parameter; $diff_{bit}$ refers to a quantization error; and $diff_{update2}$ refers to a variation trend value of a data bit width. $diff_{update2}$ measures the variation trend of a data bit width n used in quantization. A greater $diff_{update2}$ indicates that a fixed-point bit width needs to be updated and an update frequency with a shorter interval is needed.

The variation trend value of the point location parameter shown in FIG. 7 may still be obtained according to the formula (18), and $M^{(t)}$ in the formula (18) is obtained according to the formula (19). $diff_{update1}$ measures the variation trend of the point location parameter s. The variation of the point location parameter s is reflected in the variation of the maximum value $Z_{max}$ of the current data to be quantized. A greater $diff_{update1}$ indicates a larger variation range of numerical values and requires an update frequency with a shorter interval, which means a smaller target iteration interval.

The method further includes: a step 702, determining the corresponding target iteration interval according to the variation trend value of the point location parameter and the variation trend value of the data bit width.

In the present technical solution, the target iteration interval is determined according to a formula (22). For the target iteration interval, the same data bit width is used in the quantization process within a same target iteration interval, and the data bit width used in the quantization process within different target iteration intervals may be the same or different.

$$I = \frac{\beta}{\max\left(diff_{update1}, diff_{update2}\right)} - \gamma \tag{22}$$

In the formula (22), I refers to the target iteration interval; β and γ refer to hyper-parameters; $diff_{update1}$ refers to the variation trend value of the point location parameter; $diff_{update2}$ refers to the variation trend value of the data bit width; and β and γ may be empirical values or variable hyper-parameters. Conventional optimization methods for hyper-parameters are suitable for both β and γ, which will not be described further.

In the present technical solution, $diff_{update1}$ measures the variation trend of the point location parameter s, but the variation of the point location parameter s caused by the variation of the data bit width n needs to be ignored, because the variation of the data bit width n is reflected in $diff_{update2}$. If the variation of the point location parameter caused by the variation of the data bit width n is not ignored in $diff_{update1}$ the target iteration interval I determined according to the formula (22) may be inaccurate, which may result in too many first predicted time points. As a result, in the process of training or fine-tuning, the operation of determining whether and how to update the data bit width n may be frequently performed, which may lead to unreasonable utilization of resources of an artificial intelligence processor chip.

Based on the above description, $diff_{update1}$ is determined according to $M^{(t)}$. If the data bit width corresponding to the T−1th predicted time point is n1 and a corresponding point location parameter is $S_1$, a moving mean value of the point location parameter is $m_1$, which increases with the training iteration. The data to be quantized is quantized by using the data bit width n1 to obtain a quantized fixed-point number. The quantization error $diff_{bit}$ is determined according to the pre-quantized data and the corresponding quantized data, and the quantization error $diff_{bit}$ is compared with the threshold to obtain a comparison result. According to the comparison result, the data bit width $n_1$ is adjusted to $n_2$, and the data bit width is adjusted by $|n_1-n_2|$ bits. The data bit width used in quantization at the t-th predicted time point is $n_2$ In order to ignore the variation of the point location parameter caused by the variation of the data bit width, one of following two optimization methods may be selected when $M^{(t)}$ is determined. The first method is as follows: if the data bit width is increased by $|n_1-n_2|$ bits, the value of $s^{(t-1)}$ is $S_1-|n_1-n_2|$, and the value of $M^{(t-1)}$ is $m_1-|n_1-n_2|$ and $M^{(t-1)}$ are put into the formula (19) to obtain $M^{(t)}$, which is the moving mean value of the point location parameter corresponding to the t-th predicted time point and increases with the training iteration. If the data bit width is reduced by $|n_1-n_2|$ bits, the value of $S^{(t-1)}$ is $s_1+|n_1-n_2|$, and the value of $M^{(t-1)}$ is $m_1+|n_1-n_2|$, $s^{(t-1)}$ and $M^{(t-1)}$ are put into the formula (19) to obtain $M^{(t)}$, which is the moving mean value of the point location parameter corresponding to the t-th predicted time point and increases with the training iteration. The second method is as follows: No matter whether the data bit width is increased by $|n_1-n_2|$ bits or reduced by $|n_1-n_2|$ bits, the value of $s^{(t-1)}$ is $S_1$, and the value of $M^{(t-1)}$ is m $s^{(t-1)}$ and $M^{(t-1)}$ are put into the formula (19) to obtain $M^{(t)}$. When the data bit width is increased by $|n_1-n_2|$ bits, $|n_1-n_2|$ is subtracted from $M^{(t)}$; and when the data bit width is reduced by $|n_1-n_2|$ bits, $|n_1-n_2|$ is added to $M^{(t)}$; the obtained result is used as the moving mean value of the point location parameter corresponding to the t-th predicted time point, which increases with the training iteration. The above two methods are equivalent and both disregard the variation of the point location parameter caused by the variation of the data bit width and obtain a more accurate target iteration interval, which may improve the resource utilization rate of an artificial intelligence processor chip.

Figure 8A:
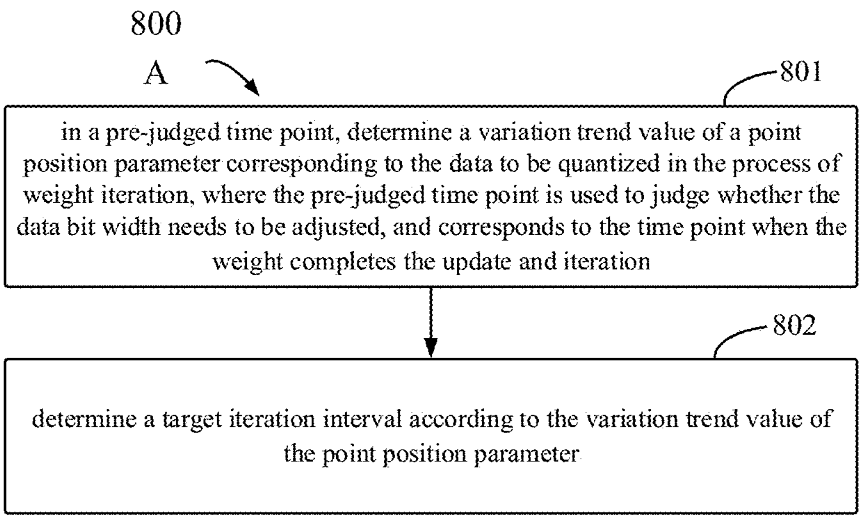
FIG. 8A is still another flow chart illustrating a target iteration interval determination method according to an embodiment of the present disclosure.

In practical applications, the data bit width n and the point location parameter s have a great effect on the quantization precision. A second scaling factor $f_2$ in the quantization parameter and an offset O have little effect on the quantization precision. For the first scaling factor $f_1$, as mentioned before, if it is the second situation, $2^s \times f_2$ is considered as the first scaling factor as a whole. Since the point location parameter s has a great effect on the quantization precision, the first scaling factor $f_1$ in this situation has a great effect on quantization. Therefore, in the present technical solution, no matter whether the data bit width n changes or not and although the point location parameter s is variable, it is very meaningful to determine the target iteration interval of the point location parameter s. The idea of the technical solution shown in FIG. 6 may be applied to determine the target iteration interval of the point location parameter s. Therefore, the method of determining the target iteration interval of the point location parameter s is shown in FIG. 8A. The method also includes:

a step 801: at a predicted time point, determining a variation trend value of a point location parameter corresponding to the data to be quantized in the weight iteration process, where the predicted time point is used to judge whether the quantization parameter needs to be adjusted or not, and the predicted time point corresponds to the time point when the weight update iteration is completed.

The method further includes: a step 802: determining a corresponding target iteration interval according to the variation trend value of the point location parameter.

It should be emphasized that the technical solution shown in FIG. 6 for determining the target iteration interval of the quantization parameter based on the variation trend value of the point location parameter is applicable to the technical solution shown in FIG. 8A, which will not be described further. For the technical solution shown in FIG. 8A, the quantization parameter is preferably the point location parameter.

It should be noted that the target iteration interval for determining the data bit width and the target iteration interval for determining the quantization parameter are only a partial, not exhaustive list. It should be noted that those skilled in the art may make modifications or variations within the spirit and principle of the disclosure. For example, within the target iteration interval for determining the data bit width, the target iteration interval for determining the quantization parameter is also applicable to the technical solutions shown in FIGS. 6, 7 and 8A. However, as long as functions and technical effects realized by the modifications or variations are similar to those of the present disclosure, the modifications or variations shall fall within the scope of protection of the present disclosure.

The quantization parameter is determined by using the technical solution. The data bit width or the quantization parameter is adjusted according to the quantization error, and the target iteration interval to make any adjustment to the data bit width or quantization parameter is determined in order to adjust the data bit width or quantization parameter at suitable time points in the process of a neural network operation and use a suitable quantization parameter at suitable iteration time points, which may achieve the speed of fixed-point computation when the artificial intelligence processor chip performs the neural network operation, and improve the peak computation power of an artificial intelligence processor chip while simultaneously ensuring the precision of floating-point computation required for quantization.

It should be noted that, the foregoing embodiments of method, for the sake of conciseness, are all described as a series of action combinations, but those skilled in the art should know that since according to the present disclosure, the steps may be performed in a different order or simultaneously, the disclosure is not limited by the described order of action. Secondly, those skilled in the art should also understand that the embodiments described in the specification are all optional, and the actions and modules involved are not necessarily required for this disclosure.

It will be understood that the quantization parameter may be a preset quantization parameter (offline quantization parameter) or a quantization parameter (online quantization parameter) which is obtained according to the processing on the data to be quantized. In the process of inference, training and fine-tuning of the neural network, the data to be quantized may be quantized offline or online. The offline quantization refers to performing offline processing on the data to be quantized by using the quantization parameter. The online quantization refers to performing online processing on the data to be quantized by using the quantization parameter. For example, when the neural network is running on the artificial intelligence chip, the data to be quantized and the quantization parameter may be sent to an operation device outside the artificial intelligence chip for offline quantization, or an operation device outside the artificial intelligence chip may be used to perform offline quantization on the pre-obtained data to be quantized and the quantization parameter. In the process of running the neural network by the artificial intelligence chip, the artificial intelligence chip may use the quantization parameter to perform online quantization on the data to be quantized. When the neural network includes a plurality of layers to be quantized, each layer to be quantized may perform online and offline quantization respectively. The present disclosure does not limit whether the data to be quantized is quantized online or offline.

Figure 8B:
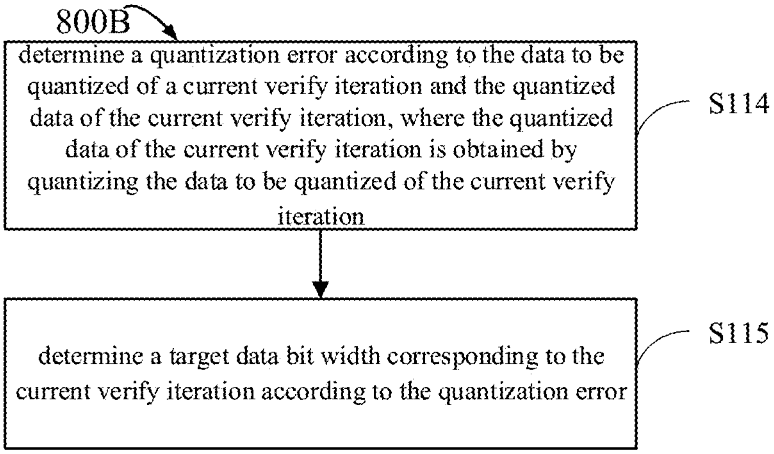
FIG. 8B is a flowchart illustrating a method for adjusting data bit width according to an embodiment of the present disclosure.

According to the embodiment of the present disclosure, a method used for adjusting the data bit width is provided. Hereinafter, description will be made with reference to FIGS. 8B to 8V. FIG. 8B is a flowchart illustrating a method 800B for adjusting data bit width according to an embodiment of the present disclosure. The method may include:

S114: determining the quantization error according to the data to be quantized of a current verify iteration and the quantized data of the current verify iteration, where the quantized data of the current verify iteration is obtained by quantizing the data to be quantized of the current verify iteration.

Optionally, the processor may quantize the data to be quantized with an initial data bit width to obtain the quantized data. The original data bit width of current verify iteration may be a hyper-parameter. The original data bit width of the current verify iteration may also be determined based on the data to be quantized of the previous verify iteration before the current verify iteration.

Specifically, the processor determines an intermediate representation data according to the data to be quantized of the current verify iteration and the quantized data of the verify iteration. Optionally, the intermediate representation data may be constant with the representation format of the data to be quantized. For example, the processor may de-quantize the quantized data to obtain the intermediate representation data that is constant with the representation format of the data to be quantized, where the de-quantization refers to the inverse process of quantization. For example, the quantized data may be obtained by using a formula 23. The processor may also perform de-quantization on the quantized data according to a formula 24 to obtain the corresponding intermediate representation data, and determine the quantization error according to the data to be quantized and the intermediate representation data.

$$I_x = \text{round}\left(\frac{F_x}{2^s}\right) \tag{23}$$

$$F_{x1} = \text{round}\left(\frac{F_x}{2^s}\right) \times 2^s \tag{24}$$

Furthermore, the processor may obtain the quantization error according to the data to be quantized and the corresponding intermediate representation data.

It is assumed that the data to be quantized of the current verify iteration is $F_x=[z_1, z_2 \ldots, z_m]$, and the intermediate representation data corresponding to the data to be quantized is $F_{x1}=[z_1^{(n)}, z_2^{(n)} \ldots, z_m\ (n)]$.

The processor may determine an error term according to the data to be quantized F_x and the corresponding intermediate representation data $F_{x1}$ and determine the quantization error according the error term.

Optionally, the processor may determine the error term according to the sum of the elements of the intermediate representation data $F_{x1}$ and the sum of the elements of the data to be quantized $F_x$, and the error term may be the difference between the sum of the elements of the intermediate representation data $F_{x1}$ and the sum of the elements of the data to be quantized $F_x$.

The processor then determines the quantization error according to the error term.

The specific quantization error may be determined according to the following formula:

$$diff_{bit} = \log_2\left(\frac{\sum_i |z_i^{(n)}| - \sum_i |z_i|}{\sum_i |z_i|} + 1\right) \quad \text{Formula (25)}$$

where $z_i$ are the elements of the data to be quantized, and $z_i^{(n)}$ are the elements of the intermediate representation data $F_{x1}$.

Optionally, the processor may compute the difference between an element of the data to be quantized and the corresponding element of the intermediate representation data $F_{x1}$ respectively, obtain m differences, and determine the sum of the m differences as the error term.

Later, the processor may determine the quantization error according to the error term.

The specific quantization error may be determined according to the following formula:

$$diff_{bit} = \log_2\left(\frac{\sum_i |z_i^{(n)} - z_i|}{\sum_i |z_i|} + 1\right) \quad \text{Formula (26)}$$

where $z_i$ are the elements of the data to be quantized, and $z_i^{(n)}$ are the elements of the intermediate representation data $F_{x1}$.

Optionally, the difference between the element of the data to be quantized and the corresponding element of the intermediate representation data $F_{x1}$ may be approximately equal to $2^{s-1}$. Therefore, the quantization error may be determined according to the following formula:

$$diff_{bit} = \log_2\left(\frac{2^{s-1} * m}{\sum_i |z_i|}\right) \quad \text{Formula (27)}$$

where m is the amount of the intermediate representation data $F_{x1}$ corresponding to the target data, s is the point location and $z_i$ are the elements of the data to be quantized.

Optionally, the intermediate representation data may also be consistent with the representation format of the quantized data and may determine the quantization error according to the intermediate representation data and the quantized data. For example, the data to be quantized may be represented as $F_x \approx I_x \times 2^s$, so the intermediate representation data is determined as $$I_{x1} \approx \frac{F_x}{2^s}.$$

The data representative format of the intermediate representation data $I_{x1}$ may be the same as that of the quantized data. In this situation, the processor may determine the quantization error according to the intermediate representation data $I_{x1}$ and $$I_x = \text{round}\left(\frac{F_x}{2^s}\right)$$

calculated by the formula (23) above. The specific quantization error determination method may refer to the formulas (25)-(27) above.

S115: determining the target data bit width corresponding to the current verify iteration according to the quantization error.

Specifically, the processor may adjust adaptively the data bit width corresponding to the current verify iteration according to the quantization error to determine the target data bit width after adjusting the current verify iteration. When the quantization error meets the preset condition, the data bit width corresponding to the current verify iteration may be constant, in other words, the target data bit width of the current verify iteration may be equal to the initial data bit width. When the quantization error does not satisfy the preset condition, the processor may adjust the data bit width corresponding to the data to be quantized of the current verify iteration to obtain the target data bit width of the current verify iteration. When the processor quantizes the data to be quantized of the current verify iteration by using the target data bit width, the quantization error satisfies the preset condition above. Optionally, the preset condition may be a preset threshold set by a user.

Figure 8C:
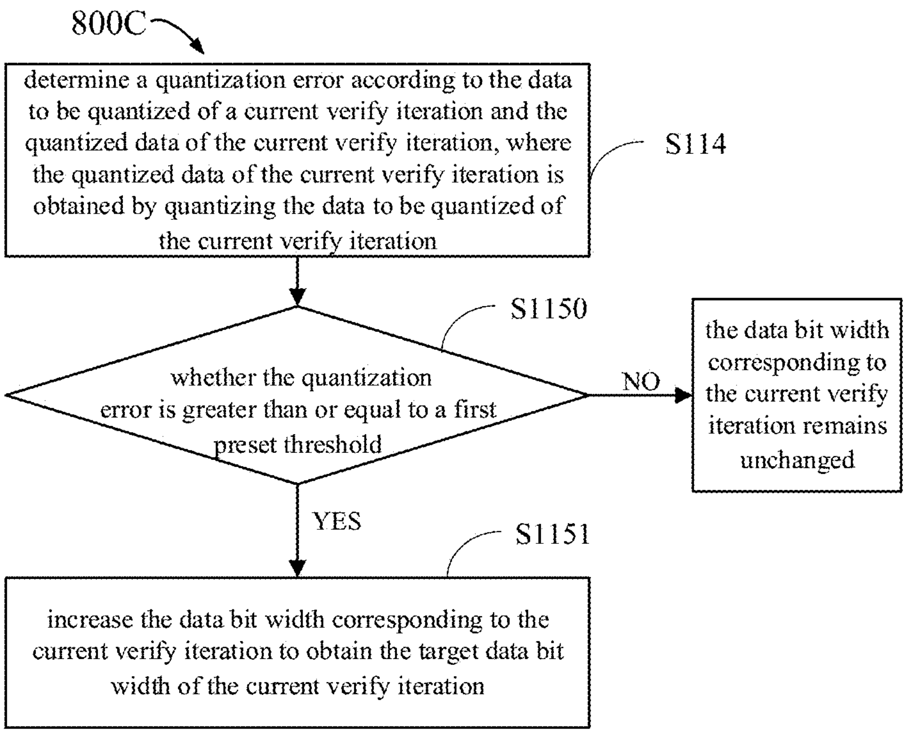
FIG. 8C is a flowchart illustrating a method for adjusting data bit width according to another embodiment of the present disclosure.

Optionally, FIG. 8C is a flowchart illustrating a method 800C for adjusting data bit width according to another embodiment of the present disclosure. As shown in FIG. 8C, the step S115 includes:

S1150, judging, by the processor, whether the quantization error is greater than or equal to a first preset threshold.

If the quantization error is greater than or equal to the first preset threshold, the operation S1151 is performed, and the data bit width corresponding to the current verify iteration is increased to obtain the target data bit width of the current verify iteration. When the quantization error is less than the first preset threshold, the data bit width of the current verify iteration remains unchanged.

Further optionally, the processor may obtain the target data bit width after adjusting once. For example, the initial data bit width of the current verify iteration is n1, and the processor may determine the target data bit width n2=n1+t after adjusting once, where t is the adjustment value of the data bit width. The target data bit width n2 is used to quantize the data to be quantized of the current verify iteration. The quantization error obtained may be less than the first preset threshold. Further optionally, the processor may obtain the target data bit width after adjusting for a plurality of times until the quantization error is less than the first preset threshold, and determine the data bit width when the quantization error is less than the first preset threshold as the target data bit width. Specifically, if the quantization error is greater than or equal to the first preset threshold, a first intermediate data bit width may be determined according to a first preset bit width stride; then the processor may quantize the data to be quantized of the current verify iteration according to the first intermediate data bit width to obtain the quantized data, and may determine the quantization error according to the data to be quantized of the current verify iteration and the quantized data of the current verify iteration, until the quantization error is less than the first preset threshold. The processor may use the data bit width corresponding to the quantization error which is less than the first preset threshold as the target data bit width.

For example, if the initial data bit width of the current verify iteration is n1, the processor may quantize the data to be quantized A of the current verify iteration with the initial data bit width n1 to obtain the quantized data B1, and may compute the quantization error C1 according to the data to be quantized A and the quantized data B1. When the quantization error C1 is greater than or equal to the first preset threshold, the processor may determine the first intermediate data bit width n2=n1+t1, where t1 is the first preset bit width stride. The processor then may quantize the data to be quantized of the current verify iteration according to the first intermediate data bit width n2 to obtain the quantized data B2 of the current verify iteration, and obtain the quantization error C2 according to the data to be quantized A and the quantized data B2. When the quantization C2 is greater than or equal to the first preset threshold, the processor may determine the first data bit width n2=n1+t1+t1, and later may quantize the data to be quantized A of the current verify iteration according to a new first intermediate data bit width and compute the corresponding quantization error until the quantization error is less the first preset threshold. If the quantization error C1 is less than the first preset threshold, the initial data bit width n1 remains unchanged.

Furthermore, the first preset bit width stride may be constant. For example, when the quantization error is greater than the first preset threshold, the processor may increase the data bit width corresponding to the current verify iteration by a same bit width value. Optionally, the first preset bit width stride may also be variable. For example, the processor may compute the difference between the quantization parameter and the first preset threshold, and the smaller the difference is, the smaller the first preset bit width stride value will be.

Figure 8D:
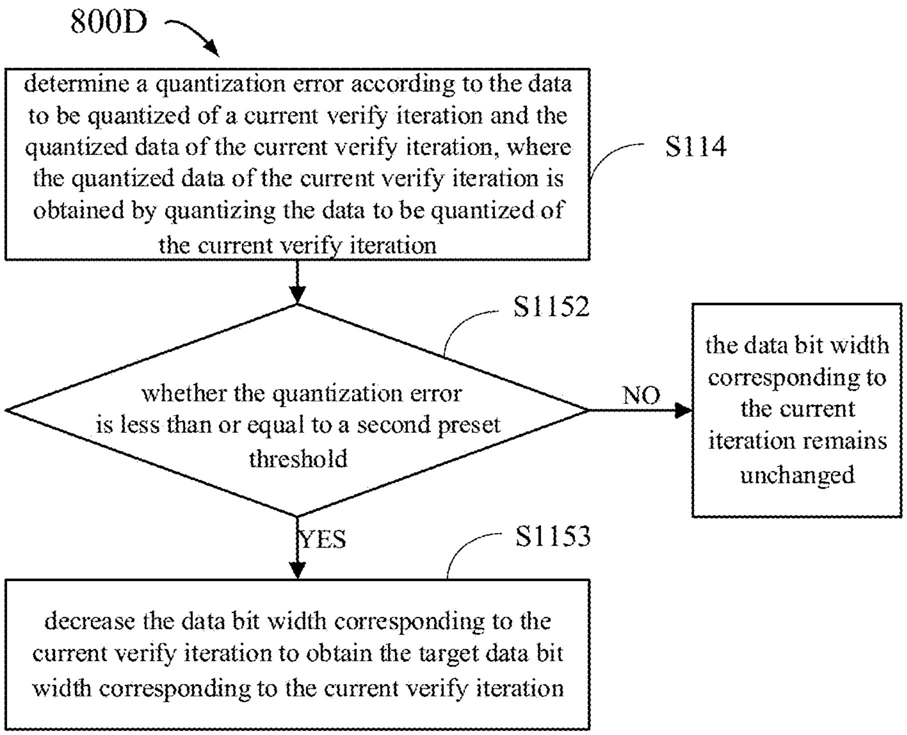
FIG. 8D is a flowchart illustrating a method for adjusting data bit width according to still another embodiment of the present disclosure.

Optionally, FIG. 8D is a flowchart illustrating a method 800D for adjusting data bit width according to another embodiment of the present disclosure. As shown in FIG. 8D, the step S115 includes:

S1152: judging, by the processor, whether the quantization error is less than or equal to the second preset threshold.

If the quantization error is less than or equal to the second preset threshold, the operation S1153 is performed, and the data bit width corresponding to the current verify iteration is reduced to obtain the target data bit width of the current verify iteration. When the quantization error is greater than the second preset threshold, the data bit width of the current verify iteration remains unchanged.

Further optionally, the processor may obtain the target data bit width after adjusting once. For example, the initial data bit width of the current verify iteration is n1, and the processor may determine the target data bit width n2=n1−t after adjusting once, where t is the adjustment value of the data bit width. The target data bit width n2 is used to quantize the data to be quantized of the current verify iteration. The quantization error obtained may be greater than the second preset threshold.

Further optionally, the processor may obtain the target data bit width after adjusting for a plurality of times until the quantization error is greater than the second preset threshold, and determine the data bit width when the quantization error is greater than the second preset threshold as the target data bit width. Specifically, if the quantization error is less than or equal to the first preset threshold, the second intermediate data bit width is determined according to the second preset bit width stride. The processor then may quantize the data to be quantized of the current verify iteration according to the second intermediate data bit width to obtain the quantized data, and determine the quantization error according to the data to be quantized of the current verify iteration and the quantized data of the current verify iteration until the quantization error is greater than the second preset threshold. The processor may use the data bit width corresponding to the quantization error which is greater than the second preset threshold as the target data bit width.

For example, if the initial data bit width of the current verify iteration is n1, the processor may quantize the data to be quantized A of the current verify iteration with the initial data bit width n1 to obtain the quantized data B1, and may compute the quantization error C1 according to the data to be quantized A and the quantized data B1. When the quantization error C1 is less than or equal to the second preset threshold, the processor may determine the second intermediate data bit width n2=n1−t2, where t2 is the second preset bit width stride. The processor then may quantize the data to be quantized of the current verify iteration according to the second intermediate data bit width n2 to obtain the quantized data B2 of the current verify iteration, and obtain the quantization error C2 according to the data to be quantized A and the quantized data B2. When the quantization error C2 is less than or equal to the first preset threshold, the processor may determine the second intermediate data bit width n2=n1−t2−t2, and later may quantize the data to be quantized A of the current verify iteration according to a new second intermediate data bit width and compute the corresponding quantization error until the quantization error is greater the second preset threshold. When the quantization error C1 is greater than the second preset threshold, the initial data bit width n1 remains unchanged.

Furthermore, the second preset bit width stride may be constant. For example, when the quantization error is less than the second preset threshold, the processor may decrease the data bit width corresponding to the current verify iteration by a same bit width value. Optionally, the second preset bit width stride may also be variable. For example, the processor may compute the difference between the quantization error and the second preset threshold, and the smaller the difference is, the smaller the second preset bit width stride value will be.

Figure 8E:
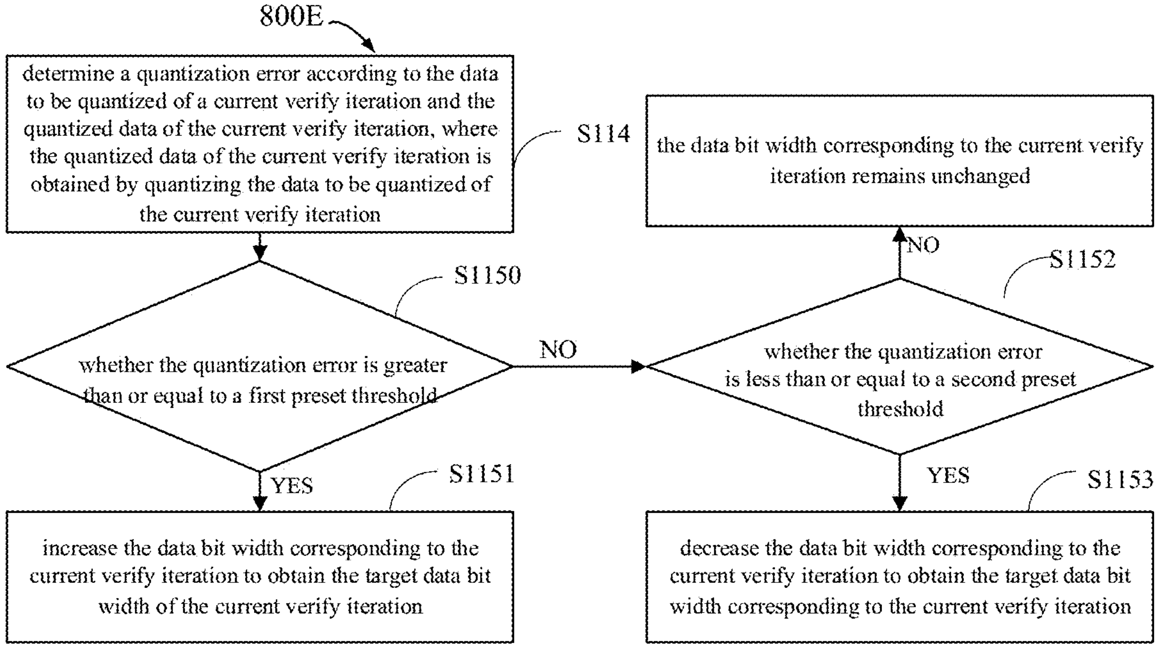
FIG. 8E is a flowchart illustrating a method for adjusting data bit width according to yet another embodiment of the present disclosure.

Optionally, FIG. 8E is a flowchart illustrating a method 800E for adjusting data bit width according to another embodiment of the present disclosure. As shown in FIG. 8E, when the processor determines that the quantization error is less than the first preset threshold and the quantization error is greater than the second threshold, the data bit width of the current verify iteration remains unchanged, where the first preset threshold is greater than the second preset threshold. In other words, the target data bit width of the current verify iteration may be equal to the initial data bit width. FIG. 8E only uses an example to illustrate the data bit width determination method of an embodiment of the present disclosure. The sequence of each operation in FIG. 8E may be adjusted adaptively, which is not particularly limited.

Figure 8F:
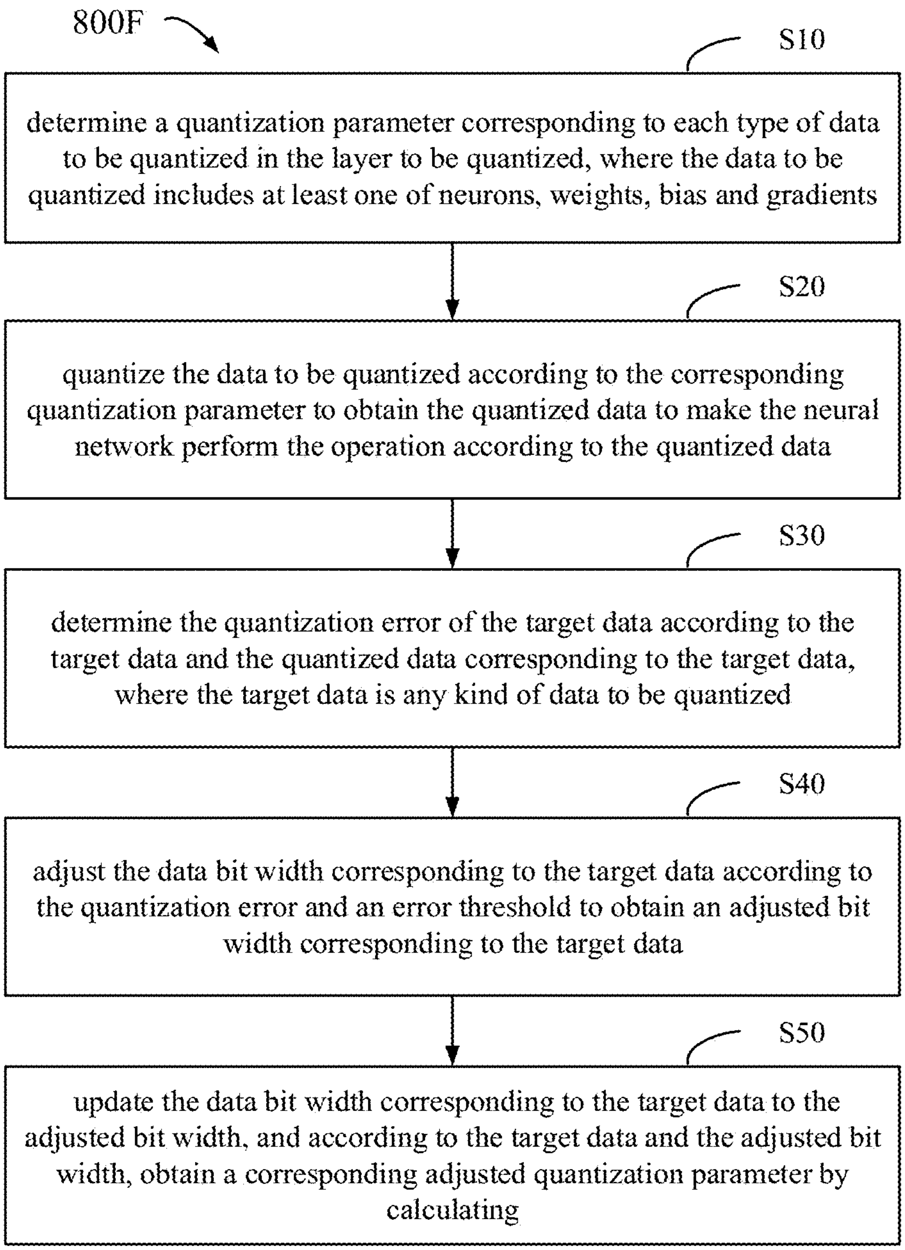
FIG. 8F is a flowchart illustrating a neural network quantization method according to an embodiment of the present disclosure.

FIG. 8F is a flowchart illustrating a neural network quantization method 800F according to an embodiment of the present disclosure. The neural network quantization method shown in FIG. 8F includes:

A step S10, determining a quantization parameter corresponding to each type of data to be quantized in the layer to be quantized, where the data to be quantized includes at least one of neurons, weights, bias and gradients.

A step S20, quantizing the data to be quantized according to the corresponding quantization parameter to obtain the quantized data, so that the neural network is operated according to the quantized data.

A step S30: determining the quantization error of the target data according to the target data and the quantized data corresponding to the target data, where the target data is any kind of data to be quantized.

The quantization error of the target data may be determined according to an error between the quantized data corresponding to the target data and the target data. The quantization error of the target data may be calculated by using a set error computation method such as a standard deviation computation method and a root-mean-square error computation method.

The quantized data corresponding to the target data may be quantized inversely according to the quantization parameter to obtain the inverse-quantized data, and the quantization error of the target data may be determined according to the error between the inverse-quantized data and the target data.

When the quantization parameter includes the point location and the offset, the quantized data of the target data may be quantized inversely according to a formula (28) to obtain the inverse-quantized data of the target data $\hat{F}_x$:

$$\hat{F}_x = \text{round}\left(\frac{F_x}{2^s}\right)\times 2^s \qquad \text{Formula (28)}$$

Round refers to the rounding calculation, $\hat{F}_x$ refers to the inverse-quantized data of the target data, and s refers to the point location corresponding to the target data.

When the quantization parameter includes the scaling factor, the quantized data of the target data may be quantized inversely according to a formula (29) to obtain the inverse-quantized data $\hat{F}_x$ of the target data:

$$\hat{F}_x = \text{round}\left(\frac{F_x}{f}\right)\times f \qquad \text{Formula (29)}$$

Round is the rounding calculation. $\hat{F}_x$ is the inverse-quantized data of the target data, and f is the scaling factor.

When the quantization parameter includes the offset, the quantized data of the target data may be quantized inversely according to a formula (30) to obtain the inverse-quantized data of the target data $\hat{F}_x$:

$$\hat{F}_x = \text{round}(F_x - o) + o \qquad \text{Formula (30)}$$

Round is the rounding calculation. $\widehat{F_x}$ is the inverse-quantized data of the target data, and o is the scaling factor.

When the quantization parameter includes the point location and the scaling factor, the quantized data of the target data may be quantized inversely according to a formula (31) to obtain the inverse-quantized data $\widehat{F_x}$ of the target data:

$$\hat{F}_x = \text{round}\left(\frac{F_x}{2^s \times f}\right) \times 2^s \times f \qquad \text{Formula (31)}$$

When the quantization parameter includes the point location and the offset, the quantized data of the target data may be quantized inversely according to a formula (32) to obtain the inverse-quantized data $\widehat{F_x}$ of the target data:

$$\hat{F}_x = \text{round}\left(\frac{F_x - o}{2^s}\right) \times 2^s + o \qquad \text{Formula (32)}$$

When the quantization parameter includes the scaling factor and the offset, the quantized data of the target data may be quantized inversely according to a formula (33) to obtain the inverse-quantized data $\widehat{F_x}$ of the target data:

$$\hat{F}_x = \text{round}\left(\frac{F_x - o}{f}\right) \times f + o \qquad \text{Formula (33)}$$

When the quantization parameter includes the point location, the scaling factor and the offset, the quantized data of the target data may be quantized inversely according to a formula (34) to obtain the inverse-quantized data $\widehat{F_x}$ of the target data:

$$\hat{F}_x = \text{round}\left(\frac{F_x - o}{2^s \times f}\right) \times 2^2 \times f + o \qquad \text{Formula (34)}$$

A formula (35) may be used to compute the error $diff_{bit}$ between the target data and the inverse-quantized data corresponding to the target data by calculating the quantization intervals:

$$diff_{bit} = \log_2\left(\frac{A * 2^{-1} * p}{\sum_i |F_x|}\right) \qquad \text{Formula (35)}$$

P is a count of each element in the target data, and s is the point location of the target data.

A value of A may be determined according to the quantization parameter. When the quantization parameter includes the point location s, $A=2^s$; when the quantization parameter includes the point location s and the scaling factor f, $A=2^s \times f$.

A formula (36) may be used to compute the error $diff_{bit}$ between the target data and the inverse-quantized data corresponding to the target data by calculating the differences between the average values of these two data:

$$diff_{bit} = \log_2\left(\frac{\sum_i |\widehat{F_x}| - \sum_i |F_x|}{\sum_i |F_x|} + 1\right) \qquad \text{Formula (36)}$$

A formula (37) may be used to compute the error $diff_{bit}$ between the target data and the inverse-quantized data corresponding to the target data by calculating the average value of the difference of these two data:

$$diff_{bit} = \log_2\left(\frac{\sum_i |\widehat{F_x} - F_x|}{\sum_i |F_x|} + 1\right) \qquad \text{Formula (37)}$$

a step S40, adjusting the data bit width corresponding to the target data according to the quantization error and an error threshold to obtain an adjusted bit width corresponding to the target data.

The error threshold may be determined according to an empirical value, and the error threshold may be used to indicate an expected value of the quantization error. When the quantization error is greater than or less than the error threshold, the data bit width corresponding to the target data may be adjusted to obtain the adjusted bit width corresponding to the data to be quantized. The data bit width may be adjusted to a longer bit width or a shorter bit width to increase or decrease the quantization precision.

The error threshold may be determined according to a maximum acceptable error. When the quantization error is greater than the error threshold, it means that the quantization precision may not meet the expectation, and the data bit width needs to be adjusted to a longer bit width. A small error threshold may be determined based on a high quantization precision. When the quantization error is less than the error threshold, it means that the quantization precision is high, which may affect the computation efficiency of the neural network. In this case, the data bit width may be adjusted to a shorter bit width to appropriately decrease the quantization precision and improve the computation efficiency of the neural network.

The data bit width may be adjusted according to a stride with fixed bits, or the data bit width may be adjusted according to a variable adjustment stride according to the difference between the quantization error and the error threshold. This is not limited in the present disclosure.

a step S50, updating the data bit width corresponding to the target data to the adjusted bit width and calculating the corresponding adjusted quantization parameter according to the target data and the adjusted bit width, so that the neural network is quantized according to the adjusted quantization parameter.

After the adjusted bit width is determined, the data bit width corresponding to the target data may be updated to the adjusted bit width. For example, when the data bit width of the target data before updating is 8 bits, and the adjusted bit width is 12 bits, then the data bit width corresponding to the target data after updating is 12 bits. The adjusted quantization parameter corresponding to the target data may be obtained according to the adjusted bit width and the target data. The target data may be re-quantized according to the adjusted quantization parameter corresponding to the target data to obtain the quantized data with higher or lower quantization precision, so that a balance between the quantization precision and the processing efficiency may be achieved in the layer to be quantized.

In the process of inference, training and fine-tuning of the neural network, the data to be quantized between each layer may be considered to have a certain correlation. For example, when the difference between the means of the data to be quantized of the respective layers is less than a set mean threshold, and the difference between the maximum values of the data to be quantized in the respective layers is also less than a set difference threshold, the adjusted quantization parameter of a layer to be quantized may be used as the adjusted quantization parameter of one or more subsequent layers for quantizing the data to be quantized in the one or more subsequent layers after the layer to be quantized. In the training and fine-tuning process of the neural network, the adjusted quantization parameter in the layer to be quantized obtained during a current iteration may also be used to quantize the layer to be quantized in subsequent iterations.

In a possible implementation, the method may further include:

using the quantization parameter of the layer to be quantized in one or more layers after the layer to be quantized.

The quantization of the neural network according to the adjusted quantization parameter may include: re-quantizing the data to be quantized by using the adjusted quantization parameter only in the layer to be quantized, and using the re-obtained quantized data for the operation of the layer to be quantized. The quantization of the neural network according to the adjusted quantization parameter may also include: instead of re-quantizing the data to be quantized by using the adjusted quantization parameter in the layer to be quantized, quantizing the data to be quantized by using the adjusted quantization parameter in one or more subsequent layers after the layer to be quantized, and/or quantizing the data to be quantized by using the adjusted quantization parameter in the layer to be quantized during the subsequent iterations. The quantization of the neural network according to the adjusted quantization parameter may also include: re-quantizing the data to be quantized by using the adjusted quantization parameter in the layer to be quantized, and using the re-obtained quantized data for the operation of the layer to be quantized, quantizing the data to be quantized by using the adjusted quantization parameter in one or more subsequent layers after the layer to be quantized, and/or quantizing the data to be quantized by using the adjusted quantization parameter in the layer to be quantized during the subsequent iterations. This is not limited in the present disclosure.

In this embodiment, the quantization error of the target data may be determined according to the target data and the corresponding quantized data, where the target data may be any type of the data to be quantized. The data bit width corresponding to the target data may be adjusted according to the quantization error and the error threshold to obtain the adjusted bit width corresponding to the target data. The data bit width corresponding to the target data may be updated to the adjusted bit width to compute the corresponding adjusted quantization parameter according to the target data and the adjusted bit width, so that the neural network may quantize according to the adjusted quantization parameter. The data bit width may be adjusted according to the error between the target data and the quantized data and the adjusted quantization parameter may be obtained according to the adjusted data bit width. By setting different error thresholds, different adjusted quantization parameters may be obtained to achieve different quantization requirements such as improving quantization precision or improving the computation efficiency. The adjusted quantization parameter obtained according to the target data and the quantized data of the target data may be more in line with the data features of the target data. In this way, a quantization result that is more in line with the needs of the target data may be obtained, and a better balance between the quantization precision and the processing efficiency may be achieved.

Figure 8G:
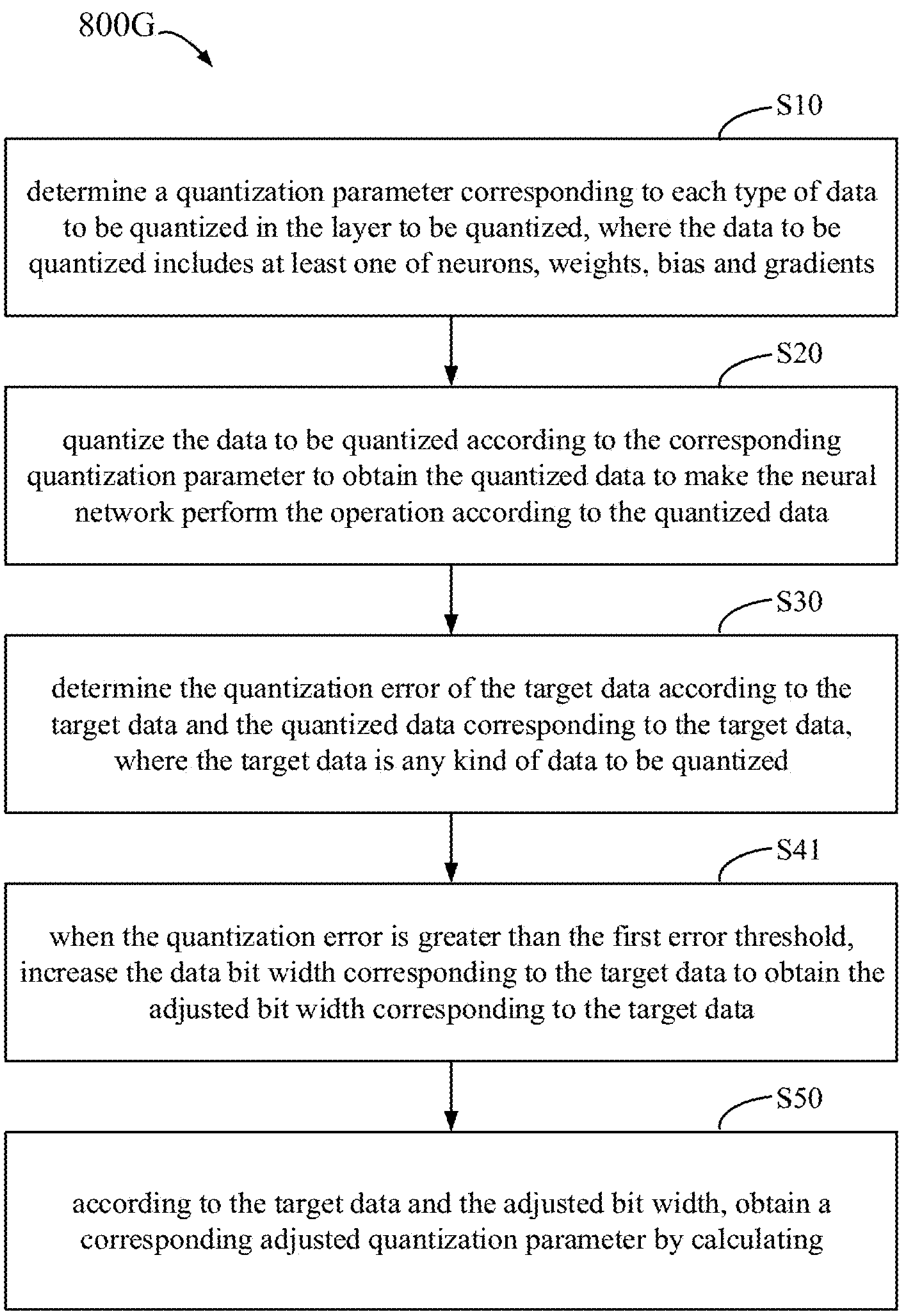
FIG. 8G is a flowchart illustrating a neural network quantization method according to an embodiment of the present disclosure.

FIG. 8G is a flowchart illustrating a neural network quantization method 800G according to an embodiment of the present disclosure. As shown in FIG. 8G, the step S40 in the neural network quantization method includes:

a step S41: when the quantization error is greater than the first error threshold, increasing the data bit width corresponding to the target data to obtain the adjusted bit width corresponding to the target data.

The first error threshold may be determined according to the maximum acceptable quantization error. The quantization error may be compared with the first error threshold. When the quantization error is greater than the first error threshold, the quantization error may be considered unacceptable. In this case, the quantization precision needs to be improved. By increasing the data bit width corresponding to the target data, the quantization precision of the target data may be improved.

The data bit width corresponding to the target data may be increased according to a fixed adjustment stride to obtain the adjusted bit width. The fixed adjustment stride may be N bits, where N is a positive integer. Each time the data bit width is adjusted, the data bit width may increase by N bits, and the data bit width after each increase=the original data bit width+N bits.

The data bit width corresponding to the target data may be increased according to a variable adjustment stride to obtain the adjusted bit width. For example, when the difference between the quantization error and the error threshold is greater than the first threshold, the data bit width may be adjusted according to an adjustment stride M1; when the difference between the quantization error and the error threshold is less than the first threshold, the data bit width may be adjusted according to an adjustment stride M2, in which the first threshold is greater than the second threshold, and M1 is greater than M2. The variable adjustment stride may be determined according to requirements. The present disclosure does not limit the adjustment stride of the data bit width and whether the adjustment stride is variable.

The adjusted quantization parameter may be obtained by calculating the target data according to the adjusted bit width. The quantized data obtained by re-quantizing the target data according to the adjusted quantization parameter has higher quantization precision than the quantized data obtained by using the quantization parameter before adjustment.

Figure 8H:
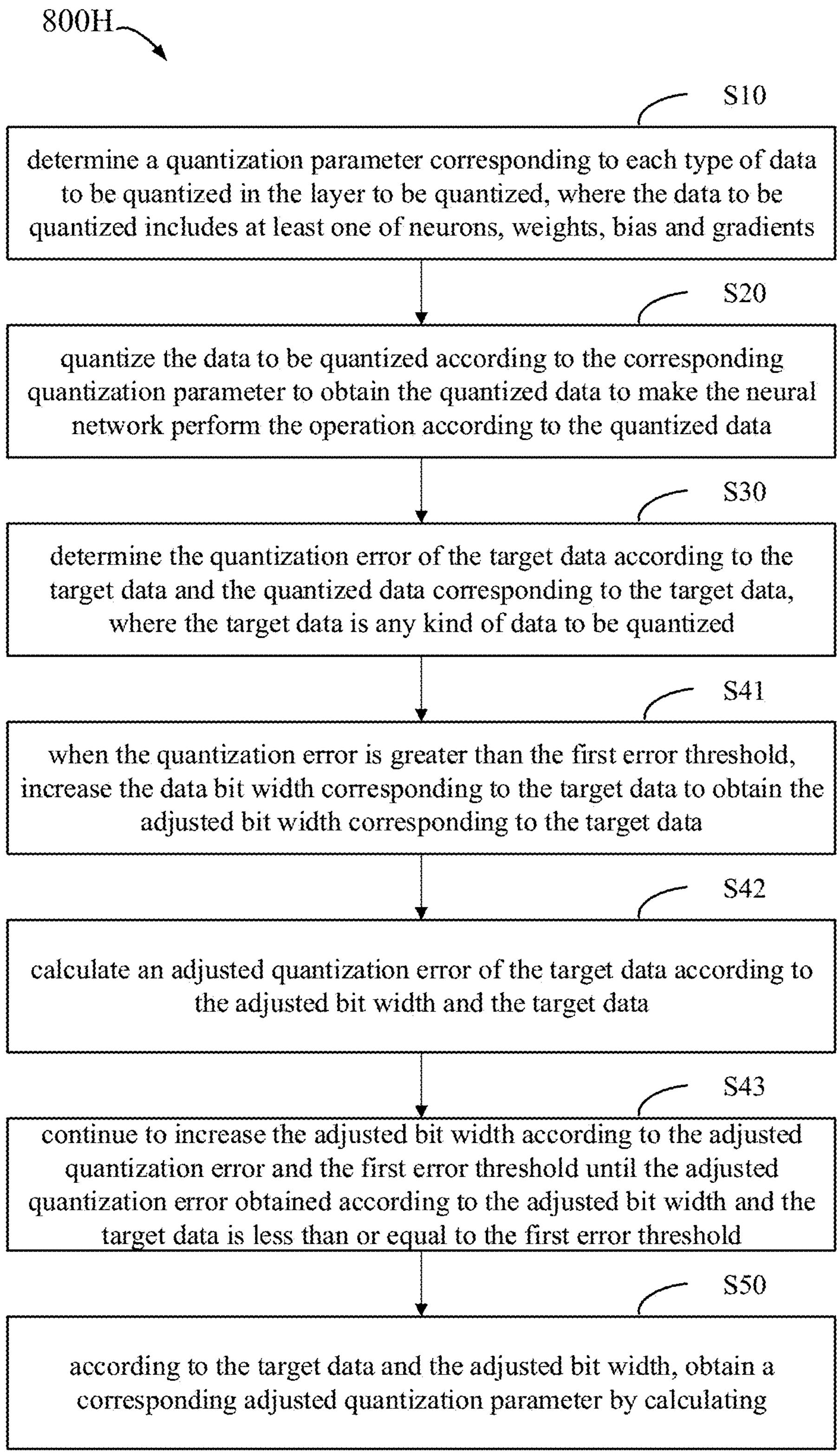
FIG. 8H is a flowchart illustrating a neural network quantization method according to an embodiment of the present disclosure.

FIG. 8H is a flowchart illustrating a neural network quantization method 800H according to an embodiment of the present disclosure. The neural network quantization method shown in FIG. 8H includes:

a step S42: calculating an adjusted quantization error of the target data according to the adjusted bit width and the target data;

a step S43: continuing to increase the adjusted bit width according to the adjusted quantization error and the first error threshold until the adjusted quantization error obtained according to the adjusted bit width and the target data is less than or equal to the first error threshold.

When the data bit width corresponding to the target data is increased according to the quantization error, the adjusted bit width is obtained after the bit width is adjusted once; the adjusted quantization parameter is obtained according to the adjusted bit width; the adjusted quantized data is obtained by quantizing the target data according to the adjusted quantization parameter; and then the adjusted quantization error of the target data is obtained according to the adjusted quantized data and the target data. The adjusted quantization error may still be greater than the first error threshold, in other words, the data bit width obtained after the data bit width is adjusted once may not meet the adjustment purpose. When the adjusted quantization error is still greater than the first error threshold, the adjusted data bit width may continue to be adjusted. In other words, the data bit width corresponding to the target data may be increased many times, until the adjusted quantization error obtained according to the final obtained adjusted bit width and the target data is smaller than the first error threshold.

The adjustment stride that the data bit width increases by many times may be a fixed adjustment stride or a variable adjustment stride. For example, the final data bit width=the original data bit width+A*N bits, where N is a fixed adjustment stride that the original data bit width increases by each time, and A is the increase time of data bit width. The final data bit width=the original data bit width+M1+M2+ . . . +Mm, in which M1, M2, . . . , Mm are variable adjustment strides that the original data bit width increases by each time.

In the embodiment, when the quantization error is greater than the first error threshold, the data bit width corresponding to the target data is increased to obtain the adjusted bit width corresponding to the target data. The data bit width may be increased by setting the first error threshold and the adjustment stride, so that the adjusted data bit width may meet the quantization requirement. When one adjustment does not meet the adjustment requirement, the data bit width may also be adjusted many times. The setting of the first error threshold and the adjustment stride makes it possible to flexibly adjust the quantization parameter according to the quantization requirements so that different quantization requirements may be met and the quantization precision may be adaptively adjusted according to the data features of the data to be quantized.

Figure 8I:
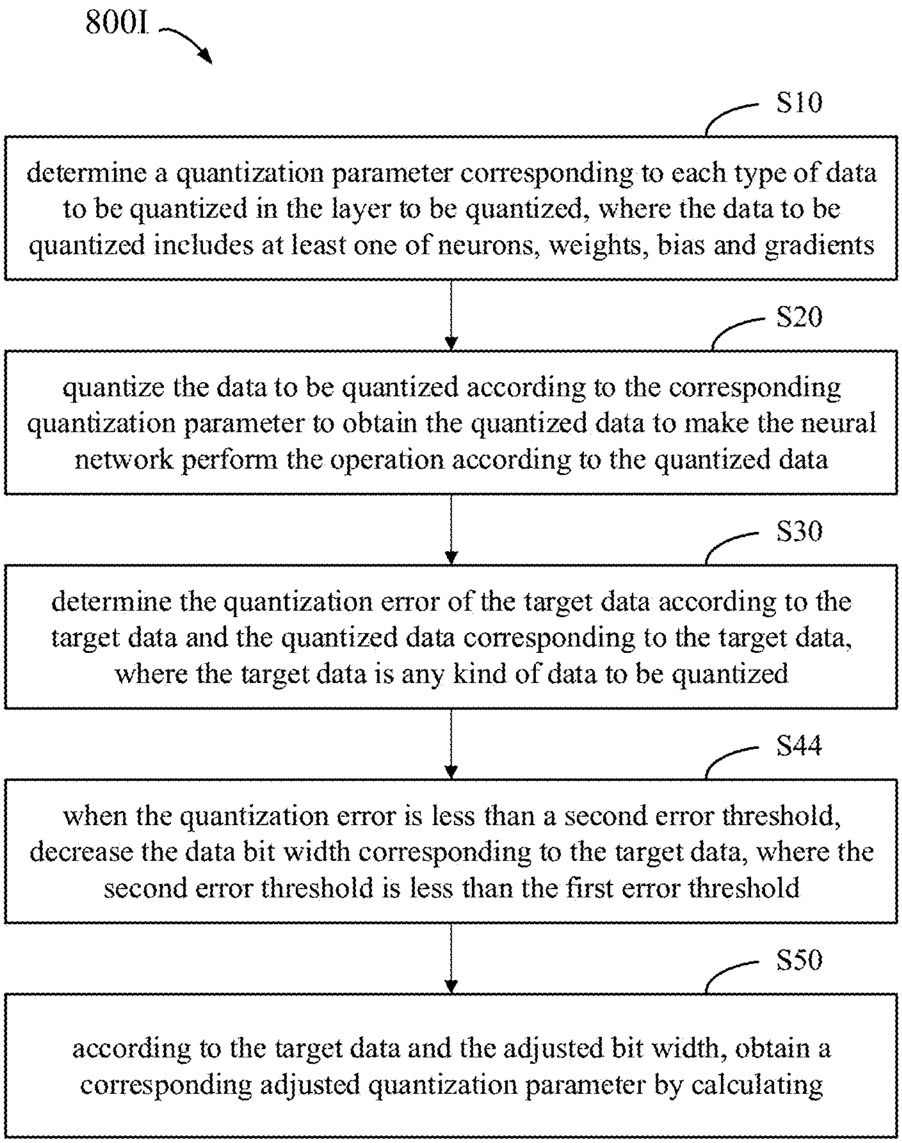
FIG. 8I is a flowchart illustrating a neural network quantization method according to an embodiment of the present disclosure.

FIG. 8I is a flowchart illustrating a neural network quantization method 800I according to an embodiment of the present disclosure. As shown in FIG. 8I, the step S40 in the neural network quantization method includes:

- a step S44, when the quantization error is less than a second error threshold, decreasing the data bit width corresponding to the target data, where the second error threshold is less than the first error threshold.

The second error threshold may be determined according to the acceptable quantization error and the expected computation efficiency of the neural network. The quantization error may be compared with the second error threshold. When the quantization error is less than the second error threshold, it may be considered that the quantization error exceeds the expectation, but the computation efficiency is too low to be acceptable. The computation efficiency of the neural network may be improved by decreasing the quantization precision. The quantization precision of the target data may be decreased by decreasing the data bit width corresponding to the target data.

The data bit width corresponding to the target data may be decreased according to a fixed adjustment stride to obtain the adjusted bit width. The fixed adjustment stride may be N bits, where N is a positive integer. Each time the data bit width is adjusted, the data bit width may be decreased by N bits. The data bit width after increasing is equal to an original data bit width minus N bits.

The data bit width corresponding to the target data may be decreased according to a variable adjustment stride to obtain the adjusted bit width. For example, when the difference between the quantization error and the error threshold is greater than the first threshold, the data bit width may be adjusted according to an adjustment stride M1; when the difference between the quantization error and the error threshold is less than the first threshold, the data bit width may be adjusted according to an adjustment stride M2, in which the first threshold is greater than the second threshold, and M1 is greater than M2. The variable adjustment stride may be determined according to requirements. The present disclosure does not limit the adjustment stride of the data bit width and whether the adjustment stride is variable.

The adjusted quantization parameter may be obtained by calculating the target data according to the adjusted bit width; the quantized data obtained by re-quantizing the target data using the adjusted quantization parameter has lower quantization precision than the quantized data obtained by using the quantization parameter before adjustment.

Figure 8J:
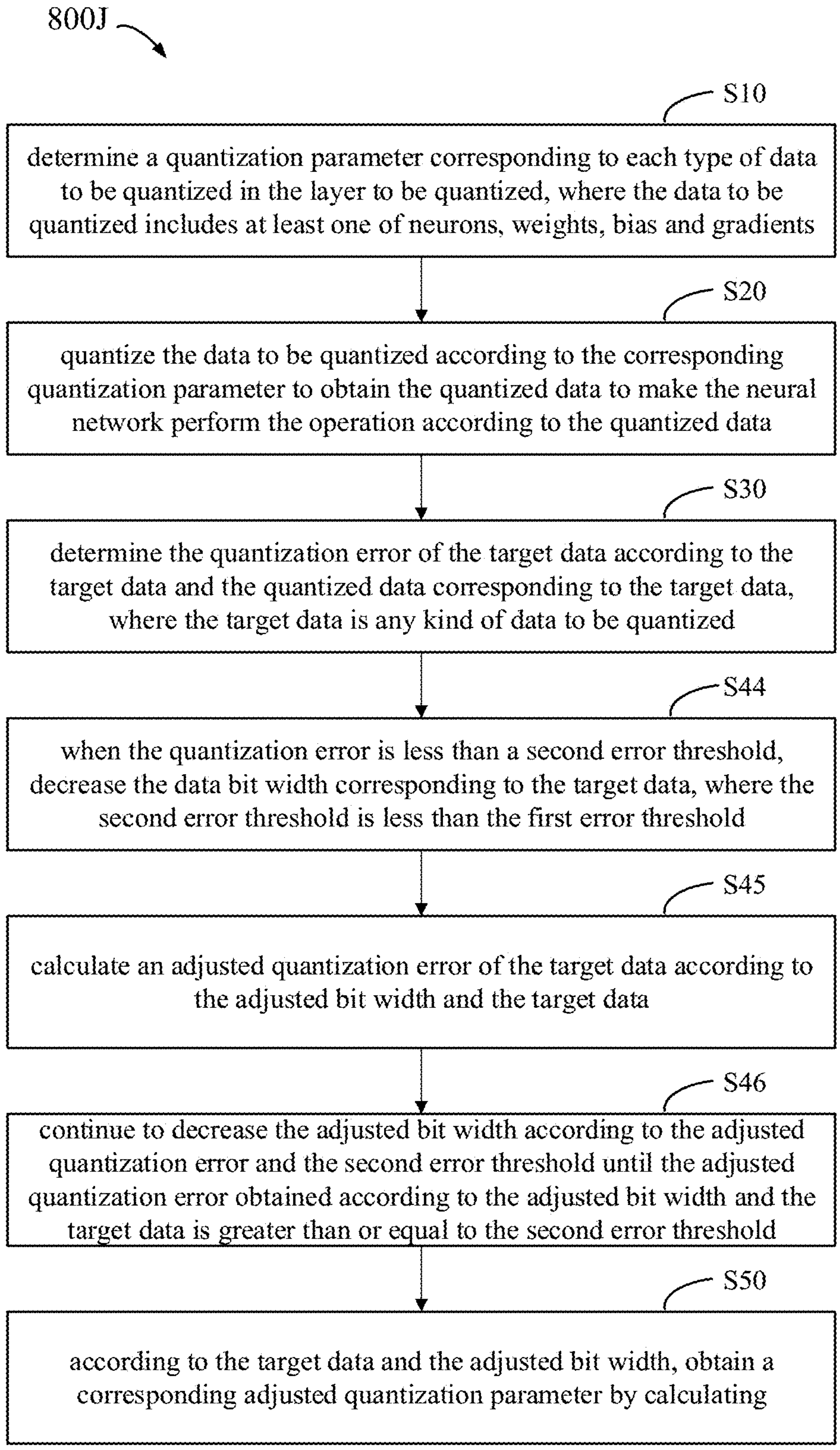
FIG. 8J is a flowchart illustrating a neural network quantization method according to an embodiment of the present disclosure.

FIG. 8J is a flowchart illustrating a neural network quantization method 800J according to an embodiment of the present disclosure;

The neural network quantization method shown in FIG. 8J includes:

- a step S45: calculating an adjusted quantization error of the target data according to the adjusted bit width and the target data;
- a step S46: continuing to decrease the adjusted bit width according to the adjusted quantization error and the second error threshold until the adjusted quantization error obtained according to the adjusted bit width and the target data is greater than or equal to the second error threshold.

When the data bit width corresponding to the target data is increased according to the quantization error, the adjusted bit width is obtained after the bit width is adjusted once; the adjusted quantization parameter is obtained according to the adjusted bit width; the adjusted quantized data is obtained by quantizing the target data according to the adjusted quantization parameter; and then the adjusted quantization error of the target data is obtained according to the adjusted quantized data and the target data. The adjusted quantization error may still be less than the second error threshold, in other words, the data bit width obtained after the bit width is adjusted once may not meet the adjustment purpose. When the adjusted quantization error is still less than the second error threshold, the adjusted data bit width may continue to be adjusted. In other words, the data bit width corresponding to the target data may be decreased many times, until the adjusted quantization error obtained according to the final obtained adjusted bit width and the target data is greater than the second error threshold.

The adjustment stride that the data bit width decreased by for many times may be a fixed adjustment stride or a variable adjustment stride. For example, the final data bit width=the original data bit width−A*N bits, where N is a fixed adjustment stride that the original data bit width increases by each time, and A is the increase times of data bit width. The final data bit width=the original data bit width−M1−M2− . . . −Mm, where M1, M2, . . . , Mm are variable adjustment strides that the original data bit width decreases by each time.

In the embodiment, when the quantization error is less than the second error threshold, the data bit width corresponding to the target data is decreased to obtain the adjusted bit width corresponding to the target data. The data bit width may be decreased by setting the second error threshold and the adjustment stride, so that the adjusted data bit width may meet the quantization requirement. When one adjustment may not meet the adjustment requirement, the data bit width may be adjusted many times. The setting of the second error threshold and the adjustment stride enables the quantization parameter to be flexibly adjusted according to quantization requirements to meet different quantization requirements, so that the quantization precision may be adjusted, and a balance between the quantization precision and the computation efficiency of the neural network may be achieved.

In a possible implementation, the method may further include:

when the quantization error is greater than the first error threshold, increasing the data bit width corresponding to the target data; when the quantization error is less than the second error threshold, decreasing the data bit width corresponding to the target data to obtain the adjusted bit width corresponding to the target data.

Two error thresholds may be set at the same time, in which the first error threshold is used to indicate that the quantization precision is too low, in this case, the data bit width may be increased; and the second error threshold is used to indicate that the quantization precision is too high, in this case, the data bit width may be decreased. The first error threshold is greater than the second error threshold, and the quantization error of the target data may be compared with the two error thresholds at the same time. When the quantization error is greater than the first error threshold, the data bit width may be increased; when the quantization error is less than the second error threshold, the data bit width may be decreased; and when the quantization error is between the first error threshold and the second error threshold, the data bit width may remain unchanged.

In the embodiment, by comparing the quantization error with the first error threshold and the second error threshold at the same time, the data bit width may be increased or decreased according to a comparison result, and the data bit width may be adjusted more flexibly by using the first error threshold and the second error threshold, so that an adjustment result of the data bit width is more in line with the quantization requirements.

It should be clear that a training of a neural network refers to a process of performing a plurality of iteration operations on the neural network (the weight of the neural network may be a random number), so that the weight of the neural network may satisfy a preset condition. An iteration operation generally includes a forward operation, a reverse operation and a weight update operation. Forward operation refers to a process of forward inference based on input data of the neural network to obtain a forward computation result. The reverse operation is a process of determining a loss value according to the forward computation result and a preset reference value, and determining a gradient value of a weight and/or a gradient value of the input data according to the loss value. The weight update operation refers to the process of adjusting the weight of the neural network according to the gradient value of the weight. Specifically, the training process of the neural network is as follows: the processor may use the neural network with a weight of a random number to perform a forward operation on the input data to obtain a forward computation result. The processor then determines a loss value according to the forward computation result and a preset reference value, and determines a gradient value of a weight and/or a gradient value of the input data according to the loss value. Finally, the processor may update the gradient value of the neural network according to the gradient value of the weight and obtain a new weight to complete an iteration operation. The processor recurrently executes a plurality of iteration operations until the forward computation result of the neural network satisfies the preset condition. For example, when the forward computation result of the neural network converges to the preset reference value, the training ends. Alternatively, when the forward computation result of the neural network and the loss value determined according to the preset reference value are less than or equal to a preset precision, the training ends.

Fine-tuning refers to a process of performing a plurality of iteration operations on the neural network (the weight of the neural network is already in a convergent state rather than a random number), so that the precision of the neural network may meet a preset requirement. The fine-tuning process is basically the same as the training process, and may be regarded as a process of retraining the neural network in a convergent state. Inference refers to a process of performing a forward operation by using the neural network of which the weight meets a preset condition to realize functions such as recognition or classification, for example, recognizing images by using the neural network, etc.

Figure 8K:
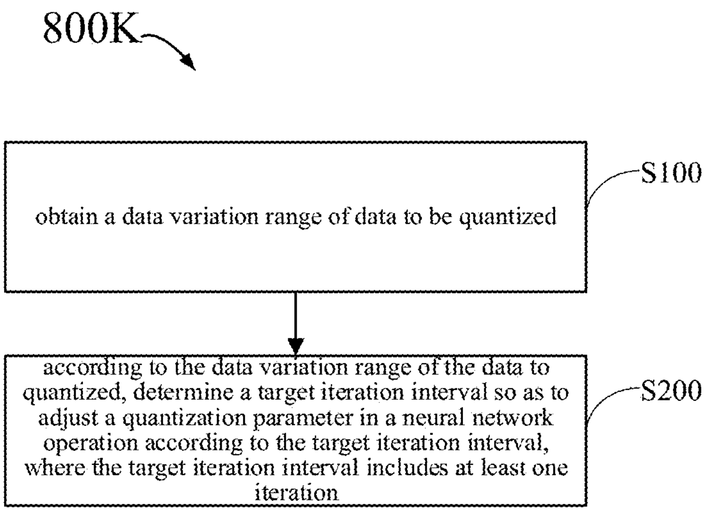
FIG. 8K is a flowchart illustrating a method for adjusting quantization parameters according to an embodiment of the present disclosure.

In an embodiment of the present disclosure, in the training or fine-tuning process of the neural network, different quantization parameters may be used to quantize the operation data of the neural network at different stages of the operation of the neural network, and perform the iteration operation according to the quantized data, thereby reducing the data storage space during the operation of the neural network and improving the data access efficiency and the computation efficiency. As shown in FIG. 8K, FIG. 8K is a flowchart illustrating a method 800K for adjusting quantization parameters according to an embodiment of the present disclosure. The method may include:

S100: obtaining a data variation range of data to be quantized.

Optionally, the processor may directly read the data variation range of the data to be quantized which may be input by a user.

Optionally, the processor may compute the data variation range of the data to be quantized according to data to be quantized in a current iteration and data to be quantized in a historical iteration. The current iteration refers to an iteration operation currently performed, and the historical iteration refers to an iteration operation performed before the current iteration. For example, the processor may obtain a maximum value and an average value of the elements in the data to be quantized in the current iteration, and a maximum value and an average value of the elements in the data to be quantized in each historical iteration, and determine a variation range of the data to be quantized according to the maximum value and the average value of the elements in each iteration. If the maximum value of the elements in the data to be quantized in the current iteration is close to the maximum value of the elements in the data to be quantized in a preset number of historical iterations, and if the average value of the elements in the data to be quantized in the current iteration is close to the average value of the elements in the data to be quantized in the preset number of historical iterations, it may be determined that the data variation range of the data to be quantized is small. Otherwise, it may be determined that the data variation range of the data to be quantized is large. For another example, the data variation range of the data to be quantized may be represented by a moving mean value or variance of the data to be quantized, or the like. This is not specifically limited here.

In an embodiment of the present disclosure, the data variation range of the data to be quantized may be used to determine whether the quantization parameter of the data to be quantized needs to be adjusted. For example, if the data variation range of the data to be quantized is large, it means that the quantization parameter needs to be adjusted in time to ensure the quantization precision. If the data variation range of the data to be quantized is small, the quantization parameters in the historical iterations may be used in the current verify iteration and a certain count of iterations after the current verify iteration, thereby avoiding frequent adjustment of the quantization parameter and improving the quantization efficiency.

Each iteration involves at least one piece of data to be quantized, and the data to be quantized may be operation data represented by a floating point or operation data represented by a fixed point. Optionally, the data to be quantized in each iteration may be at least one of neuron data, weight data and gradient data, and the gradient data may also include neuron gradient data, weight gradient data, and the like.

S200: according to the data variation range of the data to quantized, determining a target iteration interval so as to adjust a quantization parameter in a neural network operation according to the target iteration interval, where the target iteration interval includes at least one iteration, and the quantization parameter of the neural network is configured to implement quantization of the data to be quantized in the neural network operation. Here, the quantization parameter may include the data width. Therefore, according to the data variation range of the data to be quantized, determining the target iteration interval to adjust the data width in the neural network operation according to the target iteration interval, where the target iteration interval includes at least one iteration.

Optionally, the quantization parameter may include the point location and/or the scaling factor, where the scaling factor may include a first scaling factor and a second scaling factor. The specific method of calculating the point location and the scaling factor may refer to the formula described above, which will not be repeated here. Optionally, the quantization meter may also include an offset. The method of calculating the offset refers to the formula described above. Furthermore, the processor may also determine the point location and the scaling factor according to other formulas described above. In an embodiment of the present disclosure, the processor may update at least one of the point location, the scaling factor or the offset according to the certain target iteration interval to adjust the quantization parameter in the neural network operation. In other words, the quantization parameter in the neural network operation may be updated according to the data variation range of the data to be quantized in the neural network operation, so that the quantization precision may be guaranteed.

Figure 8L:
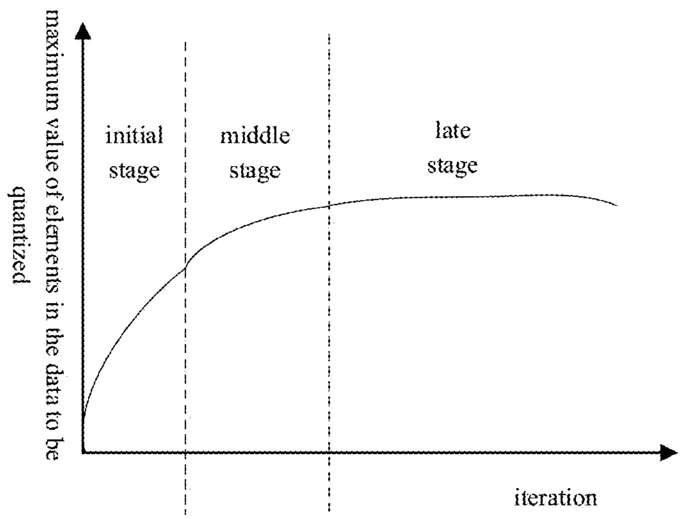
FIG. 8L is a schematic diagram of a variation trend of data to be quantized during operation according to an embodiment of the present disclosure.

It is understandable that a data variation curve of the data to be quantized may be obtained by performing statistics and analysis on a variation trend of the operation data during the training or fine-tuning process of the neural network. As shown in FIG. 8L, it may be seen from the data variation curve 800L that in an initial stage of the training or fine-tuning of the neural network, the data variation of the data to be quantized in different iterations is relatively severe, and as the training or fine-tuning operation progresses, the data variation of the data to be quantized in different iterations gradually tends to be gentle. Therefore, in the initial stage of the training or fine-tuning of the neural network, the quantization parameter may be adjusted frequently, and in middle and late stages of the training or fine-tuning of the neural network, the quantization parameter may be adjusted at intervals of a plurality of iterations or training epochs. The method of the present disclosure is to determine a suitable iteration interval to achieve a balance between quantization precision and quantization efficiency.

Specifically, the processor may determine the target iteration interval according to the data variation range of the data to be quantized, so as to adjust the quantization parameter in the neural network operation according to the target iteration interval. Optionally, the target iteration interval may increase as the data variation range of the data to be quantized decreases. In other words, when the data variation range of the data to be quantized is greater, the target iteration interval is smaller, and this indicates that the quantization parameter is adjusted more frequently. When the data variation range of the data to be quantized is smaller, the target iteration interval is greater, and this indicates that the quantization parameter is adjusted less frequently. In other embodiments, the target iteration interval may be a hyper-parameter. For example, the target iteration interval may be customized by a user.

Optionally, various types of data to be quantized, such as the weight data, the neuron data and the gradient data, may have different iteration intervals. Correspondingly, the processor may respectively obtain the data variation ranges corresponding to the various types of data to be quantized, so as to determine the target iteration interval corresponding to the respective types of data to be quantized according to the data variation range of each type of data to be quantized. In other words, the quantization process of various data to be quantized may be performed asynchronously. In an embodiment of the present disclosure, due to the difference between different types of data to be quantized, the data variation ranges of different data to be quantized may be used to determine the corresponding target iteration interval, and determine the corresponding quantization parameter according to the corresponding target iteration interval, so that the quantization precision of the data to be quantized may be guaranteed, and the correctness of the computation result of the neural network may be ensured.

Of course, in other embodiments, a same target iteration interval may be determined for different types of data to be quantized, so as to adjust the quantization parameter corresponding to the data to be quantized according to the target iteration interval. For example, the processor may respectively obtain the data variation ranges of the various type of data to be quantized, and determine the target iteration interval according to the largest data variation range of the data to be quantized, and respectively determine the quantization parameters of the various type of data to be quantized according to the target iteration interval. Furthermore, different types of data to be quantized may use the same quantization parameter.

Further optionally, the neural network may include at least one operation layer, and the data to be quantized may be at least one of neuron data, weight data, and gradient data involved in each operation layer. At this time, the processor may obtain the data to be quantized involved in a current operation layer, and determine the data variation ranges of various type of data to be quantized in the current operation layer and the corresponding target iteration interval using the above method.

Optionally, the processor may determine the data variation range of the data to be quantized once in each iteration operation process, and determine the target iteration interval once according to the data variation range of the corresponding data to be quantized. In other words, the processor may compute the target iteration interval once in each iteration. The specific computation method of the target iteration interval may be seen in the description below. Further, the processor may select a verify iteration from each iteration according to the preset condition, determine the variation range of the data to be quantized at each verify iteration, and update and adjust the quantization parameter and the like according to the target iteration interval corresponding to the verify iteration. At this time, if the iteration is not the selected verify iteration, the processor may ignore the target iteration interval corresponding to the iteration.

Optionally, each target iteration interval may correspond one verify iteration, and the verify iteration may be a starting iteration of the target iteration interval or an ending iteration of the target iteration interval. The processor may adjust the quantization parameter of the neural network at the verify iteration of each target iteration interval, so as to adjust the quantization parameter of the neural network according to the target iteration interval. The verify iteration may be a time point for verifying whether the current quantization parameter meets the requirement of the data to be quantized. The quantization parameter before the adjustment may be the same as the quantization parameter after the adjustment, or may be different from the quantization parameter after the adjustment. Optionally, the interval between adjacent verify iterations may be greater than or equal to a target iteration interval.

For example, the target iteration interval may compute the number of iterations from the current verify iteration, and the current verify iteration may be the starting iteration of the target iteration interval. For example, if the current verify iteration is a 100th iteration, the processor may determine that the target iteration interval is 3 according to the data variation range of the data to be quantized, and the processor may determine that the target iteration interval includes 3 iterations, which are respectively the 100th iteration, a 101st iteration, and a 102nd iteration. The processor may adjust the quantization parameter in the neural network operation at the 100th iteration. The current verify iteration is the corresponding iteration operation when the processor is currently performing the update and adjustment of the quantization parameter.

Optionally, the target iteration interval may compute the number of iterations from the next iteration of the current verify iteration, and the current verify iteration may be the ending iteration of the previous iteration interval of the current verify iteration. For example, if the current verify iteration is a 100th iteration, the processor may determine that the target iteration interval is 3 according to the data variation range of the data to be quantized, and the processor may determine that the target iteration interval includes 3 iterations, which are respectively a 101st iteration, a 102nd iteration, and a 103rd iteration. The processor may adjust the quantization parameter in the neural network operation at the 100th iteration and the 103rd iteration. The method for determining the target iteration interval is not limited in the present disclosure.

Figure 8M:
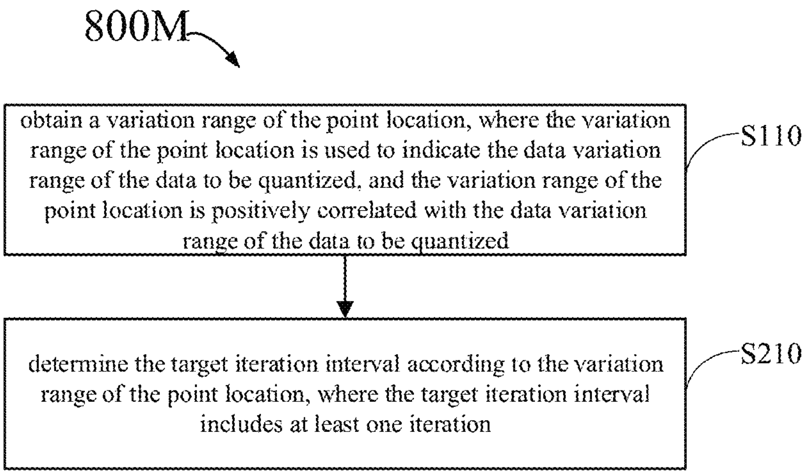
FIG. 8M is a flowchart illustrating a method for determining a target iteration interval in a method for adjusting parameters according to an embodiment of the present disclosure.

In an embodiment, it may be seen from the computation formula of the point location, the scaling factor, and the offset that the quantization parameter is usually related to the data to be quantized. Therefore, in the step S100, the data variation range of the data to be quantized may be determined indirectly by the variation range of the quantization parameter, and the data variation range of the data to be quantized may be indicated by the variation range of the quantization parameter. Specifically, FIG. 8M is a flowchart illustrating a method 800M for determining a target iteration interval in a method for adjusting parameters according to an embodiment of the present disclosure. The step S100 includes:

a step S110: obtaining a variation range of the point location, where the variation range of the point location is used to indicate the data variation range of the data to be quantized, and the variation range of the point location is positively correlated with the data variation range of the data to be quantized.

Optionally, the variation range of the point location may indirectly reflect the variation range of the data to be quantized. The variation range of the point location may be determined according to the point location of the current verify iteration and the point location of at least one historical iteration. The point location of the current verify iteration and the point locations of the respective historical iterations may be determined by using the formula described above.

Figure 8N:
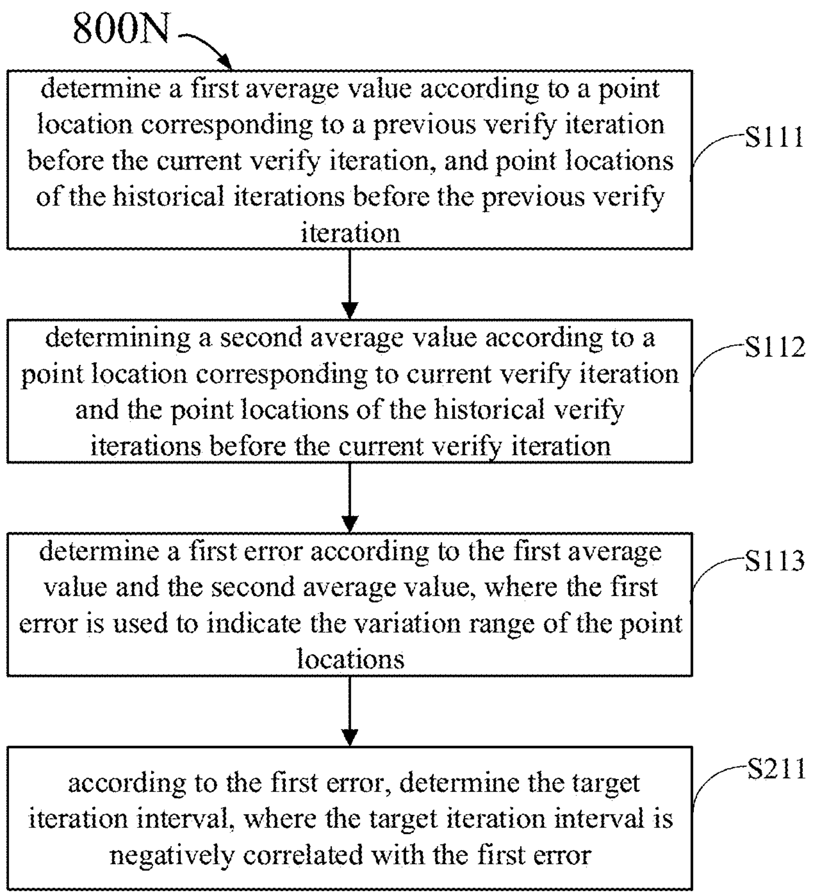
FIG. 8N is a flowchart illustrating a method for determining a point location variation range according to an embodiment of the present disclosure.

For example, the processor may compute a variance of a point location of a current verify iteration and point locations of historical iterations, and determine a variation range of the point location according to the variance. For another example, the processor may determine a variation range of a point location according to the point location of a current verify iteration and point locations of historical iterations. Specifically, as shown in FIG. 8N, FIG. 8N is a flowchart illustrating a method 800N for determining a point location variation range according to an embodiment of the present disclosure. The step S110 includes:

S111: determining a first average value according to a point location corresponding to a previous verify iteration before the current verify iteration, and point locations of the historical iterations before the previous verify iteration, where the previous verify iteration is the iteration when the quantization parameter is adjusted the last time, and there is at least one iteration interval between the previous verify iteration and the current verify iteration.

Optionally, at least one historical iteration may belong to at least one iteration interval, each iteration interval may correspond to one verify iteration, and two adjacent verify iterations may have one iteration interval. The previous verify iteration in the step S111 may be the verify iteration corresponding to the previous iteration interval before the target iteration interval.

Optionally, the first average value may be calculated according to the following formula:

$$M1=a1\times s^{t-1}+a2\times s^{t-2}+a3\times s^{t-3}+\ldots+am\times s^{1} \quad \text{Formula (38)}$$

where a1~am denote the computation weights corresponding to the point locations of respective iterations, $s^{t-1}$ denotes the point location corresponding to the previous verify iteration, $s^{t-2}$, $s^{t-3}$ . . . $s^{1}$ denote the point locations corresponding to the historical iterations before the previous verify iteration, and M1 denotes the first average value. Further, according to the data distribution characteristics, the farther the historical iteration is from the previous verify iteration, the smaller the influence on the distribution and variation range of the point location near the previous verify iteration. Therefore, the computation weights may be sequentially reduced in the order of a1~am.

For example, the previous verify iteration is the 100th iteration of the neural network operation, and the historical iterations may be the 1st iteration to the 99th iteration, and the processor may obtain the point location of the 100th iteration (for example, $s^{t-1}$), and obtain the point locations of the historical iterations before the 100th iteration, in other words, $s^1$ may refer to the point location corresponding to the 1st iteration of the neural network . . . , $s^{t-3}$ may refer to the point location corresponding to the 98th iteration of the neural network, and $s^{t-2}$ may refer to the point location corresponding to the 99th iteration of the neural network. Further, the processor may obtain the first average value according to the above formula.

Furthermore, the first average value may be calculated according to the point location of the verify iteration corresponding to each iteration interval. For example, the first average value may be calculated according to the following formula:

$$M1 = a1 \times s^{t-1} + a2 \times s^{t-2} + a3 \times s^{t-3} + \ldots + am \times s^1;$$

where a1~am denote the computation weights corresponding to the point locations of respective verify iterations, $s^{t-1}$ denotes the point location corresponding to the previous verify iteration, $s^{t-2}$, $s^{t-3}$ . . . $s^1$ denote the point locations corresponding to verify iterations of a preset number of iteration intervals before the previous verify iteration, and M1 denotes the first average value.

For example, the previous verify iteration is the 100th iteration of the neural network operation, and the historical iterations may be the 1st iteration to the 99th iteration, where the 99th iteration may belong to 11 iteration intervals. For example, the 1st iteration to the 9th iteration belong to the 1st iteration interval, the 10th iteration to the 18th iteration belong to the 2nd iteration interval, . . . , and the 90th iteration to the 99th iteration belong to the 11th iteration interval. The processor may obtain the point location of the 100th iteration (for example, $s^{t-1}$ and obtain the point location of the verify iteration in the iteration interval before the 100th iteration, in other words, $s^1$ may refer to the point location corresponding to the verify iteration of the 1st iteration interval of the neural network (for example, $s^1$ may refer to the point location corresponding to the 1st iteration of the neural network), . . . , $s^{t-3}$ may refer to the point location corresponding to the verify iteration of the 10th iteration interval of the neural network (for example, $s^{t-3}$ may refer to the point location corresponding to the 81st iteration of the neural network), and $s^{t-2}$ may refer to the point location corresponding to the verify iteration of the 11th iteration interval of the neural network (for example, $s^{t-2}$ may refer to the point location corresponding to the 90th iteration of the neural network). Further, the processor may obtain the first average value M1 according to the above formula.

In an embodiment of the present disclosure, for the convenience of illustration, it is assumed that the iteration intervals include the same number of iterations. However, in actual use, the iteration intervals may include different numbers of iterations. Optionally, the number of iterations included in the iteration intervals increases with the increase of iterations, in other words, as the training or fine-tuning of the neural network proceeds, the iteration intervals may become larger and larger.

Furthermore, in order to simplify the computation and reduce the storage space occupied by the data, the first average value M1 may be calculated using the following formula:

$$M1 = \alpha \times s^{t-1} + (1 - \alpha) \times (M0) \qquad \text{Formula (39)}$$

where α refers to the computation weight of the point location corresponding to the previous verify iteration, $s^{t-1}$ refers to the point location corresponding to the previous verify iteration, and M0 refers to the moving mean value corresponding to the verify iteration before the previous verify iteration, where the specific method for calculating M0 may refer to the method for calculating M1, which will not be repeated here.

S112: determining a second average value according to a point location corresponding to current verify iteration and the point locations of the historical verify iterations before the current verify iteration. The point location corresponding to the current verify iteration may be determined according to a target data bit width of the current verify iteration and the data to be quantized.

Optionally, the second average value M2 may be calculated according to the following formula:

$$M2 = b1 \times s^{t} + b2 \times s^{t-1} + b3 \times s^{t-2} + \ldots + bm \times s^1 \qquad \text{Formula (40)}$$

where b1~bm denote the computation weights corresponding to the point locations of respective iterations, $s^t$ denotes the point location corresponding to the current verify iteration, $s^{t-1}$, $s^{t-2}$ . . . $s^1$ denote the point locations corresponding to the historical iterations before the current verify iteration, and M2 denotes the second average value. Further, according to the data distribution characteristics, the farther the historical iteration is from the current verify iteration, the smaller the influence on the distribution and variation range of the point location near the current verify iteration. Therefore, the computation weights may be sequentially reduced in the order of b1~bm.

For example, the current verify iteration is the 101st iteration of the neural network operation, and the historical iterations before the current verify iteration refer to the 1st iteration to the 100th iteration. The processor may obtain the point location of the 101st iteration (for example, $s^t$), and obtain the point locations of the historical iterations before the 101st iteration, in other words, $s^1$ may refer to the point location corresponding to the 1st iteration of the neural network . . . , $s^{t-2}$ may refer to the point location corresponding to the 99th iteration of the neural network, and $s^{t-1}$ may refer to the point location corresponding to the 100th iteration of the neural network. Further, the processor may obtain the second average value M2 according to the above formula.

Figure 8O:
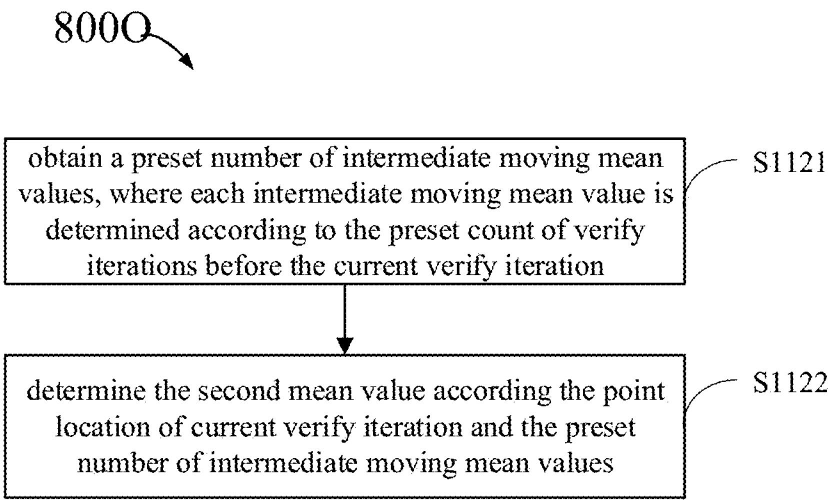
FIG. 8O is a flowchart illustrating a method for determining a second mean value according to an embodiment of the present disclosure.

Optionally, the second average value may be calculated according to the point location of the verify iteration corresponding to each iteration interval. Specifically, FIG. 8O is a flowchart illustrating a method 800O for determining a second average value according to an embodiment of the present disclosure. The step S112 includes:

S1121: obtaining a preset count of intermediate moving mean values, where each intermediate moving mean value is determined according to the preset count of verify iterations before the current verify iteration, and the verify iteration is the iteration when adjusting the parameter in the neural network quantization process;

S1122: determining the second average value according the point location of current verify iteration and the preset count of intermediate moving mean values.

For example, the second average value may be calculated according to the following formula:

$$M2 = b1 \times s\hat{}t + b2 \times s\hat{}(t-1) + b3 \times s\hat{}(t-2) + \ldots + bm \times s\hat{}1$$

where b1~bm denote the computation weights corresponding to the point locations of respective iterations, s^t denotes the point location corresponding to the current verify iteration, s^(t−1), s^(t−2) . . . s^1 denote the point locations corresponding to the verify iterations before the current verify iteration, and M2 denotes the second average value.

For example, the current verify iteration is the 100th iteration, and the historical iterations may be the 1st iteration to the 99th iteration, where the 99th iteration may belong to 11 iteration intervals. For example, the 1st iteration to the 9th iteration belong to the 1st iteration interval, the 10th iteration to the 18th iteration belong to the 2nd iteration interval, . . . , and the 90th iteration to the 99th iteration belong to the 11th iteration interval. The processor may obtain the point location of the 100th iteration (for example, $s^t$ and obtain the point location of the verify iteration in the iteration interval before the 100th iteration, in other words, $s^1$ may refer to the point location corresponding to the verify iteration of the 1st iteration interval of the neural network (for example, $s^1$ may refer to the point location corresponding to the 1st iteration of the neural network), . . . , $s^{t-2}$ may refer to the point location corresponding to the verify iteration of the 10th iteration interval of the neural network (for example, $s^{t-2}$ may refer to the point location corresponding to the 81st iteration of the neural network), and $s^{t-1}$ may refer to the point location corresponding to the verify iteration of the 11th iteration interval of the neural network (for example, $s^{t-1}$ may refer to the point location corresponding to the 90th iteration of the neural network). Further, the processor may obtain the second average value M2 according to the above formula.

In an embodiment of the present disclosure, for the convenience of illustration, it is assumed that the iteration intervals include the same number of iterations. However, in actual use, the iteration intervals may include different numbers of iterations. Optionally, the number of iterations included in the iteration intervals increases with the increase of iterations, in other words, as the training or fine-tuning of the neural network proceeds, the iteration intervals may become larger and larger.

Furthermore, in order to simplify the computation and reduce the storage space occupied by the data, the processor may determine the second average value according to the point location corresponding to the current verify iteration and the first average value. In other words, the second average value may be calculated using the following formula:

$$M2 = \beta \times s^t + (1-\beta) \times M1 \quad \text{Formula (41)}$$

where β denotes the computation weight of the point location corresponding to the current verify iteration, and M1 denotes the first average value.

S113: determining a first error according to the first average value and the second average value, where the first error is used to indicate the variation range of point locations of the current verify iteration and the historical iterations.

Optionally, the first error may be equal to an absolute value of the difference between the second average value and the first average value. Specifically, the first error may be calculated according to the following formula:

$$diff_{update1} = |M2 - M1| = \beta|s^{(t)} - M1| \quad \text{Formula (42)}$$

Optionally, the point location of the current verify iteration may be determined according to the data to be quantized of the current verify iteration and the target data bit width corresponding to the current verify iteration. The specific method of calculating the point location may refer to the formula above. The target data bit width corresponding to the current verify iteration may be a hyper-parameter. Further optionally, the target data bit width corresponding to the current verify iteration may be user-defined input. Optionally, in the process of training or fine-tuning of the neural network, the data bit width corresponding to the data to be quantized may be unchanged. In other words, the same type of data to be quantized of the same neural network is quantized by using the same data bit width. For example, the neurons of the neural network in each iteration is quantized by using an 8-bit data bit width.

Optionally, in the process of training or fine-tuning of the neural network, the data bit width corresponding to the data to be quantized may be variable to ensure the data bit width may meet the quantization requirements of the data to be quantized. In other words, the processor may adaptively adjust the data bit width corresponding to the data to be quantized according to the data to be quantized to obtain the target data bit width corresponding to the data to be quantized. Specifically, the processor may determine the target data bit width corresponding to the current verify iteration firstly, and then determine the point location corresponding to the current verify iteration according to the target data bit width corresponding to the current verify iteration and the data to be quantized corresponding to the current verify iteration.

Figure 8P:
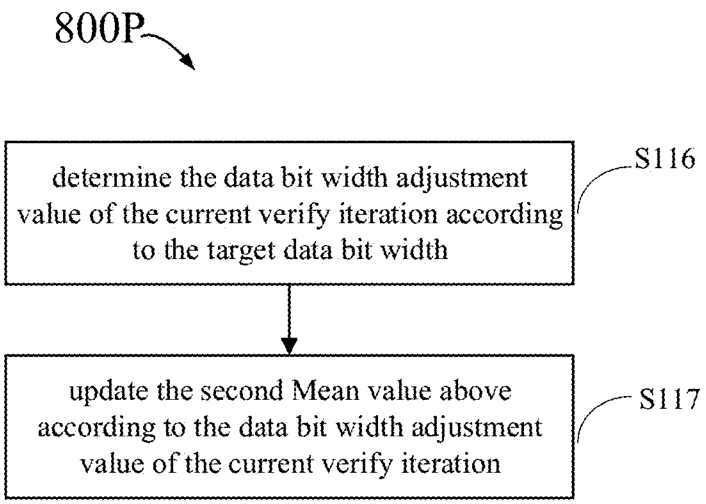
FIG. 8P is a flowchart illustrating a method for determining a second mean value according to another embodiment of the present disclosure.

In an embodiment of the present disclosure, when the data bit width of the current verify iteration changes, the point location will change correspondingly. But the change of the point location is not caused by the change of the data to be quantized. The target iteration interval calculated with the first error determined according to the formula (42) may be inaccurate and affect the quantization precision. Therefore, when the data bit width of the current verify iteration changes, the second average value may be adjusted correspondingly to guarantee the first error may reflect the variation range of the point location accurately, so as to guarantee the accuracy and reliability of the target iteration interval. Specifically, FIG. 8P is a flowchart illustrating a method 800P for determining a second average value according to an embodiment of the present disclosure. The method may include:

S116: determining the data bit width adjustment value of the current verify iteration according to the target data bit width;

Specifically, the processor may determine the data bit width adjustment value of the current verify iteration according to the target data bit width and the initial data bit width of the current verify iteration. The data bit width adjustment value=the target data bit width−the initial data bit width. The processor may obtain the data bit width adjustment value of the current verify iteration directly.

S117: updating the second average value above according to the data bit width adjustment value of the current verify iteration.

Specifically, when the data bit width adjustment value is greater than the preset parameter (for example, the preset parameter may be zero), in other words, when the data bit width of the current verify iteration increases, the processor may decrease the second average value correspondingly. When the data bit width adjustment value is less than the preset parameter (for example, the preset parameter may be zero), in other words, when the data bit width of the current verify iteration decreases, the processor may increase the second average value correspondingly. When the data bit width adjustment value is equal to the preset parameter, in other words, when the data bit width adjustment value is zero, the data to be quantized corresponding to the current iteration is not changed, the updated second average is equal to the second average before updating, and the second average before updating is calculated according to the formula (41). Optionally, when the data bit width adjustment value is equal to the preset parameter, in other words, when the data bit width adjustment value is 0, the processor may not update the second average value, in other words, the processor may not perform the operation S117.

For example, the second average value before updating $M2=\beta\times s^t+(1-\beta)\times M1$; when the target data bit width corresponding to the current verify iteration $n_2$=the initial data bit width $n_1+\Delta n$, where $\Delta n$ denotes the data bit width adjustment value. At this time, the updated second average value $M2=\beta\times s^t+(1-\beta)\times M1$. When the target data bit width corresponding to the current verify iteration $n_2$=the initial data bit width $n1-\Delta n$, where $\Delta n$ denotes the data bit width adjustment value, in this situation, the updated second average value is $M2=\beta\times(s^t-\Delta n)+(1-\beta)\times(M1+\Delta n)$, where $s^t$ denotes the point location determined by the current verify iteration according to the target data bit width.

For another example, the second average value before updating is $M2=\beta\times s^t+(1-\beta)\times M1$; when the target data bit width corresponding to the current verify iteration $n_2$=the initial data bit width $n_1+\Delta n$, where $\Delta n$ denotes the data bit width adjustment value. In this situation, the updated second average value is $M2=\beta\times s^t+(1-\beta)\times M1-\Delta n$. For another example, when the target data bit width corresponding to the current verify iteration $n_2$=the initial data bit width $n1-\Delta n$, where $\Delta n$ denotes the data bit width adjustment value, in this situation, the updated second average value is $M2=\beta\times s^t+(1-\beta)\times M1+\Delta n$, where $s^t$ denotes the point location determined by the current verify iteration according to the target data bit width.

Further, as shown in FIG. 3-6, the step S200 includes:

S210: determining the target iteration interval according to the variation range of the point location, where the target iteration interval is negatively correlated with the variation range of the point location. In other words, the greater the variation range of the point location is, the smaller the target iteration interval will be. The smaller the variation range of the point location is, the greater the target iteration interval will be.

As mentioned above, the variation range of the point location may be indicated by the first error above, and the step above may include:

S211: determining the target iteration interval, by the processor, according to the first error, where the target iteration interval is negatively correlated with the first error. In other words, a greater first error indicates a larger variation range of the point location, which means a larger data variation range of the data to be quantized and a smaller target iteration interval.

Specifically, the target iteration interval I may be calculated based on the formula below by the processor:

$$I=\frac{\delta}{diff_{update1}}-\gamma \qquad \text{Formula (43)}$$

I is the target iteration interval, $diff_{update1}$ refers to the first error above, and δ and γ may be a hyper-parameter.

It may be understood that the first error may be used to measure the variation range of the point location. A larger first error indicates a larger variation range of the point location, which means a larger data variation range of the data to be quantized and a smaller target iteration interval which needs to be set. In other words, the greater the first error is, the more frequent the adjustment of the quantization parameter is.

In the embodiment, the target iteration interval is determined by calculating the variation range (the first error) of the point location and according to the variation range of the point location. Since the quantization parameter is determined according to the target iteration interval, the quantized data obtained according to the quantization parameter may be more in accordance with the variation trend of the point location of the target data, which may improve the computation efficiency of the neural network while ensuring the quantization precision.

Figure 8Q:
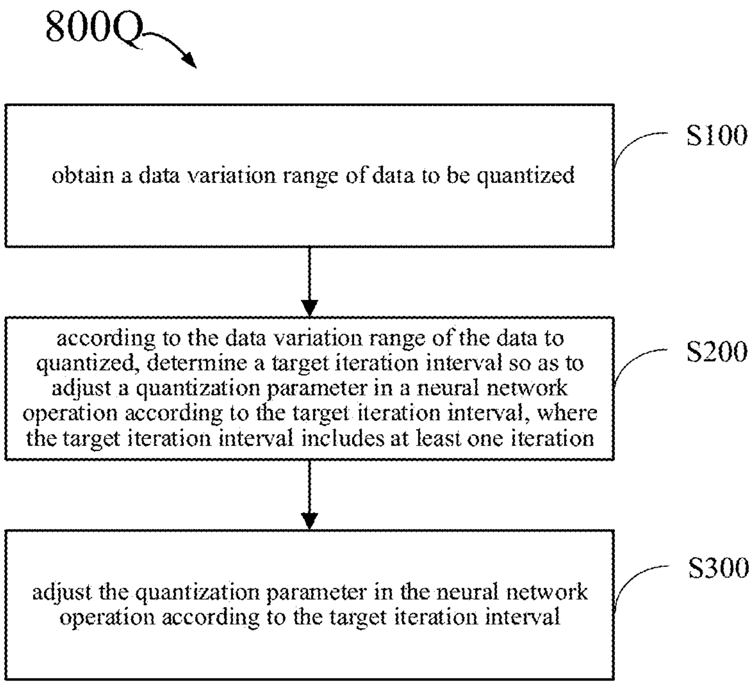
FIG. 8Q is a flowchart illustrating a method for adjusting quantization parameters according to another embodiment of the present disclosure.

Optionally, after determining the target iteration interval in the current verify iteration, the processor may further determine the quantization parameter corresponding to the target iteration interval and the parameters such as the data bit width in the current verify iteration so as to update the quantization parameter according to the target iteration interval. The quantization parameter may include a point location and/or a scaling factor. Further, the quantization parameter may also include an offset. The specific computation method of the quantization parameter refers to the description above. As shown in FIG. 8Q, FIG. 8Q is a flowchart illustrating a method 800Q for adjusting quantization parameters according to an embodiment of the present disclosure. The method may include:

S300, adjusting the quantization parameter in the neural network operation, by the processor, according to the target iteration interval.

Specifically, the processor may determine the verify iteration according to the target iteration interval, update the target iteration interval at each verify iteration, and update the quantization parameter at each verify iteration. For example, when the data bit width of the neural network operation is constant, the processor may adjust the quantization parameter such as the point location according to the data to be quantized of the verify iteration in each verify iteration. For another example, when the data bit width of the neural network operation is variable, the processor may update the data bit width in each verify iteration and adjust the quantization parameter such as the point location according to the updated data bit width and the data to be quantized of the verify iteration.

In an embodiment of the present disclosure, the processor updates the quantization parameter in each verify iteration to guarantee that the current quantization parameter may meet the quantization requirements of the data to be quantized. The target iteration interval before updating may be the same as or different from the updated target iteration interval. The data bit width before updating may be the same as or different from the updated data bit width; in other words, the data bit width of different iteration intervals may be the same or different. The quantization parameter before updating may be the same as or different from the updated quantization parameter; in other words, the quantization parameter of different iteration intervals may be the same or different.

Optionally, in the step S300 above, the processor may determine the quantization parameter in the target iteration interval at the verify iteration to adjust the quantization parameter in the neural network operation.

In one case, the data bit width corresponding to the respective iterations of the neural network operation remains unchanged, in other words, the data bit width corresponding to the respective iterations of the neural network operation is the same. At this time, the processor may determine the quantization parameters such as the point location in the target iteration interval to realize the purpose that the quantization parameter of the neural network operation may be adjusted according to the target iteration interval. The quantization parameters corresponding to the respective iterations in the target iteration interval may be consistent. In other words, each iteration in the target iteration interval uses the same point location and updates the quantization parameters such as the point location only at each verify iteration, thereby avoiding updating and adjusting the quantization parameter at each iteration, reducing the computation quantity in the quantization process and improving the quantization efficiency.

Optionally, for the case where the data bit width remains unchanged, the point locations corresponding to the respective iterations of the target iteration interval may be consistent. Specifically, the processor may determine the point location corresponding to the current verify iteration according to the data to be quantized of the current verify iteration and the target data bit width corresponding to the current verify iteration, and determine the point location corresponding to the current verify iteration as the point location corresponding to the target iteration interval. The respective iterations in the target iteration interval may apply the point location corresponding to the current verify iteration. Optionally, the target data bit width corresponding to the current verify iteration may be a hyper-parameter. For example, the target data bit width corresponding to the current verify iteration may be user-defined input. The point location corresponding to the current verify iteration may refer to the formula above.

In a situation, the data bit width corresponding to each iteration in the neural network operation may change. In other words, the data bit width corresponding to different target iteration interval may be different. However, the data bit width of each iteration in the target iteration interval remains unchanged. The data bit width corresponding to the iteration in the target iteration interval may be a hyper-parameter. For example, the data bit width corresponding to the iteration in the target iteration interval may be user-defined input. In a situation, the data bit width corresponding to the iteration in the target iteration interval may also be calculated by the processor. For example, the processor may determine the target data bit width corresponding to the current verify iteration according to the data to be quantized of the current verify iteration, and take the target data bit width corresponding to the current verify iteration as the data bit width corresponding to the target iteration interval.

At this time, to simplify the computation quantity in the quantization process, the corresponding quantization parameters such as the point location and the like in the target iteration interval may also remain unchanged. In other words, each iteration in the target iteration interval uses the same point location and updates and determines the quantization parameters such as the point location and the data bit width only at each verify iteration, thereby avoiding updating and adjusting the quantization parameter at each iteration, reducing the computation quantity in the quantization process and improving the quantization efficiency.

Optionally, for the case where the data bit width corresponding to the target iteration interval remains unchanged, the point locations corresponding to the respective iterations of the target iteration interval may be consistent. Specifically, the processor may determine the point location corresponding to the current verify iteration according to the data to be quantized of the current verify iteration and the data bit width corresponding to the current verify iteration, and take the point location corresponding to the current verify iteration as the point location corresponding to the target iteration interval. The iteration in the target iteration interval uses the point location corresponding to the current verify iteration. Optionally, the target data bit width corresponding to the current verify iteration may be a hyper-parameter. For example, the target data bit width corresponding to the current verify iteration may be user-defined input. The point location corresponding to the current verify iteration may refer to the formula above.

Optionally, the scaling factors corresponding to the respective iterations in the target iteration interval may be consistent. The processor may determine the scaling factor corresponding to the current verify iteration according to the data to be quantized of the current verify iteration, and take the scaling factor corresponding to the current verify iteration as the scaling factor of each iterative in the target iteration interval. The scaling factors corresponding to the respective iterations in the target iteration interval are consistent.

Optionally, the offsets corresponding to the respective iterations in the target iteration interval are consistent. The processor may determine the offset corresponding to the current verify iteration according to the data to be quantized of the current verify iteration, and take the offset corresponding to the current verify iteration as the offset of each iterative in the target iteration interval. Further, the process may also determine a maximum value and a minimum value of all elements of the data to quantized, and determine the quantization parameters such as the point location and scaling factor, which may refer to the descriptions above. The offsets corresponding to the respective iterations in the target iteration interval are consistent.

For example, the target iteration interval may compute the number of iterations from the current verify iteration. In other words, the verify iteration corresponding to the target iteration interval may be the starting iteration of the target iteration interval. For example, if the current verify iteration is a 100th iteration, the processor may determine that the target iteration interval is 3 according to the data variation range of the data to be quantized, and the processor may determine that the target iteration interval includes 3 iterations, which are respectively the 100th iteration, a 101st iteration, and a 102nd iteration. Further, the processor may determine the quantization parameters such as the point location corresponding to the 100th iteration according to the data to be quantized and the target data bit width corresponding to the 100th iteration, and may use the quantization parameters such as the point location corresponding to the 100th iteration to quantize the 100th iteration, the 101st iteration and the 102nd iteration. In this way, the processor does not need to compute the quantization parameters such as the point location at the 101st iteration and the 102nd iteration, thereby reducing the computation quantity in the quantization process and improving the quantization efficiency.

Optionally, the target iteration interval may compute the number of iterations from the next iteration of the current verify iteration, in other words, the verify iteration corresponding to the target iteration interval may be the ending iteration of the target iteration interval. For example, if the current verify iteration is a 100th iteration, the processor may determine that the target iteration interval is 3 according to the data variation range of the data to be quantized, and the processor may determine that the target iteration interval includes 3 iterations, which are respectively the 101st iteration, a 102nd iteration, and a 103rd iteration. Further, the processor may determine the quantization parameters such as the point location corresponding to the 100th iteration according to the data to be quantized and the target data bit width corresponding to the 100th iteration, and may use the quantization parameters such as the point location corresponding to the 100th iteration to quantize the 101st iteration, the 102nd iteration and the 103rd iteration. In this way, the processor does not need to compute the point location at the 102nd iteration and the 103rd iteration, thereby reducing the computation quantity in the quantization process and improving the quantization efficiency.

In an embodiment of the present disclosure, the data bit width and the quantization parameters corresponding to the respective iterations in one target iteration interval are consistent, in other words, the data bit width, the point location, the scaling factor and the offset corresponding to the respective iterations in one target iteration interval remain unchanged, thereby avoiding, in the process of training or fine-tuning of the neural network, adjusting the quantization parameter of the data to be quantized frequently, decreasing the computation quantity in the quantization process and improving the quantization efficiency. At different stages of training or fine-tuning, by dynamically adjusting the quantization parameter according to the data variation range, the quantization precision may be guaranteed.

Figure 8R:
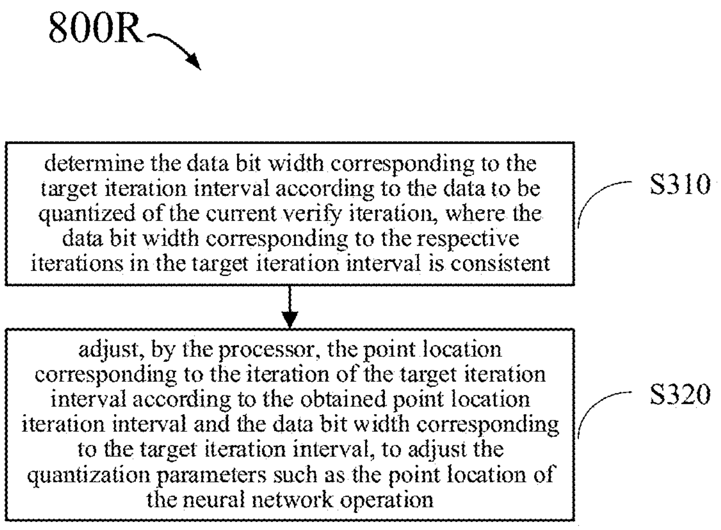
FIG. 8R is a flowchart illustrating adjustment of quantization parameters in a method for adjusting quantization parameters according to an embodiment of the present disclosure.

In another situation, the data bit width corresponding to each iteration in the neural network operation may change. However, the data bit width of each iteration in the target iteration interval remains unchanged. At this time, the quantization parameters such as the point location corresponding to the respective iterations in the target iteration interval may be inconsistent. The processor may determine the data bit width corresponding to the target iteration interval according to the target data bit width corresponding to the current verify iteration, where the data bit width corresponding to the respective iterations in the target iteration interval is consistent. The processor then adjusts the quantization parameters such as the point location in the neural network operation according to the data bit width and the point location iteration interval corresponding to the target iteration interval. Optionally, FIG. 8R is a flowchart illustrating a method 800R for adjusting quantization parameters in the quantization parameter adjustment method according to an embodiment of the present disclosure. The step S300 may include:

S310, determining the data bit width corresponding to the target iteration interval according to the data to be quantized of the current verify iteration, where the data bit width corresponding to the respective iterations in the target iteration interval is consistent. In other words, the data bit width in the neural network operation is updated once every one target iteration interval. Optionally, the data bit width corresponding to the target iteration interval may be the target data bit width corresponding to the current verify iteration. The target data bit width of the current verify iteration may refer to the steps S114 and S115 above, which will not be repeated here.

For example, the target iteration interval may compute the number of iterations from the current verify iteration. In other words, the verify iteration corresponding to the target iteration interval may be the starting iteration of the target iteration interval. For example, if the current verify iteration is a 100th iteration, the processor may determine that the target iteration interval is 6 according to the data variation range of the data to be quantized, and the processor may determine that the target iteration interval includes 6 iterations, which are respectively from the 100th iteration to a 105th iteration. At this time, the processor may determine the target data bit width of the 100th iteration, and the 101st iteration to the 105th iterations may use the target data bit width corresponding to the 100th iteration and do not need to compute the target data bit width, thereby decreasing the computation quantity and improving quantization efficiency and computation efficiency. The 106th iteration then may be the current verify iteration and repeat the above-mentioned operation of determining the target iteration interval and updating the data bit width.

Optionally, the target iteration interval may compute the number of iterations from the next iteration of the current verify iteration, in other words, the verify iteration corresponding to the target iteration interval may be the ending iteration of the target iteration interval. For example, if the current verify iteration is a 100th iteration, the processor may determine that the target iteration interval is 6 according to the data variation range of the data to be quantized, and the processor may determine that the target iteration interval includes 6 iterations, which are respectively from a 101st iteration to a 106th iteration. At this time, the processor may determine the target data bit width of the 100th iteration, and the 101st iteration to the 106th iteration may use the target data bit width corresponding to the 100th iteration and do not need to compute the target data bit width, thereby decreasing the computation quantity and improving quantization efficiency and computation efficiency. The 106th iteration then may be the current verify iteration, and the operation of determining the target iteration interval and updating the data bit width may be repeated.

S320, adjusting, by the processor, the point location corresponding to the iteration of the target iteration interval according to the obtained point location iteration interval and the data bit width corresponding to the target iteration interval, to adjust the quantization parameters such as the point location of the neural network operation, where the point location iteration interval may include at least one iteration, and the point locations of the respective iterations in the point location iteration interval are consistent. Optionally, the point location iteration interval may be a hyper-parameter. For example, the point location iteration interval may be user-defined input.

Optionally, the point location iteration interval may be less than or equal to a target iteration interval. When the point location iteration interval is equal to the target iteration interval, the processor may update the quantization parameters such as the data bit width and the point location in the current verify iteration synchronously. Further optionally, the scaling factors corresponding to the respective iterations in the target iteration interval may be consistent. Furthermore, the offsets corresponding to the respective iterations in the target iteration interval are consistent. At this time, the quantization parameters such as the data bit width and the point location corresponding to the respective iterations in the target iteration interval are the same, thereby decreasing the computation quantity and improving the quantization efficiency and computation efficiency. The specific implementation process is basically the same as that of the embodiment above, which may refer to the descriptions above and will not be repeated here.

When the point location iteration interval is less than the target iteration interval, the processor may update the quantization parameters such as the data bit width and the point location in the verify iteration corresponding to the target iteration interval, and update the quantization parameters such as the point location in a sub verify iteration determined in the point location iteration interval. Since in the case that the data bit width remains unchanged, the quantization parameters such as the point location may be fine-tuned according to the data to be quantized, the quantization parameters such as the point location may be adjusted in one target iteration interval to further improve the quantization precision.

Specifically, the processor may determine the sub-verify iteration according to the current verify iteration and the point location iteration interval. The sub-verify iteration is used to adjust the point location, and the sub-verify iteration may be an iteration in the target iteration interval. Further, a processor may adjust the point location corresponding to the iteration of the target iteration interval according to the data to be quantized of the sub-verify iteration and the data bit width corresponding to the current verify iteration, where the method for determining the point location may refer to the formula above, which will not be repeated here.

For example, if a current verify iteration is a 100th iteration, a target iteration interval is 6, the target iteration interval includes iterations from the 100th iteration to a 105th iteration, and the point location iteration interval obtained by the processor is $I_{s1}=3$, the point location may be adjusted once every three iterations from the current verify iteration. Specifically, the processor may determine the 100th iteration as the sub-verify iteration, and compute the point location s1 corresponding to the 100th iteration, then share the point location s1 for the quantization in the 100th iteration, the 101st iteration and the 102nd iteration. The processor then may use the 103rd iteration as the sub-verify iteration according to the point location iteration interval $I_{s1}$, and the processor may also determine the point location s2 corresponding to the second point location iteration interval according to the data to be quantized corresponding to the 103rd iteration and the data bit width n corresponding to the target iteration interval, and implement quantization with the point location s2 from the 103rd iteration to the 105th iteration. In an embodiment of the present disclosure, the point location s1 before the updating and the updated point location s2 may be the same or may be different. Further, the processor may determine the next target iteration interval and the quantization parameters such as the data bit width and the point location corresponding to the next target iteration interval according to the data variation range of the data to be quantized in the 106th iteration.

For another example, if the current verify iteration is a 100th iteration, the target iteration interval is 6, the target iteration interval includes iterations from a 101st iteration to a 106th iteration, and the point location iteration interval obtained by the processor is $I_{s1}=3$, the point location may be adjusted once every three iterations from the current verify iteration. Specifically, the processor may determine the point location s1 corresponding to the first point location iteration interval according to the data to be quantized of the current verify iteration and the target data bit width n1 corresponding to the current verify iteration, and share the point location s1 for the quantization in the 101st iteration, the 102nd iteration and the 103rd iteration. Later, the processor may determine the 104th iteration as the sub-verify iteration according to the point location iteration interval $I_{s1}$, and at the same time, the processor may determine a point location s2 corresponding to the second point location iteration interval according to the data to be quantized corresponding to the 104th iteration and the data bit width n1 corresponding to the target iteration interval, then share the point location s2 for the quantization in the 104th iteration to the 106th iteration. In an embodiment of the present disclosure, the point location s1 before the updating and the updated point location s2 may be the same or may be different. Further, the processor may determine the next target iteration interval and the quantization parameters such as the data bit width and the point location corresponding to the next target iteration interval according to the data variation range of the data to be quantized in the 106th iteration.

Optionally, the point location iteration interval may be 1. In other words, each iteration updates the point location once. Optionally, the point location iteration interval may be the same or may be different. For example, a target iteration interval includes at least one point location iteration interval which may sequentially increase. The implementation method of the embodiment is illustrated here, which is not used to limit the present disclosure.

Optionally, the scaling factors corresponding to the respective iterations in the target iteration interval may be inconsistent. Further optionally, the scaling factor and the point location may be updated simultaneously. In other words, the iteration interval corresponding to the scaling factor may be equal to the point location iteration interval. In other words, each time the processor updates and determines the point location, the scaling factor will be updated and determined correspondingly.

Optionally, the offsets corresponding to the respective iterations in the target iteration interval may be inconsistent. Further, the offset and the point location may be updated simultaneously. In other words, the iteration interval corresponding to the offset may be equal to the point location iteration interval. In other words, when the processor updates and determines the point location, the offset will be updated and determined correspondingly. The offset and the point location or the data bit width may be updated asynchronously, which is not specifically limited. Further, the processor may also determine the minimum value and the maximum value among all elements of the data to be quantized, and further determine the quantization parameters such as the point location, the scaling factor and the like. See details in descriptions above.

Figure 8S:
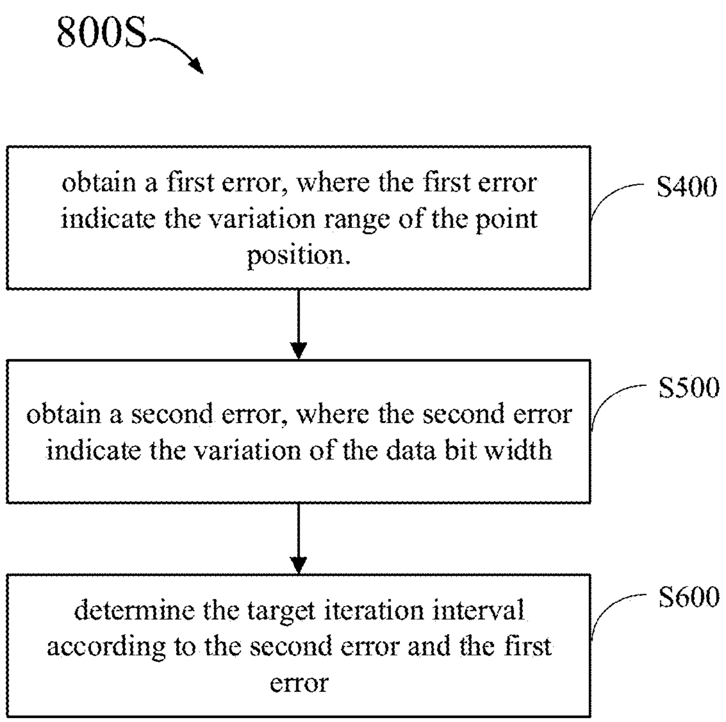
FIG. 8S is a flowchart illustrating a method for determining a target iteration interval in a method for adjusting parameters according to another embodiment of the present disclosure.

In another embodiment, the processor may synthetically determine the data variation range of the data to be quantized according to the variation range of the point location and the change of the data bit width of the data to be quantized, and determine the target iteration interval according to the data variation range of the data to be quantized, where the target iteration interval may be used to update and determine the data bit width, in other words, the processor may update and determine the data bit width in the verify iteration of each target iteration interval. Since the point location may reflect the precision of the fixed point data and the data bit width may reflect the data representation range of the fixed point data, integrating the variation range of the point location and the change of the data bit width of the data to be quantized may guarantee that the quantized data has a high precision and may satisfy the data representation range. Optionally, the variation range of the point location may be represented with the first error, and the change of the data bit width may be determined according to the quantization error. Specifically, as shown in FIG. 8S, FIG. 8S is a flowchart illustrating a method 800S for determining a target iteration interval in a method for adjusting parameters according to another embodiment of the present disclosure. The method may include:

S400: obtaining a first error. The first error may indicate the variation range of the point location. The variation range of the point location may represent the data variation range of the data to be quantized; specifically, a method for calculating the first error may refer to the descriptions in the step S110, which will not be repeated here.

S500: obtaining a second error, where the second error indicates the variation of the data bit width.

Figure 8T:
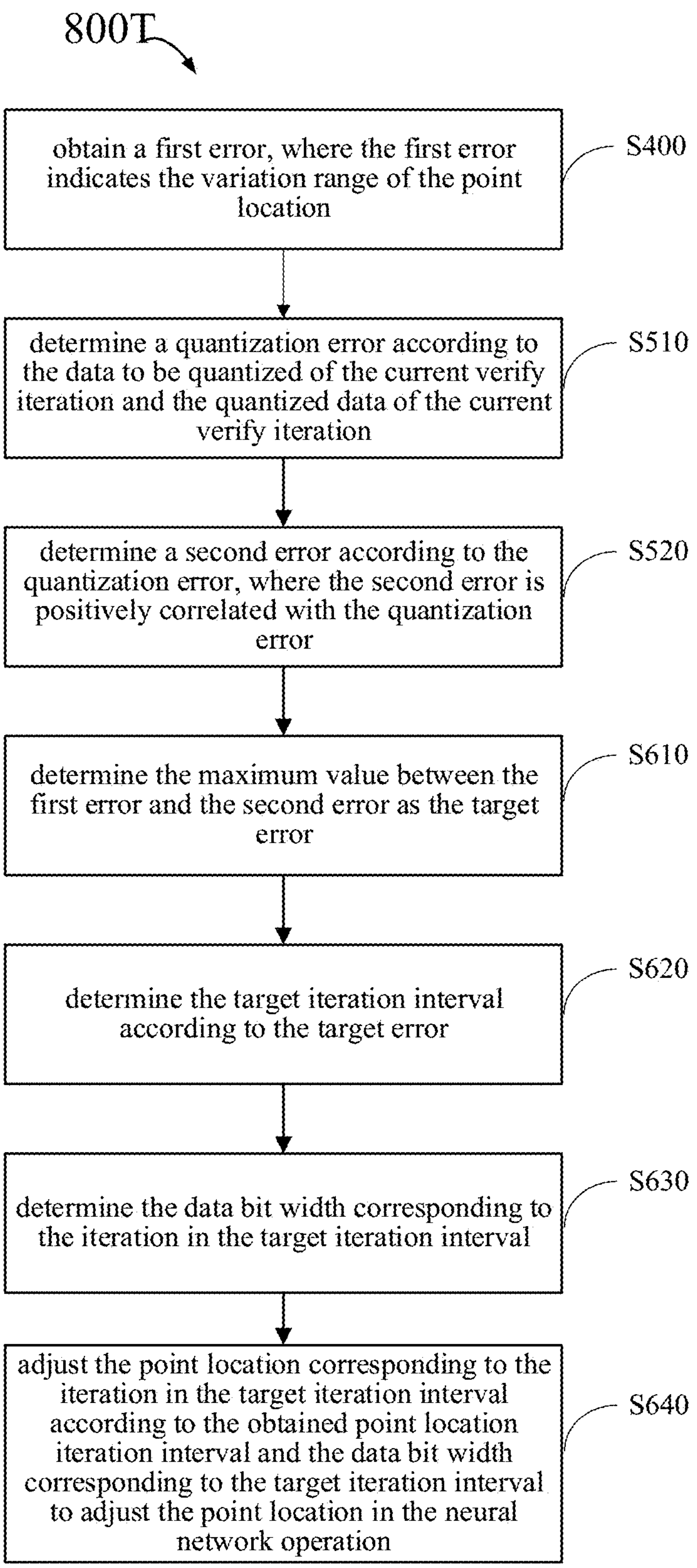
FIG. 8T is a flowchart illustrating a method for determining a target iteration interval in a method for adjusting parameters according to another embodiment of the present disclosure.

Optionally, the second error may be determined according to the quantization error, and the second error is positively correlated with the quantization error. Specifically, FIG. 8T is a flowchart illustrating a method 800T for determining a target iteration interval in a method for adjusting parameters according to another embodiment of the present disclosure. The step S500 may include:

S510, determining a quantization error according to the data to be quantized of the current verify iteration and the quantized data of the current verify iteration, where the quantized data of the current verify iteration is obtained by quantizing the data to be quantized of the current verify iteration according to the initial data bit width. The specific method for determining the quantization error may refer to the descriptions in the step S114, which will not be repeated here.

S520: determining the second error according to the quantization error, where the second error is positively correlated with the quantization error. Specifically, the second error may be calculated according to the following formula:

$$diff_{update2} = \theta * diff_{bit}^2 \quad \text{Formula (44)}$$

In the formula, $diff_{update2}$ represents the second error, $diff_{bit}$ represents the quantization error, and θ may be a hyper-parameter.

Returning to FIG. 8S, S600: determining the target iteration interval according to the second error and the first error.

Specifically, the processor may compute the target error according to the first error and the second error and determine the target iteration interval according to the target error. Optionally, the target error may be obtained by a weighted average computation of the first error and the second error. For example, the target error=K* the first error+(1−K)* the second error, where K is a hyper-parameter. Then the processor may determine the target iteration interval according to the target error, and the target iteration interval is negatively correlated with the target error. In other words, the greater the target error is, the smaller the target iteration interval will be.

Optionally, the target error may also be determined according to the maximum value of the first error and the second error, at the time, the weight value of the first error or the second error is 0. Specifically, as shown in FIG. 8T, the step S600 may include:

S610, determining the maximum value between the first error and the second error as the target error.

Specifically, the processor may compare the first error $diff_{update1}$ with the second error $diff_{update2}$. When the first error $diff_{update1}$ is greater than the second error $diff_{update2}$, the target error is equal to the first error $diff_{update1}$.

When the first error $diff_{update1}$ is less than the second error $diff_{update2}$, the target error is equal to the second error $diff_{update2}$.

When the first error $diff_{update1}$ is equal to the second error, the target error may be the first error $diff_{update1}$ or the second error $diff_{update2}$.

The quantization error $diff_{update}$ may be determined according to the following formula:

$$diff_{update} = \max\left(diff_{update1}, diff_{update2}\right) \quad (45)$$

$diff_{update}$ denotes the target error, $diff_{update1}$ denotes the first error, and $diff_{update2}$ denotes the second error.

S620, determining the target iteration interval according to the target error, where the target error is negatively correlated with the target iteration interval. Specifically, the target iteration interval may be determined according to the following method, and may be calculated based on the following formula:

$$I = \frac{\beta}{diff_{update}} - \gamma \quad \text{Formula (46)}$$

where I denotes the target iteration interval, $diff_{update}$ denotes the target error, and δ and γ may be hyper-parameters.

Optionally, in the embodiments above, the data bit width in the neural network operation is variable, and the variation range of the data bit width may be measured by the second error. In this situation, as shown in FIG. 8T, after the processor determines the target iteration interval, the processor may execute the step S630: determining the data bit width corresponding to the iteration in the target iteration interval, where the data bit width corresponding to the iteration in the target iteration interval is consistent. Specifically, the processor may determine the data bit width corresponding to the target iteration interval according to the data to be quantized of the current verify iteration. In other words, the data bit width in the process of neural network operation may be updated once every other target iteration interval. Optionally, the data bit width corresponding to the target iteration interval may be the data bit width of the current verify iteration. The target data bit width of the current verify iteration may refer to the steps S114 and S115 above, which will not be repeated here.

For example, the target iteration interval may compute the number of iterations from the current verify iteration. In other words, the current verify iteration corresponding to the target iteration interval may be the starting iteration of the target iteration interval. For example, if the current verify iteration is a 100th iteration, the processor may determine that the target iteration interval is 6 according to the data variation range of the data to be quantized, and the processor may determine that the target iteration interval includes 6 iterations, which are respectively from the 100th iteration to a 105th iteration. At this time, the processor may determine the target data bit width of the 100th iteration, and the 101st iteration to the 105th iteration may use the target data bit width corresponding to the 100th iteration and do not need to compute the target data bit width, thereby decreasing the computation quantity and improving quantization efficiency and computation efficiency. The 106th iteration then may be the current verify iteration, and the operation of determining the target iteration interval and updating the data bit width may be repeated.

Optionally, the target iteration interval may compute the number of iterations from the next iteration of the current verify iteration, in other words, the verify iteration corresponding to the target iteration interval may be the ending iteration of the target iteration interval. For example, if the current verify iteration is a 100th iteration, the processor may determine that the target iteration interval is 6 according to the data variation range of the data to be quantized. The processor may determine that the target iteration interval includes 6 iterations, which are respectively from a 101st iteration to a 106th iteration. At this time, the processor may determine the target data bit width of the 100th iteration, and the 101st iteration to the 106th iteration may use the target data bit width corresponding to the 100th iteration and do not need to compute the target data bit width, thereby decreasing the computation quantity and improving quantization efficiency and computation efficiency. The 106th iteration then may be the current verify iteration, and the operation of determining the target iteration interval and updating the data bit width may be repeated.

Furthermore, the processor may determine the quantization parameter of the target iteration interval in the verify iteration to adjust the quantization parameter of the neural network operation according to the target iteration interval. In other words, the quantization parameters such as the point location of the neural network operation may be updated synchronously with the data bit width.

In one case, the quantization parameters corresponding to the respective iterations in the target iteration interval may be consistent. Optionally, the processor may determine the point location corresponding to the current verify iteration according to the data to be quantized of the current verify iteration and the target data bit width corresponding to the current verify iteration, and determine the point location corresponding to the current verify iteration as the point location corresponding to the target iteration interval, where the point locations corresponding to the respective iterations in the target iteration interval are consistent. In other words, the respective iterations of the target iteration interval use the quantization parameters such as the point location of the current verify iteration, thereby avoiding updating and adjusting the quantization parameter in each iteration, decreasing the computation quantity in the quantization process and improving the quantization efficiency.

Optionally, the scaling factors corresponding to the respective iterations in the target iteration interval may be consistent. The processor may determine the scaling factor corresponding to the current verify iteration according to the data to be quantized of the current verify iteration, and take the scaling factor corresponding to the current verify iteration as the scaling factor of each iterative in the target iteration interval, where the scaling factor corresponding to the iteration in the target iteration interval is consistent. Optionally, the offset corresponding to the iteration in the target iteration interval is consistent. The processor may determine the offset corresponding to the current verify iteration according to the data to be quantized of the current verify iteration, and take the offset corresponding to the current verify iteration as the offset of each iteration in the target iteration interval. Further, the process may also determine a maximum value and a minimum value of all elements of the data to quantized, and determine the quantization parameters such as the point location and scaling factor, which may refer to the descriptions above. The offset corresponding to the iteration in the target iteration interval is consistent.

For example, the target iteration interval may compute the number of iterations from the current verify iteration. In other words, the current verify iteration corresponding to the target iteration interval may be the starting iteration of the target iteration interval. For example, if the current verify iteration is a 100th iteration, the processor may determine that the target iteration interval is 3 according to the data variation range of the data to be quantized, and the processor may determine that the target iteration interval includes 3 iterations, which are respectively the 100th iteration, a 101st iteration, and a 102nd iteration. Further, the processor may determine the quantization parameters such as the point location corresponding to the 100th iteration according to the data to be quantized and the target data bit width corresponding to the 100th iteration, and may use the quantization parameters such as the point location corresponding to the 100th iteration to quantize the 100th iteration, the 101st iteration and the 102nd iteration. In this way, the processor does not need to compute the quantization parameters such as the point location at the 101st iteration and the 102nd iteration, thereby reducing the computation quantity in the quantization process and improving the quantization efficiency.

Optionally, the target iteration interval may compute the number of iterations from the next iteration of the current verify iteration, in other words, the verify iteration corresponding to the target iteration interval may be the ending iteration of the target iteration interval. For example, if the current verify iteration is a 100th iteration, the processor may determine that the target iteration interval is 3 according to the data variation range of the data to be quantized, and the processor may determine that the target iteration interval includes 3 iterations, which are respectively the 101st iteration, a 102nd iteration, and a 103rd iteration. Further, the processor may determine the quantization parameters such as the point location corresponding to the 100th iteration according to the data to be quantized and the target data bit width corresponding to the 100th iteration, and may use the quantization parameters such as the point location corresponding to the 100th iteration to quantize the 101st iteration, the 102nd iteration and the 103rd iteration. In this way, the processor does not need to compute the point location at the 102nd iteration and the 103rd iteration, thereby reducing the computation quantity in the quantization process and improving the quantization efficiency.

In an embodiment of the present disclosure, the data bit width and the quantization parameters corresponding to the respective iterations in one target iteration interval are consistent, in other words, the data bit width, the point location, the scaling factor and the offset corresponding to the respective iterations in one target iteration interval remain unchanged, thereby avoiding, in the process of training or fine-tuning of the neural network, adjusting the quantization parameter of the data to be quantized frequently, decreasing the computation quantity in the quantization process and improving the quantization efficiency. At different stages of training or fine-tuning, by dynamically adjusting the quantization parameter according to the data variation range, the quantization precision may be guaranteed.

In another case, the processor may determine the quantization parameter in the target iteration interval according to the point location iteration interval corresponding to the quantization parameters such as the point location to adjust the quantization parameter in the neural network operation. In other words, the quantization parameters such as the point location of the neural network operation may be updated asynchronously with the data bit width. The processor may update the quantization parameters such as the data bit width and the point location in the verify iteration of the target iteration interval, or may update solely the point location corresponding to the iteration in the target iteration interval according to the point location iteration interval.

Specifically, the processor may determine the data bit width corresponding to the target iteration interval according to the target data bit width corresponding to the current verify iteration, where the data bit width corresponding to the respective iterations in the target iteration interval is consistent. Later, the processor may adjust the quantization parameters such as the point location in the process of the neural network operation according to the data bit width corresponding to the target iteration interval and the point location iteration interval. As shown in FIG. 8T, after the data bit width corresponding to the target iteration interval is determined, the processor may then perform the step S640: adjusting the point location corresponding to the iteration in the target iteration interval according to the obtained point location iteration interval and the data bit width corresponding to the target iteration interval to adjust the point location in the neural network operation, where the point location iteration interval includes at least one iteration, and the point location of the iteration in the point location iteration interval is consistent. Optionally, the point location iteration interval may be a hyper-parameter. For example, a point location iteration interval may be user-defined input.

Optionally, the point location iteration interval may be less than or equal to the target iteration interval. When the point location iteration interval is equal to the target iteration interval, the processor may update the quantization parameters such as the data bit width and the point location in the current verify iteration synchronously. Further optionally, the scaling factors corresponding to the respective iterations in the target iteration interval may be consistent. Furthermore, the offsets corresponding to the respective iterations in the target iteration interval are consistent. At this time, the quantization parameters such as the data bit width and the point location corresponding to the respective iterations in the target iteration interval are the same, thereby decreasing the computation quantity and improving the quantization efficiency and computation efficiency. The specific implementation process is basically the same as the foregoing embodiments, which may refer to the description above and will not be repeated here.

When the point location iteration interval is less than the target iteration interval, the processor may update the quantization parameters such as the data bit width and the point location in the verify iteration corresponding to the target iteration interval, and update the quantization parameters such as the point location in a sub verify iteration determined in the point location iteration interval. Since in the case that the data bit width remains unchanged, the quantization parameters such as the point location may be fine-tuned according to the data to be quantized, the quantization parameters such as the point location may be adjusted in one target iteration interval to further improve the quantization precision.

Specifically, the processor may determine the sub-verify iteration according to the current verify iteration and the point location iteration interval. The sub-verify iteration is used to adjust the point location, and the sub-verify iteration may be an iteration in the target iteration interval. Further, a processor may adjust the point location corresponding to the iteration of the target iteration interval according to the data to be quantized of the sub-verify iteration and the data bit width corresponding to the current verify iteration, where the method for determining the point location may refer to the formula above, which will not be repeated here.

For example, if a current verify iteration is a 100th iteration, a target iteration interval is 6, the target iteration interval includes iterations from the 100th iteration to a 105th iteration, and the point location iteration interval obtained by the processor is $I_{s1}=3$, the point location may be adjusted once every three iterations from the current verify iteration. Specifically, the processor may determine the 100th iteration as the sub-verify iteration, and compute the point location s1 corresponding to the 100th iteration, then share the point location s1 for the quantization in the 100th iteration, the 101st iteration and the 102nd iteration. The processor then may use the 103rd iteration as the sub-verify iteration according to the point location iteration interval $I_{s1}$, and the processor may also determine the point location s2 corresponding to the second point location iteration interval according to the data to be quantized corresponding to the 103rd iteration and the data bit width n corresponding to the target iteration interval, and implement quantization with the point location s2 from the 103rd iteration to the 105th iteration. In an embodiment of the present disclosure, the value of the point location s1 before updating and the value of the updated point location s2 may be the same or different. Further, the processor may determine the next target iteration interval and the quantization parameters such as the data bit width and the point location corresponding to the next target iteration interval according to the data variation range of the data to be quantized in the 106th iteration.

For another example, if the current verify iteration is a 100th iteration, the target iteration interval is 6, the target iteration interval includes iterations from a 101st iteration to a 106th iteration, and the point location iteration interval obtained by the processor is $I_{s1}=3$, the point location may be adjusted once every three iterations from the current verify iteration. Specifically, the processor may determine that the point location corresponding to the first point location iteration interval is s1 according to the data to be quantized of the current verify iteration and the target bit width n1 corresponding to the current verify iteration, and perform quantization on the 101st iteration, the 102nd iteration and the 103rd iteration with the point location s1. Later, the processor may determine the 104th iteration as the sub-verify iteration according to the point location iteration interval $I_{s1}$, and at the same time, the processor may determine a point location s2 corresponding to the second point location iteration interval according to the data to be quantized corresponding to the 104th iteration and the data bit width n1 corresponding to the target iteration interval, then share the point location s2 for the quantization in the 104th iteration to the 106th iteration. In an embodiment of the present disclosure, the value of the point location s1 before updating and the value of the updated point location s2 may be the same or different. Further, the processor may determine the next target iteration interval and the quantization parameters such as the data bit width and the point location corresponding to the next target iteration interval according to the data variation range of the data to be quantized in the 106th iteration.

Optionally, the point location iteration interval may be 1, in other words, the point location may be updated once in each iteration. Optionally, the point location iteration interval may be the same or different. For example, the at least one point location iteration interval included in the target iteration interval may be increased in sequence. The implementation method of the embodiment is illustrated here, which is not used to limit the present disclosure.

Optionally, the scaling factor corresponding to the iteration in the target iteration interval may be inconsistent. Further optionally, the scaling factor may be updated synchronously with the point location, in other words, the iteration interval corresponding to the scaling factor may be equal to the point location iteration interval. In other words, when the processor updates and determines the point location, the scaling factor will be updated and determined correspondingly.

Optionally, the offsets corresponding to the respective iterations in the target iteration interval may be inconsistent. Further, the offset and the point location may be updated simultaneously. In other words, the iteration interval corresponding to the offset may be equal to the point location iteration interval. In other words, when the processor updates and determines the point location, the offset will be updated and determined correspondingly. The offset and the point location or the data bit width may be updated asynchronously, which is not specifically limited. Furthermore, the processor may also determine a maximum value and a minimum value of all elements of the data to quantized, and determine the quantization parameters such as the point location, the scaling factor, which may refer to the descriptions above.

In other optional embodiments, the point location, the scaling factor and the offset may be updated asynchronously. In other words, one or all of the point location iteration interval, the scaling factor iteration interval and the offset iteration interval may be different, where the point location iteration interval and the scaling factor iteration interval are less than or equal to the target iteration interval. The offset iteration interval may be less than the target iteration interval. Since the offset is only correlated with the distribution of the data to be quantized, in an optional embodiment, the offset and the target iteration interval may be completely asynchronous. In other words, the offset iteration interval may also be greater than the target iteration interval.

In an optional embodiment, the method may be used in the process of training or fine-tuning of the neural network to adjust the quantization parameter of the operation data involved in the process of training or fine-tuning of the neural network, to improve the quantization precision and efficiency of the operation data involved in the process of neural network operation. The operation data may be at least one of neuron data, weight data and gradient data. As shown in FIG. 8L, according to the data variation curve of the data to be quantized, at the initial stage of training or fine-tuning, the difference between the data to be quantized of each iterative is large, and the data variation range of the data to be quantized is sharp. In this situation, the value of the target iteration interval may be small so that the quantization parameter in the target iteration interval may be updated in time and the quantization precision may be ensured. At the middle stage of training or fine-tuning, the data variation range of the data to be quantized gradually tends to be gentle. In this situation, the target iteration interval may be increased to avoid frequent updating of the quantization parameter and improve the quantization efficiency and the computation efficiency. In the late stage of the training or fine-tuning, the training or fine-tuning of the neural network tends to be stable (in other words, when the forward computation result of the neural network is close to the preset reference value, the training or fine-tuning of the neural network tends to be stable). At this time, the value of the target iteration interval may be increased continuously to further improve the quantization efficiency and computation efficiency. Based on the data variation range, the target iteration interval may be determined by using different methods at different stages of training or fine-tuning of the neural network, to improve the quantization efficiency and computation efficiency on the basis of ensuring the quantization precision.

Figure 8U:
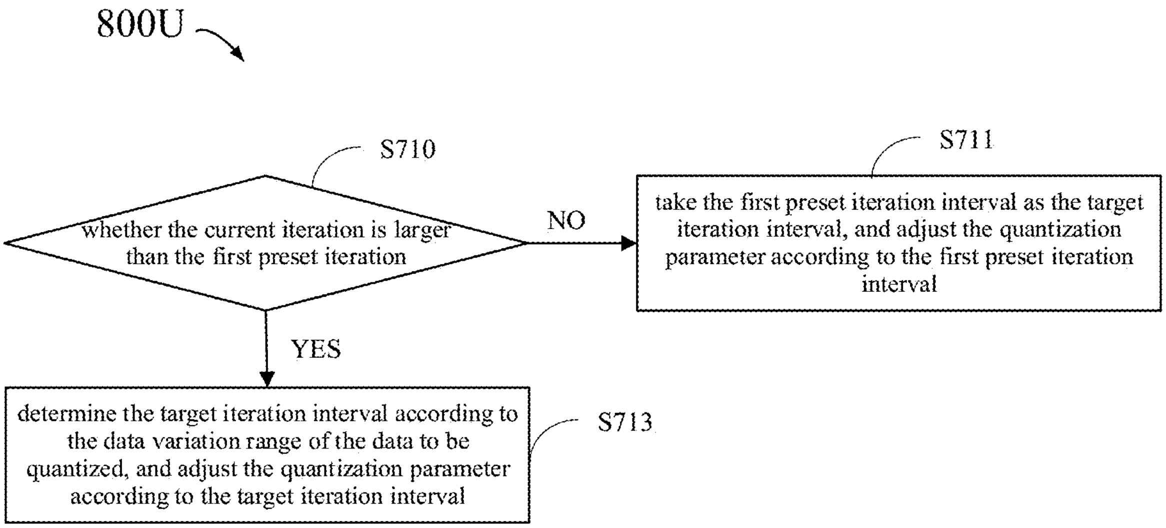
FIG. 8U is a flowchart illustrating a method for adjusting quantization parameters according to another embodiment of the present disclosure.

Specifically, as shown in FIG. 8U, FIG. 8U is a flowchart illustrating a method 800U for adjusting quantization parameters according to another embodiment of the present disclosure. The method is used in training or fine-tuning of the neural network. The method may also include:

S710: determining, by the processor, whether the current iteration is larger than the first preset iteration, where the current iteration refers to the iteration which is currently performed by the processor. Optionally, the first preset iteration may be a hyper-parameter. The first preset iteration may be determined according to the data variation curve of the data to be quantized. The first preset iteration may also be self-definition by the user. Optionally, the first preset iteration may be less than a total number of the iterations included in a training epoch, where a training epoch denoted that all the data to be quantized in a dataset performs a forward operation and a reverse operation.

When the current iteration is less than or equal to the first preset iteration, the processor may execute the step S711: taking the first preset iteration interval as the target iteration interval, and adjusting the quantization parameter according to the first preset iteration interval.

Optionally, the processor may read the first preset iteration input by a user, and determine the first preset iteration interval according to the correspondence between the first preset iteration and the first preset iteration interval.

Optionally, the first preset iteration interval may be a hyper-parameter, and the first preset iteration interval may also be user-defined. At this time, the processor may read directly the first preset iteration and the first preset iteration interval input by a user, and update the quantization parameter of the neural network operation according to the first preset iteration interval. In an embodiment of the present disclosure, the processor does not need to determine the target iteration interval according to the data variation range of the data to be quantized.

For example, if the first preset iteration input by a user is a 100th iteration, and the first preset iteration interval is 5, when the current iteration is less than or equal to the 100th iteration, the quantization parameter may be updated according to the first preset iteration interval. In other words, the processor may determine that from the 1st iteration to the 100th iteration of training or fine-tuning of the neural network, the quantization parameter is updated every 5 iterations. Specifically, the processor may determine the quantization parameters corresponding to the 1st iteration such as the data bit width n1 and the point location s1, and quantize the data to be quantized in the 1st iteration to the 5th iteration with the data bit width n1 and the point location s1, in other words, a same quantization parameter may be used in the 1st iteration to the 5th iteration. Later, the processor may determine the quantization parameters corresponding to the 6th iteration such as the data bit width n2 and the point location s2, and quantize the data to be quantized in the 6th iteration to the 10th iteration with the data bit width n2 and the point location s2, in other words, a same quantization parameter may be used in the 6th iteration to the 10th iteration. Similarly, the processor may follow the quantization method until the 100th iteration is completed. The determination method of the quantization parameters such as the data bit width and the point location in each iteration interval may refer to the description above, which will not be repeated here.

For another example, if the first preset iteration input by a user is a 100th iteration and the first preset iteration interval is 1, the quantization parameter may be updated according to the first preset iteration interval when the current iteration is less than or equal to the 100th iteration. In other words, the processor may determine that in the 1st iteration to the 100th iteration of the training or fine-tuning of the neural network, the quantization parameter may be updated every other iteration. Specifically, the processor may determine the quantization parameters corresponding to the 1st iteration such as the data bit width n1 and the point location s1, and quantize the data to be quantized in the 1st iteration with the data bit width n1 and the point location s1. The processor may then determine the quantization parameters corresponding to the 2nd iteration such as the data bit width n2 and the point location s2, and quantize the data to be quantized in the 2nd iteration with the data bit width n2 and the point location s2 . . . . Similarly, the processor may determine the quantization parameters corresponding to the 100th iteration such as the data bit width n100 and the point location $100, and quantize the data to be quantized with the data bit width n100 and the point location s100. The method for determining the quantization parameters such as the data bit width and the point location in each iteration interval may refer to the descriptions above, which will not be repeated here.

The above just illustrates the method which the data bit width and the quantization parameter are updated synchronously. In another optional embodiment, in each target iteration interval, the processor may determine the point location iteration interval according to the variation range of the point location, and update the quantization parameters such as the point location according to the point location iteration interval.

Optionally, when the current iteration is greater than the first preset iteration, the neural network is at the middle stage of training or fine-tuning. In this situation, the data variation range of the data to be quantized of the historical iteration may be obtained, and the target iteration interval may be determined according to the data variation range of the data to be quantized. The target iteration interval may be greater than the first preset iteration interval, thereby reducing the updating quantity of the quantization parameter and improving the quantization efficiency and computation efficiency. Specifically, when the current iteration is greater than the first preset iteration, the processor may perform the step S713: determining the target iteration interval according to the data variation range of the data to be quantized, and adjusting the quantization parameter according to the target iteration interval.

Following the example above, if the first preset iteration input by a user is a 100th iteration, and the first preset iteration interval is 1, when the current iteration is less than or equal to the 100th iteration, the quantization parameter may be adjusted according to the first preset iteration interval. In other words, the processor may determine that in the 1st iteration to the 100th iteration of the training or fine-tuning of the neural network, the quantization parameter may be updated every other iteration. The specific implementation may refer to the description above. When the current iteration is greater than the 100th iteration, the processor may determine the data variation range of the data to be quantized according to the data to be quantized of the current iteration and the data to be quantized of the historical iterations before the current iteration, and determine the target iteration interval according to the data variation range of the data to be quantized. Specifically, when the current iteration is greater than the 100th iteration, the processor may adjust adaptively the data bit width corresponding to the current iteration to obtain the target data bit width corresponding to the current iteration, and determine the target data bit width corresponding to the current iteration as the data bit width of the target iteration interval, where the data bit width corresponding to the iterations in the target iteration interval is consistent. In the meantime, the processor may determine the point location corresponding to the current iteration according to the target data bit width and the data to be quantized corresponding to the current iteration, and determine the first error according to the point location corresponding to the current iteration. The processor may determine the quantization error according to the data to be quantized corresponding to the current iteration, and determine the second error according to the quantization error. The processor may then determine the target iteration interval according to the first error and the second error. The target iteration interval may be greater than the first preset iteration interval. Further, the processor may determine the quantization parameters such as the point location and the scaling factor of the target iteration interval. The specific implementation method may refer to the description above.

For example, if the current iteration is a 100th iteration, the processor may determine that the target iteration interval is 3 according to the data variation range of the data to be quantized, and the processor may determine that the target iteration interval includes 3 iterations, which are respectively the 100th iteration, a 101st iteration, and a 102nd iteration. The processor may determine the quantization error according to the data to be quantized of the 100th iteration, determine the second error and the target data bit width corresponding to the 100th iteration and take the target data bit width as the data bit width corresponding to the target iteration interval, where, the data bit widths corresponding to the 100th iteration, the 101st iteration and the 102nd iteration are all the target data bit width corresponding to the 100th iteration. The processor may also determine the quantization parameters such as the point location and the scaling factor corresponding to the 100th iteration according to data to be quantized of the 100th iteration and the target data bit width corresponding to the 100th iteration. The processor then quantizes the 100th iteration, the 101st iteration and the 102nd iteration by using the quantization parameter corresponding to the 100th iteration.

Figure 8V:
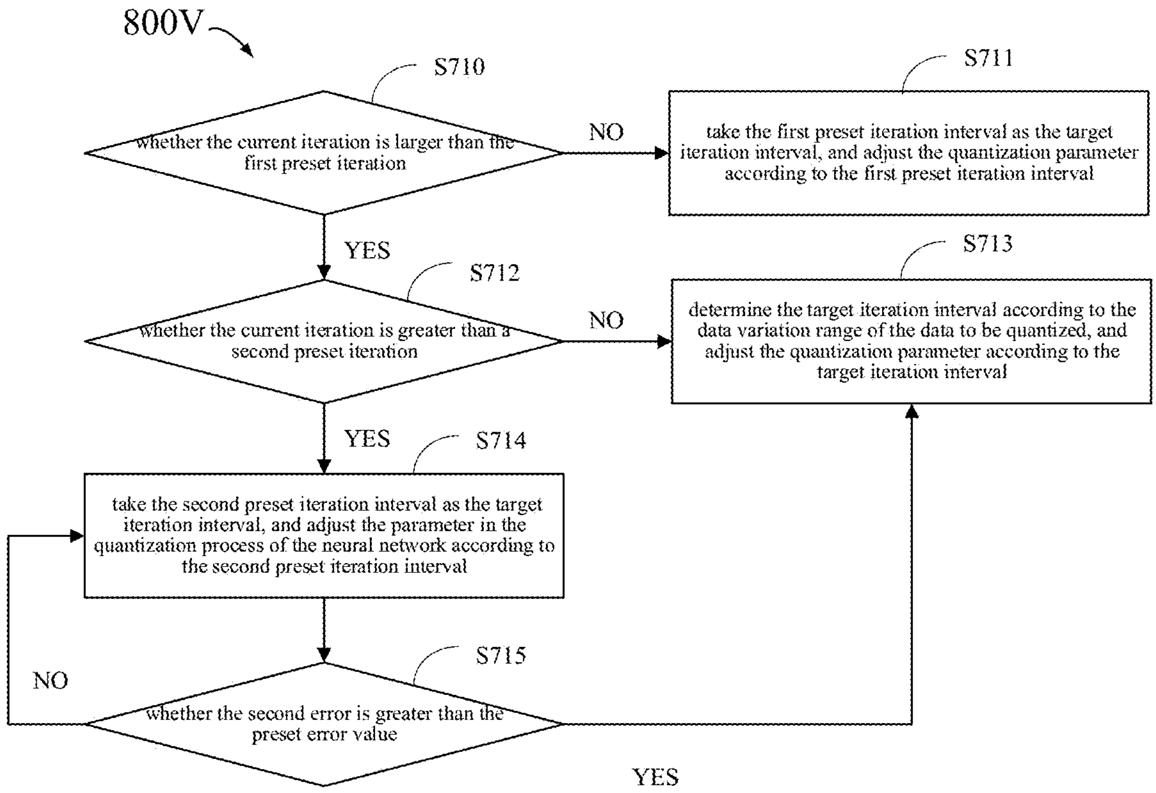
FIG. 8V is a flowchart illustrating a method for adjusting quantization parameters according to yet another embodiment of the present disclosure.
Figure 9:
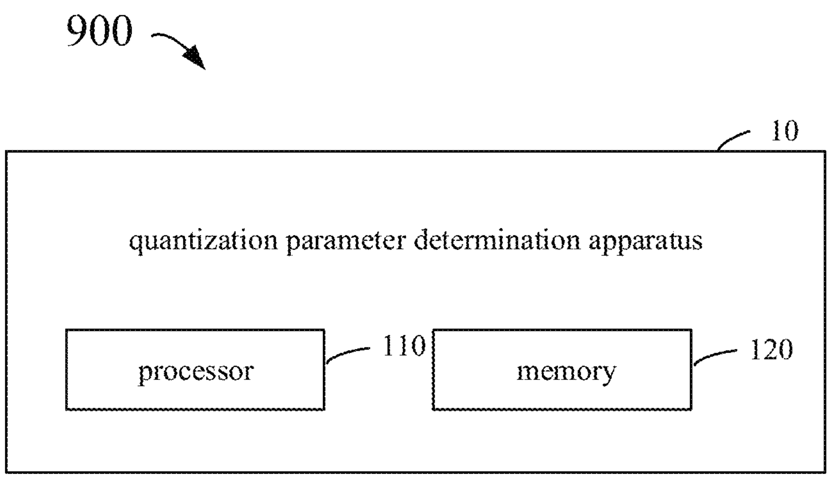
Figure 10:
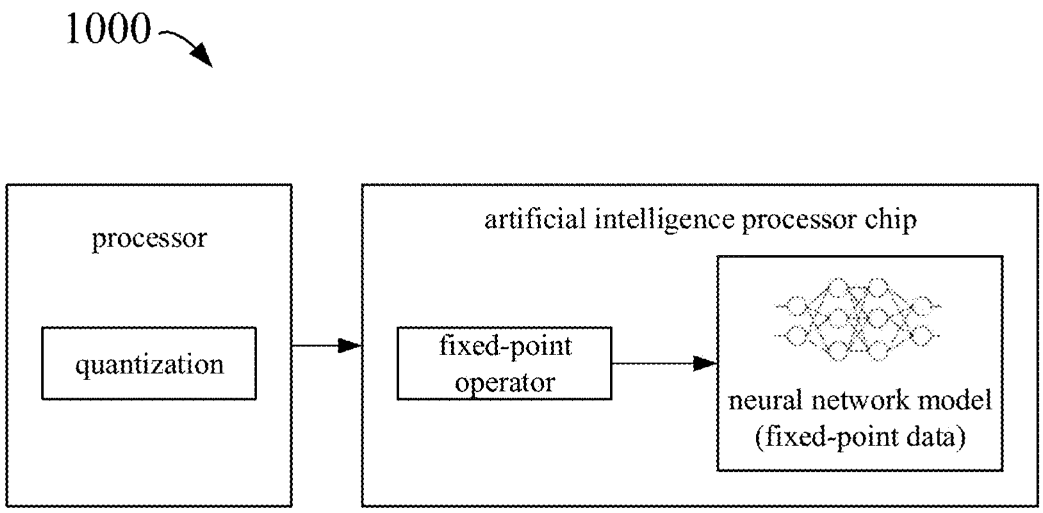
Figure 11:
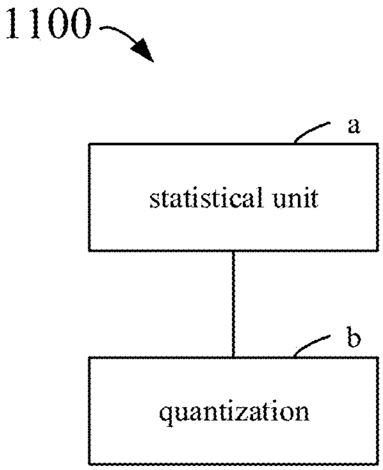
Figure 12:
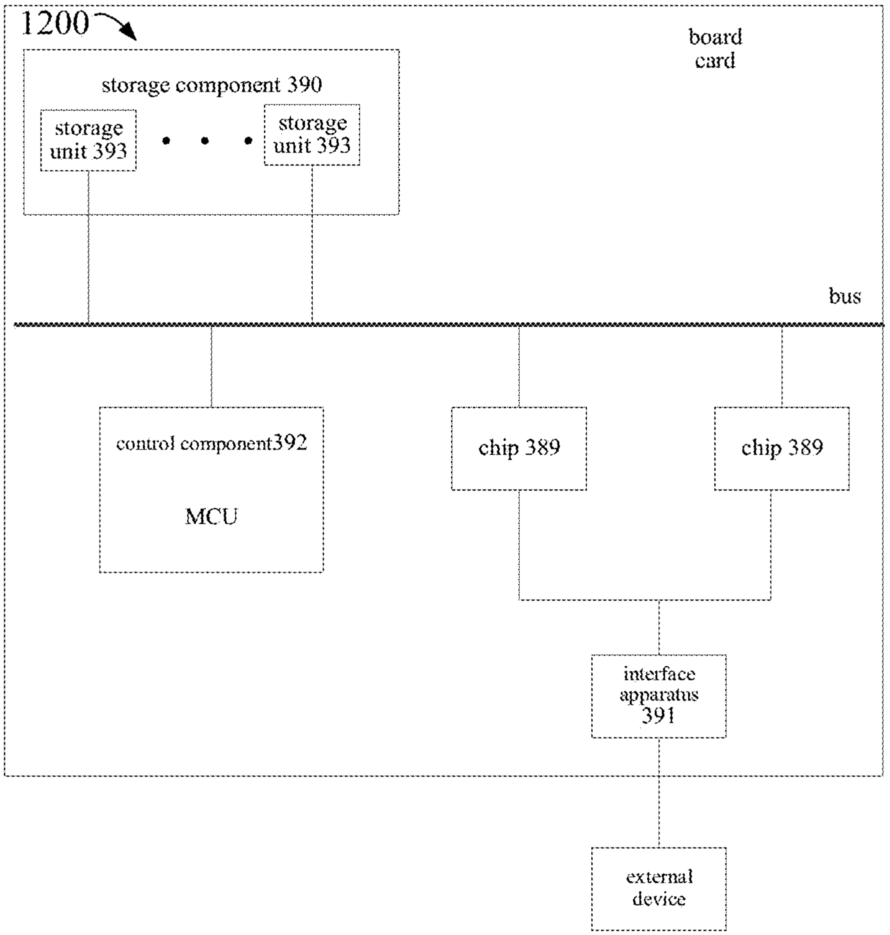

Further, FIG. 8V is a flowchart illustrating a method 800V for adjusting quantization parameters according to another embodiment of the present disclosure. The method may also include the following.

When the current iteration is greater than the first preset iteration, the processor may also perform a step S712: determining whether the current iteration is greater than a second preset iteration, where the second preset iteration is greater than the first preset iteration, and the second preset iteration interval is greater than the first preset iteration interval. Optionally, the second preset iteration may be a hyper-parameter, and the second preset iteration may be greater than a total count of the iterations of at least one training epoch. Optionally, the second preset iteration may be determined according to the data variation curve of the data to be quantized. Optionally, the second preset interval may also be user-defined.

When the current iteration is greater than or equal to the second preset iteration, the processor may execute the step S714: taking the second preset iteration interval as the target iteration interval, and adjusting the parameter in the quantization process of the neural network according to the second preset iteration interval. When the current iteration is greater than the first preset iteration and the current iteration is less than the second preset iteration, the processor may execute the step S713 above, in other words, the processor may determine the target iteration interval according to the data variation range of the data to be quantized, and adjust the quantization parameter according to the target iteration interval.

Optionally, the processor may read the second preset iteration input by a user, and determine the second preset iteration interval according to the correspondence between the second preset iteration and the second preset iteration interval, where the second preset iteration interval is greater than the first preset iteration interval. Optionally, when the convergence of the neural network meets the preset conditions, it may be determined that the current iteration is greater than or equal to the second preset iteration. For example, when a result of a forward operation of a current iteration approaches a preset reference value, it may be determined that the convergence of the neural network meets the preset conditions. In this situation, it may be determined that the current iteration is greater than or equal to the second preset iteration. Or, when a loss value corresponding to the current iteration is less than or equal to a preset threshold, it may be determined that the convergence of the neural network meets the preset conditions.

Optionally, the second preset iteration interval may be a hyper-parameter, and the second preset iteration interval may be greater than or equal to a total number of the iteration of at least one training epoch. Optionally, the second preset iteration interval may be user-defined. The processor may directly read the second preset iteration and the second preset iteration interval input by a user, and update the quantization parameter in the neural network operation according to the second preset iteration interval. For example, the second preset iteration interval may be equal to a total number of the iterations of a training epoch. In other words, the quantization parameter may be updated once in each training epoch.

Furthermore, the method above also includes:

When the current iteration is greater than or equal to the second preset iteration, the processor may also determine whether the current data bit width needs to be adjusted at each verify iteration. If the current data bit width needs to be adjusted, the processor may switch from the step S714 to the step S713 to re-determine the data bit width, so that the data bit width may meet the requirements of the data to be quantized.

Specifically, the processor may determine whether the data bit width needs to be adjusted according to the second error. The processor may also perform the step S715 to determine whether the second error is greater than the preset error value. When the current iteration is greater than or equal to the second preset iteration and the second error is greater than the preset error value, the step S713 may be performed, in other words, the iteration interval may be determined according to the data variation range of the data to be quantized so as to re-determine the data bit width according to the iteration interval. When the current iteration is greater than or equal to the second preset iteration and the second error is less than or equal to the preset error value, the step S714 may be performed continuously, in other words, the second preset iteration interval may be determined as the target iteration interval and the quantization parameters in the quantization process of the neural network may be adjusted according to the second preset iteration interval. The preset error value may be determined according to the preset threshold corresponding to the quantization error. When the second error is greater than the preset error, it means that the data bit width may need to be further adjusted, and the processor may determine the iteration interval according to the data variation range of the data to be quantized to re-determine the data bit width according to the iteration interval.

For example, the second preset iteration interval is a total number of the iterations of a training epoch. When the current iteration is greater than or equal to the second preset iteration, the processor may update the quantization parameter according to the second preset iteration interval. In other words, the quantization parameter may be updated once in each training epoch. In this situation, an initial iteration of each training epoch is used as a verify iteration. At the initial iteration of each training epoch, the processor may determine the quantization error according to the data to be quantized of the verify iteration, determine the second error according to the quantization error, and determine whether the second error is greater than the preset error value according to the following formula:

$$diff_{update2} = \theta * diff_{bit}^2 > T$$

where, $diff_{update2}$ represents the second error, $diff_{bit}$ represents the quantization error, θ represents the hyper-parameter, and T represents the preset error value. Optionally, the preset error value may be equal to the first preset threshold divided by the hyper-parameter. The preset error value may be a hyper-parameter. For example, the preset error value may be obtained according to the following formula: T=th/10, where th represents the first preset threshold, and the value of the hyper-parameter is 10.

If the second error $diff_{update2}$ is greater than the preset error value T, it means that the data bit width may not meet the preset conditions. In this situation, the second preset iteration interval will not be used to update the quantization parameter, and the processor may determine the target iteration interval according to the data variation range of the data to be quantized to ensure that the data bit width meets the preset conditions. In other words, when the second error $diff_{update2}$ is greater than the preset error value T, the processor switches from the step S714 to the step S713.

In other embodiments, the processor may determine whether the data bit width needs to be adjusted according to the quantization error. For example, the second preset iteration interval is a total number of the iterations of a training epoch. When the current iteration is greater than or equal to the second preset iteration, the processor may update the quantization parameter according to the second preset iteration interval. In other words, the quantization parameter may be updated once in each training epoch. The initial iteration of each training epoch is used as a verify iteration. At the initial iteration of each training epoch, the processor may determine the quantization error according to the data to be quantized of the verify iteration. When the quantization error is greater than or equal to the first preset threshold, the data bit width may not meet the preset conditions. In other words, the processor switches from the step S714 to the step S713.

In an optional embodiment, the quantization parameters such as the point location, the scaling factor and the offset may be displayed by a display apparatus. In this situation, a user may acquire the quantization parameter in the process of the neural network operation through the display apparatus, and the user may also adaptively modify the quantization parameter determined by the processor. Similarly, the data bit width and the target iteration interval may be displayed by a display apparatus.

In this situation, a user may acquire the parameters such as the target iteration interval and the data bit width in the process of the neural network operation by the display apparatus, and the user may also adaptively modify the parameters such as the target iteration interval and the data bit width determined by the processor.

It should be noted that the target iteration interval for determining the data bit width and the target iteration interval for determining the quantization parameter are only a partial, not exhaustive list. It should be noted that those skilled in the art may make modifications or variations within the spirit and principle of the disclosure. For example, within the target iteration interval for determining the data bit width, the target iteration interval for determining the quantization parameter is also applicable to the technical solutions shown in FIGS. 6, 7 and 8A. However, as long as functions and technical effects realized by the modifications or variations are similar to those of the present disclosure, the modifications or variations shall fall within the scope of protection of the present disclosure.

The quantization parameter is determined by using the technical solution. The data bit width or the quantization parameter is adjusted according to the quantization error, and the target iteration interval to make any adjustment to the data bit width or quantization parameter is determined in order to adjust the data bit width or quantization parameter at suitable time points in the process of a neural network operation and use a suitable quantization parameter at suitable iteration time points, which may improve the peak computation power of an artificial intelligence processor chip while simultaneously ensuring the precision of floating-point computation required for quantization.

It should be noted that, the foregoing embodiments of method, for the sake of conciseness, are all described as a series of action combinations, but those skilled in the art should know that since according to the present disclosure, the steps may be performed in a different order or simultaneously, the disclosure is not limited by the described order of action. Secondly, those skilled in the art should also understand that the embodiments described in the specification are all optional, and the actions and modules involved are not necessarily required for this disclosure.

Further, it should be explained that though the steps in the flowchart of FIG. 2, FIG. 6, FIG. 7 and FIG. 8A are shown by following the direction of arrows, yet these steps may not necessarily be performed according to the order indicated by the arrows. Unless clearly stated herein, the order for performing these steps is not strictly restricted. These steps may be performed in a different order. Additionally, at least part of the steps shown in FIG. 2, FIG. 6, FIG. 7 and FIG. 8A may include a plurality of sub-steps or a plurality of stages. These sub-steps or stages may not necessarily be performed and completed at the same time, instead, these sub-steps or stages may be performed at different time. These sub-steps or stages may not necessarily be performed sequentially either, instead, these sub-steps or stages may be performed in turn or alternately with at least part of other steps, or sub-steps of other steps, or stages.

Figures 2, 3, 4, 5, 6, 7, 8:
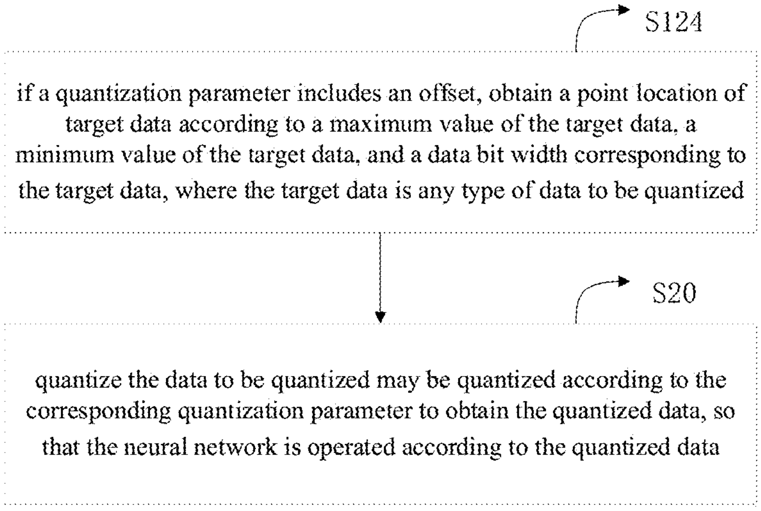
Figures 2, 3, 4, 5, 6, 7, 8, 9:
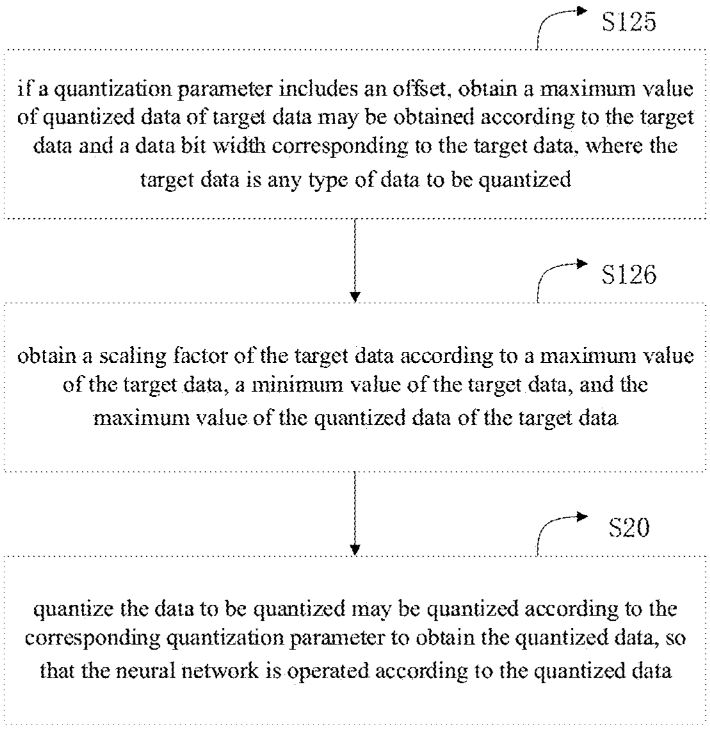
FIG. 9 is a block diagram of hardware configuration of a neural network quantization parameter determination device according to an embodiment of the present disclosure.

As shown in FIG. 9, FIG. 9 is a block diagram of hardware configuration of a neural network quantization parameter determination apparatus according to an embodiment of the present disclosure. In FIG. 9, a quantization parameter determination apparatus 10 of the neural network may include a processor 110 and a memory 120. FIG. 9 only shows the constituent elements related to the embodiment in the quantization parameter determination apparatus 10 of the neural network. Therefore, it is apparent for those skilled in the art that the quantization parameter determination apparatus 10 of the neural network may also include common constituent elements different from the constituent elements in FIG. 10, such as a fixed-point computation unit.

The quantization parameter determination apparatus 10 of the neural network may correspond to calculating devices with various processing functions, such as generating neural networks, training or learning neural networks, quantizing floating-point neural networks to fixed-point neural networks, or retraining neural network. For example, the quantization parameter determination apparatus 10 of the neural network may be implemented as various types of devices, such as a personal computer (PC), a service device, a mobile device and the like.

The processor 110 controls all the functions of the quantization parameter determination apparatus 10 of the neural network. For example, the processor 110 controls all the functions of the quantization parameter determination apparatus 10 of the neural network by executing a program stored in a memory 120 on the quantization parameter determination apparatus 10 of the neural network. The processor 110 may be implemented by a CPU (Central Processing Unit), a GPC (Graphics Processing Unit), an AP (Application Processor), an IPU (Intelligence Processing Unit) and the like provided by the quantization parameter determination apparatus 10 of the neural network. However, the present disclosure is not limited to it.

The memory 120 is a hardware used to store various data processed in the quantization parameter determination apparatus 10 of the neural network. For example, the memory 120 may store the processed data and the data to be processed in the quantization parameter determination apparatus 10 of the neural network. The memory 120 may store a processed dataset or a dataset to be processed by the processor 110 in the process of the neural network operation, such as the untrained data of the initial neural network, the intermediate data of the neural network generated in the training process, the trained data of the neural network, the quantized data of the neural network and the like. For example, the memory 120 may store applications, drivers and the like driven by the quantization parameter determination apparatus 10 of the neural network. For example, the memory 120 may store various programs related to a training algorithm, a quantization algorithm and the like of the neural network which are to be executed by the processor 110. The memory 120 may be a DRAM. But the present disclosure is not limited to it. The memory 120 may include at least one of a nonvolatile memory and a volatile memory. The nonvolatile memory may include an ROM (Read Only Memory), a PROM (Programmable ROM), an EPROM (Electrically PROM), an EEPROM (Electrically Erasable PROM), a flash memory, a PRAM (Phase Transition RAM), an MRAM (Magnetic RAM), an RRAM (Resistor RAM), an FEAM (Ferroelectric RAM) and the like. The volatile memory may include a DRAM (Dynamic RAM), an SRAM (Statistic RAM), an SDRAM (Simultaneous RAM), a PRAM (Programmable RAM), a MARM, a RRAM, an FeRAM (Ferroelectric RAM) and the like. In the embodiment, the memory 120 may include at least one of an HDD (Hard Disk Drive), an SSD (Solid State Drive), a CF, an SD (Security Digital) Card, an Micro-SD Card, an Mini-SD Card, an xD Card, a cashes or a memory stick.

The processor 110 may generate a trained neural network by repeatedly training (learning) a given initial neural network. In this state, in order to ensure the processing accuracy of the neural network, the parameters of the initial neural network are in a high-precision data representation format, such as a data representation format with 32-bit floating point. The parameter may include various types of data input/output to/from the neural network, such as an input/output neuron of the neural network, a weight, a bias and the like. Compared with the fixed-point computation, a floating-point computation requires plenty of computation and relatively frequent access to a memory. Specifically, most computation required by the neural network processing is known to be various types of convolution computation. Therefore, in mobile devices with relatively low processing performance (such as smart phones, tablet computers, wearable devices, embedded devices, and the like.), the high-precision data operations of neural networks may make the resources of the mobile devices underutilized. As a result, in order to drive the neural network operation within the allowable precision loss range and to sufficiently reduce the amount of computation in the above-mentioned devices, the high-precision data involved in the neural network operation process may be quantized and converted into low-precision fixed-point numbers.

Taking into account the processing performance of the devices such as the mobile devices, the embedded devices and the like where the neural network is deployed, the quantization parameter determination apparatus 10 of the neural network performs the quantization to convert the parameters of the trained neural network into fixed-point types with a specific number of bits, and the quantization parameter determination apparatus 10 of the neural network sends the corresponding quantization parameter to the devices where the neural network is deployed, so that when the artificial intelligence processor chip performs training, fine-tuning and other operations, the operation is a fixed-point number operation. Devices where the neural network is deployed may be autonomous vehicles, robots, smart phones, tablet devices, AR (augmented reality devices), IoT (Internet of Things devices) and the like that perform speech recognition, image recognition and the like by using the neural network, but this disclosure is not limited to it. The controller 110 acquires the data in the process of the neural network operation from the memory 120. The data includes at least one of a neuron, a weight, a bias and a gradient. The technical solution shown in FIG. 2 is used to determine the corresponding quantization parameter. The quantization parameter is used to quantize the target data in the neural network operation. The quantized data is used to perform the neural network operation. The computation operation includes and is not limited to the training, fine-tuning and inference.

The processor 110 adjusts the data bit width n according to the quantization error $diff_{bit}$, and the processor 110 may perform the program of executing a method of determining the target iteration interval shown in FIG. 6, FIG. 7 and FIG. 8 determine the target iteration interval of the data bit width or the target iteration interval of the quantization parameter.

To sum up, the quantization parameter determination device of the neural network provided by the embodiment of the specification and the specific functions realized by the memory 120 and processor 110 may be explained in comparison with the embodiment of this specification, and may achieve the technical effects of the embodiment which will not be repeated here.

In this embodiment, the processor 110 may be implemented in any appropriate manner. For example, the processor 110 may use a microprocessor or a processor, and store a compute readable medium, a logic gate, a switch, an application specific integrated circuit (ASIC), a programmable logic controller, an embedded microcontroller and the like of the computer readable program code (for example, a software or a hardware) which may be performed by the (micro) processor.

Figures 2, 3, 4, 5, 6, 7, 8, 9, 10:
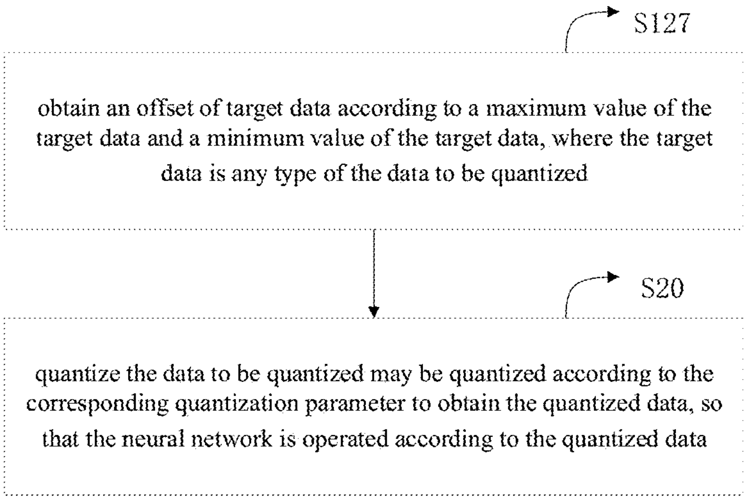
FIG. 10 is an application schematic diagram of a neural network quantization parameter determination device applied to an artificial intelligence processor chip according to an embodiment of the present disclosure.

As shown in FIG. 10, FIG. 10 is an application schematic diagram of a quantization parameter determination device of the neural network being applied to an artificial intelligence processor chip according to an embodiment of the present disclosure. In FIG. 10, as mentioned above, in the quantization determination device 10 of the neural network such as a PC and a processor, the processor 110 performs quantization and quantizes the floating-point data involved in the neural network operation to the fixed-pointed data. The fixed-point operator in the artificial intelligence processor chip performs the training, fine-tuning or inference by using the fixed-pointed data obtained by quantization. The artificial intelligence processor chip is a dedicated hardware to drive the neural network. Since the artificial intelligence processor chip is implemented with relatively low power or performance, compared with the high-precision data, the low-precision fixed-point data is used in the technical solution to perform the neural network operation so that when the low-precision fixed-point data is read, the memory bandwidth needed is smaller and the cashes on the artificial intelligence processor chip may be better used to avoid bottlenecks of access and storing. At the same time, when SIMD instructions are performed on the artificial intelligence processor chip, more computations are realized in one clock cycle to perform the neural network operation faster.

Further, in the face of the fixed-point operation and the high-precision data operation of the same length, especially by comparing the fixed-point operation with the floating-point operation, it may be seen that the computation mode of the floating-point operation is more complicated and requires more logic devices to form a floating-point computation unit. In other words, a volume of the floating-point computation unit is larger than the volume of a fixed-point computation unit. Moreover, the floating-point computation unit needs to consume more resources to process, and a gap of power consumption between the fixed-point computation unit and the floating-point computation unit is usually an order of magnitude.

To sum up, the technical solution may replace a floating-point computation unit on artificial intelligence processor chip with a fixed-point computation unit, reducing the power consumption of artificial intelligence processor chip. This is particularly important for the mobile device. In other words, the technical solution opens a door to a large number of embedded systems that may not efficiently run floating-point computation codes, and makes it possible to widely apply the Internet of Things.

In this technical solution, the artificial intelligence processor chip may correspond to an NPU (neural processing unit), a TPU (tensor processing unit), a neural engines and the like which are dedicated chips used to drive the neural networks, but the present disclosure is not limited to it.

In this technical solution, the artificial intelligence processor chip may be realized in a separate device independent of the quantization parameter determination device 10 of the neural network, and the quantization parameter determination device 10 of the neural network may also be realized as part of the function module of the artificial intelligence processor chip. However, the present disclosure is not limited to it.

In this technical solution, the operating system of the general purpose processor (such as a CPU) generates instructions based on this technical solution and sends the generated instructions to the artificial intelligence processor chip (such as a GPU). The artificial intelligence processor chip performs the instruction operation to realize the determination and quantization process of quantization parameter of the neural network. In another application, the general purpose processor directly determines the corresponding quantization parameters based on the technical solution, the general purpose processor directly quantizes the corresponding target data according to the quantization parameters, and the artificial intelligence processor chip uses the quantized data to perform the fixed-point operation. Moreover, the general purpose processor (such as the CPU) and the artificial intelligence processor chip (such as the GPU) perform flow operations. The operating system of the general purpose processor (such as the CPU) generates instructions based on this technical solution, and performs the neural network operation on the artificial intelligence processor chip (such as the GPU) while copying the target data, which may hide some of the time consumption. However, the present disclosure is not limited to it.

In the embodiment, the present disclosure further provides a computer readable storage medium. A computer program may be stored in the computer readable storage medium. The quantization parameter determination method of the neural network may be implemented when the computer program is executed.

In the process of a neural network operation, the quantization parameter is determined during quantization by using the technical solution in the present disclosure. The quantization parameter is used by an artificial intelligence processor to quantize the data involved in the process of the neural network operation and convert the high-precision data into the low-precision fixed-point data, which may reduce the storage space of the data involved in the process of neural network operation. For example, a conversion from float32 to fix8 may reduce a model parameter by four times. Smaller data storage space enables neural network deployment to occupy smaller space, thus the on-chip memory of an artificial intelligence processor chip may accommodate more data, which may reduce memory access data in the artificial intelligence processor chip and improve the computation performance.

Those skilled in the art also know that the function of a client and a server may be achieved not only through coding by a computer readable program, but also through logically programming the steps in form of a logic gate, a switch, a dedicated integrated circuit, a programmable logic controller and an embedded micro-controller. Therefore, the client and the server may be considered as hardware components, and the devices included in them configured to implement various functions may also be considered as structures within the hardware components. Or even, the devices used to implement various functions may be viewed as both software modules for implementing the methods and the structures within the hardware components.

Figures 2, 3, 4, 5, 6, 7, 8, 9, 10, 11:
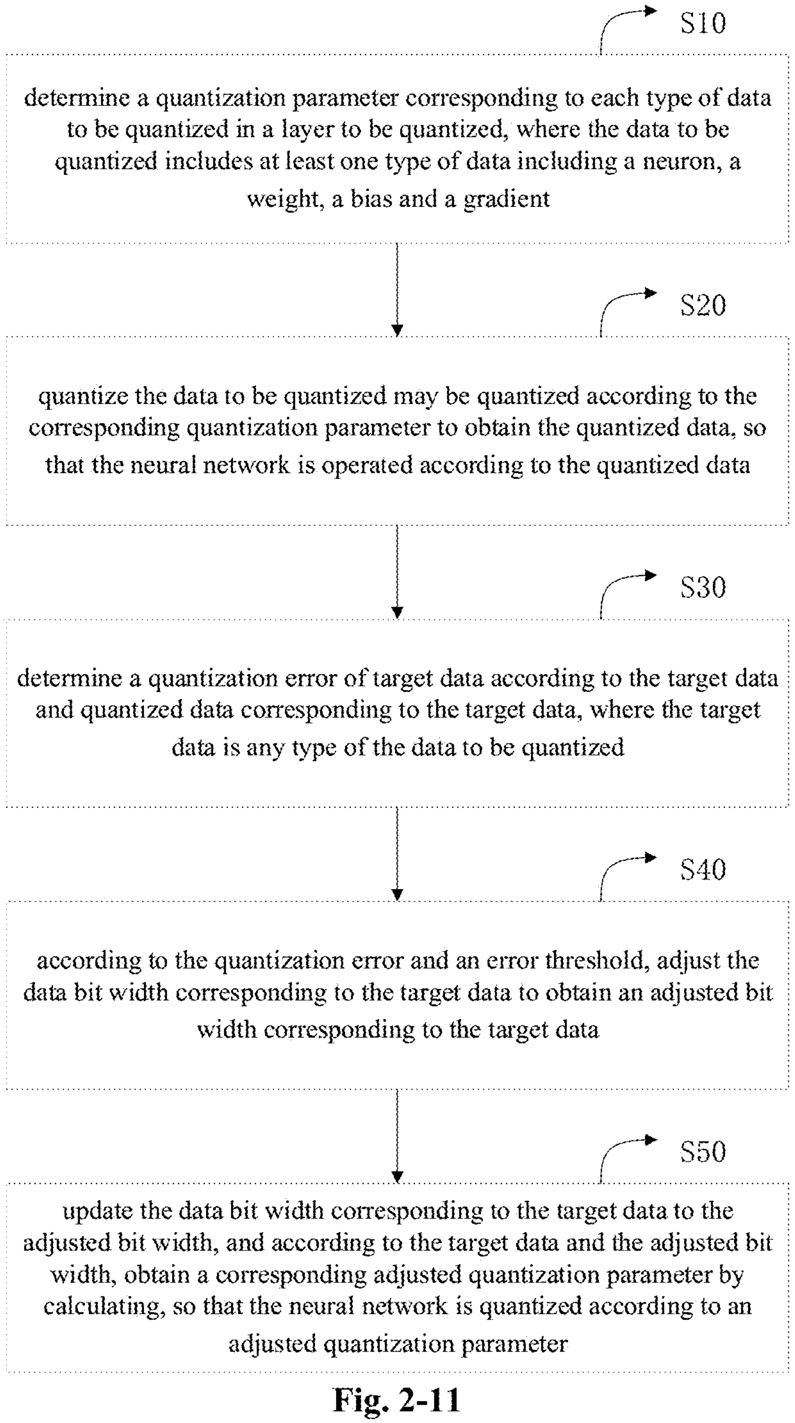
FIG. 11 is a functional block diagram of a neural network quantization parameter determination device according to an embodiment of the present disclosure.

As shown in FIG. 11, FIG. 11 is a functional block diagram of a neural network quantization parameter determination device according to an embodiment of the present disclosure. The method may include:

a statistical unit a configured to obtain a statistical result of each type of data to be quantized, where the data to be quantized includes at least one type of neurons, weights, gradients, and biases of the neural network;

a quantization parameter determination unit b configured to determine a corresponding quantization parameter by using the statistical result of each type of the data to be quantized and a data bit width, where the quantization parameter is used by an artificial intelligence processor to perform corresponding quantization on the data involved in the process of neural network operation.

In this embodiment, optionally, the quantization parameter determination apparatus of the neural network also includes:

a first quantization unit configured to quantize the data to be quantized by using the corresponding quantization parameter.

In this embodiment, optionally, the quantization parameter determination apparatus of the neural network also includes:

a second quantization unit configured to quantize the target data by using the corresponding quantization parameter, where the characteristics of the target data and the data to be quantized have similarities.

In this embodiment, the process of the neural network operation includes at least one operation of the neural network training, the neural network inference and the neural network fine-tuning.

In this embodiment, the statistical results obtained by the statistical unit are a maximum value and a minimum value of each type of data to be quantized.

In this embodiment, the statistical results obtained by the statistical unit is an absolute maximum value of each type of data to be quantized.

In this embodiment, the statistical unit determines the absolute maximum value according to the maximum value and the minimum value of each data to be quantized.

In this embodiment, the quantization parameter determination unit determines the quantization parameter according to the maximum value, the minimum value and the data bit width of each type of data to be quantized.

In this embodiment, the quantization parameter determination unit determine the quantization parameter according to the absolute maximum value and the data bit width of each type of data to be quantized.

In this embodiment, the quantization parameter determined by the quantization parameter determination unit is a point location parameter or a first scaling factor.

In this embodiment, the quantization parameter determination unit determines the first scaling factor according to the point location parameter and a second scaling factor. the point location parameter when determining the first scaling factor is a known fixed value, or the multiplication result of the point location parameter and the corresponding second scaling factor is taken as a first scaling factor as a whole to be applied to the data quantization in the process of the neural network operation.

In this embodiment, the quantization parameter determined by the quantization parameter determination unit includes the point location parameter and the second scaling factor.

In this embodiment, the quantization parameter determines the second scaling factor according to the point location parameter, the statistical results and the data bit width.

In this embodiment, the quantization parameter determined by the quantization parameter determination unit also includes an offset.

In this embodiment, the quantization parameter determination unit determine the offset according to the statistical results of each type of data to be quantized.

In this embodiment, the data bit width used by the quantization parameter determination unit is a preset value.

In this embodiment, the quantization parameter determination unit includes an adjustment unit and a quantization error determination unit, where, the adjustment unit is configured to adjust the data bit width according to the corresponding quantization error; and the quantization error determination unit is configured to determine the quantization error according to the quantized data and the corresponding pre-quantized data.

In an embodiment, the adjustment unit is specifically configured to:

compare the quantization error with the threshold, and according to a comparison result, adjust the data bit width, where the threshold includes at least one of a first threshold and a second threshold.

In this embodiment, the adjustment unit includes a first adjustment sub-unit, where the first adjustment sub-unit is configured to:

increase the data bit width if the quantization error is greater than or equal to the first threshold.

In this embodiment, the adjustment unit includes a second adjustment sub-unit, where the second adjustment sub-unit is configured to:

decrease the data bit width if the quantization error is less than or equal to the second threshold.

In this embodiment, the adjustment unit includes a third adjustment sub-unit, where the third adjustment sub-unit is configured to:

keep the data bit width unchanged if the quantization error is between the first threshold and the second threshold.

In an embodiment, the quantization error determination unit includes:

a quantization interval determination sub-unit configured to determine the quantization interval according to the data bit width;

a first quantization error determination sub-unit configured to determine the quantization error according to the quantization interval, the count of the quantized data and the corresponding pre-quantized data.

In an embodiment, the quantization error determination unit includes:

an inverse-quantized data determination sub-unit configured to de-quantize the quantized data to obtain the inverse-quantized data, where the inverse-quantized data and the corresponding pre-quantized data have the same data format.

a second quantization error determination sub-unit configured to determine the quantization error according to the quantized data and the corresponding inverse-quantized data.

In an embodiment, the pre-quantized data used by the quantization error determination unit is the data to be quantized.

In the embodiment, the pre-quantized data used by the quantization error determination unit is the data to be quantized involved in the process of a weight update iteration in a target iteration interval, where the target iteration interval includes at least one weight update iteration, and the same data bit width is used in the quantization process in the same target iteration interval.

In this embodiment, the quantization parameter determination apparatus of the neural network also includes a first target iteration interval determination unit, where the first target iteration interval determination unit includes:

a first variation trend value determination unit configured to, at a predicted time point, determine a variation trend value of a point location parameter of the data to be quantized in the weight update iteration process, where the predicted time point is used to determine whether the data bit width needs to be adjusted or not, and the predicted time point corresponds to the time point when the weight update iteration is completed;

a first target iteration interval unit configured to determine a corresponding target iteration interval according to the variation trend value of the point location parameter.

In this embodiment, the first target iteration interval determination unit includes:

a second variation trend value determination unit configured to, at a predicted time point, determine a variation trend value of a point location parameter and a variation trend value of a data bit width of the data to be quantized involved in the weight update iteration process, where the predicted time point is used to determine whether the data bit width needs to be adjusted or not, and the predicted time point corresponds to the time point when the weight update iteration is completed;

a second target iteration interval unit configured to determine the corresponding target iteration interval according to the variation trend value of the point location parameter and the variation trend value of the data bit width.

In this embodiment, the first target iteration interval determination unit also includes a first predicted time point determination unit, where the first predicted time point determination unit is configured to determine the first predicted time point according to the target iteration interval.

In this embodiment, the first target iteration interval determination unit also includes a second predicted time point determination unit, where the second predicted time point determination unit is configured to determine the second predicted time point according to the data variation range curve, where the data variation range curve is obtained by analyzing the data variation range in the weight update iteration.

In this embodiment, both the first variation trend value determination unit and the second variation trend value determination unit determine the variation trend value of the point location parameter according to a moving mean value of the point location parameter corresponding to a current predicted time point and a moving mean value of the point location parameter corresponding to a previous predicted time point.

In this embodiment, both the first variation trend value determination unit and the second variation trend value determination determine the variation trend value of the point location parameter according to a moving average of the point location parameter corresponding to a current predicted time point and a point location parameter corresponding to a previous predicted time point.

In this embodiment, the first variation trend value determination unit and the second data variation trend value determination unit include:

a point location parameter determination sub-unit corresponding to the current predicted time point configured to determine the point location parameter corresponding to the current predicted time point according to the point location parameter corresponding to the previous predicted time point and the adjustment value of the data bit width;

an adjustment result determination sub-unit configured to adjust the moving mean value of the point location parameter corresponding to the predicted time point according to the adjustment value of the data bit width to obtain the adjustment result;

a first moving mean value determination sub-unit configured to determine a moving mean value of the point location parameter corresponding to the current predicted time point according to the point location parameter corresponding to the current predicted time point and the adjustment result.

In this embodiment, the first variation trend value determination unit and the second data variation trend value determination unit include:

an intermediate result determination sub-unit configured to determine the intermediate result of the moving mean value of the point location parameter corresponding to the current predicted time point according to the point location parameter corresponding to the previous predicted time point and the moving average of the point location parameter corresponding to the previous predicted time point.

a second moving mean value determination sub-unit configured to determine a moving mean value of the point location parameter corresponding to the current predicted time point according to the intermediate result of the moving mean value of the point location parameter corresponding to the current predicted time point and the adjustment value of the data bit width.

In this embodiment, the second variation trend value determination unit determines the variation trend value of the data bit width according to the corresponding quantization error.

In this embodiment, the first target iteration interval determination unit also includes:

a quantization error determination unit configured to determine the corresponding quantization error, where the pre-quantized data corresponding to the quantization error is the data to be quantized involved in the process of weight update iteration corresponding to the predicted time point;

a data bit width determination unit configured to determine the data bit width used in the quantization process in the target iteration interval according to the corresponding quantization error.

In an embodiment, the data bit width determination unit is configured to:

compare the quantization error with the threshold. According to the comparison results, the data bit width in the quantization process in the previous target iteration interval is adjusted. The adjustment results are used as the data bit width in the quantization process in the current target iteration interval.

In the embodiment, the pre-quantized data used by the quantization error determination unit is the data to be quantized involved in the process of a weight update iteration in a target iteration interval, where the target iteration interval includes at least one weight update iteration, and the same quantization parameter is used in the quantization process in the same target iteration interval.

In this embodiment, the quantization parameter determination device of the neural network also includes a second target iteration interval determination unit, where the second target iteration interval determination unit includes:

a third variation trend value determination unit configured to, at a predicted time point, determine the variation trend value of the point location parameter of the data to be quantized involved in the weight update iteration process, where the predicted time point is used to determine whether the quantization parameter needs to be adjusted or not, and the predicted time point corresponds to the time point when the weight update iteration is completed;

a third target iteration interval configured to determine the corresponding target iteration interval according to the variation trend value of the point location parameter.

In this embodiment, the quantization parameter determination unit determines the point location parameter according to the statistical results and the data bit width.

In an embodiment, an apparatus for adjusting the data bit width is provided, where includes:

an obtaining unit configured to obtain a data bit width for quantizing the data to be quantized, where the data bit width is intended to indicate the bit width of the quantized data after the data to be quantized is quantized;

a quantization unit configured to quantize a group of data to be quantized based on the data bit width to convert the group of data to be quantized to a group of quantized data, where the group of quantized data have the data bit width;

a determination unit configured to compare the group of data to be quantized with the group of quantized data, determine the quantization error associated to the data bit width, and adjust the data bit width based on the determined quantization error.

In an embodiment, the comparison unit includes:

an interval determination unit configured to determine the quantization interval according to the data bit width; and an error determination unit configured to determine the quantization error according to the quantization interval, the group of the quantized data and the group of the data to be quantized.

In this embodiment, the error determination unit includes:

a quantization unit configured to quantize inversely the group of quantized data to obtain a group of inverse-quantized data according to the quantization interval, where the group of inverse-quantized data and the group of the data to be quantized have the same data format; and a quantization error determination unit configured to determine the quantization error according to the group of inverse-quantized data and the group of data to be quantized.

In an embodiment, the adjustment unit includes:

a comparison unit configured to compare the quantization error with a preset threshold. The preset threshold includes at least one of a first threshold and a second threshold; and a data bit width adjustment unit configured to adjust the data bit width according to the comparison results.

In this embodiment, the bit width adjustment unit also includes:

an increasing unit configured to respond to determine that the quantization error is greater than or equal to the first threshold and increase the data bit width.

In the embodiment, the increasing unit includes:

a stride increasing unit configured to increase the data bit width according to a first preset bit width stride to determine the adjusted data bit width.

In this embodiment, the quantization unit is configured to quantize the group of data to be quantized based on the adjusted data bit width to convert the group of data to be quantized to another group of quantized data. The another group of quantized data has the data bit width; and the determination unit is configured to compare the group of data to be quantized with the another group of quantized data, to determine another quantization error associated to the adjusted data bit width until the another quantization error is less than the first preset threshold.

In this embodiment, the device is invoked iteratively.

In this embodiment, the adjustment unit includes:

a decreasing unit configured to respond to determine that the quantization error is less than or equal to the second threshold and decrease the data bit width.

In the embodiment, the decreasing unit includes:

a stride decreasing unit configured to decrease the data bit width according to a second preset bit width stride to determine the adjusted data bit width.

In this embodiment, the quantization unit is configured to quantize the group of data to be quantized based on the adjusted data bit width to convert the group of data to be quantized to another group of quantized data, where the another group of quantized data has the data bit width; and the determination unit is configured to determine the another quantization error associated to the adjusted data bit width based on the group of data to be quantized and the another group of quantized data until the another quantization error is greater than the second preset threshold.

In this embodiment, the device is invoked iteratively.

In an embodiment, the adjustment unit includes:

a maintaining unit configured to maintain the data bit width unchanged if the quantization error is between the first threshold and the second threshold.

In the embodiments, the adjustment unit further includes:

an updating unit configured to update the quantization parameter for quantizing a group of the data to be quantized based on the group of data to be quantized and the adjusted data bit width; and the quantization unit is further configured to quantize the group of data to be quantized based on the updated quantization parameter.

In this embodiment, a range unit is configured to obtain a data variation range of the data to be quantized; and an interval unit is configured to, according to the variation range of the data to be quantized, determine the target iteration interval to adjust the data bit width according to the target iteration interval, where the target iteration interval includes at least one iteration.

In this embodiment, the range unit includes:

a point location unit configured to obtain the variation range of the point location, where the variation range of the point location is used to indicate the data variation range of the data to be quantized, and the variation range of the point location is positively correlated with the data variation range of the data to be quantized.

In this embodiment, the point location unit includes:

a first average value unit configured to determine a first average value according to the point location corresponding to the previous verify iteration before the current verify iteration, and the point location corresponding to the historical iteration before the previous verify iteration;

a second average value unit configured to determine a second average value according to the point location corresponding to the current verify iteration and the point location corresponding to the historical iteration before the current verify iteration, where the point location corresponding to the current verify iteration is determined according to the target data bit width corresponding to the current verify iteration and the data to be quantized; and a first error unit configured to determine a first error according to the first average value and the second average value, where the first error is used to indicate the variation range of the point location.

In this embodiment, the interval unit includes:

a first interval unit configured to determine the target iteration interval according to the first error, where the target iteration interval is negatively correlated with the first error.

In this embodiment, the range unit further includes:

a trend unit configured to obtain the variation trend of the data bit width; and a data variation range unit configured to determine the data variation range of the data to be quantized according to the variation range of the point location and the variation trend of the data bit width.

In this embodiment, the interval unit further includes:

an iteration interval unit configured to determine the target iteration interval according to the obtained first error and the second error, where the first error is used to indicate the variation range of the point location, and the second error is used to indicate the variation trend of the data bit width.

In this embodiment, the iteration interval unit includes:

a target error unit configured to use the maximum value of the first error and the second error as the target error; and a target iteration interval unit configured to determine the target iteration interval according to the target error, where the target error is negatively correlated with the target iteration interval.

In this embodiment, the second error is determined according to the quantization error, where the quantization error is determined according to the data to be quantized in the current verify iteration and the quantized data of the current verify iteration, where the second error is positively correlated with the quantization error.

In this embodiment, a device used in the training or fine-tuning of the neural network further includes:

a first iteration unit configured to determine the target iteration interval according to the data variation range of the data to be quantized and adjust the quantization parameter according to the target iteration interval when the current iteration is greater than a first preset iteration.

In this embodiment, the device further includes:

a second iteration unit configured to take the first preset iteration interval as the target iteration interval and adjust the quantization parameter according to the first preset iteration interval when the current iteration is less than or equal to the first preset iteration interval.

In this embodiment, the device further includes:

a third iteration unit configured to take the second preset iteration interval as the target iteration interval and adjust the quantization parameter according to the second preset iteration interval when the current iteration is greater than or equal to the second preset iteration interval, where the second preset iteration is greater than the first preset iteration, and the second preset iteration interval is greater than the first preset iteration interval.

In this embodiment, the device further includes:

a convergence unit configured to determine that the current iteration is greater than or equal to the second preset iteration when the convergence of the neural network meets the preset conditions.

In this embodiment, the device further includes the following:

when the current iteration is greater than or equal to the second preset iteration, and the second error is greater than the preset error, the iteration interval is determined according to the data variation range of the data to be quantized to re-determine the data bit width according to the iteration interval.

In an embodiment, a computer readable storage medium is provided. A computer program is stored in the computer readable storage medium, and the steps of the method are implemented in any of the examples above when the program is executed.

An embodiment provides an artificial intelligence chip including any one of the above-mentioned data processing devices.

An embodiment provides an electronic device including the above-mentioned artificial intelligence chip.

An embodiment provides a board card including a storage component, an interface device, a control component, and the above-mentioned artificial intelligence chip, where the artificial intelligence chip is connected to the storage component, the control component, and the interface device;

the storage device is configured to store data;

the interface device is configured to implement data transfer between the artificial intelligence chip and an external device; and the control component is configured to monitor a state of the artificial intelligence chip.

In an embodiment, the storage component includes: a plurality groups of storage units, where each group of storage units is connected to the artificial intelligence chip through a bus, and the storage units are DDR SDRAMs;

the chip includes a DDR controller configured to control data transfer and data storage of each storage unit; and the interface device is a standard PCIe (Peripheral Component Interconnect Express) interface.

In this embodiment, determining the quantization parameter corresponding to each type of data to be quantized in the layer to be quantized includes:

calculating and obtaining the corresponding quantization parameter according to each piece of data to be quantized and the corresponding data bit width.

In an embodiment, calculating the corresponding quantization parameter according to each piece of data to be quantized and the corresponding data bit width includes:

when the quantization parameter does not include the offset, obtaining a point location of the target data according to an absolute maximum value of the target data and the data bit width corresponding to the target data.

In an embodiment, calculating the corresponding quantization parameter according to each piece of data to be quantized and the corresponding data bit width includes:

when the quantization parameter does not include the offset, obtaining a maximum value of the quantized target data according to the target data and the data bit width corresponding to the target data which is any type of data to be quantized; and obtaining a scaling factor of target data according to an absolute maximum value of the target data and a maximum value of the quantized target data.

In an embodiment, calculating the corresponding quantization parameter according to each piece of data to be quantized and the corresponding data bit width includes:

when the quantization parameter includes the offset, obtaining a point location of the target data according to a maximum value of the target data, a minimum value of the target data and the data bit width corresponding to the target data, where the target data is any type of data to be quantized.

In an embodiment, calculating the corresponding quantization parameter according to each piece of data to be quantized and the corresponding data bit width includes:

when the quantization parameter includes the offset, obtaining a maximum value of the target data according to the target data and the data bit width corresponding to the target data, where the target data is any type of data to be quantized; and obtaining the scaling factor of the target data according to a maximum value of the target data, a minimum value of the target data and a maximum value of the quantized target data.

In an embodiment, calculating the corresponding quantization parameter according to each piece of data to be quantized and the corresponding data bit width includes:

obtaining an offset of the target data according to a maximum value and a minimum value of the target data which is any type of data to be quantized.

In an embodiment, the method also includes:

determining the quantization error of the target data according to the target data and the quantized data corresponding to the target data, where the target data is any kind of data to be quantized.

adjusting the data bit width corresponding to the target data according to the quantization error and an error threshold to obtain the adjusted bit width corresponding to the target data;

updating the data bit width corresponding to the target data to the adjusted bit width, and calculating a corresponding adjusted quantization parameter according to the target data and the adjusted bit width, so that the neural network is quantized according to the adjusted quantization parameter.

In the embodiment, according to the quantization error and an error threshold, adjusting the data bit width corresponding to the target data and obtaining the adjusted bit width corresponding to the target data includes:

when the quantization error is greater than the first error threshold, increasing the data bit width corresponding to the target data to obtain the adjusted bit width corresponding to the target data.

In an embodiment, calculating an adjusted quantization error of the target data according to the adjusted bit width and the target data includes:

continuing to increase the adjusted bit width according to the adjusted quantization error and the first error threshold until the adjusted quantization error obtained according to the adjusted bit width and the target data is less than or equal to the first error threshold.

In an embodiment, according to the quantization error and the error threshold, adjusting the data bit width corresponding to the target data includes:

when the quantization error is less than a second error threshold, decreasing the data bit width corresponding to the target data, where the second error threshold is less than the first error threshold.

In an embodiment, the method also includes:

calculating an adjusted quantization error of the target data according to the adjusted bit width and the target data; and continuing to decrease the adjusted bit width according to the adjusted quantization error and the second error threshold until the adjusted quantization error obtained according to the adjusted bit width and the target data is greater than or equal to the second error threshold.

In an embodiment, during a fine-tuning stage and/or training stage of a neural network operation, the method further includes:

obtaining a data variation range of the target data in a current iteration and historical iterations, where the historical iterations are iterations before the current iteration; and according to the data variation range of the target data, determining the target iteration interval corresponding to the target data to enable the neural network to update a quantization parameter of the target data according to the target iteration interval, where the target iteration interval includes at least one iteration and the target data is any type of data to be quantized.

In an embodiment, the method also includes:

according to a data bit width of the target data in the current iteration, determining the data bit width corresponding to the iteration within the target iteration interval to enable the neural network to determine the quantization parameter according to the data bit width of the target data corresponding to the iteration within the target iteration interval.

In an embodiment, the quantization parameter determination unit includes:

a second quantization parameter determination sub-unit configured to calculate the corresponding quantization parameter according to each type of data to be quantized and the corresponding data bit width.

In an embodiment, the second quantization parameter determination sub-unit includes:

a first point location computation unit configured to obtain the point location of the target data according to an absolute maximum value of the target data and the data bit width corresponding to the target data when the quantization parameter does not include the offset, where the target data is any type of data to be quantized.

In an embodiment, the second quantization parameter determination sub-unit includes:

a first scaling factor computation unit configured to, when the quantization parameter does not include the offset, obtain the maximum value of the target data after quantization according to the target data and the data bit width corresponding to the target data, where the target data may be any type of data to be quantized, and obtain a scaling factor of the target data according to the maximum value of the absolute value of the target data and the maximum value of the quantized target data.

In an embodiment, the second quantization parameter determination sub-unit includes:

a second point location computation unit configured to, when the quantization parameter includes the offset, obtain a point location of the target data according to the maximum value of the target data, the minimum value of the target data and a data bit width corresponding to the target data, where the target data is any type of data to be quantized.

In an embodiment, the second quantization parameter determination sub-unit includes:

a second scaling factor computation unit configured to, when the quantization parameter includes the offset, obtain a maximum value of the quantized target data according to the target data and the data bit width corresponding to the target data, where the target data is any type of data to be quantized, and obtain the scaling factor of the target data according to a maximum value of the target data, a minimum value of the target data and a maximum value of the quantized target data.

In an embodiment, the second quantization parameter determination sub-unit includes:

an offset computation unit configured to obtain the offset of the target data according to a maximum value and a minimum value of the target data, where the target data is any type of data to be quantized.

In an embodiment, the device further includes:

a quantization error determination unit configured to determine the quantization error of the target data according to the target data and the quantized data corresponding to the target data, where the target data is any type of data to be quantized.

an adjusted bit width determination unit configured to adjust the data bit width corresponding to the target data according to the quantization error and the error threshold to obtain the adjusted bit width corresponding to the target data;

an adjusted quantization parameter determination unit configured to update the data bit width corresponding to the target data to the adjusted bit width, and compute the corresponding adjusted quantization parameter according to the target data and the adjusted bit width, so that the neural network is quantized according to the corresponding adjusted quantization parameter.

In an embodiment, the adjusted bit width determination unit includes:

a first adjusted bit width determination sub-unit configured to increase the data bit width corresponding to the target data to obtain the adjusted bit width corresponding to the target data when the quantization error is greater than a first error threshold.

In an embodiment, the adjusted bit width determination unit includes:

a first adjusted quantization error determination sub-unit configured to calculate the adjusted quantization error of the target data according to the adjusted bit width and the target data; and a first adjusted bit width loop determination sub-unit configured to continue to increase the adjusted bit width according to the adjusted quantization error and the first error threshold until the adjusted quantization error obtained according to the adjusted bit width and the target data is less than or equal to the first error threshold.

In an embodiment, the adjusted bit width determination unit includes:

a second adjusted bit width determination sub-unit configured to decrease the data bit width corresponding to the target data, where the second error threshold is less than the first error threshold, when the quantization error is less than a second error threshold.

In an embodiment, the adjusted bit width determination unit further includes:

a second adjusted quantization error determination sub-unit configured to calculate the adjusted quantization error of the target data according to the adjusted bit width and the target data; and a second adjusted bit width loop determination sub-unit configured to continue to decrease the adjusted bit width according to the adjusted quantization error and the second error threshold until the adjusted quantization error obtained according to the adjusted bit width and the target data is greater than or equal to the second error threshold.

In an embodiment, during a fine-tuning stage and/or training stage of a neural network operation, the device further includes:

a data variation range determination unit configured to obtain a data variation range of the target data in a current iteration and historical iterations, where the historical iterations are iterations before the current iteration; and a target iteration interval determination unit configured to determine a target iteration interval corresponding to the target data according to the data variation range of the target data to enable the neural network to update the quantization parameter of the target data according to the target iteration interval, where the target iteration interval includes at least one iteration, and the target data is any type of data to be quantized.

In an embodiment, the device further includes:

a first target iteration interval application sub-unit configured to determine a data bit width corresponding to the iteration within the target iteration interval according to a data bit width of the target data in a current iteration to enable the neural network to determine the quantization parameter according to the data bit width corresponding to the iteration within the target iteration interval.

An embodiment provides a neural network quantization parameter adjustment method, where the method includes:

obtaining a data variation range of data to be quantized;

according to the data variation range of the data to quantized, determining a target iteration interval to adjust a quantization parameter in a neural network operation according to the target iteration interval, where the target iteration interval includes at least one iteration, and the quantization parameter of the neural network is configured to implement quantization of the data to be quantized in the neural network operation.

In an embodiment, the quantization parameter also includes a point location, where the point location is a decimal point location in the quantized data corresponding to the data to be quantized, and the method also includes:

determining the point location corresponding to the iteration in the target iteration interval according to the target data bit width corresponding to a current verify iteration and the data to be quantized of the current verify iteration to adjust the point location in the neural network operation, where the point location corresponding to the iteration in the target iteration interval is consistent.

In an embodiment, the quantization parameter also includes a point location, where the point location is a decimal point location in the quantized data corresponding to the data to be quantized, and the method also includes:

determining the data bit width corresponding to the target iteration interval according to the target data bit width corresponding to the current verify iteration, where the data bit width corresponding to the iteration in the target iteration interval is consistent; and adjusting the point location corresponding to the iteration in the target iteration interval according to the obtained point location iteration interval and the data bit width corresponding to the target iteration interval to adjust the point location in the neural network operation, where the point location iteration interval includes at least one iteration, and the point location of the iteration in the point location iteration interval is consistent.

In an embodiment, the point location iteration interval is less than or equal to the target iteration interval.

In an embodiment, the quantization parameter also includes a scaling factor, where the scaling factor and the point location are updated simultaneously.

In an embodiment, the quantization parameter also include an offset, where the offset and the point location are updated simultaneously.

In an embodiment, the method also includes:

determining the quantization error according to the data to be quantized of the current verify iteration and the quantized data of the current verify iteration, where the quantized data of the current verify iteration is obtained by quantizing the data to be quantized of the current verify iteration;

determining the target data bit width corresponding to the current verify iteration according to the quantization error.

In an embodiment, according to the quantization error, determining the target data bit width corresponding to the current verify iteration includes:

increasing the data bit width corresponding to the current verify iteration to obtain the target data bit width corresponding to the current verify iteration if the quantization error is greater than or equal to the first preset threshold; or decreasing the data bit width corresponding to the current verify iteration to obtain the target data bit width corresponding to the current verify iteration if the quantization error is less than or equal to the second preset threshold.

In an embodiment, if the quantization error is greater than or equal to the first preset threshold, the data bit width corresponding to the current verify iteration is increased to obtain the target data bit width corresponding to the current verify iteration, which includes:

determining a first intermediate data bit width according to the first preset bit width stride if the quantization error is greater than or equal to the first preset threshold; and returning to determine the quantization error according to the data to be quantized in the current verify iteration and the quantized data of the current verify iteration until the quantization parameter is less than the first preset threshold, where the quantized data of the current verify iteration is obtained by quantizing the data to be quantized of the current verify iteration according to the first intermediate data bit width.

In an embodiment, if the quantization error is less than or equal to the second preset threshold, the data bit width corresponding to the current verify iteration is decreased, which includes:

determining a second intermediate data bit width according to the second preset bit width stride if the quantization error is less than or equal to the second preset threshold;

returning to determine the quantization error according to the data to be quantized in the current verify iteration and the quantized data of the current verify iteration until the quantization error is greater than the second preset threshold, where the quantized data of the current verify iteration is obtained by quantizing the data to be quantized of the current verify iteration according to the second intermediate data bit width.

In an embodiment, obtaining the data variation range of the data to be quantized includes:

obtaining a variation range of the point location, where the variation range of the point location may be used to indicate the data variation range of the data to be quantized, and the variation range of the point location is positively correlated with the data variation range of the data to be quantized.

In an embodiment, obtaining the variation range of the point location includes:

determining a first average value according to the point location corresponding to a previous verify iteration before the current verify iteration and point locations of the historical iterations before the previous verify iteration, where the previous iteration is the verify iteration corresponding to the previous iteration interval before the target iteration interval.

determining a second average value according to the point location corresponding to the current verify iteration and the point locations of the historical iterations before current verify iteration, where the point location corresponding to the current verify iteration is determined according to the target data bit width corresponding to the current verify iteration and the data to be quantized; and determining a first error according to the first average value and the second average value, where the first error is used to indicate the variation range of the point location.

In an embodiment, determining a second average value according to the point location corresponding to the current verify iteration and the point locations of the historical iterations before the current verify iteration includes:

obtaining a preset count of intermediate moving mean values, where each intermediate moving mean value is determined according to the preset count of verify iterations before the current verify iteration; and determining the second average value according to the point location of the current verify iteration and the preset count of intermediate moving mean values.

In an embodiment, determining a second average value according to a point location corresponding to current verify iteration and the point locations of the historical iterations before the current verify iteration includes:

determining the second average value according to the point location corresponding to the current verify iteration and the first average value.

In an embodiment, the method also includes:

updating the second average value according to the obtained data bit width adjustment value of the current verify iteration, where the data bit width adjustment value of the current verify iteration is determined according to the target data bit width of the current verify iteration and an initial data bit width.

In an embodiment, updating the second average value according to the obtained data bit width adjustment value of the current verify iteration includes:

decreasing the second average value according to the data bit width adjustment value of the current verify iteration when the data bit width adjustment value of the current verify iteration is greater than the preset parameter; and increasing the second average value according to the data bit width adjustment value of the current verify iteration when the data bit width adjustment value of the current verify iteration is less than the preset parameter.

In an embodiment, determining the target iteration interval according to the data variation range of the data to be quantized includes:

determining the target iteration interval according to the first error, where the target iteration interval is negatively correlated with the first error.

In an embodiment, obtaining the data variation range of the data to be quantized further includes:

obtaining the variation range of the data bit width; and determining the data variation range of the data to be quantized according to the variation range of the point location and the variation trend of the data bit width.

In an embodiment, determining the target iteration interval according to the data variation range of the data to be quantized further includes:

determining the target iteration interval according to the obtained first error and the second error, where the first error is used to indicate the variation range of the point location, and the second error is used to indicate the variation trend of the data bit width.

In an embodiment, determining the target iteration interval according to the obtained second error and the first error includes:

taking a maximum value of the first error and the second error as the target error; and determining the target iteration interval according to the target error, where the target error is negatively correlated with the target iteration interval.

In an embodiment, the second error is determined according to the quantization error, where the quantization error is determined according to the data to be quantized in the current verify iteration and the quantized data of the current verify iteration, and the second error is positively correlated with the quantization error.

In an embodiment, the method used in the training or fine-tuning of the neural network further includes:

determining the target iteration interval according to the data variation range of the data to be quantized and adjusting the quantization parameter according to the target iteration interval when the current iteration is greater than the first preset iteration.

In an embodiment, the method further includes:

taking a first preset iteration interval as the target iteration interval and adjusting the quantization parameter according to the first preset iteration interval when the current iteration is less than or equal to the first preset iteration.

In an embodiment, the method further includes:

taking a second preset iteration interval as the target iteration interval and adjusting the quantization parameter according to the second preset iteration interval when the current iteration is greater than or equal to the second preset iteration interval, where the second preset iteration is greater than the first preset iteration, and the second preset iteration interval is greater than the first preset iteration interval.

In an embodiment, the method further includes:

determining that the current iteration is greater than or equal to the second preset iteration when the convergence of the neural network meets the preset conditions.

In an embodiment, the method further includes the following:

when the current iteration is greater than or equal to the second preset iteration, and the second error is greater than the preset error, the iteration interval is determined according to the data variation range of the data to be quantized to re-determine the data bit width according to the iteration interval.

In an embodiment, the data to be quantized is at least one of neuron data, weight data or gradient data.

An embodiment provides a quantization parameter adjustment device of a neural network, including a memory and a processor. A computer program is stored in the memory. The steps of the above-mentioned method are implemented when a processor executes the computer program.

The embodiment further provides a computer readable storage medium. A computer program is stored in the computer readable storage medium. The steps of the method in any example mentioned above are implemented when a processor executes the computer program.

The embodiment provides a quantization parameter adjustment device of the neural network, where the device includes:

an obtaining unit configured to obtain a data variation range of data to be quantized;

an iteration interval determination unit configured to determine a target iteration interval according to the data variation range of the data to be quantized so as to adjust a quantization parameter in a neural network operation according to the target iteration interval, where the first target iteration interval includes at least one iteration, and the quantization parameter of the neural network is configured to implement quantization of the data to be quantized in the neural network operation.

In an embodiment, the quantization parameter includes a point location, where the point location is a decimal point in the quantized data corresponding to the data to be quantized, and the device further includes:

a quantization parameter determination unit configured to determine the point location corresponding to the iteration in the target iteration interval according to the target data bit width corresponding to the current verify iteration and the data to be quantized of the current verify iteration to adjust the point location in the neural network operation, where the point location corresponding to the iteration in the target iteration interval is consistent.

In an embodiment, the quantization parameter may include a point location, where the point location is a decimal point in the quantized data corresponding to the data to be quantized, and the device further includes:

a data bit width determination unit configured to determine the data bit width corresponding to the target iteration interval according to the target data bit width corresponding to the current verify iteration, where the data bit width corresponding to the iteration in the target iteration interval is consistent;

a quantization parameter determination unit configured to adjust the point location corresponding to the iteration in the target iteration interval according to the obtained point location iteration interval and the data bit width corresponding to the target iteration interval to adjust the point location in the neural network operation, where the point location iteration interval includes at least one iteration, and the point location of the iteration in the point location iteration interval is consistent.

In an embodiment, the point location iteration interval is less than or equal to the target iteration interval.

In an embodiment, the quantization parameter also includes a scaling factor, where the scaling factor and the point location are updated simultaneously.

In an embodiment, the quantization parameter also includes an offset, where the offset and the point location are updated simultaneously.

In an embodiment, the data bit width determination unit includes:

a quantization error determination unit configured to determine the quantization error according to the data to be quantized of the current verify iteration and the quantized data of the current verify iteration, where the quantized data of the current verify iteration is obtained by quantizing the data to be quantized of the current verify iteration;

a data bit width determination unit configured to determine the target data bit width corresponding to the current verify iteration according to the quantization error.

In an embodiment, the data bit width determination unit configured to determine the target data bit width corresponding to the current verify iteration according to the quantization error is specifically configured to:

increase the data bit width corresponding to the current verify iteration to obtain the target data bit width corresponding to the current verify iteration if the quantization error is greater than or equal to the first preset threshold; or decrease the data bit width corresponding to the current verify iteration to obtain the target data bit width corresponding to the current verify iteration if the quantization error is less than or equal to the second preset threshold.

In an embodiment, the data bit width determination unit configured to increase the data bit width corresponding to the current verify iteration to obtain the target data bit width corresponding to the current verify iteration if the quantization error is greater than or equal to the first preset threshold is specifically configured to:

determine a first intermediate data bit width according to the first preset bit width stride if the quantization error is greater than or equal to the first preset threshold; and return to determine the quantization error according to the data to be quantized in the current verify iteration and the quantized data of the current verify iteration until the quantization parameter is less than the first preset threshold, where the quantized data of the current verify iteration is obtained by quantizing the data to be quantized of the current verify iteration according to the first intermediate data bit width.

In an embodiment, the data bit width determination unit configured to decrease the data bit width corresponding to the current verify iteration to obtain the target data bit width corresponding to the current verify iteration if the quantization error is less than or equal to the second preset threshold is specifically configured to:

determine a second intermediate data bit width according to the second preset bit width stride if the quantization error is less than or equal to the second preset threshold;

return to determine the quantization error according to the data to be quantized in the current verify iteration and the quantized data of the current verify iteration until the quantization error is greater than the second preset threshold, where the quantized data of the current verify iteration is obtained by quantizing the data to be quantized of the current verify iteration according to the second intermediate data bit width.

In an embodiment, the obtaining unit includes:

a first obtaining unit configured to obtain a variation range of the point location, where the variation range of the point location is used to indicate the data variation range of the data to be quantized, and the variation range of the point location is positively correlated with the data variation range of the data to be quantized.

In an embodiment, the first obtaining unit includes:

a first average value determination unit configured to determine a first average value according to a point location corresponding to a previous verify iteration before the current verify iteration, and point locations of the historical iterations before the previous verify iteration, where the previous verify iteration is the verify iteration corresponding to the previous iteration interval before the target iteration interval;

a second average value determination unit configured to determine a second average value according to the point location corresponding to the current verify iteration and the point location corresponding to the historical iteration before the current verify iteration, where the point location corresponding to the current verify iteration is determined according to the target data bit width corresponding to the current verify iteration and the data to be quantized; and a first error determination unit configured to determine a first error according to the first average value and the second average value, where the first error is used to indicate the variation range of the point location.

In an embodiment, the second average value determination unit is specifically configured to:

obtain a preset count of intermediate moving mean values, where each intermediate moving mean value is determined according to the preset count of verify iterations before the current verify iteration; and determine the second average value according the point location of the current verify iteration and the preset count of intermediate moving mean values.

In an embodiment, the second average value determination unit is configured to determine the second average value according the point location corresponding to the current verify iteration and the first average value.

In an embodiment, the second average value determination unit is configured to update the second average value according to the obtained data bit width adjustment value of the current verify iteration, where the data bit width adjustment value corresponding to the current verify iteration is determined according to the target data bit width of the current verify iteration and the initial data bit width.

In an embodiment, the second average value determination unit configured to update the second average value according to the obtained data bit width adjustment value of the current verify iteration is specifically configured to:

decrease the second average value according to the data bit width adjustment value of the current verify iteration when the data bit width adjustment value of the current verify iteration is greater than the preset parameter; and increase the second average value according to the data bit width adjustment value of the current verify iteration when the data bit width adjustment value of the current verify iteration is less than the preset parameter.

In an embodiment, the iteration interval determination t is configured to determine the target iteration interval according to the first error, where the target iteration interval is negatively correlated with the first error.

In an embodiment, the obtaining unit further includes:

a second obtaining unit configured to acquire the variation trend of the data bit width and determine the data variation range of the data to be quantized according to the variation range of the point location and the variation trend of the data bit width.

In an embodiment, the iteration interval determination unit is also configured to determine the target iteration interval according to an obtained first error and a second error, where, the first error is used to indicate the variation range of the point location, and the second error is used to indicate the variation trend of the data bit width.

In an embodiment, the iteration interval determination unit configured to determine the target iteration interval according to then obtained first error and the second error is specifically configured to:

take a maximum value of the first error and the second error as the target error; and determine the target iteration interval according to the target error, where, the target error is negatively correlated with the target iteration interval.

In an embodiment, the second error is determined according to the quantization error, where the quantization error is determined according to the data to be quantized in the current verify iteration and the quantized data of the current verify iteration, and the second error is positively correlated with the quantization error.

In an embodiment, the device is configured to implement the training or fine-tuning of the neural network, and the iteration interval determination unit is also configured to:

determine the target iteration interval according to the data variation range of the data to be quantized and adjust the quantization parameter according to the target iteration interval when the current iteration is greater than the first preset iteration.

In an embodiment, the iteration interval determination unit is also configured to take the first preset iteration interval as the target iteration interval and adjust the quantization parameter according to the first preset iteration when the current iteration is less than or equal to the first preset iteration.

In an embodiment, the iteration interval determination unit is also configured to:

take a second preset iteration interval as the target iteration interval and adjust the quantization parameter according to the second preset iteration interval when the current iteration is greater than or equal to the second preset iteration interval, where when the convergence of the neural network meets the preset conditions, it is determined that the current iteration is greater than or equal to the second preset iteration; and the second preset iteration is greater than the first preset iteration, and the second preset iteration interval is greater than the first preset iteration interval.

In an embodiment, the iteration interval determination unit is also configured to: determine the iteration interval according to the data variation range of the data to be quantized when the current iteration is greater than or equal to the second preset iteration, and the second error is greater than the preset error, to re-determine the data bit width according to the iteration interval.

It should be understood that the foregoing device embodiments are only illustrative, and the device of the present disclosure is also implemented in other ways.

For example, the division of the units/units in the foregoing embodiment is only a logical function division, and there may be other division methods in actual implementation.

For example, a plurality of units, modules, or components may be combined or integrated into another system, or some features may be omitted or not implemented.

The units/units described as separate components may or may not be physically separated.

The components shown as units/modules may or may not be physical units. In other words, the components may be located in one place, or may be distributed to a plurality of network units.

According to certain needs, some or all of the units may be selected for realizing the purposes of the embodiments of the present disclosure.

In addition, unless otherwise specified, the functional units/modules in the various embodiments of the present disclosure may be integrated into one unit/module. Alternatively, each unit/module may exist alone physically. Alternatively, two or more units/modules may be integrated together.

The above-mentioned integrated units/modules may be implemented in the form of hardware or in the form of software program modules.

It should be understood that the foregoing device embodiments are only illustrative, and the device of the present disclosure may also be implemented in other ways.

For example, the division of the units/modules in the foregoing embodiment is only a logical function division, and there may be other division methods in actual implementation.

For example, a plurality of units, modules, or components may be combined or integrated into another system, or some features may be omitted or not implemented.

The units/modules described as separate components may or may not be physically separated.

The components shown as units/modules may or may not be physical units. In other words, the components may be located in one place, or may be distributed to a plurality of network units.

According to certain needs, some or all of the units may be selected for realizing the purposes of the embodiments of the present disclosure.

In addition, unless otherwise specified, the functional units/modules in the various embodiments of the present disclosure may be integrated into one unit/module. Alternatively, each unit/module may exist alone physically. Alternatively, two or more units/modules may be integrated together.

The above-mentioned integrated units/modules may be implemented in the form of hardware or in the form of software program modules.

When the above-mentioned integrated units/modules are implemented in the form of hardware, the hardware may be a digital circuit, an analog circuit, and the like.

Physical implementation of the hardware structure may include, but is not limited to, a transistor, a memristor, and the like.

Unless otherwise specified, the artificial intelligence processor may be any appropriate hardware processor, such as a CPU, a GPU, an FPGA, a DSP, an ASIC, and the like.

Unless otherwise specified, the storage unit may be any suitable magnetic storage medium or magneto-optical storage medium, such as a RRAM (Resistive Random Access Memory), a DRAM (Dynamic Random Access Memory), an SRAM (Static Random-Access Memory), an EDRAM (Enhanced Dynamic Random Access Memory), an HBM (High-Bandwidth Memory), or an HMC (Hybrid Memory Cube), or the like.

If the integrated units/modules are implemented in the form of software program modules and sold or used as an independent product, the product may be stored in a computer-readable memory.

Based on such understanding, the essence of the technical solutions of the present disclosure, or a part of the present disclosure that contributes to the prior art, or all or part of technical solutions, may all or partly embodied in the form of a software product that is stored in a memory. The software product includes several instructions to enable a computer device (which may be a personal computer, a server, or a network device, and the like) to perform all or part of the steps of the methods described in the embodiments of the present disclosure.

The foregoing memory includes: a USB flash drive, a read-only memory (ROM), a random access memory (RAM), a mobile hard disk, a magnetic disk, or an optical disc, and other media that may store program codes.

In the technical solution, the present disclosure also provides an artificial intelligence chip including the above-mentioned neural network quantization parameter determination device.

In the technical solution, the present disclosure also provides a board card including a storage component, an interface device, a control component, and the above-mentioned artificial intelligence chip. The artificial intelligence chip is connected to the storage component, the control component, and the interface device, respectively; the storage component is configured to store data; the interface device is configured to implement data transfer between the artificial intelligence chip and an external device; and the control component is configured to monitor a state of the artificial intelligence chip.

Figures 2, 3, 4, 5, 6, 7, 8, 9, 10, 11, 12:
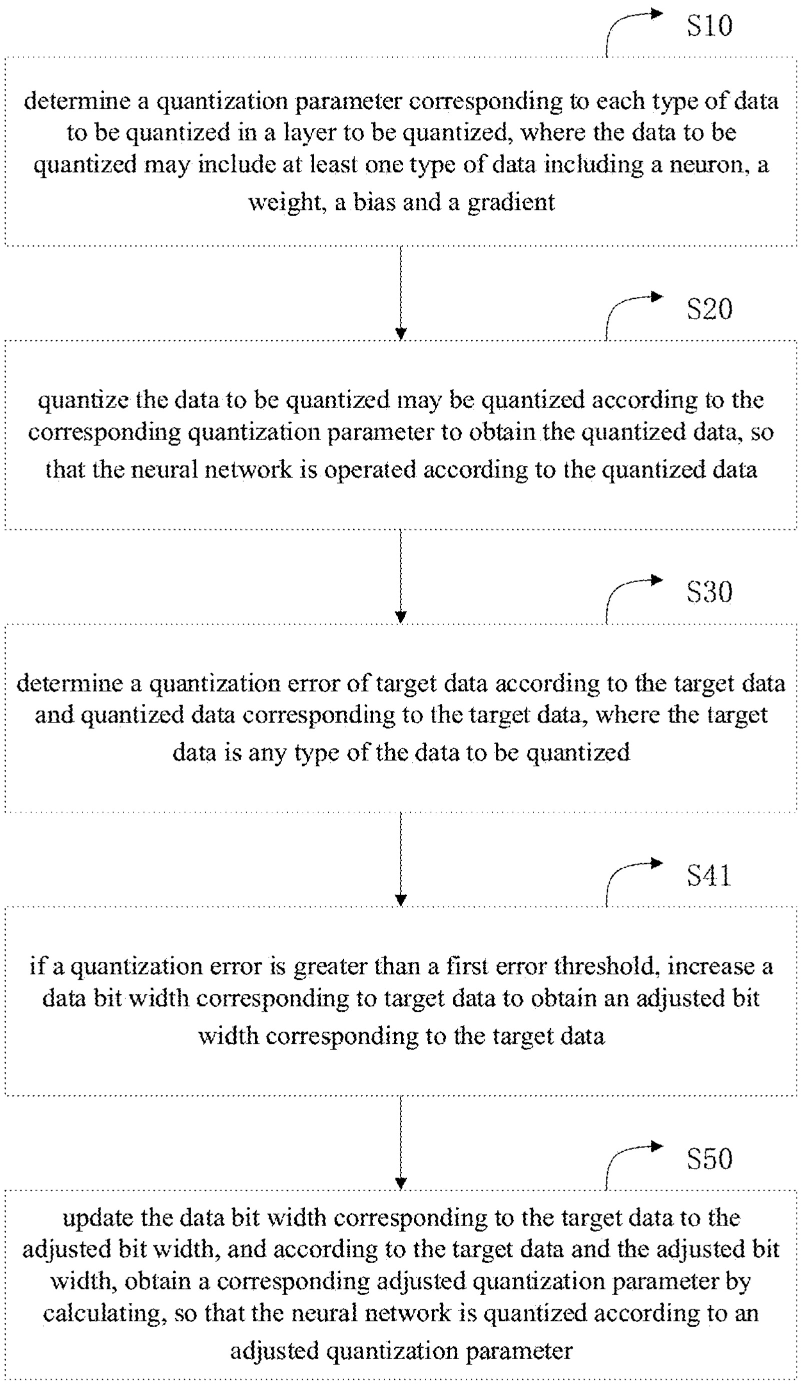
FIG. 12 is a structural block diagram of a board card according to an embodiment of the present disclosure.
Figures 2, 3, 4, 5, 6, 7, 8, 9, 10, 11, 12, 13:
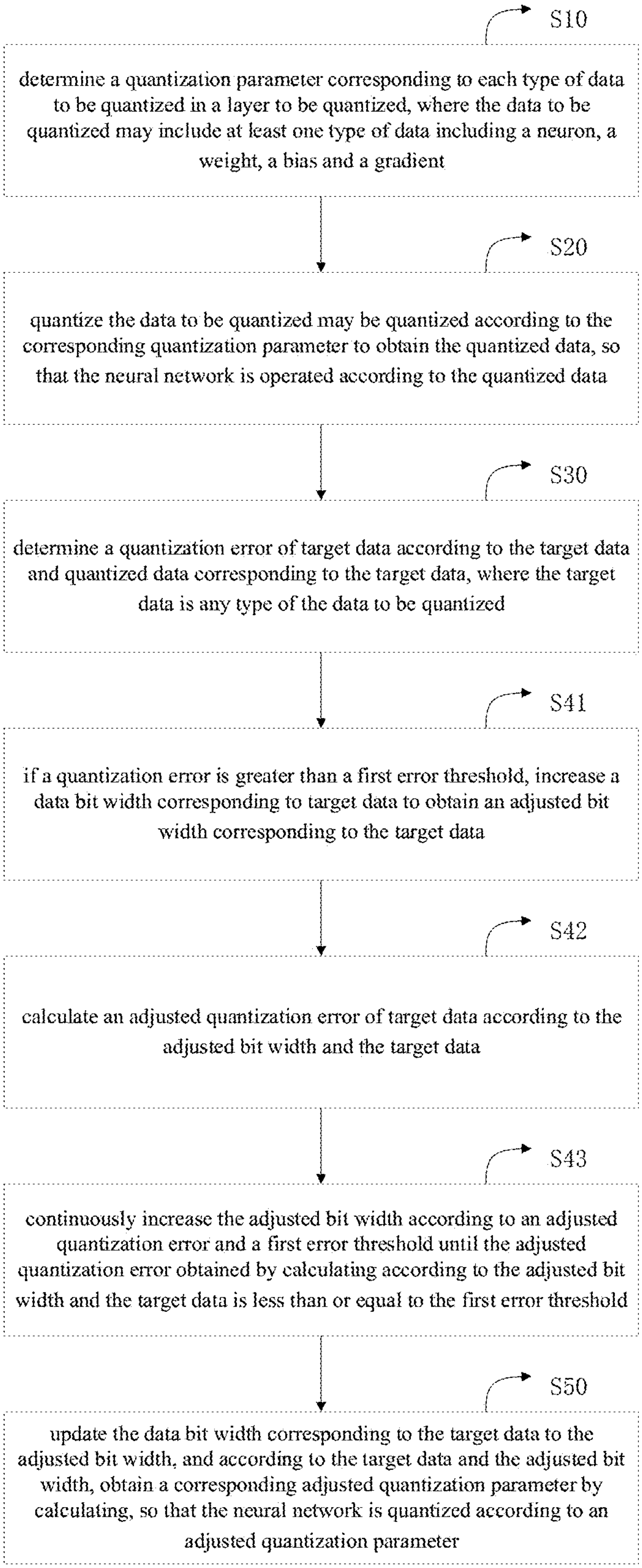
Figures 2, 3, 4, 5, 6, 7, 8, 9, 10, 11, 12, 13, 14:
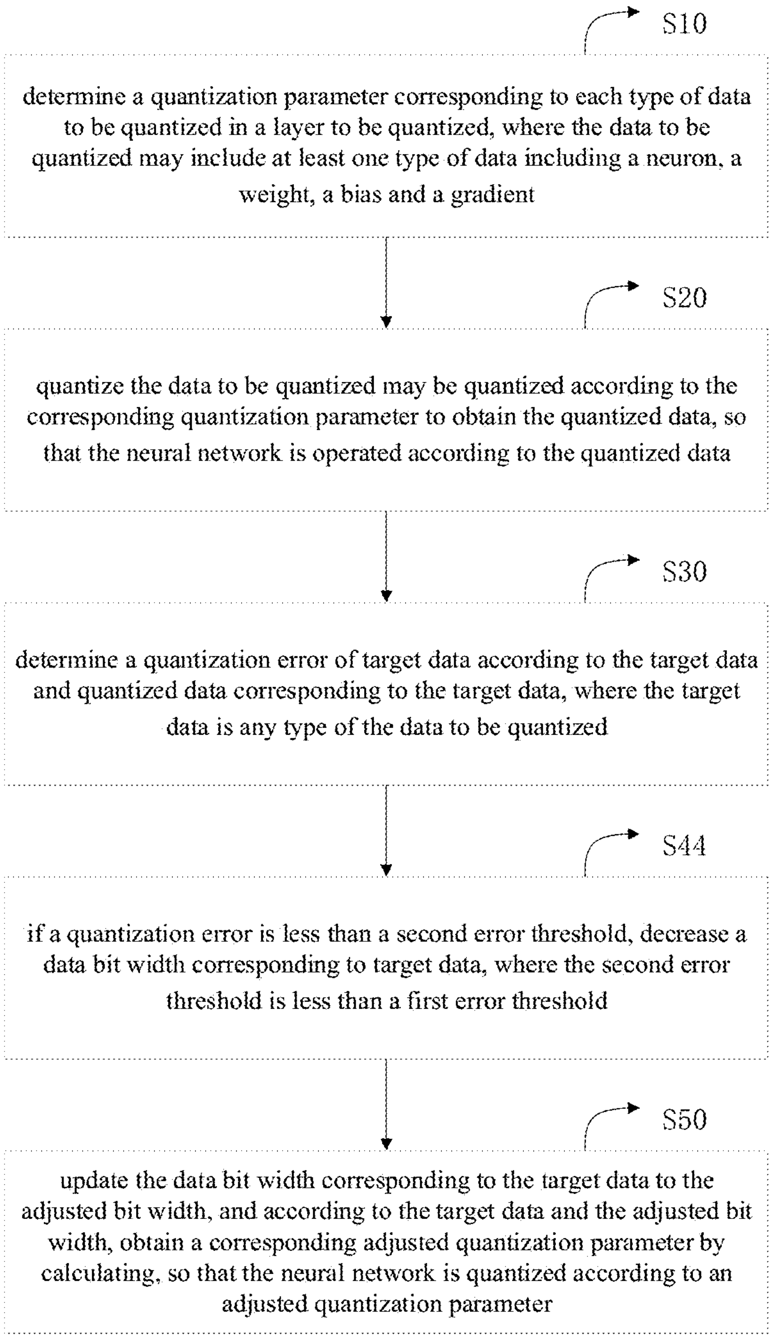
Figures 2, 3, 4, 5, 6, 7, 8, 9, 10, 11, 12, 13, 14, 15:
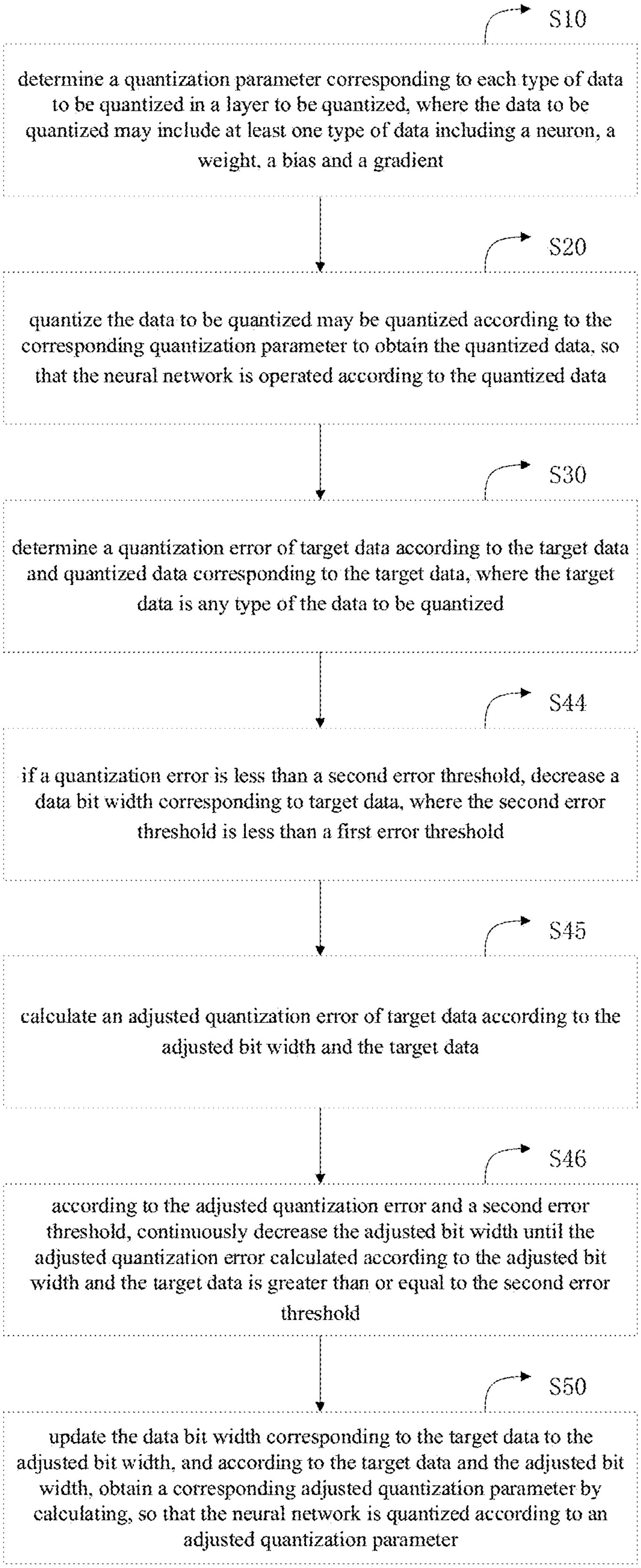
Figures 2, 3, 4, 5, 6, 7, 8, 9, 10, 11, 12, 13, 14, 15, 16:
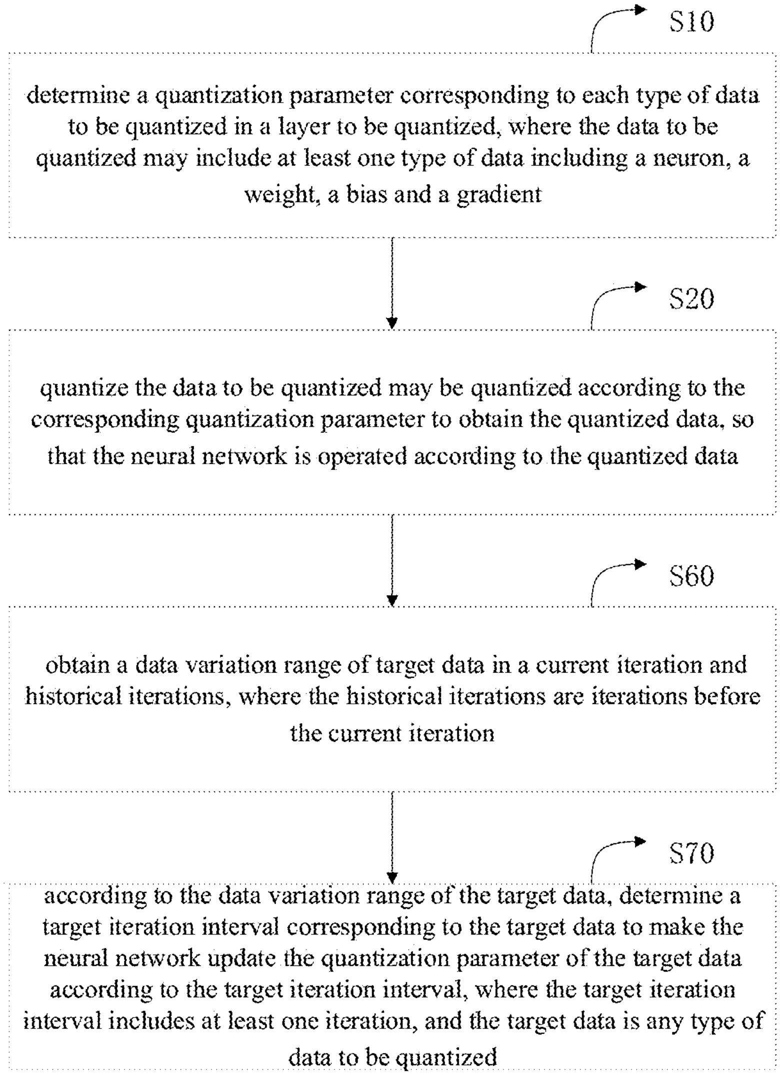
Figures 2, 3, 4, 5, 6, 7, 8, 9, 10, 11, 12, 13, 14, 15, 16, 17:
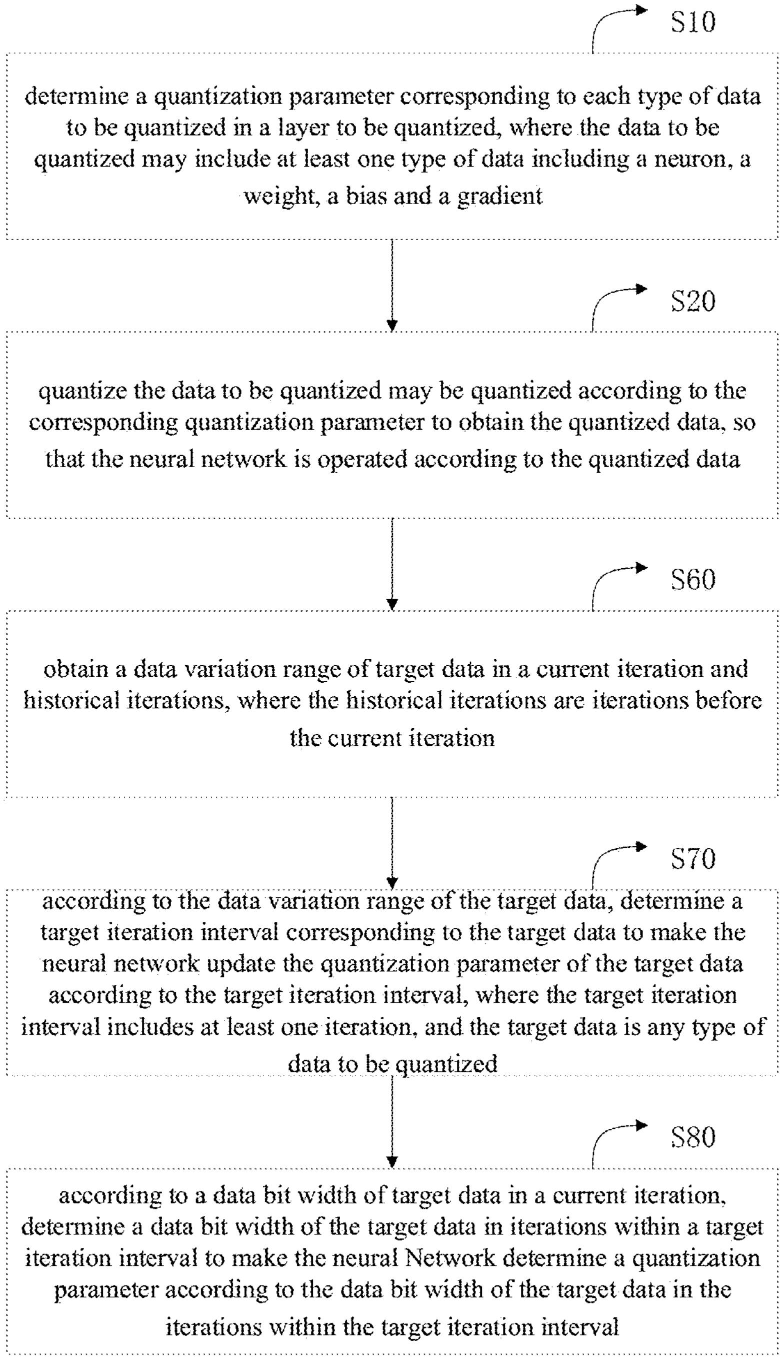
Figures 2, 3, 4, 5, 6, 7, 8, 9, 10, 11, 12, 13, 14, 15, 16, 17, 18:
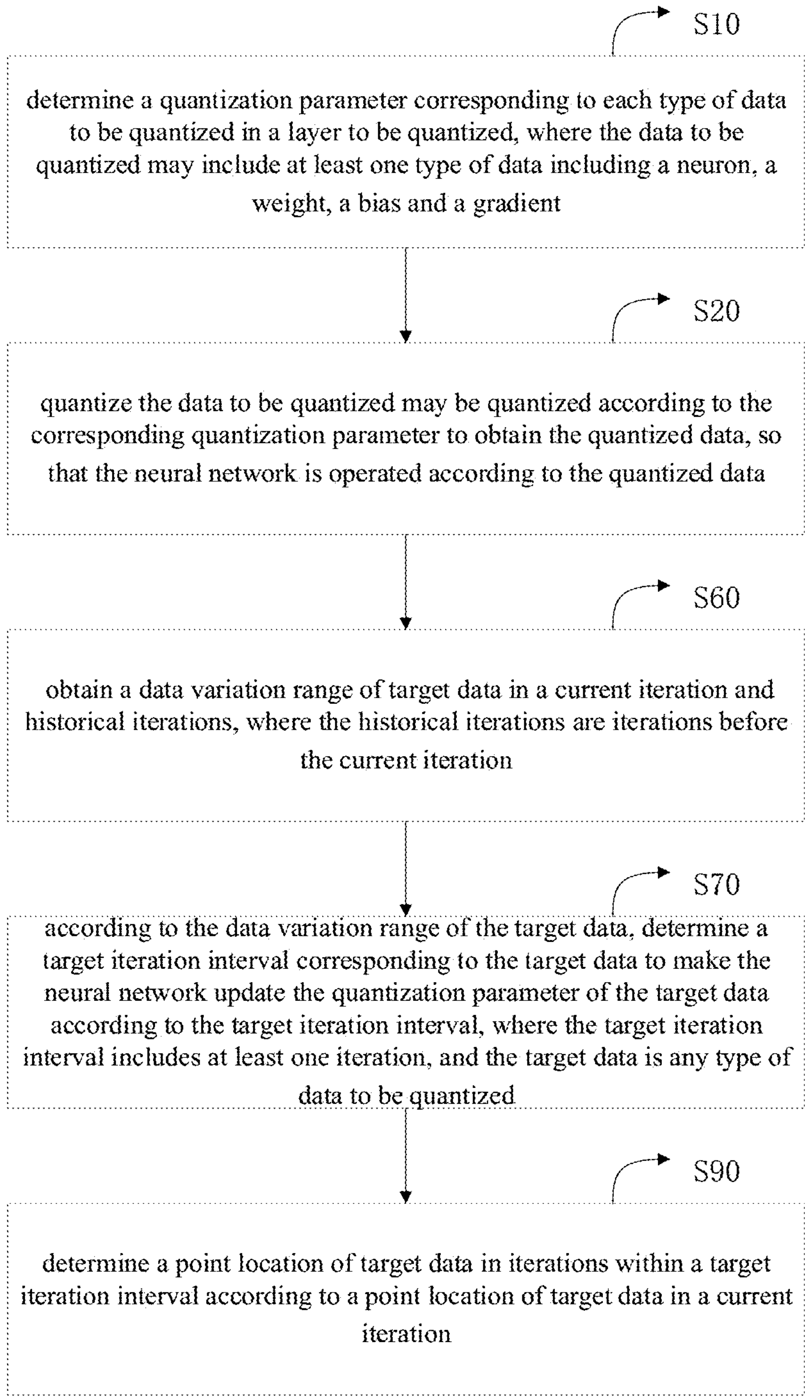
Figures 2, 3, 4, 5, 6, 7, 8, 9, 10, 11, 12, 13, 14, 15, 16, 17, 18, 19:
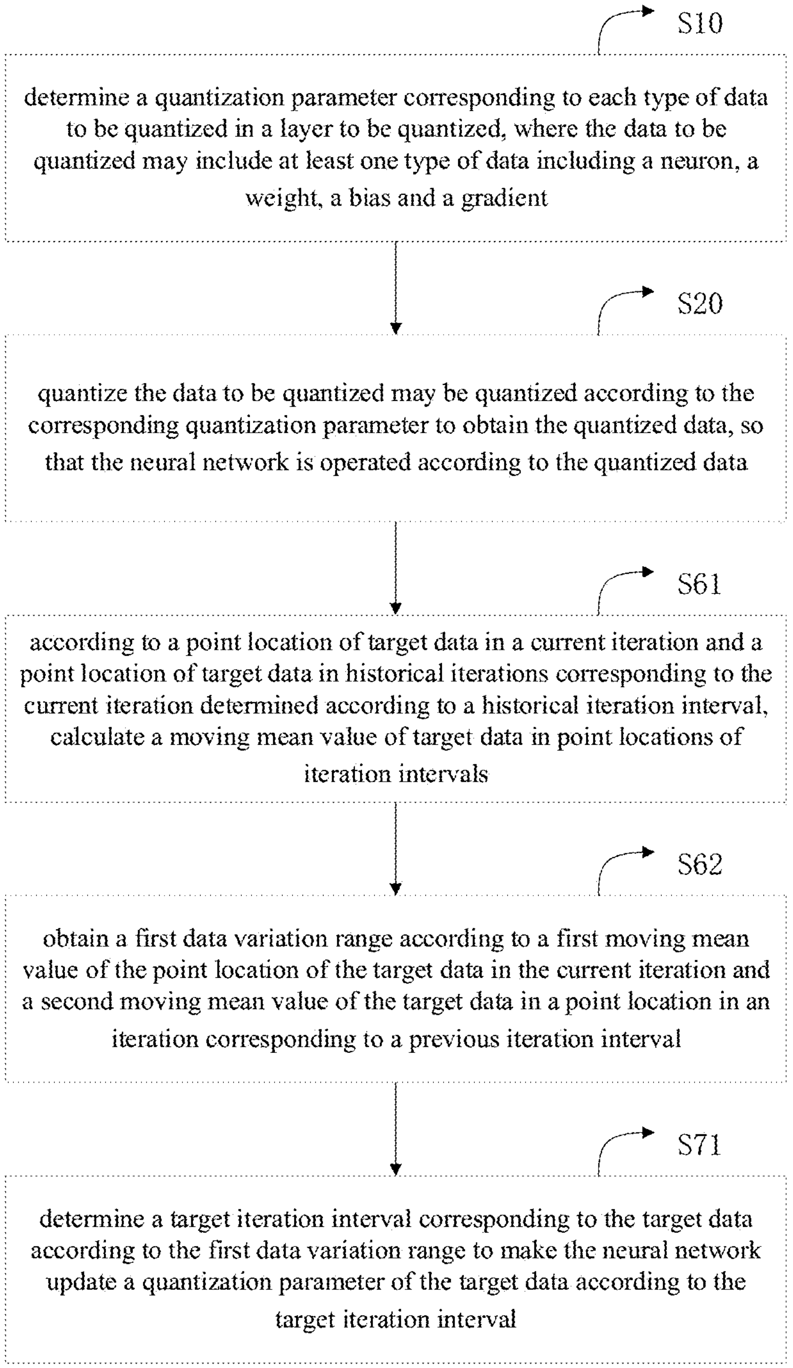
Figures 2, 3, 4, 5, 6, 7, 8, 9, 10, 11, 12, 13, 14, 15, 16, 17, 18, 19, 20:
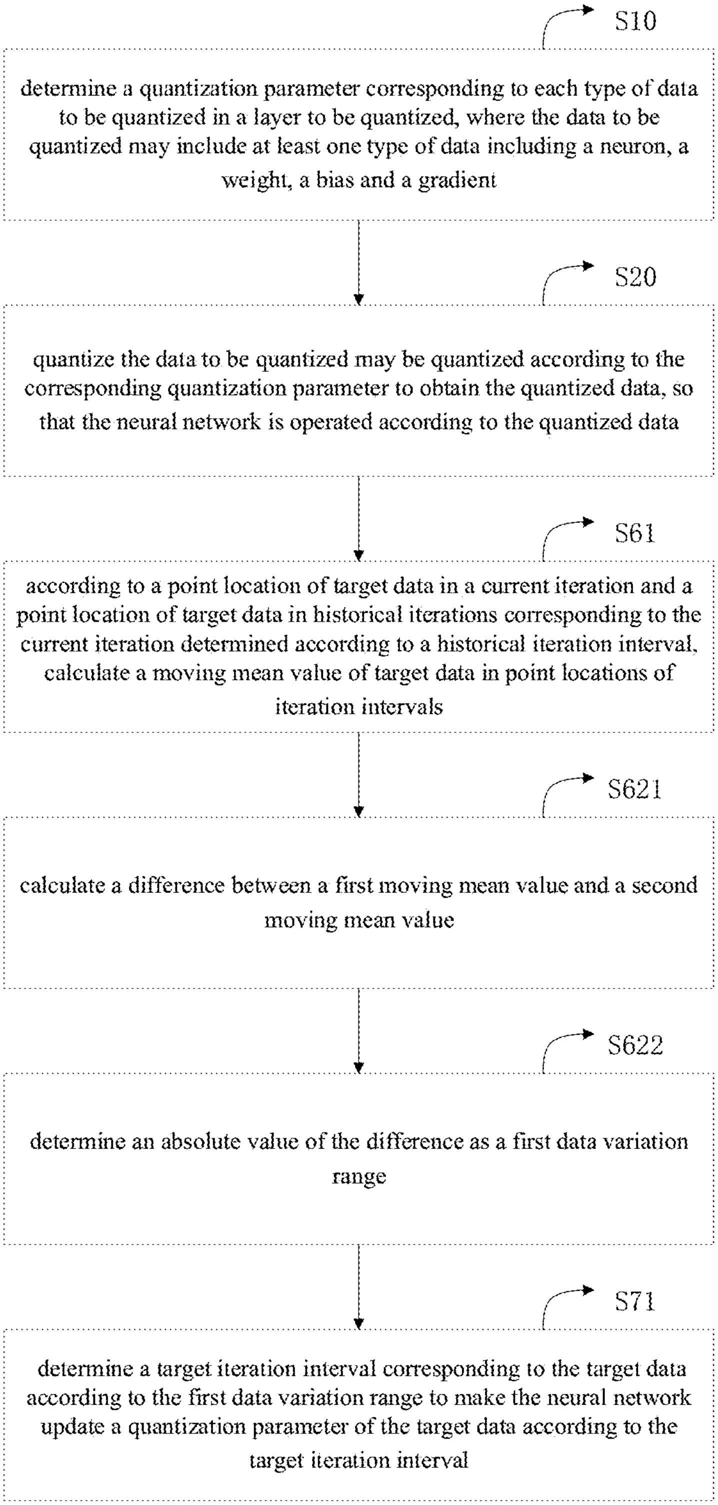
Figures 2, 3, 4, 5, 6, 7, 8, 9, 10, 11, 12, 13, 14, 15, 16, 17, 18, 19, 20, 21:
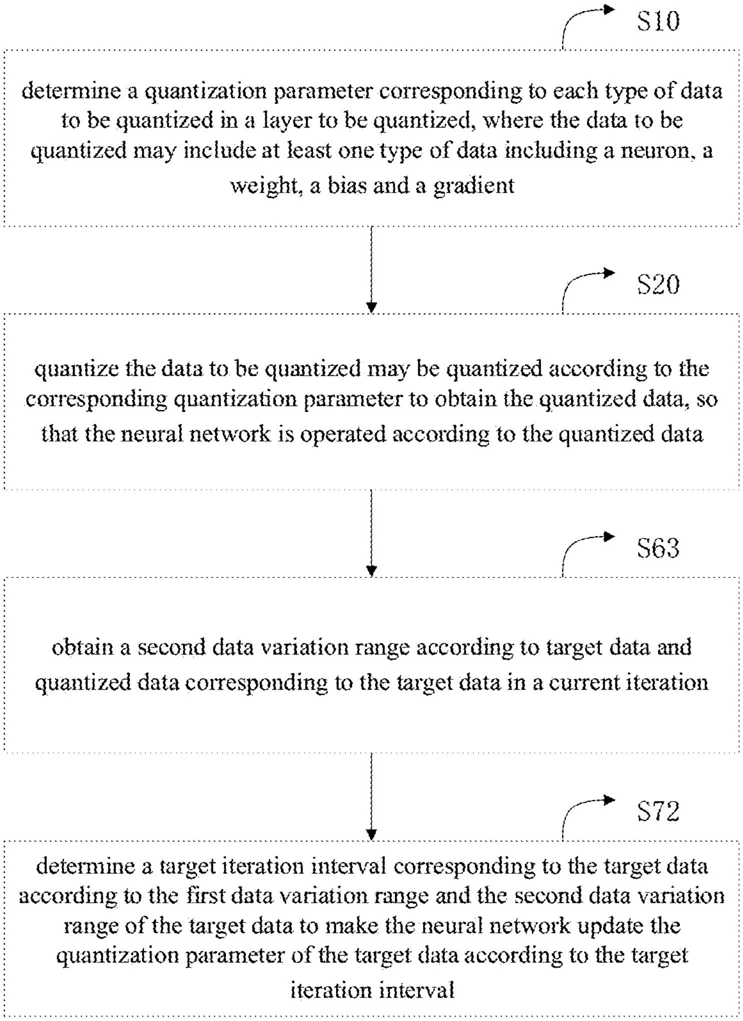
Figures 2, 3, 4, 5, 6, 7, 8, 9, 10, 11, 12, 13, 14, 15, 16, 17, 18, 19, 20, 21, 22:
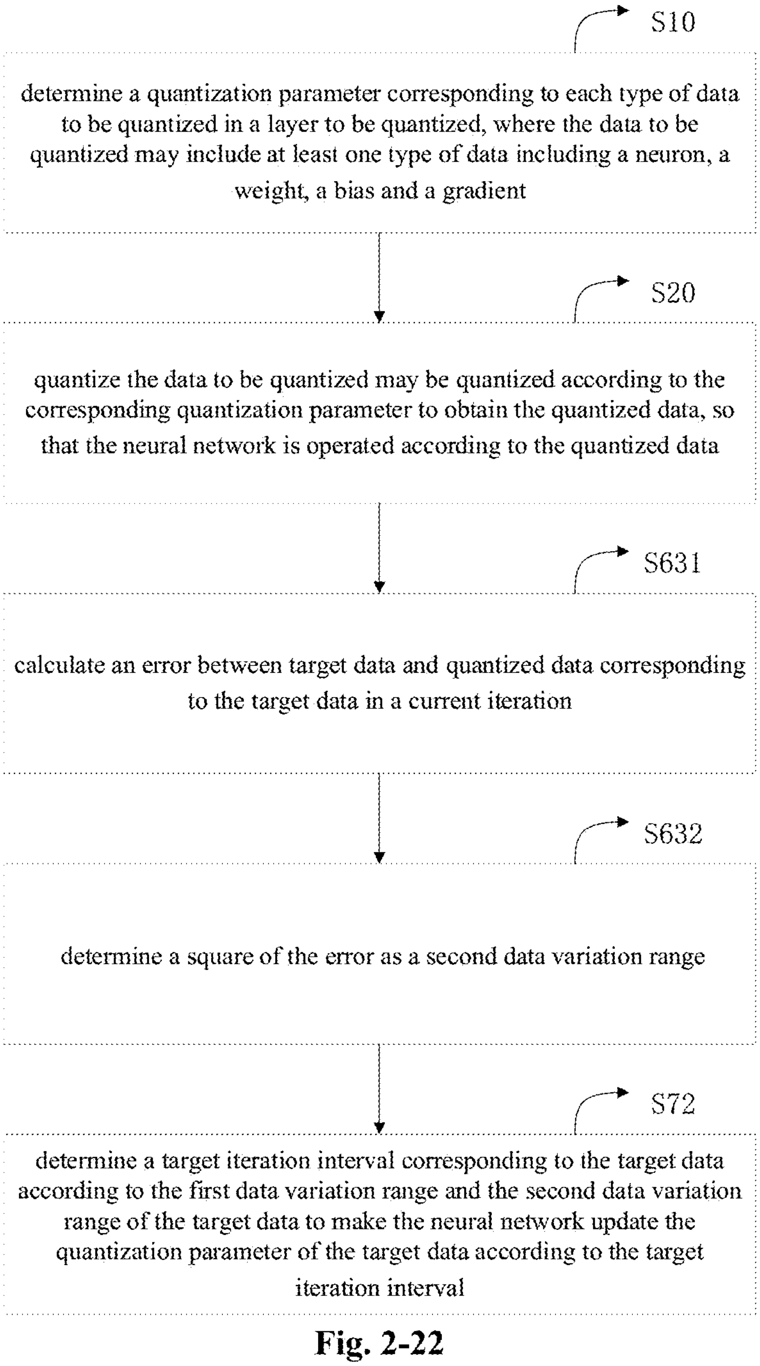
Figures 2, 3, 4, 5, 6, 7, 8, 9, 10, 11, 12, 13, 14, 15, 16, 17, 18, 19, 20, 21, 22, 23:
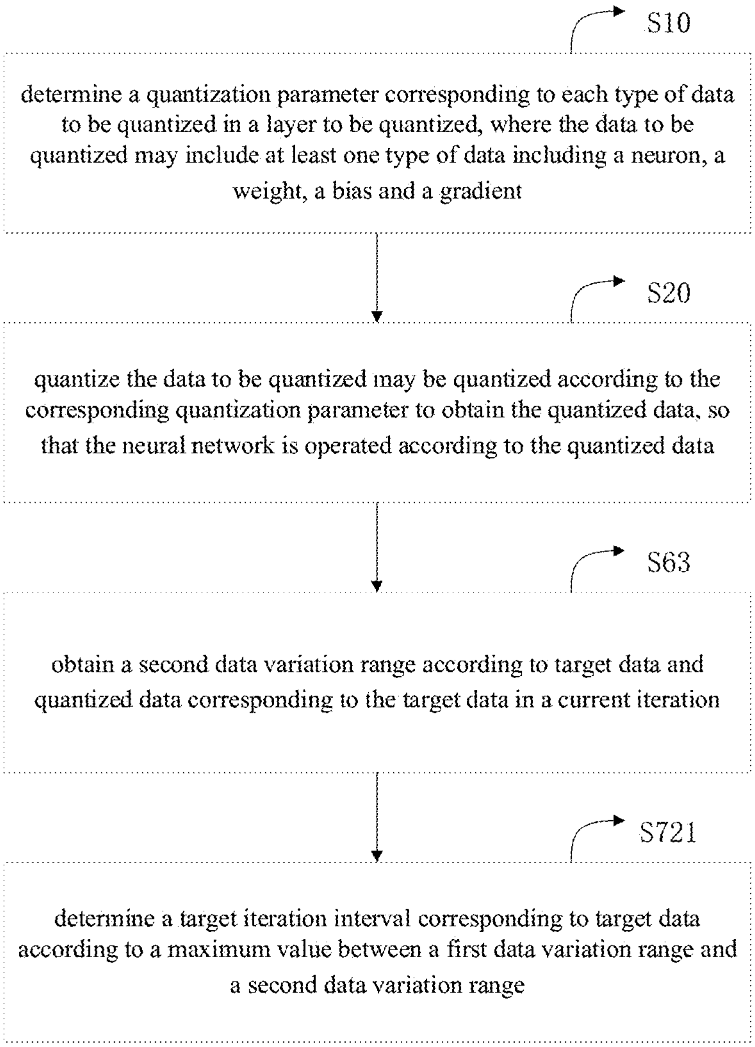
Figures 2, 3, 4, 5, 6, 7, 8, 9, 10, 11, 12, 13, 14, 15, 16, 17, 18, 19, 20, 21, 22, 23, 24:
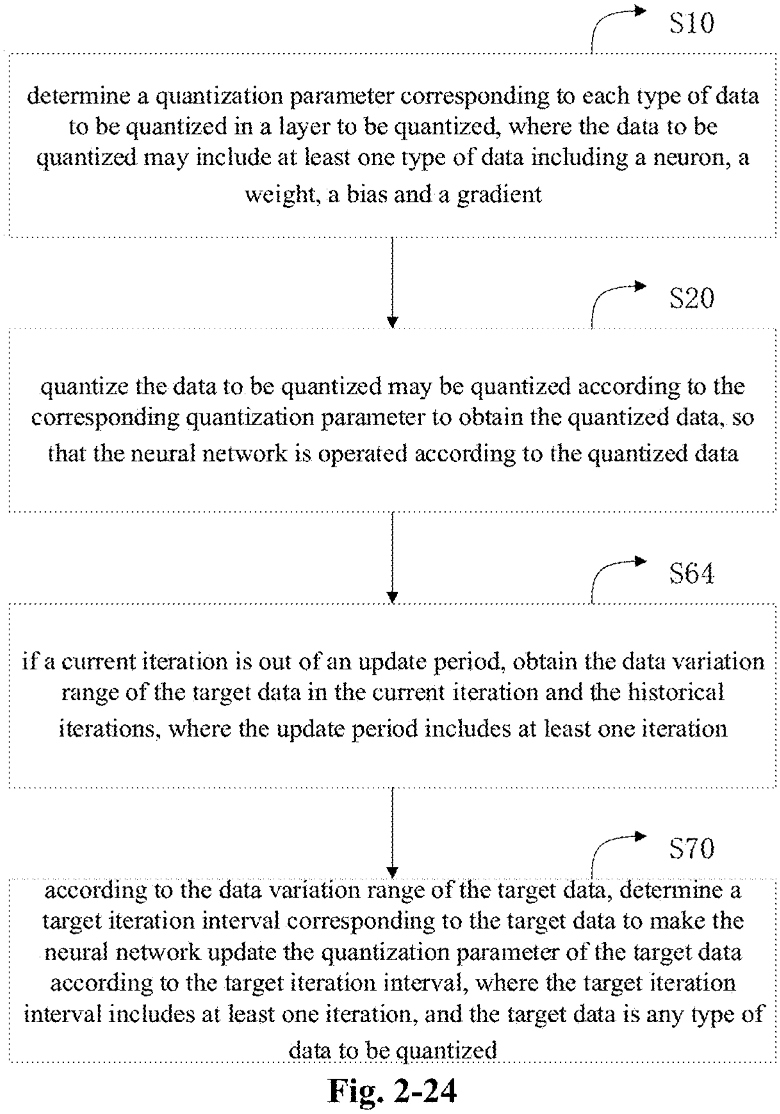
Figures 2, 3, 4, 5, 6, 7, 8, 9, 10, 11, 12, 13, 14, 15, 16, 17, 18, 19, 20, 21, 22, 23, 24, 25:
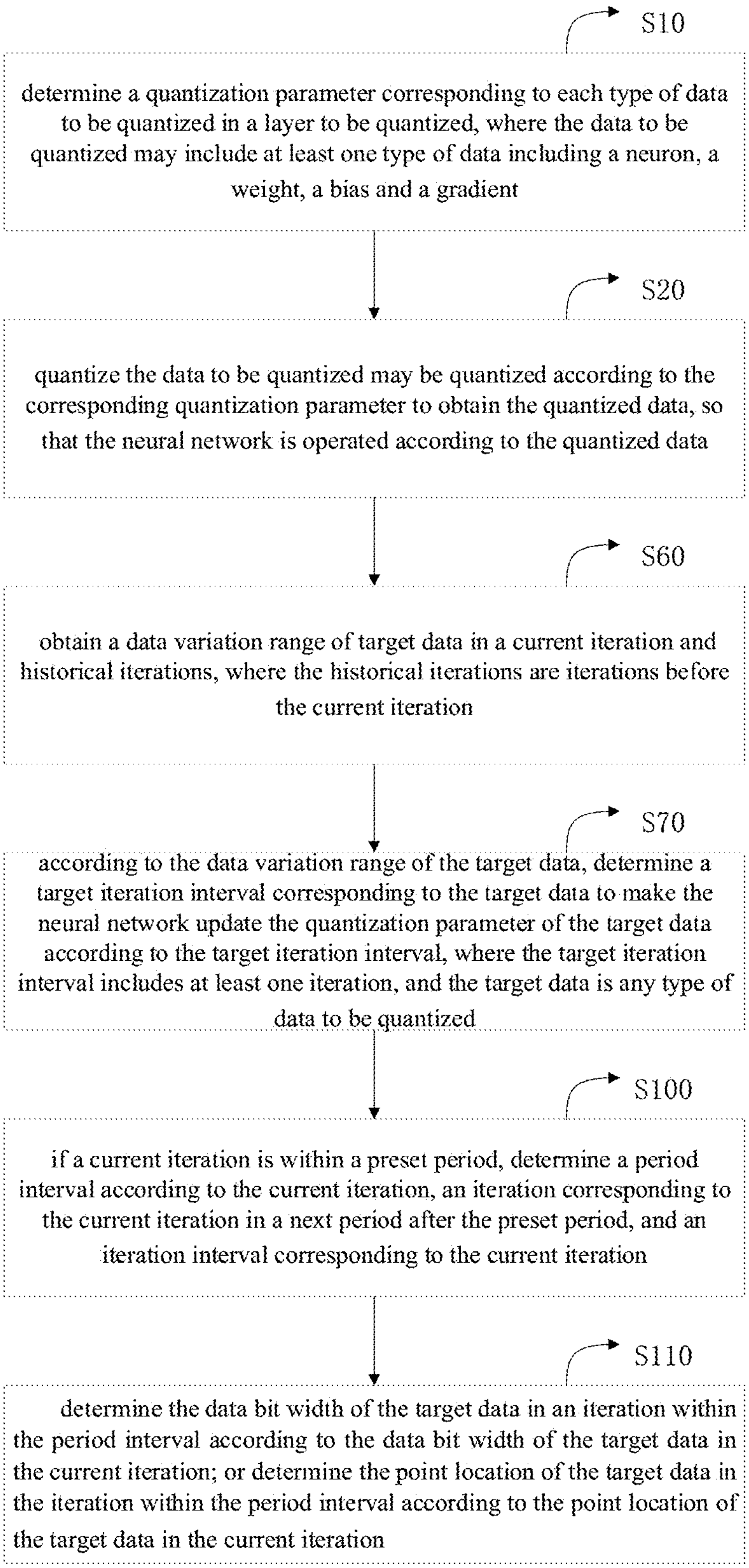
Figures 2, 3, 4, 5, 6, 7, 8, 9, 10, 11, 12, 13, 14, 15, 16, 17, 18, 19, 20, 21, 22, 23, 24, 25, 26:
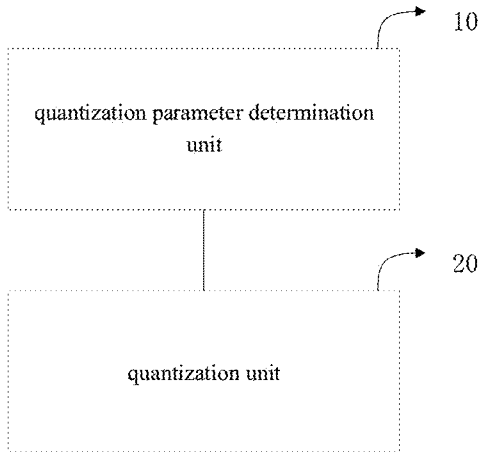
Figures 2, 3, 4, 5, 6, 7, 8, 9, 10, 11, 12, 13, 14, 15, 16, 17, 18, 19, 20, 21, 22, 23, 24, 25, 26, 27:
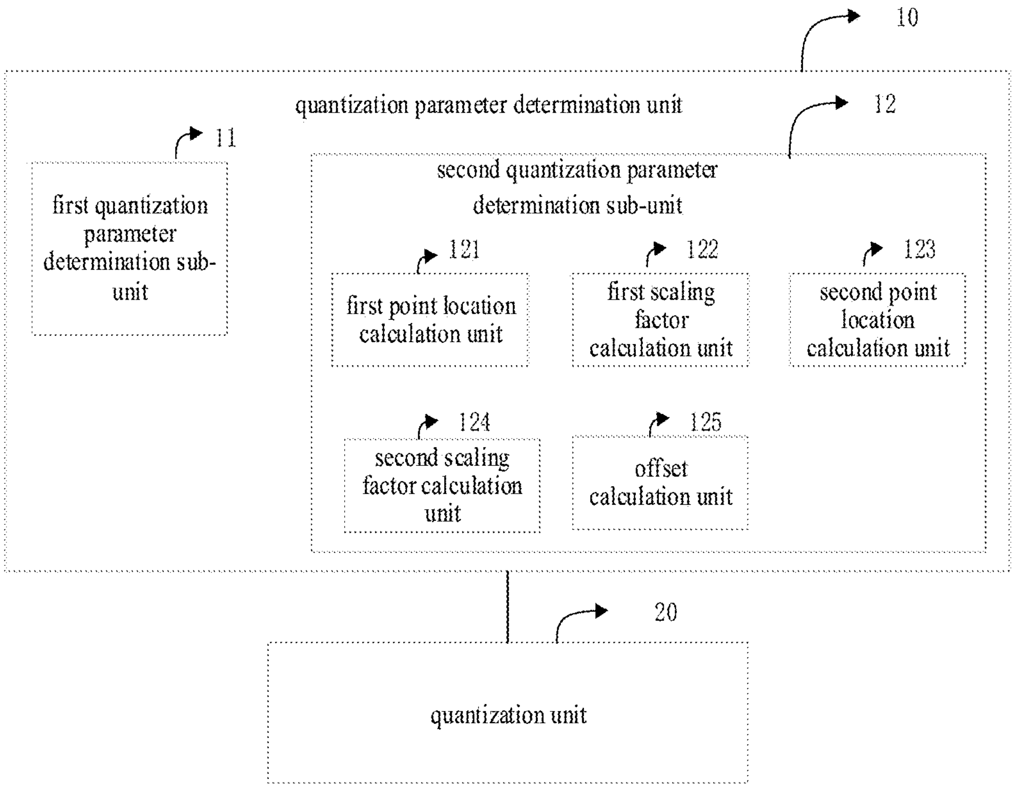
Figures 2, 3, 4, 5, 6, 7, 8, 9, 10, 11, 12, 13, 14, 15, 16, 17, 18, 19, 20, 21, 22, 23, 24, 25, 26, 27, 28:
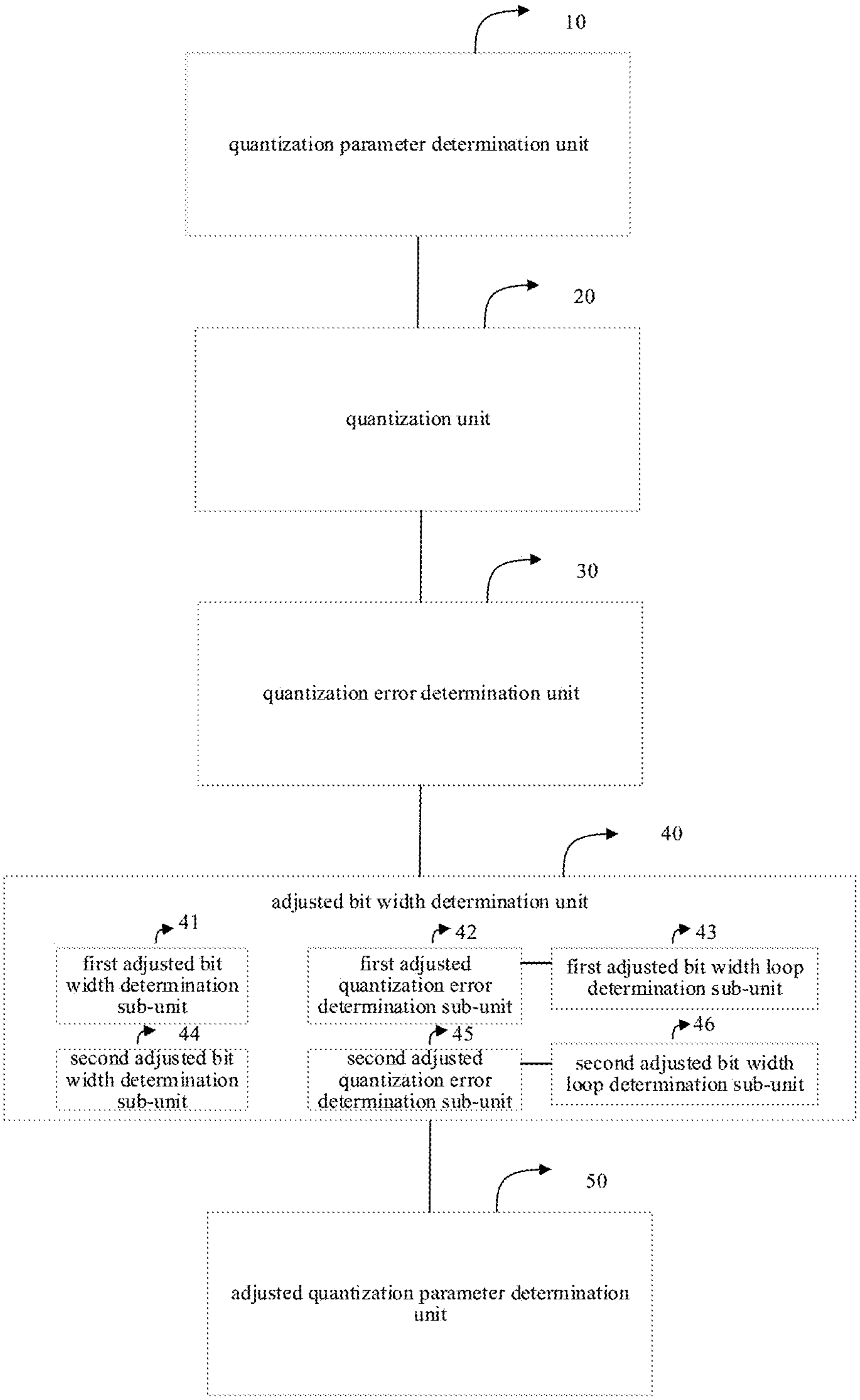
Figures 2, 3, 4, 5, 6, 7, 8, 9, 10, 11, 12, 13, 14, 15, 16, 17, 18, 19, 20, 21, 22, 23, 24, 25, 26, 27, 28, 29:
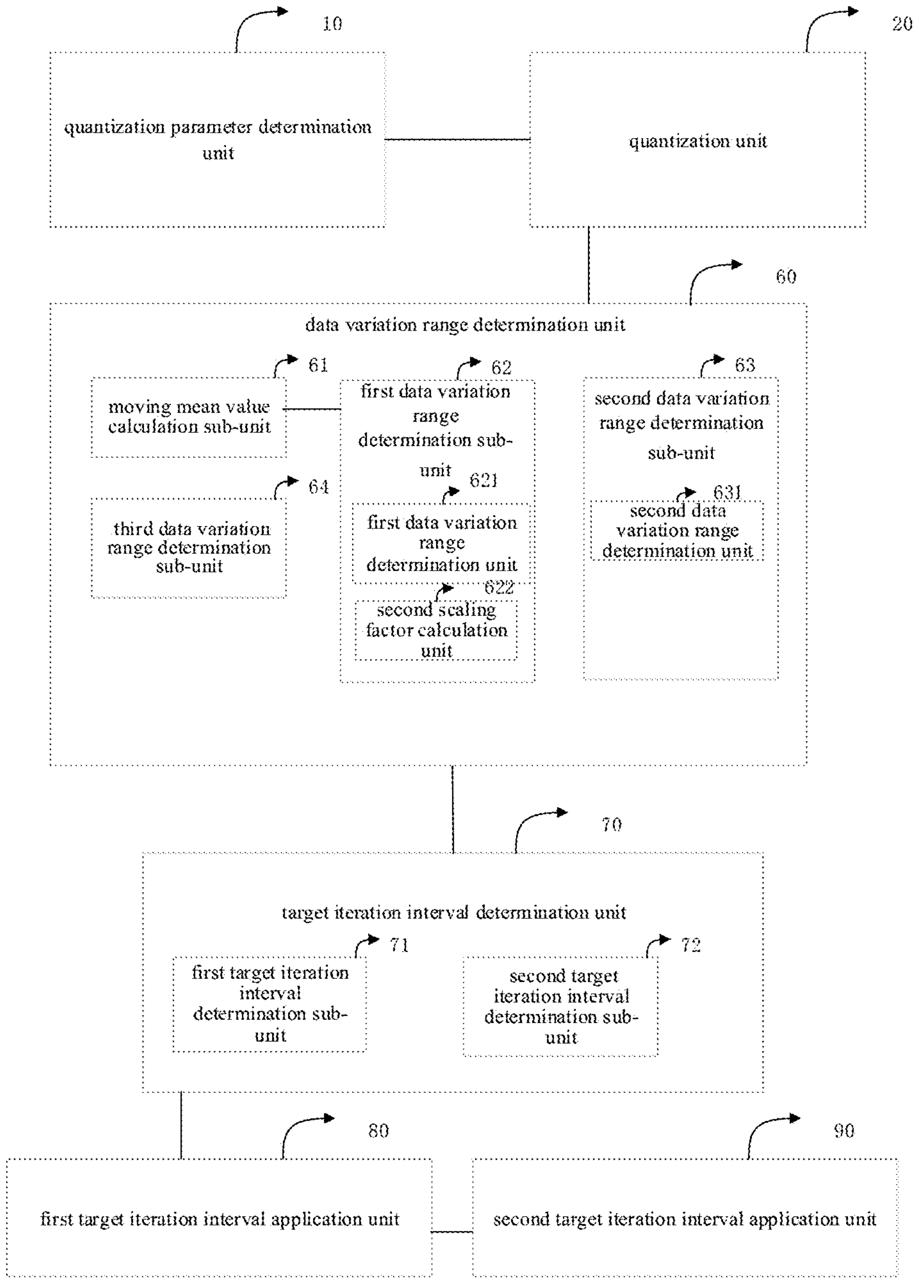
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30:
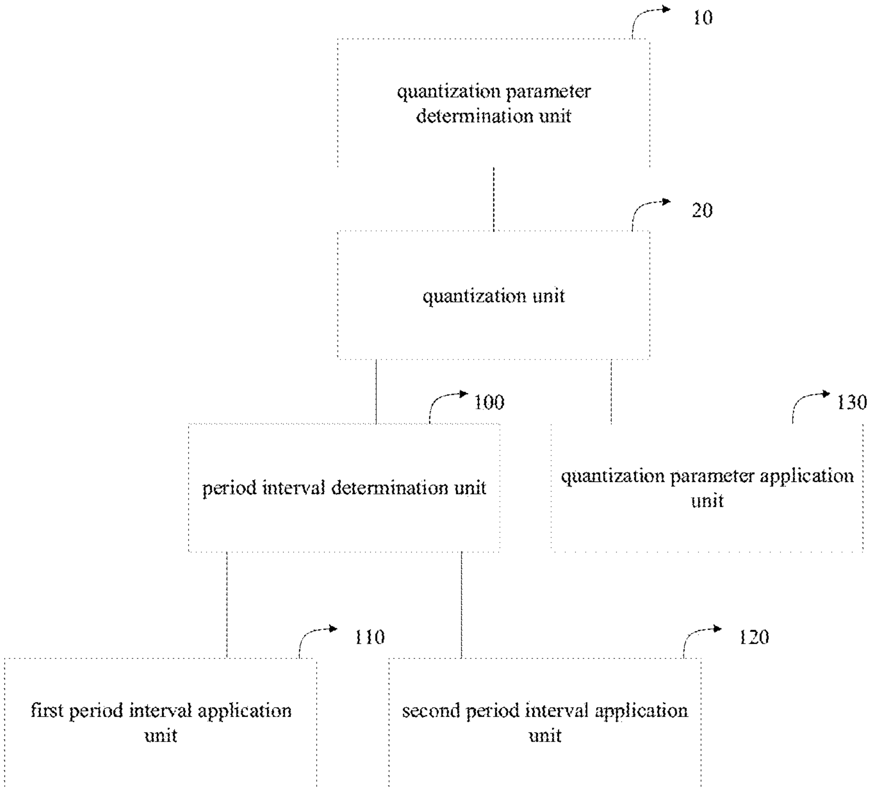
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31:
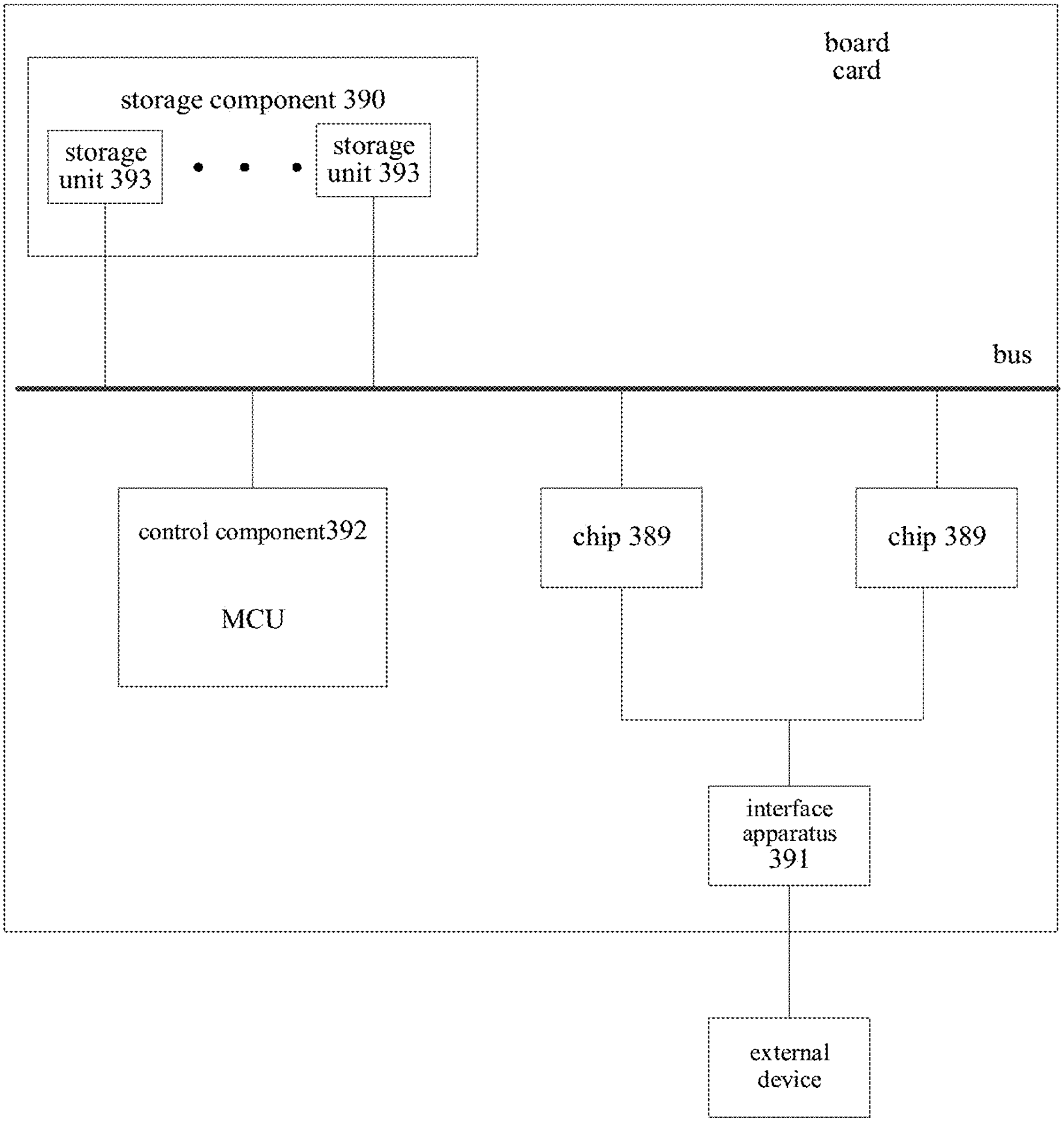
Figure 3:
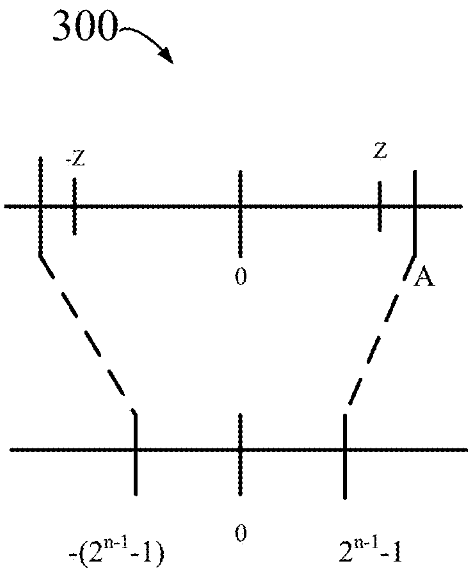
Figures 1, 3:
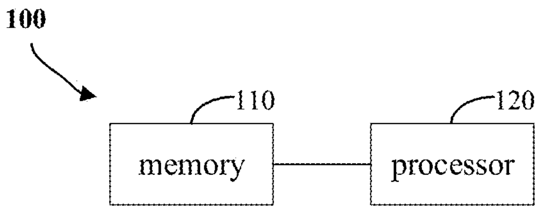
Figures 2, 3:
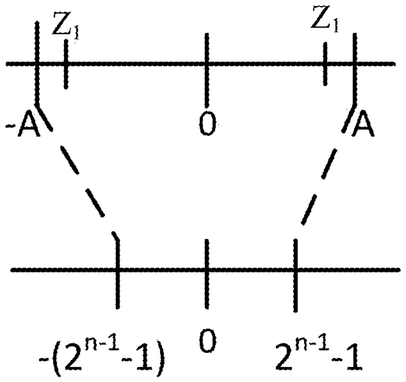
Figure 3:
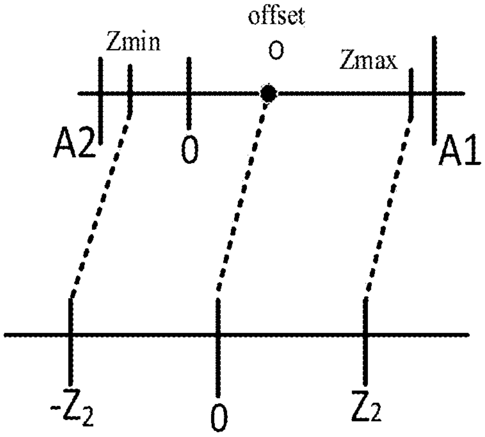
Figures 3, 4:
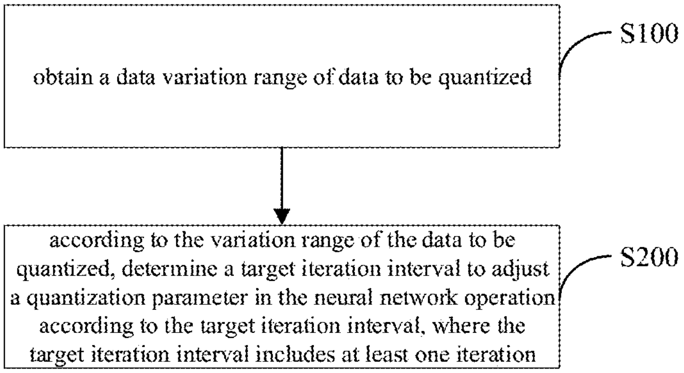
Figures 3, 4, 5:
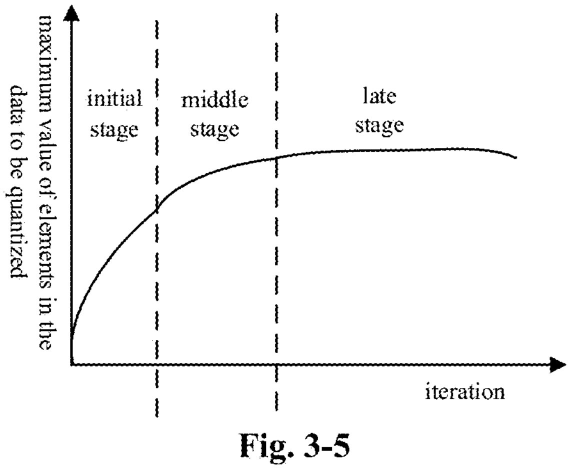
Figures 3, 4, 5, 6:
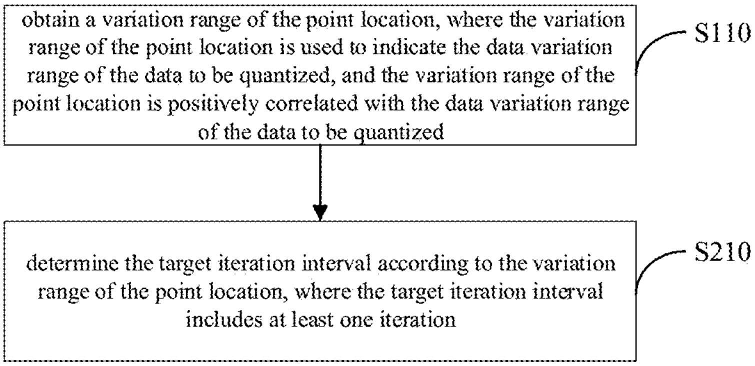
Figures 3, 4, 5, 6, 7:
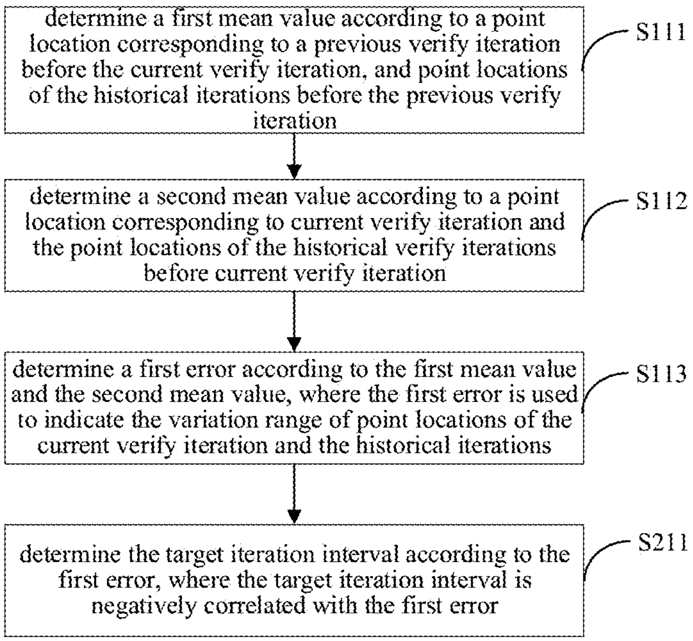
Figures 3, 4, 5, 6, 7, 8:
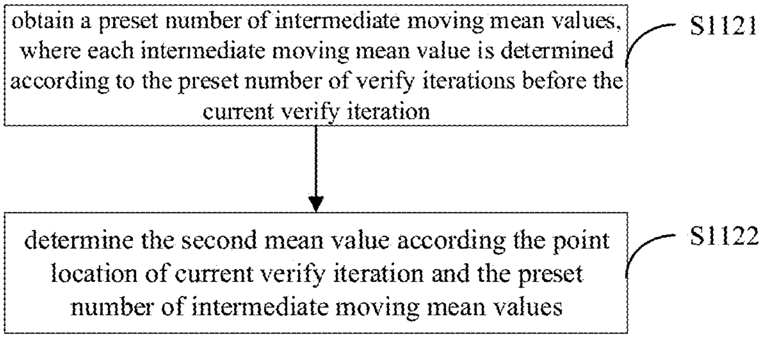
Figures 3, 4, 5, 6, 7, 8, 9:
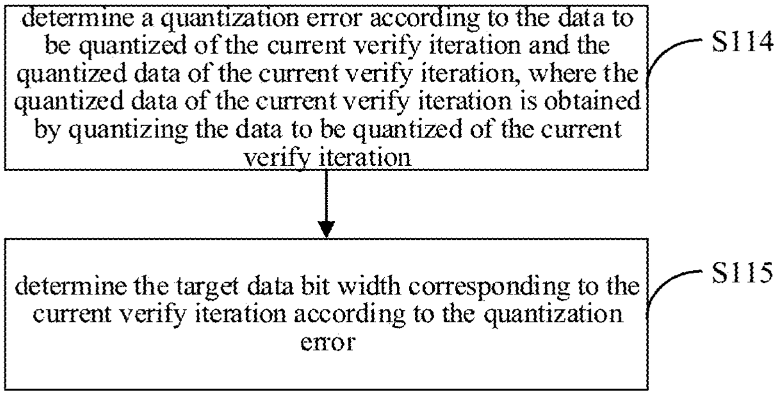
Figures 3, 4, 5, 6, 7, 8, 9, 10:
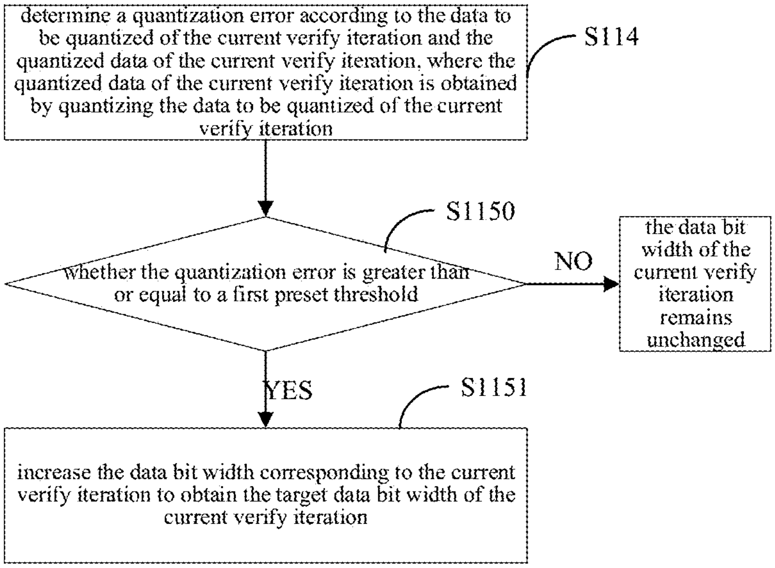
Figures 3, 4, 5, 6, 7, 8, 9, 10, 11:
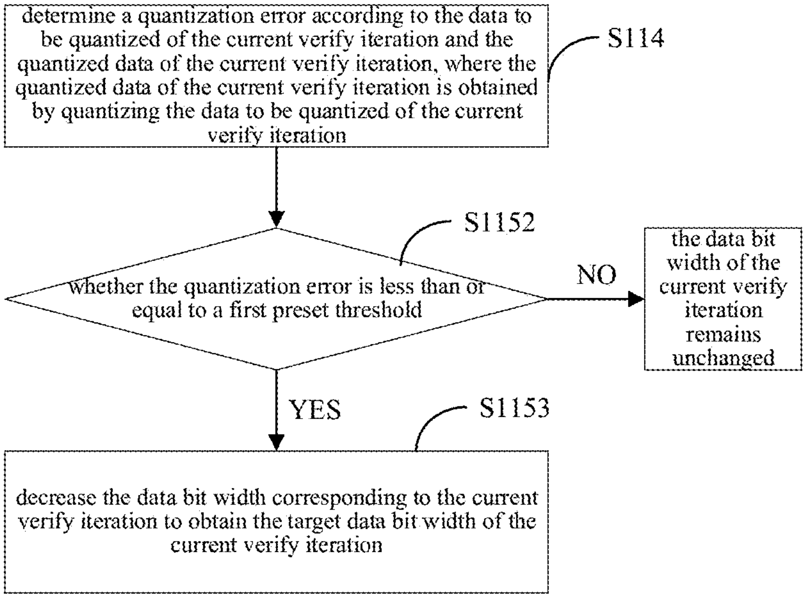
Figures 3, 4, 5, 6, 7, 8, 9, 10, 11, 12:
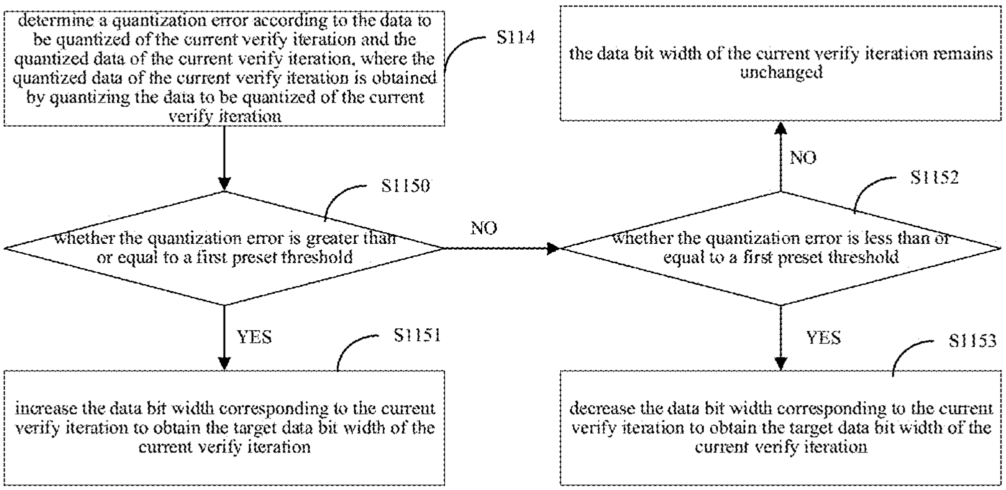
Figures 3, 4, 5, 6, 7, 8, 9, 10, 11, 12, 13:
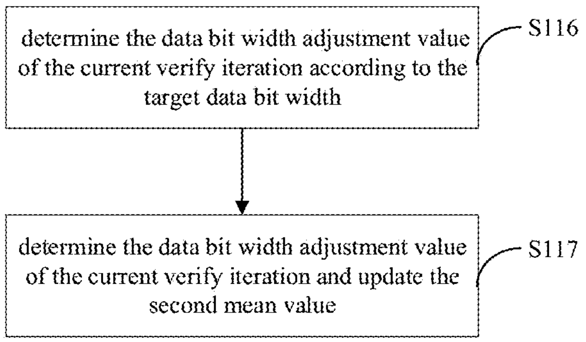
Figures 3, 4, 5, 6, 7, 8, 9, 10, 11, 12, 13, 14:
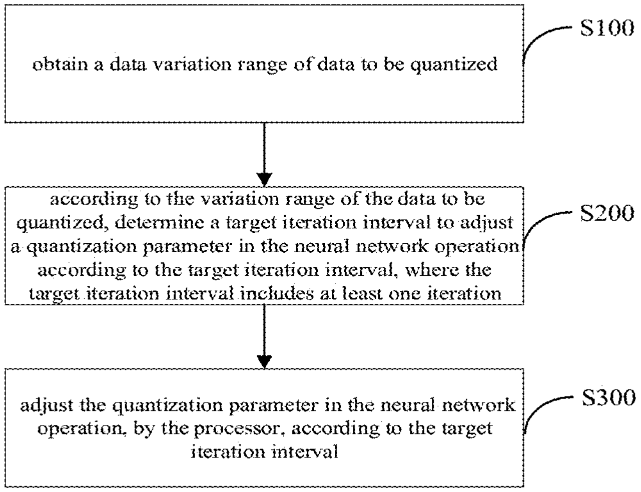
Figures 3, 4, 5, 6, 7, 8, 9, 10, 11, 12, 13, 14, 15:
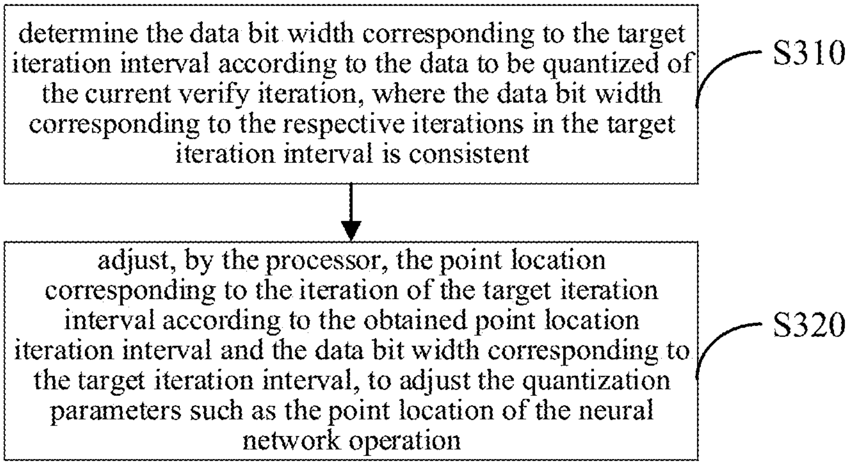
Figures 3, 4, 5, 6, 7, 8, 9, 10, 11, 12, 13, 14, 15, 16:
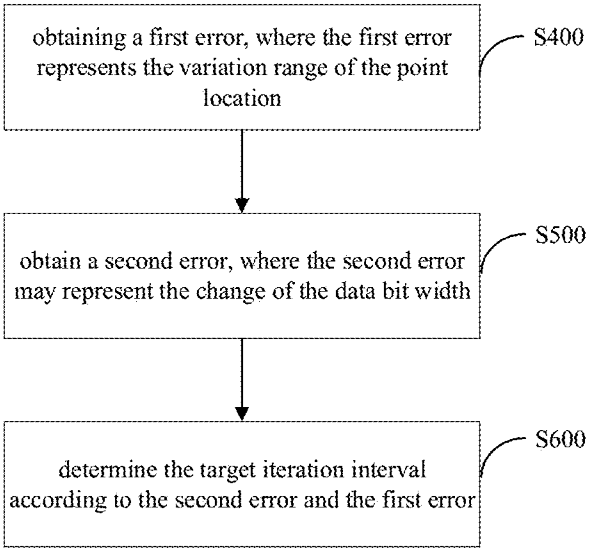
Figures 3, 4, 5, 6, 7, 8, 9, 10, 11, 12, 13, 14, 15, 16, 17:
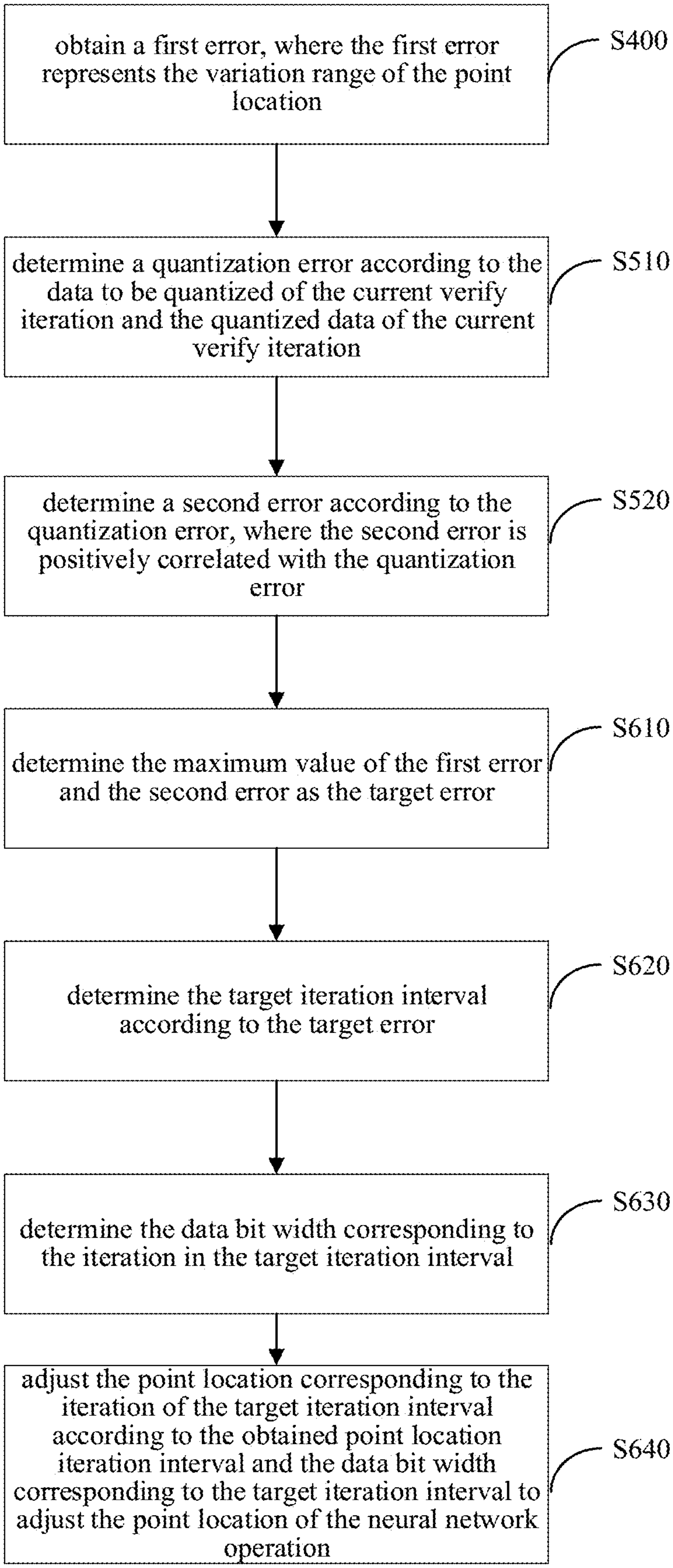
Figures 3, 4, 5, 6, 7, 8, 9, 10, 11, 12, 13, 14, 15, 16, 17, 18:
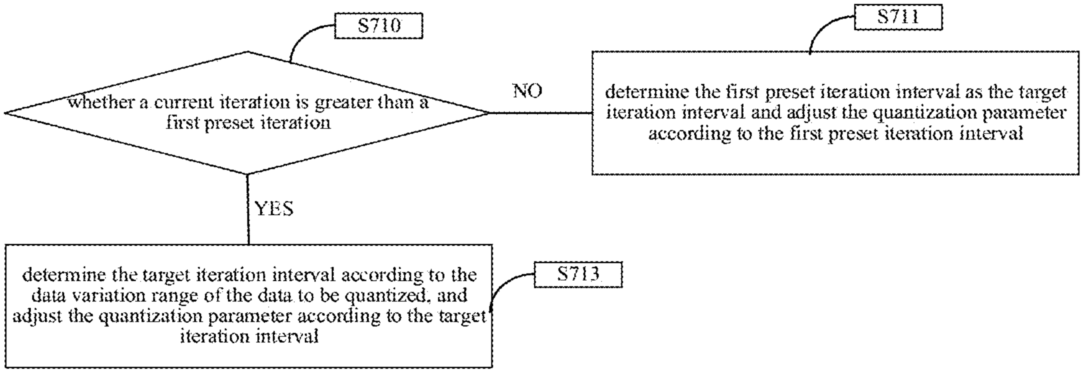
Figures 3, 4, 5, 6, 7, 8, 9, 10, 11, 12, 13, 14, 15, 16, 17, 18, 19:
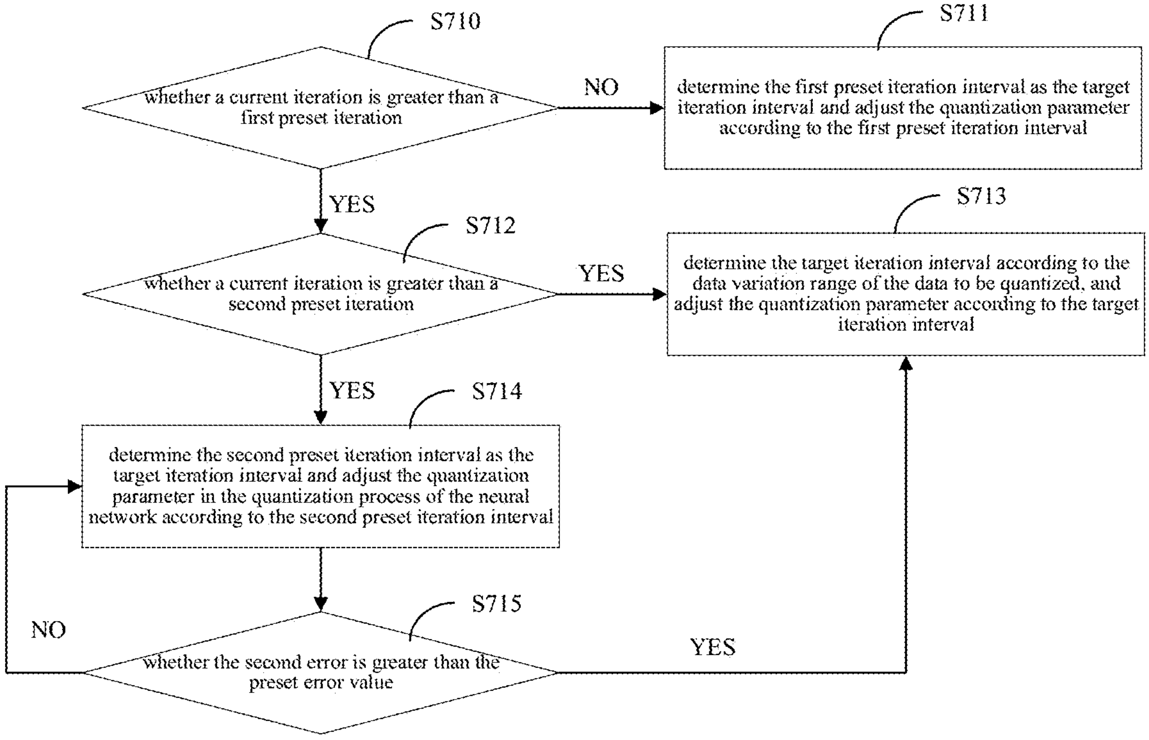
Figures 3, 4, 5, 6, 7, 8, 9, 10, 11, 12, 13, 14, 15, 16, 17, 18, 19, 20:
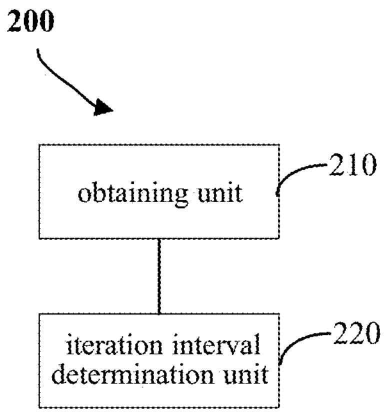
Figures 3, 4, 5, 6, 7, 8, 9, 10, 11, 12, 13, 14, 15, 16, 17, 18, 19, 20, 21:
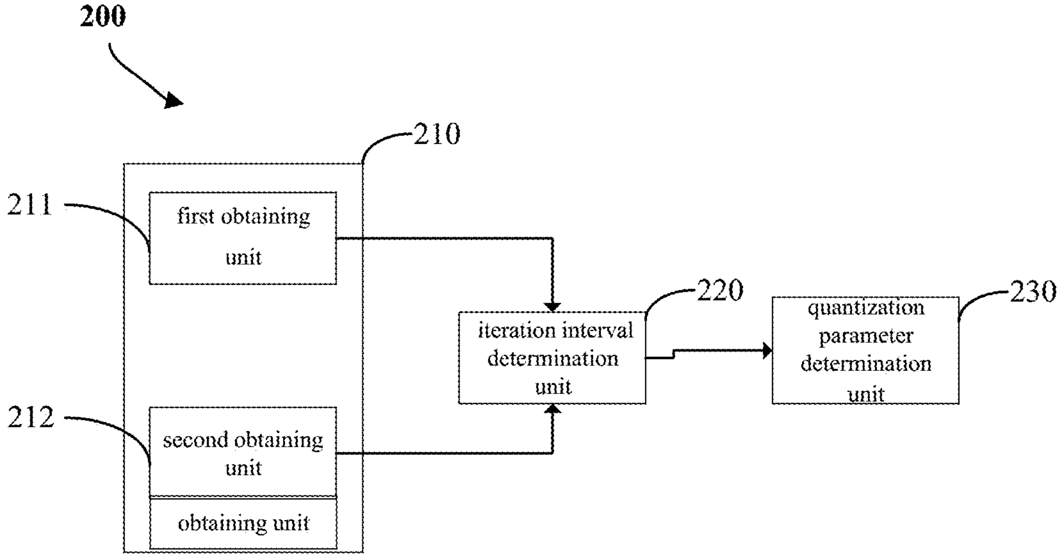
Figures 3, 4, 5, 6, 7, 8, 9, 10, 11, 12, 13, 14, 15, 16, 17, 18, 19, 20, 21, 22:
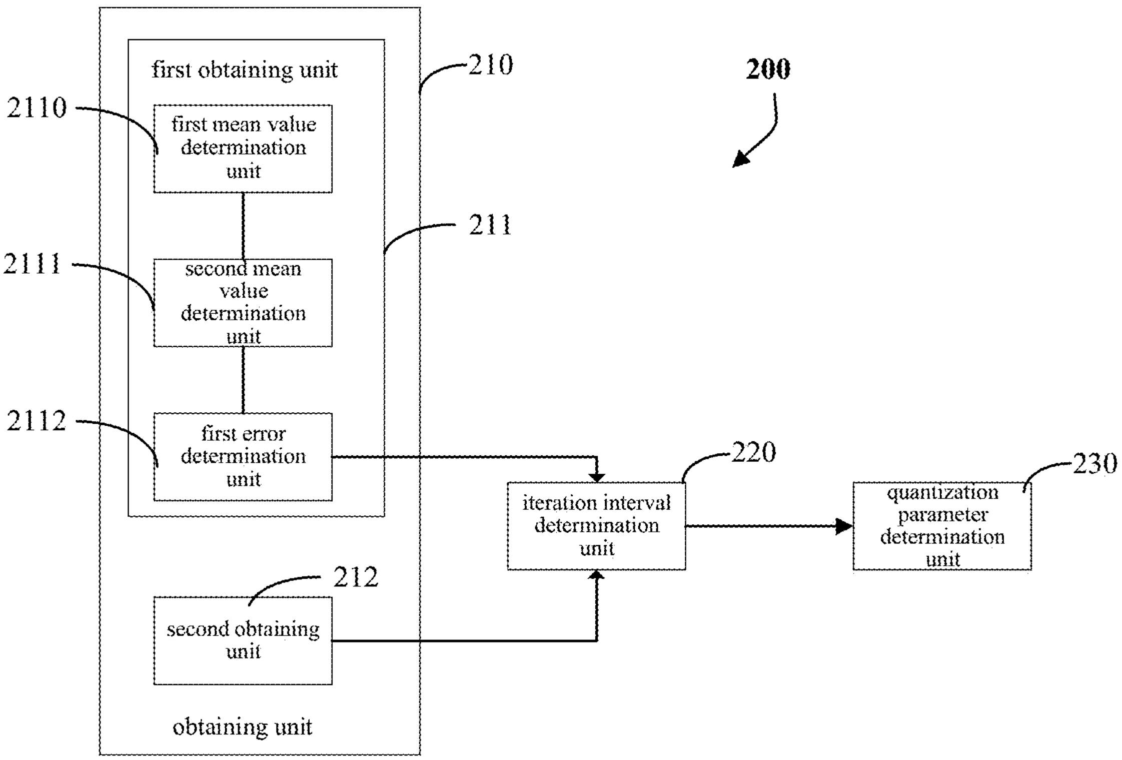
Figures 3, 4, 5, 6, 7, 8, 9, 10, 11, 12, 13, 14, 15, 16, 17, 18, 19, 20, 21, 22, 23:
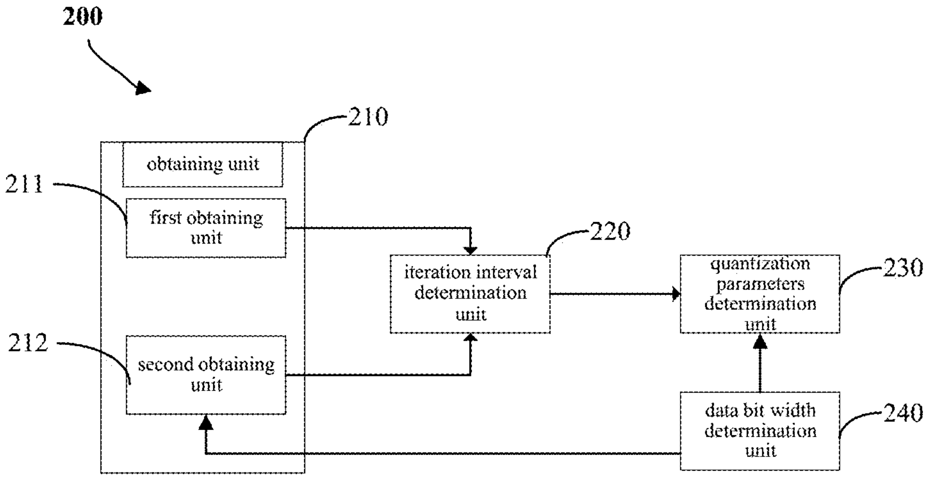
Figures 3, 4, 5, 6, 7, 8, 9, 10, 11, 12, 13, 14, 15, 16, 17, 18, 19, 20, 21, 22, 23, 24:
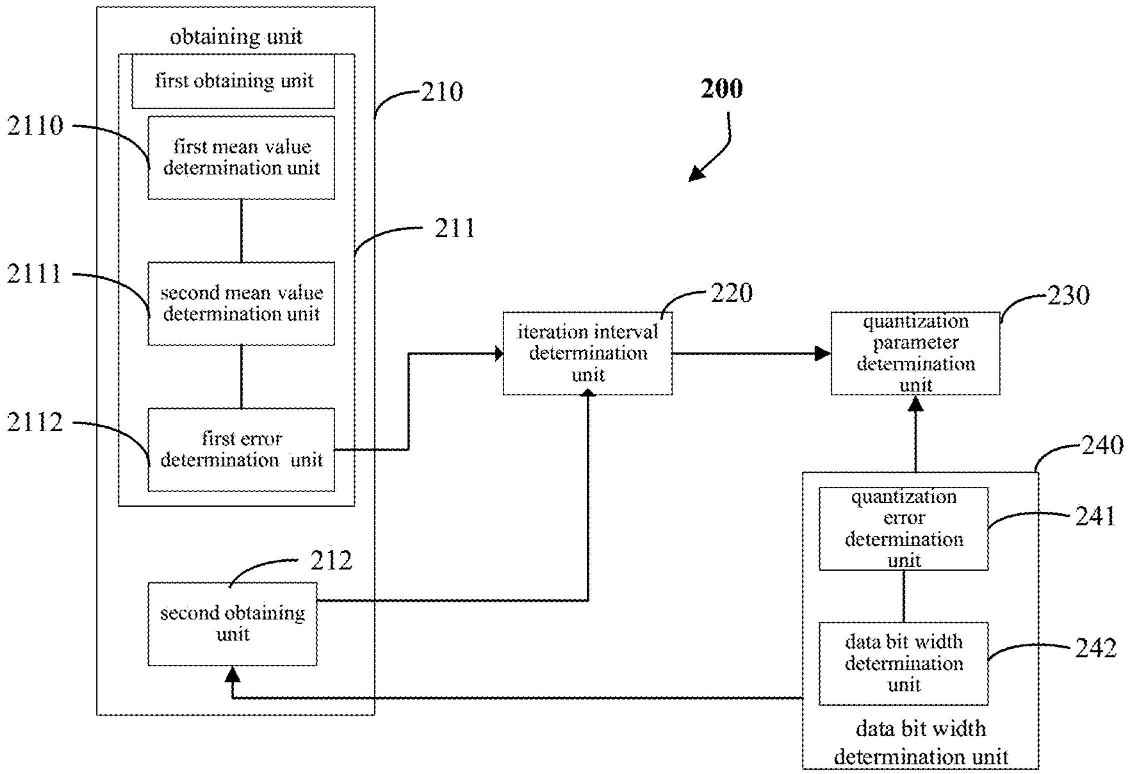
Figures 3, 4, 5, 6, 7, 8, 9, 10, 11, 12, 13, 14, 15, 16, 17, 18, 19, 20, 21, 22, 23, 24, 25:
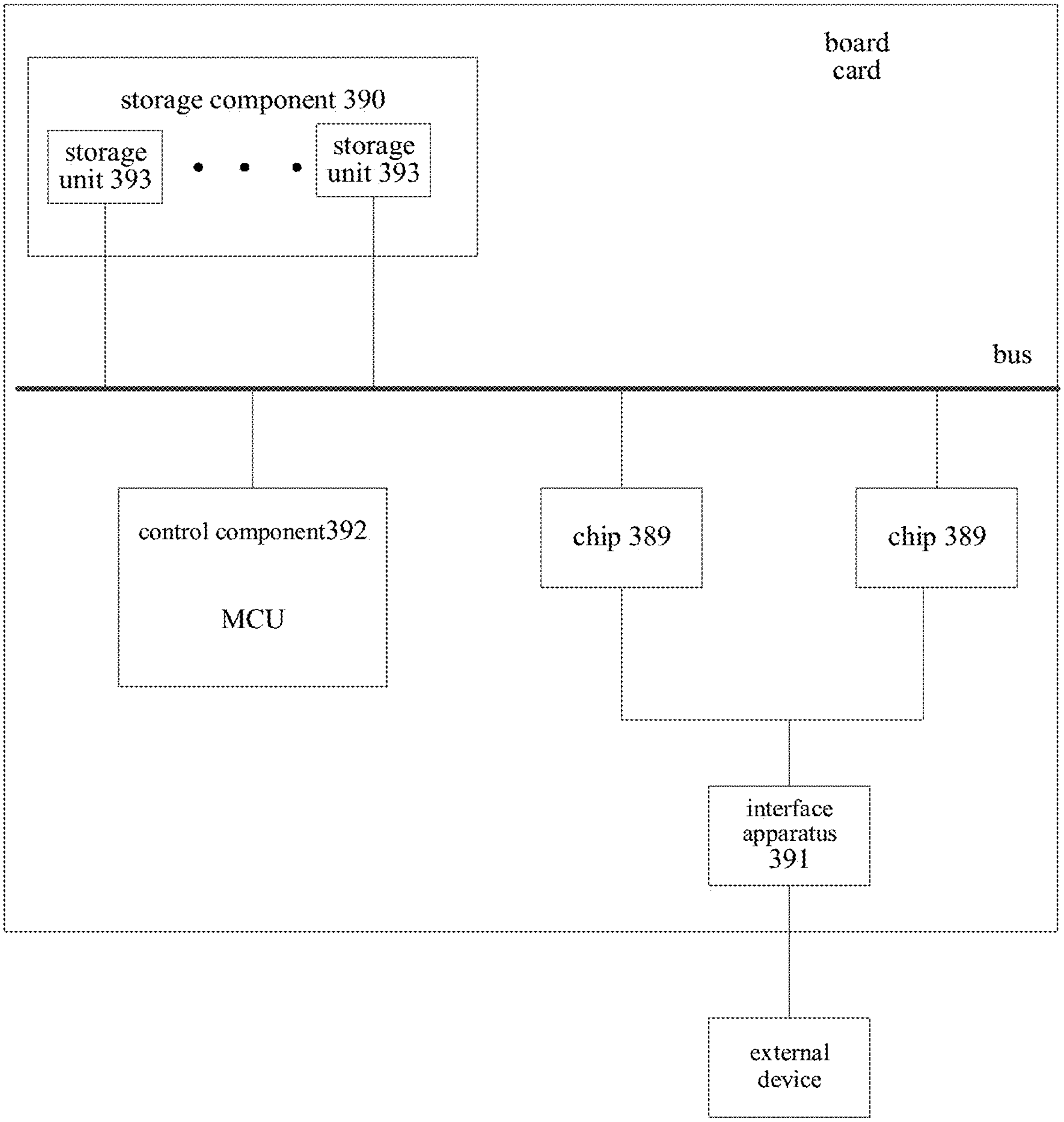
Figure 4:
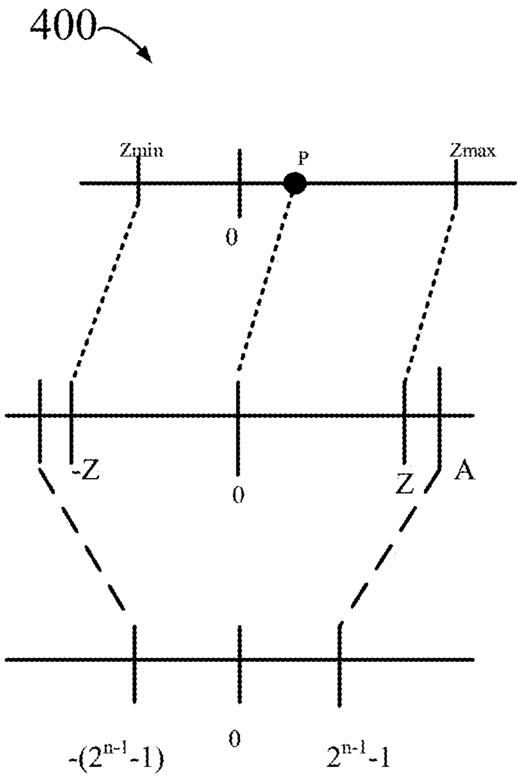

FIG. 12 is a structural block diagram of a board card according to an embodiment of the present disclosure. Referring to FIG. 12, in addition to the above-mentioned chip 389, the board card may further include other matching components. The matching components may include, but are not limited to, a storage component 390, an interface device 391, and a control component 392.

The storage component 390 is connected to the artificial intelligence chip through a bus, and is configured to store data.

The storage component may include a plurality of groups of storage units 393.

Each group of storage units is connected to the artificial intelligence chip through the bus.

It may be understood that each group of the storage units may be a DDR SDRAM (Double Data Rate Synchronous Dynamic Random Access Memory).

DDR may double the speed of SDRAM without increasing the clock frequency.

DDR allows data to be read on the rising and falling edges of the clock pulse.

A speed of DDR is twice that of standard SDRAM.

In an embodiment, the memory device may include 4 groups of storage units.

Each group of storage units may include a plurality of DDR4 particles (chips).

In an embodiment, four 72-bit DDR4 controllers may be arranged inside the artificial intelligence chip, where 64 bit of each 72-bit DDR4 controller is for data transfer and 8 bit is for an ECC (Error Checking and Correcting) parity.

It may be understood that when each group of the storage units adopts DDR4-3200 particles, theoretical bandwidth of data transfer may reach 25600 MB/s.

In an embodiment, each group of the storage units may include a plurality of DDR SDRAMs arranged in parallel.

A DDR may transfer data twice per clock cycle.

A DDR controller may be arranged inside the chip for controlling the data transfer and data storage of each storage unit.

The interface device may be electrically connected to the artificial intelligence chip.

The interface device is configured to realize data transfer between the artificial intelligence chip and an external device (such as a server or a computer).

In an embodiment, the interface device may be a standard PCIe interface.

For instance, data to be processed may be transferred by a server through the standard PCIE interface to the chip, thereby realizing data transfer.

Alternatively, when a PCIe 3.0×16 interface is adopted for transferring, theoretical bandwidth may reach 16000 MB/s.

In another embodiment, the interface device may also be other interfaces. A specific representation of the other interfaces is not limited herein, as long as the interface unit may realize a switching function.

In addition, a computation result of the artificial intelligence chip may still be transferred by the interface device to an external device (such as a server).

The control component is electrically connected to the artificial intelligence chip.

The control component is configured to monitor a state of the artificial intelligence chip.

Specifically, the artificial intelligence chip and the control component may be electrically connected through an SPI (Serial Peripheral Interface).

The control component may include a MCU (Micro Controller Unit).

If the artificial intelligence chip includes a plurality of processing chips, a plurality of processing cores, or a plurality of processing circuits, the chip is capable of driving a plurality of loads.

In this case, the artificial intelligence chip may be in different working state such as multi-load state and light-load state.

The working state of the plurality of processing chips, the plurality of processing cores, or a plurality of processing circuits may be regulated and controlled by the control device.

In a possible implementation, an electronic equipment is provided. The electronic equipment includes the artificial intelligence chip.

The electronic equipment includes a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device.

The vehicle includes an airplane, a ship, and/or a car; the household electrical appliance may include a television, an air conditioner, a microwave oven, a refrigerator, an electric rice cooker, a humidifier, a washing machine, an electric lamp, a gas cooker, and a range hood; and the medical equipment may include a nuclear magnetic resonance spectrometer, a B-ultrasonic scanner, and/or an electrocardiograph.

The foregoing may be better understood according to the following articles:

A1.

A method for adjusting data bit width, comprising:

obtaining a data bit width used to perform a quantization on data to be quantized, where the data bit width indicates the bit width of the quantized data after the data to be quantized being quantized;

performing a quantization on a group of data to be quantized based on the data bit width to convert a group of data to be quantized to a group of quantized data, where the group of quantized data has the data bit width;

comparing the group of data to be quantized the group of quantized data to determine a quantization error correlated with the data bit width; and adjusting the data bit width based on the determined quantization error.

A2.

The method of article A1, where comparing the group of data to be quantized with the group of quantized data to determine a quantization error correlated with the data bit width includes:

determining a quantization interval according to the data bit width; and determining the quantization error according to the quantization interval, the group of the quantized data and the group of data to be quantized.

A3.

The method of article A2, where determining the quantization error according to the quantization interval, the group of the quantized data and the group of the data to be quantized includes:

inversely quantizing the group of quantized data according to the quantization interval to obtain a group of quantized inversely data, where a data format of the group of quantized inversely data is the same with a data format of the group of the data to be quantized; and determining a quantization error according to the group of quantized inversely data and the group of data to be quantized.

A4.

The method of any of articles A1 to A3, where adjusting the data bit width based on the determined quantization error includes:

comparing the quantization error and a preset threshold, where the preset threshold includes at least one of a first threshold and a second threshold; and adjusting the data bit width according to a comparison result.

A5.

The method of article A4, where adjusting the data bit width according to the comparison result includes:

increasing the data bit width when the quantization error is greater than or equal to the first threshold.

A6.

The method of article A5, where increasing the data bit width includes:

increasing the data bit width according to a first preset bit width stride to determine an adjusted data bit width.

A7.

The method of article A6, further comprising:

performing the quantization on the group of data to be quantized based on the adjusted data bit width to convert the group of data to be quantized to another group of quantized data, where the another group of quantized data has the adjusted data bit width; and comparing the group of data to be quantized with the another group of quantized data to determine another quantization error correlated with an adjusted data bit width until the another quantization error is less than the first preset threshold.

A8.

The method of article A7, where the method is performed iteratively.

A9.

The method of article A4, where adjusting the data bit width according to the comparison result includes:

decreasing the data bit width when the quantization error is less than or equal to a second threshold.

A10.

The method of article A9, where decreasing the data bit width includes:

decreasing the data bit width according to a second preset bit width stride to determine an adjusted bit width.

A11.

The method of article A10, further comprising:

performing the quantization on the group of data to be quantized based on the adjusted data bit width to convert the group of data to be quantized to another group of quantized data, where the another group of quantized data has the adjusted data bit width; and determining another quantization error correlated with the adjusted data bit width based on the group of data to be quantized and the another group of quantized data until the another quantization error is greater than the second preset threshold.

A12.

The method of article A11, where the method is performed iteratively.

A13.

The method of article A4, where adjusting the data bit width according to the comparison result includes:

maintaining the data bit width when the quantization error is between the first threshold and the second threshold.

A14.

The method of any of articles A1 to A13, further comprising:

updating a quantization parameter configured to perform the quantization on the group of data to be quantized based on the group of data to be quantized and the adjusted bit width; and performing the quantization on the group of data to be quantized based on an updated quantization parameter.

A15.

The method of article A1, further comprising:

obtaining a data variation range of data to be quantized;

according to the data variation range of the data to be quantized, determining a target iteration interval to adjust the data bit width according to the target iteration interval, where the target iteration interval includes at least one iteration.

A16.

The method of article A15, where obtaining the data variation range of the data to be quantized includes:

obtaining a variation range of a point location, where the variation range of the point location is used to indicate the data variation range of the data to be quantized, and the variation range of the point location is positively correlated with the data variation range of the data to be quantized.

A17.

The method of article A16, where obtaining the variation range of the point location includes:

determining a first mean value according to a point location corresponding to a previous verify iteration before the current verify iteration, and point locations of historical iterations before the previous verify iteration, where the previous verify iteration refers to a verify iteration corresponding to the previous iteration interval before the target iteration interval;

determining a second mean value according to a point location corresponding to the current verify iteration and the point locations of the historical verify iterations before current verify iteration, where the point location corresponding to the current verify iteration is determined according to the target data bit width corresponding to the current verify iteration and the data to be quantized; and determining a first error according to the first mean value and the second mean value, where the first error is used to indicate the variation range of the point location.

A18.

The method of article A15, where determining the target iteration interval according to the data variation range of the data to be quantized includes:

determining the target iteration interval according to the first error, where the target iteration interval is negatively correlated with the first error.

A19.

The method of article A15, where obtaining the data variation range of the data to be quantized includes:

obtaining a variation trend of the data bit width; and determining the data variation range of the data to be quantized according to the variation range of the point location and the variation trend of the data bit width.

A20.

The method of article A19, where determining the target iteration interval according to the data variation range of the data to be quantized includes:

determining the target iteration interval according to the first error and the second error, where the first error is used to indicate the variation range of the point location, and the second error is used to indicate the variation range of the data bit width.

A21.

The method of article A20, where determining the target iteration interval according to the first error and the second error includes:

determining a maximum value of the first error and the second error as a target error;

determining the target iteration interval according to the target error, where the target error is negatively correlated with the target iteration interval.

A22.

The method of any articles A20 or A21, where the second error is determined according to the quantization error, where the quantization error is determined according to the data to be quantized of the current verify iteration and the quantized data of the current verify iteration, and the second error is positively correlated with the quantization error.

A23.

The method of any of articles A15 to A22, applied in the training or fine tuning of the neural network, where the method further comprising:

when the current iteration is greater than a first preset iteration, determining the target iteration interval according to the data variation range of the data to be quantized, and adjusting the quantization parameter according to the target iteration interval.

A24.

The method of article A23, further comprising:

when the current iteration is less than or equal to the first preset iteration, determining a first preset iteration interval as the target iteration interval and adjusting the quantization parameter according to the first preset iteration interval.

A25.

The method of articles A23 or A24, further comprising:

when the current iteration is greater than or equal to a second preset iteration, determining a second preset iteration interval as the target iteration interval and adjusting the quantization parameter according to the second preset iteration interval, where the second preset iteration is greater than the first preset iteration, and the second preset iteration interval is greater than the first preset iteration interval.

A26.

The method of article A25, further comprising:

when the convergence of the neural network meets preset conditions, determining that the current iteration is greater than or equal to the second preset iteration.

A27.

The method of article A25, further comprising:

when the current iteration is greater than or equal to the second preset iteration, and the second error is greater than a preset error value, determining the iteration interval according to the data variation range of the data to be quantized so as to re-determine the data bit width according to the iteration interval.

A28.

A device for adjusting a data bit width, comprising:

an obtaining unit configured to obtain a data bit width used to perform a quantization on data to be quantized, where the data bit width indicates the bit width of the quantized data after the data to be quantized being quantized;

a quantization unit configured to perform a quantization on a group of data to be quantized based on the data bit width to convert the group of data to be quantized to a group of quantized data, where the group of quantized data has the data bit width; and a determination configured to compare the group of data to be quantized with the group of quantized data to determine a quantization error correlated with the data bit width, and adjust the data bit width based on the determined quantization error.

A29.

The device of article A28, where the comparison unit includes:

an internal determination unit configured to determine a quantization interval according to the data bit width; and an error determination unit configured to determine the quantization error according to the quantization interval, the group of the quantized data and the group of data to be quantized.

A30.

The device of article A29, where the error determination unit includes:

an inverse quantization unit configured to inversely quantize the group of quantized data according to the quantization interval to obtain a group of quantized inversely data, where a data format of the group of quantized inversely data is the same with a data format of the group of the data to be quantized; and a quantization error determination unit configured to determine the quantization error according to the group of the quantized inversely data and the group of data to be quantized.

A31.

The device of any one of articles A28 to A30, where the control unit includes:

a comparison unit configured to compare the quantization error and a preset threshold, where the preset threshold includes at least one of a first threshold and a second threshold; and a bit width adjustment unit configured to adjust the data bit width according to a comparison result.

A32.

The device of article A31, where the bit width adjustment unit includes:

an increasing unit configured to increase the data bit width when the quantization error is greater than or equal to the first threshold.

A33.

The device of article A32, where the increasing unit includes:

a stride increasing unit configured to increase the data bit width according to a first preset bit width stride to determine an adjusted data bit width.

A34.

The device of article A33, where the quantization unit is further configured to perform the quantization on the group of data to be quantized based on the adjusted data bit width to convert the group of data to be quantized to another group of quantized data, where the another group of quantized data has the adjusted data bit width; and the quantization unit is configured to compare the group of data to be quantized with the another group of quantized data to determine another quantization error correlated with an adjusted data bit width until the another quantization error is less than the first preset threshold.

A35.

The device of article A34, where the device is used iteratively.

A36.

The device of article A31, where the adjustment unit includes:

a decreasing unit configured to decrease the data bit width when the quantization error is less than or equal to a second threshold.

A37.

The device of article A36, where the decreasing unit includes:

a stride decreasing unit configured to decrease the data bit width according to a second preset bit width stride to determine an adjusted bit width.

A38.

The device of article A37, where the quantization unit is further configured to perform the quantization on the group of data to be quantized based on the adjusted data bit width to convert the group of data to be quantized to another group of quantized data, where the another group of quantized data has the adjusted data bit width; and the quantization unit is further configured to determine another quantization error correlated with the adjusted data bit width based on the group of data to be quantized and the another group of quantized data until the another quantization error is greater than the second preset threshold.

A39.

The device of article A38, where the device is used iteratively.

A40.

The device of article A31, where the adjustment unit includes:

a maintaining unit configured to maintain the data bit width when the quantization error is between the first threshold and the second threshold.

A41.

The device of any one of articles A28 to A40, further comprising:

an updating unit configured to update a quantization parameter configured to perform the quantization on the group of data to be quantized based on the group of data to be quantized and the adjusted bit width; and the quantization unit further configured to perform the quantization on the group of data to be quantized based on the updated quantization parameter.

A42.

The device of article A28, further comprising:

a range unit configured to obtain a data variation range of data to be quantized;

an interval unit configured to, according to the data variation range of the data to be quantized, determine a target iteration interval to adjust the data bit width according to the target iteration interval, where the target iteration interval includes at least one iteration.

A43.

The device of article A42, where the range unit includes:

a point location unit configured to obtain a variation range of a point location, where the variation range of the point location is used to indicate the data variation range of the data to be quantized, and the variation range of the point location is positively correlated with the data variation range of the data to be quantized.

A44.

The device of article A43, where the point location unit includes:

a first mean value unit configured to determine a first mean value according to a point location corresponding to a previous verify iteration before the current verify iteration, and point locations of the historical iterations before the previous verify iteration, where the previous verify iteration refers to a verify iteration corresponding to the previous iteration interval before the target iteration interval;

a second mean value unit configured to determine a second mean value according to a point location corresponding to current verify iteration and the point locations of the historical verify iterations before current verify iteration, where the point location corresponding to the current verify iteration is determined according to the target data bit width corresponding to the current verify iteration and the data to be quantized; and a first error unit configured to determine a first error according to the first mean value and the second mean value, where the first error is used to indicate the variation range of the point location.

A45.

The device of article A42, where the interval unit includes:

a first interval unit configured to determine the target iteration interval according to the first error, where the target iteration interval is negatively correlated with the first error.

A46.

The device of article A42, where the range unit further includes:

a trend unit configured to obtain a variation trend of the data bit width; and a data variation range unit configured to determine the data variation range of the data to be quantized according to the variation range of the point location and the variation trend of the data bit width.

A47.

The device of article A46, where the interval unit further includes:

an iteration interval unit configured to determine the target iteration interval according to the first error and the second error, where the first error is used to indicate the variation range of the point location, and the second error is used to indicate the variation range of the data bit width.

A48.

The device of article A47, where the iteration interval unit includes:

a target error unit configured to determine a maximum value of the first error and the second error as a target error; and a target iteration interval unit configured to determine the target iteration interval according to the target error, where the target error is negatively correlated with the target iteration interval.

A49.

The device of articles A47 or A48, where the second error is determined according to the quantization error, where the quantization error is determined according to the data to be quantized of the current verify iteration and the quantized data of the current verify iteration, and the second error is positively correlated with the quantization error.

A50.

The device of any of articles A42 to A49, applied in the training or fine tuning of the neural network, further comprising:

a first iteration unit configured to, when the current iteration is greater than a first preset iteration, determine the target iteration interval according to the data variation range of the data to be quantized, and adjust the quantization parameter according to the target iteration interval.

A51.

The device of article A50, further comprising:

a second iteration unit configured to, when the current iteration is less than or equal to the first preset iteration, determine a first preset iteration interval as the target iteration interval and adjust the quantization parameter according to the first preset iteration interval.

A52.

The device of articles A50 or A51, further comprising:

a third iteration unit configured to, when the current iteration is greater than or equal to a second preset iteration, determine a second preset iteration interval as the target iteration interval and adjust the quantization parameter according to the second preset iteration interval, where the second preset iteration is greater than the first preset iteration, and the second preset iteration interval is greater than the first preset iteration interval.

A53.

The device of article A52, further comprising:

a convergence unit configured to, when the convergence of the neural network meets preset conditions, determine that the current iteration is greater than or equal to the second preset iteration.

A54.

The device of article A52, where the device is further configured to:

when the current iteration is greater than or equal to the second preset iteration, and the second error is greater than a preset error value, determine the iteration interval according to the data variation range of the data to be quantized so as to re-determine the data bit width according to the iteration interval.

A55.

A computer readable storage medium, where a computer program is stored in the computer readable storage medium, and the method of any of articles A1 to A27 are implemented when the computer program is executed by a processor.

A56.

An artificial intelligence chip comprising the device configured to process the data of any one of articles A28 to A54.

A57.

An electronic device comprising the artificial intelligence chip of article 56.

A58.

A board card comprising a storage component, an interface apparatus, a control component, and the artificial intelligence chip of article 56, where the artificial intelligence chip is connected to the storage component, the control component, and the interface apparatus;

the storage device is configured to store data;

the interface apparatus is configured to implement data transfer between the artificial intelligence chip and an external device; and the control component is configured to monitor a state of the artificial intelligence chip.

A59.

The board card of article A58, where the storage component includes: a plurality groups of storage units, where each group of storage units is connected to the artificial intelligence chip through a bus, and the storage units are DDR SDRAMs, the chip includes a DDR controller configured to control data transfer and data storage of each storage unit; and the interface apparatus is a standard PCIe interface.

To solve the problem of neural network quantization, the following scheme (201910505239.7) is provided.

Specifically, a quantization method, a quantization device and related products of a neural network are provided.

The present disclosure relates to the technical field of artificial intelligence and specifically to a quantization method, a quantization device and related products of a neural network.

With the continuous development of artificial intelligence technology, its application field has become more and more extensive, and especially it has been well applied in the fields of image recognition, speech recognition, natural language processing, and the like. However, as the complexity of artificial intelligence algorithms increases, data volume and data dimensions that are required to be processed are increasing as well. How to balance computation efficiency and accuracy of computation results is an urgent problem to be solved in the field of artificial intelligence.

In view of this, the present disclosure provides a neural network quantization technical solution.

A first aspect of the present disclosure provides a neural network quantization method for any layer to be quantized in a neural network, and the method may include:

determining a quantization parameter corresponding to each type of data to be quantized in the layer to be quantized, where the data to be quantized includes at least one type of data including a neuron, a weight, a bias and a gradient; and quantizing the data to be quantized according to a corresponding quantization parameter and obtaining quantized data, so that the neural network is operated according to the quantized data.

A second aspect of the present disclosure provides a neural network quantization apparatus configured to quantize any layer to be quantized in a neural network, and the apparatus may include:

a quantization parameter determination unit configured to determine a quantization parameter corresponding to each type of data to be quantized in the layer to be quantized, where the data to be quantized includes at least one type of data including a neuron, a weight, a bias and a gradient; and a quantization unit configured to quantize the data to be quantized according to a corresponding quantization parameter and obtain quantized data, so that the neural network is operated according to the quantized data.

A third aspect of the present disclosure provides an artificial intelligence chip including the above-mentioned neural network quantization apparatus.

A fourth aspect of the present disclosure provides an electronic device including the above-mentioned artificial intelligence chip.

A fifth aspect of the present disclosure provides a board card including a storage component, an interface apparatus, a control component, and the above-mentioned artificial intelligence chip, where the artificial intelligence chip is connected to the storage component, the control component, and the interface apparatus, respectively; the storage component is configured to store data; the interface apparatus is configured to implement data transfer between the artificial intelligence chip and an external device; and the control component is configured to monitor a state of the artificial intelligence chip.

In the embodiments of the present disclosure, for any layer to be quantized in a neural network, a quantization parameter corresponding to each type of data to be quantized in the layer to be quantized may be determined, where the data to be quantized may include at least one type of data including a neuron, a weight, a bias and a gradient; the data to be quantized may be quantized according to a corresponding quantization parameter and quantized data may be obtained, so that the neural network is operated according to the quantized data. Using a quantization parameter that is more suitable for the data to be quantized in each layer to quantize each layer to be quantized may improve the computation efficiency of each layer on the premise of ensuring the accuracy of computation results of each layer. It may also improve the computation efficiency of the whole neural network on the premise of ensuring the accuracy of computation results of the whole neural network.

Other features and aspects of the present disclosure will become clear based on the following detailed description of exemplary embodiments with reference to drawings.

The drawings are included in the specification and constitute a part of the specification. Together with the specification, the drawings illustrate exemplary embodiments, features, and aspects of the present disclosure and are used to explain the principles of the present disclosure.

FIG. 2-1 is a flowchart illustrating a neural network quantization method, according to an embodiment of the present disclosure;

FIG. 2-2 is a flowchart illustrating a neural network quantization method, according to an embodiment of the present disclosure;

FIG. 2-3 is a flowchart illustrating a neural network quantization method, according to an embodiment of the present disclosure;

FIG. 2-4 is a flowchart illustrating a neural network quantization method, according to an embodiment of the present disclosure;

FIG. 2-5 is a schematic diagram of a correspondence of data before and after quantization if a quantization parameter does not include an offset in a neural network quantization method, according to an embodiment of the present disclosure;

FIG. 2-6 is a flowchart illustrating a neural network quantization method, according to an embodiment of the present disclosure;

FIG. 2-7 is a schematic diagram of a correspondence of data before and after quantization if a quantization parameter includes an offset in a neural network quantization method, according to an embodiment of the present disclosure;

FIG. 2-8 is a flowchart illustrating a neural network quantization method, according to an embodiment of the present disclosure;

FIG. 2-9 is a flowchart illustrating a neural network quantization method, according to an embodiment of the present disclosure;

FIG. 2-10 is a flowchart illustrating a neural network quantization method, according to an embodiment of the present disclosure;

FIG. 2-11 is a flowchart illustrating a neural network quantization method, according to an embodiment of the present disclosure;

FIG. 2-12 is a flowchart illustrating a neural network quantization method, according to an embodiment of the present disclosure;

FIG. 2-13 is a flowchart illustrating a neural network quantization method, according to an embodiment of the present disclosure;

FIG. 2-14 is a flowchart illustrating a neural network quantization method, according to an embodiment of the present disclosure;

FIG. 2-15 is a flowchart illustrating a neural network quantization method, according to an embodiment of the present disclosure;

FIG. 2-16 is a flowchart illustrating a neural network quantization method, according to an embodiment of the present disclosure;

FIG. 2-17 is a flowchart illustrating a neural network quantization method, according to an embodiment of the present disclosure;

FIG. 2-18 is a flowchart illustrating a neural network quantization method, according to an embodiment of the present disclosure;

FIG. 2-19 is a flowchart illustrating a neural network quantization method, according to an embodiment of the present disclosure;

FIG. 2-20 is a flowchart illustrating a neural network quantization method, according to an embodiment of the present disclosure;

FIG. 2-21 is a flowchart illustrating a neural network quantization method, according to an embodiment of the present disclosure;

FIG. 2-22 is a flowchart illustrating a neural network quantization method, according to an embodiment of the present disclosure;

FIG. 2-23 is a flowchart illustrating a neural network quantization method, according to an embodiment of the present disclosure;

FIG. 2-24 is a flowchart illustrating a neural network quantization method, according to an embodiment of the present disclosure;

FIG. 2-25 is a flowchart illustrating a neural network quantization method, according to an embodiment of the present disclosure;

FIG. 2-26 is a schematic diagram of a neural network quantization apparatus, according to an embodiment of the present disclosure;

FIG. 2-27 is a schematic diagram of a neural network quantization apparatus, according to an embodiment of the present disclosure;

FIG. 2-28 is a schematic diagram of a neural network quantization apparatus, according to an embodiment of the present disclosure;

FIG. 2-29 is a schematic diagram of a neural network quantization apparatus, according to an embodiment of the present disclosure;

FIG. 2-30 is a schematic diagram of a neural network quantization apparatus, according to an embodiment of the present disclosure;

FIG. 2-31 is a structural block diagram of a board card, according to an embodiment of the present disclosure.

To solve the problem of neural network quantization, the following solutions (201910505239.7) are provided. Technical solutions of the embodiments of the present disclosure will be described clearly and completely hereinafter with reference to drawings in the embodiments of the present disclosure. Obviously, the embodiments to be described are merely some rather than all embodiments of the present disclosure. All other embodiments obtained by those skilled in the art based on the embodiments of the present disclosure without creative efforts shall fall within the protection scope of the present disclosure.

It should be understood that terms such as “first”, “second”, “third”, and “fourth” that appear in the claims, the specification, and the drawings are used for distinguishing different objects rather than describing a specific order. It should be understood that terms “including” and “comprising” used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiments rather than limiting the present disclosure. As being used in the specification and the claims of the disclosure, unless the context clearly indicates otherwise, singular forms such as “a”, “an”, and “the” are intended to include plural forms. It should also be understood that a term “and/or” used in the specification and the claims refers to any and all possible combinations of one or more of relevant listed items and includes these combinations.

A dedicated word “exemplary” here means “serving as an example, an embodiment, or being illustrative”. Any embodiment described herein as “exemplary” should not be construed as being superior or better than other embodiments.

In addition, in order to better illustrate the present disclosure, many specific details are given in the following embodiments. Those skilled in the art should understand that the present disclosure may also be implemented without some specific details. In some embodiments, the methods, means, elements, and circuits well-known to those skilled in the art are not described in detail in order to highlight the gist of the present disclosure.

Data to be operated in the neural network is usually in a floating-point data format or a fixed-point data format with high precision. When running the neural network in a chip carrying the neural network, the data to be operated in the floating-point data format or the fixed-point data format with high precision leads to a large computation amount and a large memory access overhead of a neural network operation. In order to improve computation efficiency, the data to be quantized in the neural network may be quantized, and a data format after quantization is usually a fixed-point data format with a short bit width and low precision. Using quantized data with low precision to perform the neural network operation may reduce the computation amount and the memory access overhead. The data format after quantization may be a fixed-point data format with a short bit width. Data to be operated with the floating-point data format may be quantized as data to be operated with the fixed-point data format, and data to be operated with a fixed-point format with high precision may be quantized as data to be operated with a fixed-point format with low precision.

It may be understood that quantization precision refers to the size of an error between data after quantization and data before quantization. The quantization precision may affect the accuracy of the computation results of the neural network. The higher the quantization precision is, the higher the accuracy of the computation results will be, but the larger the computation amount and the memory access overhead will also be. Compared with quantized data with a short bit width, quantized data with a long bit width has higher quantization precision, and when being used for performing the neural network operation, the accuracy of the quantized data with a long bit width is also higher. However, when being used for performing the neural network operation, the computation amount and the memory access overhead of the quantized data with a long bit width are relatively higher, and the computation efficiency of the quantized data with a long bit width is lower. Similarly, for the same data to be quantized, quantized data obtained by using different quantization parameters may have different quantization precision and generate different quantization results, which may also have different effects on the computation efficiency and the accuracy of computation results. For quantizing the neural network and balancing the computation efficiency and the accuracy of computation results, quantized data bit widths and quantization parameters that are more suitable for the data feature of the data to be operated may be adopted.

The data to be operated in the neural network may include a neuron, a weight, a bias and a gradient. Usually, the same quantization parameter may be set for the whole neural network when the data to be operated in the neural network is quantized traditionally. For example, the neural network may include four convolutional layers and two fully-connected layers. The data to be operated is the neuron (which is usually an input neuron). A set of quantization parameters A may be set for the quantization of the neural network, and the set of quantization parameters A may be used to quantize neurons in the four convolutional layers and two fully-connected layers. Because neurons of each layer of the neural network are different, different algorithms may be used. If quantizing each layer by using the same quantization parameter, the quantization parameter may not adopt to the features of the neurons of each layer, so that the whole quantization precision of the neural network and the accuracy of the computation results may be low. Additionally, when setting a set of quantization parameters for the neural network, in consideration of ensuring the accuracy of the computation results and improving the quantization precision, setting a quantized bit width with a long bit width may reduce the computation efficiency of the neural network. Therefore, a traditional neural network quantization method may not balance quantization precision improvement and computation efficiency improvement.

FIG. 2-1 is a flowchart illustrating a neural network quantization method, according to an embodiment of the present disclosure. The neural network quantization method may be applied to a general-purpose processor (for example, a central processing unit (CPU), a graphics processing unit (GPU)) and a special-purpose processor (for example, an artificial intelligence processor, a scientific computing processor, a digital signal processor, and the like). The present disclosure does not limit the type of the processor applied by the neural network quantization method.

As shown in FIG. 2-1, for any layer to be quantized in the neural network, the neural network quantization method may include the following.

In a step S10, a quantization parameter corresponding to each type of data to be quantized in a layer to be quantized may be determined, where the data to be quantized may include at least one type of data including a neuron, a weight, a bias and a gradient.

The layer to be quantized in the neural network may be any layer of the neural network. Some or all of the layers in the neural network may be determined as the layer to be quantized according to requirements. When the neural network includes a plurality of layers to be quantized, each layer to be quantized may be continuous or discontinuous. Different neural networks may have different types of layers to be quantized. For example, the layer to be quantized may be a convolutional layer, a fully-connected layer, and the like. The present disclosure does not limit the count and type of layers to be quantized.

In a possible implementation, the data to be quantized may include at least one type of data including a neuron, a weight, a bias, and a gradient.

Computation data that is used for performing a computation of the layer to be quantized may include the neuron, the weight, the bias and the gradient. At least one type of data including the neuron, the weight, the bias, and the gradient in the layer to be quantized may be determined as the data to be quantized according to requirements. When there are various types of data to be quantized in the layer to be quantized, for each type of data to be quantized, the quantization method of the present disclosure may be adopted for quantization, so as to obtain quantized data corresponding to each type of data to be quantized. Then quantized data of each type and computation data that is not required to be quantized may be used for performing the computation of the layer to be quantized. Further, some or all data of the computation data in the layer to be quantized may be determined as the data to be quantized according to requirements. The present disclosure has no limitation on this.

An inference stage of the neural network operation may include a stage in which a forward computation is performed on a trained neural network to complete a preset task. In the inference stage of the neural network, at least one type of data including the neuron, the weight, the bias, and the gradient may be used as the data to be quantized and may be quantized according to the quantization method of the embodiments of the present disclosure, and then the quantized data may be used to complete the computation of the layer to be quantized.

A fine-tuning stage of the neural network operation may include a stage in which forward computations and backward computations of a preset count of iterations are performed on the trained neural network to fine-tune the parameters to complete a preset task. In the fine-tuning stage of the neural network operation, at least one of neuron, weight, bias, and gradient may be quantized according to the quantization method of the embodiments of the present disclosure, and then the quantized data is used to complete the forward computation and backward computation in the layer to be quantized.

A training stage of the neural network operation may include a stage in which an iterative training is performed on an initialized neural network to obtain the trained neural network and the trained neural network may execute a specific task. In the training stage of the neural network, at least one type of data including the neuron, the weight, the bias, and the gradient may be quantized according to the quantization method of the embodiments of the present disclosure, and then the quantized data may be used to complete the forward computation and backward computation of the layer to be quantized.

The quantization parameter corresponding to the layer to be quantized may be one or a plurality of quantization parameters.

The quantization parameter may include a parameter used for quantizing the data to be quantized, such as a point location. The point location may be used to determine a decimal point location in the quantized data. The quantization parameter may also include a scaling factor, an offset, and the like. When the neural network includes a plurality of layers to be quantized, each layer to be quantized may have the corresponding quantization parameter which may be different or be the same, which is not limited in the present disclosure.

Different data to be quantized of the layer to be quantized may correspond to different quantization parameters. For example, the neuron in a layer to be quantized 1 may correspond to a quantization parameter 1, and the weight in the layer to be quantized 1 may correspond to a quantization parameter 2. A method for determining the quantization parameter corresponding to each type of data to be quantized in the layer to be quantized may include: looking up a preset quantization parameter to directly determine the quantization parameter, looking up a correspondence to determine the quantization parameter, or calculating according to the data to be quantized to obtain the quantization parameter. For example:

the quantization parameter corresponding to each type of data to be quantized in the layer to be quantized may be set for the layer to be quantized in the neural network. The preset quantization parameter may be stored in a set storage space. The set storage space may be an on-chip storage space or an off-chip storage space. For example, the set quantization parameter may be identified and distinguished by a layer and stored in the preset storage space. When the layer to be quantized is being quantized, the corresponding quantization parameter may be fetched from the set storage space for quantization. The quantization parameter corresponding to each type of data to be quantized may be set according to an empirical value. The set quantization parameter corresponding to each type of data to be quantized may be updated according to requirements. For example, a quantization parameter of a next layer may be updated according to a quantization parameter of a previous layer.

The quantization parameter may be determined according to the data feature of the data to be quantized in the layer to be quantized or the layer feature of the layer to be quantized, by looking up a correspondence between the data feature and the quantization parameter or between the layer feature and the quantization parameter. For example, the data to be quantized may have different quantization parameters when the data to be quantized is sparsely-distributed or denselydistributed. The quantization parameter corresponding to the data distribution of the data to be quantized may be determined by looking up the correspondence. For another example, when the layer to be quantized is a convolutional layer or a fully-connected layer, the layer to be quantized may correspond to different quantization parameters respectively. When the layer to be quantized is the convolutional layer, the quantization parameter corresponding to the convolutional layer may be looked up.

Additionally, by using a preset quantization parameter calculation method, the quantization parameter corresponding to each layer to be quantized may be obtained according to the data to be quantized in each layer to be quantized. For example, by using a rounding algorithm, a point location in the quantization parameter may be obtained according to a maximum value of an absolute value of the data to be quantized and a preset data bit width.

In a step S20, the data to be quantized may be quantized according to the corresponding quantization parameter and the quantized data may be obtained, so that the neural network is operated according to the quantized data.

By using a preset quantization algorithm, the data to be quantized may be quantized according to the quantization parameter and the quantized data may be obtained. For example, by using the rounding algorithm as the quantization algorithm, a rounding quantization on the data to be quantized may be performed according to the data bit width and the point location and the quantized data may be obtained. The rounding algorithm may include rounding up, rounding down, rounding to zero, and rounding off. The present disclosure does not limit the specific implementation of the quantization algorithm.

If the neural network includes a plurality of layers to be quantized, each type of the data to be quantized in each layer to be quantized may be quantized by respectively adopting corresponding quantization parameters. Since the quantization parameter corresponding to each piece of data to be quantized is more in accordance with the feature of the data to be quantized, the quantization precision of each type of data to be quantized in each layer to be quantized is more in accordance with the computation requirement of the layer to be quantized. On the premise of ensuring the accuracy of the computation result of the layer, the computation efficiency of the layer may be improved, and the balance between the computation efficiency of the layer and the accuracy of the computation results of the layer may be realized. For the whole neural network, if the balance between the accuracy of the computation results and the computation efficiency of each layer to be quantized is realized, the balance between the accuracy of the computation results and the computation efficiency of the whole neural network is realized.

In the process of inference, training and fine-tuning of the neural network, target data may be quantized offline or online. Offline quantization refers to performing offline processing on the data to be quantized by using the quantization parameter. Online quantization refers to performing online processing on the data to be quantized by using the quantization parameter. For example, when the neural network is running on the artificial intelligence chip, the data to be quantized and the quantization parameter may be sent to a computation apparatus outside the artificial intelligence chip for offline quantization, or a computation device outside the artificial intelligence chip may be used to perform offline quantization on the data to be quantized and the quantization parameter that are pre-obtained. In the process of running the neural network in the artificial intelligence chip, the artificial intelligence chip may perform online quantization on the data to be quantized by using the quantization parameter. When the neural network includes the plurality of layers to be quantized, each layer to be quantized may perform online quantization and offline quantization, respectively. The present disclosure does not limit whether the layer to be quantized is quantized online or offline.

In this embodiment, for any layer to be quantized in a neural network, a quantization parameter corresponding to each type of data be to be quantized in a layer to be quantized may be determined, where the data to be quantized may include at least one type of data including a neuron, a weight, a bias and a gradient; the data to be quantized may be quantized according to a corresponding quantization parameter and quantized data may be obtained, so that the neural network is operated according to the quantized data. Using a quantization parameter that is more suitable for the data to be quantized in each layer to quantize each layer to be quantized may improve the computation efficiency of each layer on the premise of ensuring the accuracy of computation results of each layer. It may also improve the computation efficiency of the whole neural network on the premise of ensuring the accuracy of computation results of the whole neural network.

In a possible implementation, the quantization parameter may include at least one of parameters including a point location, a scaling factor and an offset, where the point location is a decimal point location after quantization, and the scaling factor is a ratio between a maximum value of the quantized data and a maximum value of an absolute value of the data to be quantized, and the offset is an intermediate value of the data to be quantized.

In a possible implementation, the quantization parameter may include the point location. By using the following formula (1) to quantize the data to be quantized, quantized data $I_x$ may be obtained:

$$I_x = \text{round}\left(\frac{F_x}{2^s}\right). \quad \text{Formula (1)}$$

In this formula, s denotes the point location, and $I_x$ denotes the quantized data, and $F_x$ denotes the data to be quantized, and round denotes a rounding off operation. It may be understood that other rounding operation methods, such as rounding up, rounding down, and rounding to zero, may also be used to replace the rounding off operation in the formula (1). It may be understood that when the data bit width is constant, for the quantized data obtained according to the point location, the more the decimal places are, the greater the quantization precision of the data to be quantized will be.

In a possible implementation, the quantization parameter may include the scaling factor. By using the following formula (2) to quantize the data to be quantized, the quantized data $I_x$ may be obtained:

$$I_x = \text{round}\left(\frac{F_x}{f}\right). \quad \text{Formula (2)}$$

In this formula, f denotes the scaling factor, and $I_x$ denotes the quantized data, and $F_x$ denotes the data to be quantized, and round denotes the rounding off operation. It may be understood that other rounding operation methods, such as rounding up, rounding down, and rounding to zero, may also be used to replace the rounding off operation in the formula (2). It may be understood that when the data bit width is constant, different scaling factors may be used to adjust the numerical range of the quantized data.

In a possible implementation, the quantization parameter may include the offset. By using the following formula (3) to quantize the data to be quantized, the quantized data $I_x$ may be obtained:

$$I_x = \text{round}(F_x - o). \qquad \text{Formula (3)}$$

In this formula, o denotes the offset, and $I_x$ denotes the quantized data, and $F_x$ denotes the data to be quantized, and round denotes the rounding off operation. It may be understood that other rounding operation methods, such as rounding up, rounding down, and rounding to zero, may also be used to replace the rounding off operation in the formula (3). It may be understood that when the data bit width is constant, different scaling factors may be used to adjust the offset between the value of data after quantization and data before the quantization.

In a possible implementation, the quantization parameter may include the point location and the scaling factor. By using the following formula (4) to quantize the data to be quantized, the quantized data $I_x$ may be obtained:

$$I_x = \text{round}\left(\frac{F_x}{2^s \times f}\right). \qquad \text{Formula (4)}$$

In this formula, s denotes the point location, and f denotes the scaling factor, and $I_x$ denotes the quantized data, and $F_x$ denotes the data to be quantized, and round denotes the rounding off operation. It may be understood that other rounding operation methods, such as rounding up, rounding down, and rounding to zero, may also be used to replace the rounding off operation in the formula (4).

In a possible implementation, the quantization parameter may include the point location and the offset. By using the following formula (5) to quantize the data to be quantized, the quantized data $I_x$ may be obtained:

$$I_x = \text{round}\left(\frac{F_x - o}{2^s}\right). \qquad \text{Formula (5)}$$

In this formula, s denotes the point location, and o is the offset, and $I_x$ denotes the quantized data, and $F_x$ denotes the data to be quantized, and round denotes the rounding off operation. It may be understood that other rounding operation methods, such as rounding up, rounding down, and rounding to zero, may also be used to replace the rounding off operation in the formula (5).

In a possible implementation, the quantization parameter may include the point location, the scaling factor, and the offset. By using the following formula (6) to quantize the data to be quantized, the quantized data $I_x$ may be obtained:

$$I_x = \text{round}\left(\frac{F_x - o}{2^s \times f}\right). \qquad \text{Formula (6)}$$

In this formula, s denotes the point location, and f denotes the scaling factor, and o is the offset, and $I_x$ denotes the quantized data, and $F_x$ denotes the data to be quantized, and round denotes the rounding off operation. It may be understood that other rounding operation methods, such as rounding up, rounding down, and rounding to zero, may also be used to replace the rounding off operation in the formula (6).

In this embodiment, the quantization parameter may include at least one of parameters including a point location, a scaling factor, and an offset. Adopting different combinations of quantization parameters to quantize the data to be quantized may generate quantization results with different precision. The quantization parameter may be combined flexibly and used according to requirements.

FIG. 2-2 is a flowchart illustrating a neural network quantization method, according to an embodiment of the present disclosure. As shown in FIG. 2-2, the step S10 in the neural network quantization method may include the following.

In a step S11, a quantization parameter corresponding to each type of data to be quantized in a layer to be quantized may be determined by looking up a correspondence between data to be quantized and a quantization parameter.

In a possible implementation, the quantization parameter corresponding to each type of data to be quantized in each layer to be quantized may be a stored preset value. The correspondence between the data to be quantized and the quantization parameter may be established for the neural network. The correspondence may include a correspondence between each type of data to be quantized in each layer to be quantized and the quantization parameter, and the correspondence may be stored in a storage space that each layer may share and access. It is also possible to establish correspondences among a plurality of pieces of data to be quantized and quantization parameters for the neural network, and each layer to be quantized corresponds to one of the correspondences. The correspondence of each layer may be stored in a storage space that is exclusive to this layer, or the correspondence of each layer may be stored in the storage space that each layer may share and access.

The correspondence between the data to be quantized and the quantization parameter may include correspondences among the plurality of pieces of data to be quantized and a plurality of corresponding quantization parameters. For example, a correspondence A between the data to be quantized and the quantization parameter may include: two pieces of data to be quantized including a neuron and a weight in the layer to be quantized 1; the neuron may correspond to three quantization parameters including a point location 1, a scaling factor 1, and an offset 1; and the weight may correspond to two quantization parameters including a point location 2 and an offset 2. The present disclosure does not limit the specific format of the correspondence between the data to be quantized and the quantization parameter.

In this embodiment, by looking up a correspondence between data to be quantized and a quantization parameter, a quantization parameter corresponding to each type of data to be quantized in a layer to be quantized may be determined. The quantization parameter corresponding to each layer to be quantized may be preset and stored based on the correspondence for use by the layer to be quantized after looking up the quantization parameter. The method of obtaining the quantization parameter of the embodiment is simple and convenient.

FIG. 2-3 is a flowchart illustrating a neural network quantization method, according to an embodiment of the present disclosure. As shown in FIG. 2-3, the step S10 of the neural network quantization method may include the following.

In a step S12, according to each type of data to be quantized and a corresponding data bit width, a corresponding quantization parameter may be obtained by calculating.

A data bit width n corresponding to the data to be quantized may be preset. The quantization parameter corresponding to the data to be quantized may be obtained by calculating according to the data bit width n and the data to be quantized. The quantization parameter obtained by calculating the data to be quantized itself may be more in accordance with the feature of the data to be quantized itself.

In the process of inference, training and fine-tuning of the neural network, the data to be quantized may be at least one type of data including a neuron, a weight, and a bias. For the process of training and fine-tuning, the data to be quantized may also include a gradient. In the process of inference, training and fine-tuning of the neural network, the quantization parameter corresponding to the data to be quantized may be calculated according to the data to be quantized and the corresponding data bit width obtained online.

In this embodiment, a corresponding quantization parameter may be obtained by calculating according to each type of data to be quantized and a corresponding data bit width. The quantization parameter obtained by calculating according to the online data to be quantized may be more in accordance with the quantization requirement of each type of the data to be quantized in the layer to be quantized of the neural network.

FIG. 2-4 is a flowchart illustrating a neural network quantization method, according to an embodiment of the present disclosure. As shown in FIG. 2-4, the step S12 of the neural network quantization method may include the following.

In a step S121, if a quantization parameter does not include an offset, a point location of target data may be obtained according to a maximum value of an absolute value of the target data and a data bit width corresponding to the target data, where the target data may be any type of data to be quantized.

In a possible implementation, the quantization parameter may include a plurality of parameters. If the quantization parameter does not include the offset, the quantization parameter may include at least one of parameters including a point location and a scaling factor. If the quantization parameter does not include the offset, any piece of data to be quantized may be determined as the target data. The target data may be any type of data including a neuron, a weight, a bias and a gradient.

The target data may include data composed of a plurality of elements. A maximum value and a minimum value in the elements of the target data may be determined, and according to an absolute value of the maximum value and an absolute value of the minimum value, a maximum value of an absolute value of the target data may be obtained. Or an absolute value in the elements of the target data may be determined, and according to the absolute value of the elements, the maximum value of the absolute value of the target data may be obtained.

FIG. 2-5 is a schematic diagram of a correspondence of data before and after quantization if a quantization parameter does not include an offset in a neural network quantization method, according to an embodiment of the present disclosure. As shown in FIG. 2-5, $z_1$ is a maximum value of an absolute value of target data, a data bit width corresponding to the target data n is 8, and A is a maximum value that may be represented after quantizing the target data with the data bit width n, and A is $2^s(2^{n-1}-1)$. A is required to include $Z_1$, and $Z_1$ may be greater than A/2. A formula (7) may be used to restrict this:

$$2^s(2^{n-1}-1) \geq Z_1 > 2^{s-1}(2^{n-1}-1). \quad \text{Formula (7)}$$

A point location of the target data may be obtained by calculating according to a maximum value of an absolute value of the target data and a data bit width. For example, by using the following formula (8), a point location s of the target data may be obtained by calculating if a quantization parameter does not include an offset:

$$s = \text{ceil}\left(\log_2\left(\frac{Z_1}{2^{n-1}-1}\right)\right). \quad \text{Formula (8)}$$

In this formula, ceil denotes rounding up, and $Z_1$ denotes the maximum value of the absolute value of the target data, and s denotes the point location, and n denotes a data bit width corresponding to the target data.

In this embodiment, if the quantization parameter does not include the offset, the point location of the target data may be obtained according to the maximum value of the absolute value of the target data and the data bit width corresponding to the target data. Obtaining a corresponding point location by calculating according to the target data may be more in accordance with the feature of the target data itself and have higher quantization precision.

FIG. 2-6 is a flowchart illustrating a neural network quantization method, according to an embodiment of the present disclosure. As shown in FIG. 2-6, the step S12 of the neural network quantization method may include the following.

In a step S122, if a quantization parameter does not include an offset, a maximum value of quantized data of target data may be obtained according to the target data and a data bit width corresponding to the target data, where the target data may be any type of data to be quantized.

In a step S123, a scaling factor of the target data may be obtained according to a maximum value of an absolute value of the target data and the maximum value of the quantized data of the target data The maximum value of the absolute value of the target data may refer to the related explanation in the above-mentioned embodiment.

By using a formula (9), the scaling factor f of the target data may be obtained by calculating if the quantization parameter does not include the offset.

$$f = \frac{Z_1}{A}. \quad \text{Formula (9)}$$

In this formula, A is the maximum value of the quantized data of the target data if the quantization parameter does not include the offset. A formula (10) may be used to calculate A:

$$A = 2^{ceil\left(log_2\left(\frac{Z_1}{2^{n-1}-1}\right)\right)}\left(2^{n-1}-1\right) \quad \text{Formula (10)}$$

-continued $$diff\_update1 = |M2 - M1| = \beta |s^{\wedge}((t)) - M1|.$$

In this embodiment, if a quantization parameter does not include an offset, a scaling factor corresponding to target data may be obtained by calculating according to a maximum value of an absolute value of the target data and a data bit width corresponding to the target data. Obtaining a corresponding scaling factor by calculating according to the target data may be more in accordance with the feature of the target data itself and have higher quantization precision.

FIG. 2-7 is a schematic diagram of a correspondence of data before and after quantization if a quantization parameter includes an offset in a neural network quantization method, according to an embodiment of the present disclosure. As shown in FIGS. 2-7, A1 and A2 are a maximum value and a minimum values that may be represented after quantizing the target data with n, respectively, and $Z_{min}$ is a minimum value among all elements of target data, and $Z_{max}$ is a maximum value among all elements of target data, and $$Z_2 = \frac{Z_{max} - Z_{min}}{2},$$

and the target data may be quantized after the target data is translated according to an offset o.

FIG. 2-8 is a flowchart illustrating a neural network quantization method, according to an embodiment of the present disclosure. As shown in FIG. 2-8, the step S12 of the neural network quantization method may include the following.

In a step S124, if a quantization parameter includes an offset, a point location of target data may be obtained according to a maximum value of the target data, a minimum value of the target data, and a data bit width corresponding to the target data, where the target data may be any type of data to be quantized.

In a possible implementation, if the quantization parameter includes the offset, the quantization parameter may include at least one of parameters including a point location and a scaling factor. As shown in FIG. 2-7, a point location s of the target data may be obtained if the quantization parameter includes the offset according to a formula (11):

$$s = \text{ceil}\left(\log_2\left(\frac{Z_2}{2^{n-1} - 1}\right)\right). \qquad \text{Formula (11)}$$

In this formula, ceil denotes rounding up, and s denotes the point location, and n denotes the data bit width corresponding to the target data.

In this embodiment, if a quantization parameter includes an offset, a point location corresponding to target data may be obtained by calculating according to a maximum of the target data, a minimum value of the target data, and a data bit width corresponding to the target data. Obtaining a corresponding point location by computing according to the target data may be more in accordance with the feature of the target data itself and have higher quantization precision.

FIG. 2-9 is a flowchart illustrating a neural network quantization method, according to an embodiment of the present disclosure. As shown in FIG. 2-9, the step S12 of the neural network quantization method may include the following.

In a step S125, if a quantization parameter includes an offset, a maximum value of quantized data of target data may be obtained according to the target data and a data bit width corresponding to the target data, where the target data may be any type of data to be quantized.

In a step S126, a scaling factor of the target data may be obtained according to a maximum value of the target data, a minimum value of the target data, and the maximum value of the quantized data of the target data.

In a possible implementation, if the quantization parameter includes the offset, the quantization parameter may include at least one of parameters including a point location and a scaling factor. As shown in FIG. 2-7, according to a formula (12), if the quantization parameter includes the offset, a scaling factor f of the target data may be obtained:

$$f = \frac{Z_2}{A}. \qquad \text{Formula (12)}$$

In this embodiment, if a quantization parameter includes an offset, a scaling factor corresponding to target data may be obtained by calculating according to a maximum value of the target data, a minimum value of the target data, and a data bit width corresponding to the target data. Obtaining a corresponding scaling factor by computing according to the target data may be more in accordance with the feature of the target data itself and have higher quantization precision.

FIG. 2-10 is a flowchart illustrating a neural network quantization method, according to an embodiment of the present disclosure. As shown in FIG. 2-10, the step S12 of the neural network quantization method may include the following.

In a step S127, an offset of target data may be obtained according to a maximum value of the target data and a minimum value of the target data, where the target data may be any type of the data to be quantized.

In a possible implementation, as shown in FIG. 2-7, according to a formula (13), if a quantization parameter includes an offset, an offset o of the target data may be obtained:

$$o = \frac{Z\_min + Z - max}{2}. \qquad \text{Formula (13)}$$

In this embodiment, if a quantization parameter includes an offset, a offset corresponding to target data may be obtained by calculating according to a maximum value of the target data, a minimum value of the target data, and a data bit width corresponding to the target data. Obtaining a corresponding offset by calculating according to the target data may be more in accordance with the feature of the target data itself and have higher quantization precision.

FIG. 2-11 is a flowchart illustrating a neural network quantization method, according to an embodiment of the present disclosure. As shown in FIG. 2-11, the neural network quantization method may further include the following.

In a step S30, a quantization error of target data may be determined according to the target data and quantized data corresponding to the target data, where the target data may be any type of the data to be quantized.

The quantization error of the target data may be determined according to an error between the quantized data corresponding to the target data and the target data. By using a set error calculation method, such as a standard deviation calculation method and a root-mean-square error calculation method, the quantization error of the target data may be calculated.

According to a quantization parameter, the quantized data corresponding to the target data may be quantized inversely to obtain inverse-quantized data, and according to an error between the inverse-quantized data and the target data, the quantization error of the target data may be determined.

If the quantization parameter includes a point location, the quantized data of the target data may be quantized inversely according to a formula (14) to obtain the inverse-quantized data of the target data $\hat{F_x}$:

$$\hat{F_x} = \text{round}\left(\frac{F_x}{2^s}\right) \times 2^s. \quad \text{Formula (14)}$$

In this formula, round is a rounding off operation, and $\hat{F_x}$ is the inverse-quantized data of the target data, and s is the point location corresponding to the target data.

If the quantization parameter includes a scaling factor, according to a formula (15), the quantized data of the target data may be quantized inversely, and the inverse-quantized data of the target data $\hat{F_x}$ may be obtained:

$$\hat{F_x} = \text{round}\left(\frac{F_x}{f}\right) \times f. \quad \text{Formula (15)}$$

In this formula, round denotes the rounding off operation, and $\hat{F_x}$ denotes the inverse-quantized data of the target data, and f is the scaling factor.

If the quantization parameter includes an offset, according to a formula (16), the quantized data of the target data may be quantized inversely, and the inverse-quantized data of the target data $\hat{F_x}$ may be obtained:

$$\hat{F_x} = \text{round}(F_x - o) + o. \quad \text{Formula (16)}$$

In this formula, round denotes the rounding off operation, and $\hat{F_x}$ denotes the inverse-quantized data of the target data, and o is the scaling factor.

If the quantization parameter includes a point location and the scaling factor, according to a formula (17), the quantized data of the target data may be quantized inversely, and the inverse-quantized data of the target data $\hat{F_x}$ may be obtained:

$$\hat{F_x} = \text{round}\left(\frac{F_x}{2^s \times f}\right) \times 2^s \times f. \quad \text{Formula (17)}$$

If the quantization parameter includes the point location and the offset, according to a formula (18), the quantized data of the target data may be quantized inversely, and the inverse-quantized data of the target data $\hat{F_x}$ may be obtained:

$$\hat{F_x} = \text{round}\left(\frac{F_x - o}{2^s}\right) \times 2^s \times o \text{ diff\_update1} = |M2 - M1| = \beta|s \wedge ((t)) - M1|. \quad \text{Formula (18)}$$

If the quantization parameter includes the scaling factor and the offset, according to a formula (19), the quantized data of the target data may be quantized inversely, and the inverse-quantized data of the target data $\hat{F_x}$ may be obtained:

$$\hat{F_x} = \text{round}\left(\frac{F_x - o}{f}\right) \times f + o. \quad \text{Formula (19)}$$

If the quantization parameter includes the point location, the scaling factor and the offset, according to a formula (20), the quantized data of the target data may be quantized inversely, and the inverse-quantized data of the target data $\hat{F_x}$ may be obtained:

$$\hat{F_x} = \text{round}\left(\frac{F_x - o}{2^s \times f}\right) \times 2^s \times f + o. \quad \text{Formula (20)}$$

Through a method of calculating a quantization interval, for example, through a formula (21), an error $\text{diff}_{bit}$ between the target data and the inverse-quantized data corresponding to the target data may be obtained by calculating:

$$diff_{bit} = \log_2\left(\frac{A * 2^{-1} * p}{\sum_i |F_x|}\right). \quad \text{Formula (21)}$$

In this formula, p is the count of the elements of the target data, and s is the point location of the target data. The value of A may be determined according to the quantization parameter. If the quantization parameter includes a point location s, A is equal to $2^s$; if the quantization parameter includes the point location s and a scaling factor f, and A is equal to $2^s$×f.

Through a method of calculating a difference between the mean values of two pieces of data, for example, through a formula (22), the error $\text{diff}_{bit}$ between the target data and the inverse-quantized data corresponding to the target data may be obtained by calculating:

$$diff_{bit} = \log_2\left(\frac{\sum_i |\hat{F_x}| - \sum_i |F_x|}{\sum_i |F_x|} + 1\right). \quad \text{Formula (22)}$$

Through a method of calculating a mean value of a difference between the two pieces of data, for example, through a formula (23), the error $\text{diff}_{bit}$ between the target data and the inverse-quantized data corresponding to the target data may be obtained by calculating:

$$diff_{bit} = \log_2\left(\frac{\sum_i |\hat{F_x} - F_x|}{\sum_i |F_x|} + 1\right). \quad \text{Formula (23)}$$

In a step S40, according to the quantization error and an error threshold, the data bit width corresponding to the target data may be adjusted to obtain adjusted bit width corresponding to the target data.

The error threshold may be determined according to an empirical value, and the error threshold may be used to indicate an expected value of the quantization error. If the quantization error is greater than or less than the error threshold, the data bit width corresponding to the target data may be adjusted and the adjusted bit width corresponding to the target data may be obtained. The data bit width may be adjusted to a longer bit width or a shorter bit width, so as to increase or decrease the quantization precision.

The error threshold may be determined according to a maximum acceptable error. If the quantization error is greater than the error threshold, it is shown that the quantization precision may not meet the expectation and the data bit width is required to be adjusted to be a longer bit width. A small error threshold may be determined according to high quantization precision. If the quantization error is less than the error threshold, it is shown that the quantization precision is relatively high and the computation efficiency of the neural network may be affected. In this case, the data bit width may be adjusted to a shorter bit width to appropriately decrease the quantization precision and improve the computation efficiency of the neural network.

The data bit width may be adjusted based on a stride with fixed bits, or according to the difference between the quantization error and the error threshold, the data bit width may be adjusted based on a variable adjustment stride. This is not limited in the present disclosure.

In a step S50, the data bit width corresponding to the target data may be updated to the adjusted bit width, and according to the target data and the adjusted bit width, a corresponding adjusted quantization parameter may be obtained by calculating, so that the neural network may be quantized according to an adjusted quantization parameter.

After the adjusted bit width is determined, the data bit width corresponding to the target data may be updated to be the adjusted bit width. For example, if the data bit width of the target data before updating is 8 bits, and the adjusted bit width is 12 bits, then the data bit width corresponding to the target data after updating is 12 bits. The adjusted quantization parameter corresponding to the target data may be obtained by calculating according to the adjusted bit width and the target data. The target data may be re-quantized according to the adjusted quantization parameter corresponding to the target data to obtain the quantized data with higher or lower quantization precision, so that a balance between the quantization precision and the processing efficiency may be achieved in the layer to be quantized.

In the process of inference, training and fine-tuning of the neural network, the data to be quantized between each layer may be considered to have a certain correlation. For example, if the difference between the mean values of the data to be quantized of each layer is less than a set mean value threshold, and the difference between the maximum values of the data to be quantized of each layer is also less than a set difference threshold, the adjusted quantization parameter of the layer to be quantized may be used as the adjusted quantization parameter of one or more subsequent layers for quantizing the data to be quantized in the one or more subsequent layers after the layer to be quantized. In the training and fine-tuning process of the neural network, the adjusted quantization parameter of the layer to be quantized obtained during a current iteration may also be used to quantize the layer to be quantized in subsequent iterations.

In a possible implementation, the method may further include:

using the quantization parameter of the layer to be quantized in one or more layers after the layer to be quantized.

Quantizing the neural network according to the adjusted quantization parameter may include: re-quantizing the data to be quantized by using the adjusted quantization parameter only in the layer to be quantized, and using the re-obtained quantized data for the computation of the layer to be quantized. Quantizing the neural network according to the adjusted quantization parameter may also include: instead of re-quantizing the data to be quantized by using the adjusted quantization parameter in the layer to be quantized, quantizing the data to be quantized by using the adjusted quantization parameter in one or more subsequent layers after the layer to be quantized, and/or quantizing the data to be quantized by using the adjusted quantization parameter in the layer to be quantized during the subsequent iterations. Quantizing the neural network according to the adjusted quantization parameter may further include: re-quantizing the data to be quantized by using the adjusted quantization parameter in the layer to be quantized, and quantizing the data to be quantized by using the adjusted quantization parameter in one or more subsequent layers after the layer to be quantized, and/or quantizing the data to be quantized by using the adjusted quantization parameter in the layer to be quantized during the subsequent iterations This is not limited in the present disclosure.

In this embodiment, a quantization error of target data may be determined according to the target data and quantized data corresponding to the target data, where the target data may be any type of the data to be quantized; according to the quantization error and an error threshold, a data bit width corresponding to the target data may be adjusted, and an adjusted bit width corresponding to the target data may be obtained; and the data bit width corresponding to the target data may be updated to be an adjusted bit width, and according to the target data and the adjusted bit width, a corresponding adjusted quantization parameter may be obtained by calculating, so that a neural network may be quantized according to the adjusted quantization parameter. The data bit width may be adjusted according to an error between the target data and the quantized data, and the adjusted quantization parameter may be obtained by calculating according to the adjusted data bit width. By setting different error thresholds, different adjusted quantization parameters may be obtained, and different quantization requirements, such as quantization precision improvement or computation efficiency improvement, may be met. The adjusted quantization parameter obtained by calculating according to the target data and the quantized data of the target data may be more in accordance with the data feature of the target data itself. In this way, a quantization result that is more in accordance with the requirement of the target data itself may be obtained, and a better balance between quantization precision and processing efficiency may be achieved.

FIG. 2-12 is a flowchart illustrating a neural network quantization method, according to an embodiment of the present disclosure. As shown in FIG. 2-12, the step S40 of the neural network quantization method may include the following.

In a step S41, if a quantization error is greater than a first error threshold, a data bit width corresponding to target data may be increased and an adjusted bit width corresponding to the target data may be obtained.

The first error threshold may be determined according to a maximum acceptable quantization error. The quantization error may be compared with the first error threshold. If the quantization error is greater than the first error threshold, the quantization error may be considered unacceptable. If quantization precision is required to be improved, by increasing the data bit width corresponding to the target data, quantization precision of the target data may be improved.

The data bit width corresponding to the target data may be increased based on a fixed adjustment stride and the adjusted bit width may be obtained. The fixed adjustment stride may be N bits, where N is a positive integer. Each time the data bit width is adjusted, the data bit width may increase by N bits, and the data bit width after increasing each time is equal to an original data bit width plus N bits.

The data bit width corresponding to the target data may be increased based on a variable adjustment stride and the adjusted bit width may be obtained. For example, if a difference between the quantization error and the error threshold is greater than the first error threshold, the data bit width may be adjusted according to an adjustment stride M1; if the difference between the quantization error and the error threshold is less than the first error threshold, the data bit width may be adjusted according to an adjustment stride M2, where the first error threshold is greater than a second error threshold, and the M1 is greater than the M2. Each variable adjustment stride may be determined according to requirements. The present disclosure does not limit the adjustment stride of the data bit width and whether the adjustment stride is variable.

The adjusted quantization parameter may be obtained by calculating the target data according to the adjusted bit width. The quantization precision of the quantized data obtained by re-quantizing the target data according to the adjusted quantization parameter is higher than that of the quantized data obtained by using the quantization parameter before adjustment.

FIG. 2-13 is a flowchart illustrating a neural network quantization method, according to an embodiment of the present disclosure. As shown in FIG. 2-13, the neural network quantization method may further include the following.

In a step S42, an adjusted quantization error of target data may be calculated according to an adjusted bit width and the target data.

In a step S43, the adjusted bit width may be increased continuously according to an adjusted quantization error and a first error threshold until the adjusted quantization error obtained by calculating according to the adjusted bit width and the target data is less than or equal to the first error threshold.

If a data bit width corresponding to the target data is increased according to a quantization error, an adjusted bit width is obtained after the bit width is adjusted once; an adjusted quantization parameter is obtained by calculating according to the adjusted bit width; adjusted quantized data is obtained by quantizing the target data according to the adjusted quantization parameter; and then an adjusted quantization error of the target data is obtained by calculating according to the adjusted quantized data and the target data, where the adjusted quantization error may still be greater than the first error threshold; in other words, the data bit width obtained after the bit width is adjusted once may not meet the adjustment purpose. If the adjusted quantization error is still greater than the first error threshold, the adjusted data bit width may continue to be adjusted. In other words, the data bit width corresponding to the target data may be increased many times until the adjusted quantization error obtained according to the final obtained adjusted bit width and the target data is less than the first error threshold.

The adjustment stride that is increased many times may be a fixed adjustment stride or a variable adjustment stride. For example, a final data bit width is equal to an original data bit width plus A*N bits, where Nis a fixed adjustment stride that is increased each time, and A is the number of times of increasing the data bit width. The final data bit width is equal to the original data bit width plus M1 plus M2 . . . plus Mm, where M1, M2, . . . , Mm are variable adjustment strides that are increased each time.

In this embodiment, if a quantization error is greater than a first error threshold, a data bit width corresponding to target data may be increased, and an adjusted bit width corresponding to the target data may be obtained. The data bit width may be increased by setting the first error threshold and an adjustment stride, so that the adjusted data bit width may meet a quantization requirement. If one adjustment does not meet an adjustment requirement, the data bit width may also be adjusted many times. By setting the first error threshold and the adjustment stride, a quantization parameter may be adjusted flexibly according to the quantization requirement, and different quantization requirements may be met, and quantization precision may be adaptively adjusted according to the data feature of the data to be quantized itself.

FIG. 2-14 is a flowchart illustrating a neural network quantization method, according to an embodiment of the present disclosure. As shown in FIG. 2-14, the step S40 of the neural network quantization method may include the following.

In a step S44, if a quantization error is less than a second error threshold, a data bit width corresponding to target data may be decreased, where the second error threshold is less than a first error threshold.

The second error threshold may be determined according to an acceptable quantization error and the expected computation efficiency of the neural network. The quantization error may be compared with the second error threshold. If the quantization error is less than the second error threshold, it may be considered that the quantization error exceeds the expectation, and the computation efficiency is too low to be acceptable. The computation efficiency of the neural network may be improved by decreasing quantization precision. By decreasing the data bit width corresponding to the target data, quantization precision of the target data may be decreased.

The data bit width corresponding to the target data may be decreased according to a fixed adjustment stride, and an adjusted bit width may be obtained. The fixed adjustment stride may be N bits, where N is a positive integer. Each time the data bit width is adjusted, the data bit width may decrease by N bits. The data bit width after decreasing is equal to an original data bit width minus N bits.

The data bit width corresponding to the target data may be decreased according to a variable adjustment stride and the adjusted bit width may be obtained. For example, if a difference between the quantization error and the error threshold is greater than the first error threshold, the data bit width may be adjusted according to an adjustment stride M1; if the difference between the quantization error and the error threshold is less than the first error threshold, the data bit width may be adjusted according to an adjustment stride M2, where the first error threshold is greater than a second error threshold, and the M1 is greater than the M2. Each variable adjustment stride may be determined according to requirements. The present disclosure does not limit the adjustment stride of the data bit width and whether the adjustment stride is variable.

An adjusted quantization parameter may be obtained by calculating the target data according to the adjusted bit width; quantization precision of the quantized data obtained by re-quantizing the target data by using the adjusted quantization parameter is lower than that of the quantized data obtained by using the quantization parameter before adjustment.

FIG. 2-15 is a flowchart illustrating a neural network quantization method, according to an embodiment of the present disclosure. As shown in FIG. 2-15, the neural network quantization method may further include the following.

In a step S45, an adjusted quantization error of target data may be computed according to an adjusted bit width and the target data.

In a step S46, according to the adjusted quantization error and a second error threshold, the adjusted bit width may be decreased continuously until the adjusted quantization error calculated according to the adjusted bit width and the target data is greater than or equal to the second error threshold.

If a data bit width corresponding to the target data is increased according to a quantization error, the adjusted bit width is obtained after the bit width is adjusted once; an adjusted quantization parameter is obtained by calculating according to the adjusted bit width; adjusted quantized data is obtained by quantizing the target data according to the adjusted quantization parameter; and then an adjusted quantization error of the target data is obtained by calculating according to the adjusted quantized data and the target data, where the adjusted quantization error may still be less than the second error threshold; in other words, a data bit width obtained after the bit width is adjusted once may not meet an adjustment purpose. If the adjusted quantization error is still less than the second error threshold, the adjusted data bit width may continue to be adjusted. In other words, the data bit width corresponding to the target data may be decreased many times until the adjusted quantization error obtained according to the final obtained adjusted bit width and the target data is greater than the second error threshold.

The adjustment stride that is decreased many times may be a fixed adjustment stride or a variable adjustment stride. For example, a final data bit width is equal to an original data bit width minus A*N bits, where N is a fixed adjustment stride that is increased each time, and A is the number of times of increasing the data bit width. The final data bit width is equal to an original data bit width minus M2 . . . minus Mm, where M1, M2, . . . , Mm are variable adjustment strides that are decreased each time.

In this embodiment, if a quantization error is less than a second error threshold, a data bit width corresponding to the target data may be decreased and an adjusted bit width corresponding to target data may be obtained. The data bit width may be decreased by setting the second error threshold and an adjustment stride, so that an adjusted data bit width may meet a quantization requirement. If one adjustment does not meet the adjustment requirement, the data bit width may also be adjusted many times. By setting the second error threshold and the adjustment stride, a quantization parameter may be adjusted flexibly according to the quantization requirement, and different quantization requirements may be met, and quantization precision may be able to be adjusted, and a balance between the quantization precision and the computation efficiency of the neural network may be achieved.

In a possible implementation, the method may further include:

if the quantization error is greater than the first error threshold, increasing the data bit width corresponding to the target data; if the quantization error is less than the second error threshold, decreasing the data bit width corresponding to the target data, and obtaining the adjusted bit width corresponding to the target data.

Two error thresholds may be set at the same time, where the first error threshold may be used to indicate that the quantization precision is too low, and in this case, the data bit width may be increased; and the second error threshold may be used to indicate that the quantization precision is too high, and in this case, the data bit width may be decreased. If the first error threshold is greater than the second error threshold, the quantization error of the target data may be compared with the two error thresholds at the same time. If the quantization error is greater than the first error threshold, the data bit width may be increased; if the quantization error is less than the second error threshold, the data bit width may be decreased; and if the quantization error is between the first error threshold and the second error threshold, the data bit width may remain unchanged.

In this embodiment, by comparing a quantization error with a first error threshold and a second error threshold at the same time, a data bit width may be increased or decreased according to a comparison result, and a data bit width may be adjusted more flexibly by using the first error threshold and the second error threshold, so that an adjustment result of the data bit width is more in line with a quantization requirement.

FIG. 2-16 is a flowchart illustrating a neural network quantization method, according to an embodiment of the present disclosure. As shown in FIG. 2-16, during a fine-tuning stage and/or training stage of a neural network operation, the method may further include the following.

In a step S60, a data variation range of target data in a current iteration and historical iterations may be obtained, where the historical iterations are iterations before the current iteration.

A plurality of iterations are included in the fine-tuning stage and/or training stage of the neural network operation. After one forward computation and one backward computation are performed in each layer to be quantized of the neural network and the weight of the layer to be quantized is updated, an iteration is completed. During the plurality of iterations, the data variation range of the target data and/or the quantized data corresponding to the target data in the layer to be quantized may be used to determine whether the target data and/or the quantized data in different iterations may be quantized by using the same quantization parameter. If the data variation range of the target data in the current iteration and the historical iterations is small, which, for example, is less than a set range variation threshold, the same quantization parameter may be used in a plurality of iterations with a small data variation range.

The quantization parameter corresponding to the target data may be determined through a method of fetching a pre-stored quantization parameter. If the target data is quantized in different iterations, it is required to fetch the quantization parameter corresponding to the target data in each iteration. If the data variation range of the target data and/or the quantized data corresponding to the target data in the plurality of iterations is small, the same quantization parameter used in the plurality of iterations with the small data variation range may be temporarily stored. In each iteration, the temporarily-stored quantization parameter may be used for quantization, instead of fetching the quantization parameter in each iteration.

The quantization parameter may be obtained by calculating according to the target data and the data bit width. If the target data is quantized in different iterations, it is required to compute the quantization parameter in each iteration, respectively. If the data variation range of the target data and/or the quantized data corresponding to the target data in the plurality of iterations is small, the same quantization parameter may be used in the plurality of iterations with the small variation range, and in this case, a quantization parameter calculated during a first iteration may be used directly in each iteration, instead of calculating the quantization parameter in each iteration.

It may be understood that if the target data is a weight, the weight of each iteration is constantly updated, and if the data variation range of the weights of the plurality of iterations is small, or if the data variation range of the quantized data corresponding to the weights of the plurality of iterations is small, the same quantization parameter may be used to quantize the weights of the plurality of iterations in the plurality of iterations.

In a step S70, according to the data variation range of the target data, a target iteration interval corresponding to the target data may be determined to make the neural network update the quantization parameter of the target data according to the target iteration interval, where the target iteration interval includes at least one iteration, and the target data may be any type of data to be quantized.

The target iteration interval may be determined according to the data variation range of the target data. The target iteration interval includes at least one iteration. The same quantization parameter may be used in each iteration within the target iteration interval; in other words, the quantization parameter of the target data may no longer be updated in each iteration within the target iteration interval. If the neural network updates the quantization parameter of the target data according to the target iteration interval, including iterations within the target iteration interval, the preset quantization parameter may not be obtained or the quantization parameter may not be calculated; in other words, the quantization parameter may not be updated in the iterations within the target iteration interval. However, in iterations out of the target iteration interval, the preset quantization parameter may be obtained or the quantization parameter may be calculated; in other words, the quantization parameter may be updated in the iterations out of the target iteration interval.

It may be understood that the smaller the data variation range of the target data or the quantized data of the target data in the plurality of iterations is, the more the count of iterations within the determined target iteration interval will be. According to the calculated data variation range, a correspondence between a preset data variation range and an iteration interval may be looked up, and the target iteration interval corresponding to the calculated data variation range may be determined. The correspondence between the preset data variation range and the iteration interval may be preset according to requirements. According to the calculated data variation range, by using a set calculation method, the target iteration interval may be obtained by calculating. The present disclosure does not limit the method of calculating the data variation range and the method of obtaining the target iteration interval.

In this embodiment, during a fine-tuning stage and/or training stage of a neural network operation, a data variation range of target data in a current iteration and historical iterations may be obtained, and according to the data variation range of the target data, a target iteration interval corresponding to the target data may be determined, so that the neural network may update a quantization parameter of the target data according to the target iteration interval. The target iteration interval may be determined according to the data variation range of the target data or quantized data corresponding to the target data in a plurality of iterations. The neural network may determine whether to update the quantization parameter according to the target iteration interval. Since the data variation range of the plurality of iterations that are included in the target iteration interval is small, quantization precision may be also guaranteed even if the quantization parameter may not be updated in the iterations within the target iteration interval. However, if the quantization parameter may not be updated in the plurality of iterations within the target iteration interval, the number of times of fetching or calculating the quantization parameter may be decreased, thereby improving the computation efficiency of the neural network.

FIG. 2-17 is a flowchart illustrating a neural network quantization method, according to an embodiment of the present disclosure. As shown in FIG. 2-17, the neural network quantization method may further include the following.

In a step S80, according to a data bit width of target data in a current iteration, a data bit width of the target data in iterations within a target iteration interval may be determined to make the neural network determine a quantization parameter according to the data bit width of the target data in the iterations within the target iteration interval.

As described in the above-mentioned embodiments of the present disclosure, the quantization parameter of the target data may be preset, or may be obtained by calculating according to the data bit width corresponding to the target data. However, the data bit width corresponding to the target data in different layers to be quantized or the data bit width corresponding to the target data in different iterations in the same layer to be quantized may be adaptively adjusted according to the method of the above-mentioned embodiments of the present disclosure.

If the data bit width of the target data may not be adjusted adaptively and is the preset data bit width, the data bit width of the target data in the iterations within the target iteration interval may be determined according to the preset data bit width of the target data in the current iteration. Each iteration within the target iteration interval may not use its own preset value.

If the data bit width of the target data may be adjusted adaptively, the data bit width of the target data in the iterations within the target iteration interval may be determined according to the data bit width of the target data in the current iteration. If the data bit width may be adjusted adaptively, the data bit width may be adjusted once or many times. The data bit width of the target data after being adaptively adjusted in the current iteration may be used as the data bit width corresponding to each iteration within the target iteration interval, and the data bit width may no longer be adaptively adjusted (updated) in each iteration within the target iteration interval. The target data may use the data bit width after being adaptively adjusted in the current iteration or may use the data bit width before being adaptively adjusted, which is not limited in the present disclosure.

Since the data variation range of the target data does not meet a set condition, the data bit width may be adaptively adjusted in other iterations out of the target iteration interval according to the method of the present disclosure, and the data bit width that is more in accordance with the target data of the current iteration may be obtained. Or by using a method of calculating the target iteration interval of the present disclosure, a new target iteration interval may be obtained by calculating and may be used, and therefore, while the quantization precision of the iterations out of the target iteration interval is ensured, the computation efficiency of the neural network is also improved.

If the data bit width of each iteration within the target iteration interval is the same, for each iteration, corresponding quantization parameters may be obtained by calculating respectively according to the same data bit width. The quantization parameter may include at least one of parameters including a point location, a scale factor, and an offset. In each iteration within the target iteration interval, the quantization parameter may be obtained by calculating respectively according to the same data bit width. If the quantization parameter includes the point location, the scaling factor and the offset, in each iteration within the target iteration interval, by using the same data bit width, the corresponding point location, scaling factor and offset may be calculated, respectively.

If the data bit width of each iteration within the target iteration interval is determined according to the data bit width of the current iteration, the quantization parameter corresponding to each iteration within the target iteration interval may be determined according to the quantization parameter of the current iteration. If the quantization parameter of each iteration within the target iteration interval may not be obtained by calculating again according to the same data bit width, the computation efficiency of the neural network may be further improved. The quantization parameter corresponding to each iteration within the target iteration interval may be determined according to all or part of the quantization parameters of the current iteration. If the quantization parameter corresponding to each iteration within the target iteration interval is determined according to part of the quantization parameters of the current iteration, the remaining quantization parameters may still be required to be calculated in each iteration within the target iteration interval.

For example, the quantization parameter includes the point location, the scaling factor, and the offset. The data bit width and the point location of each iteration within the target iteration interval may be determined according to the data bit width and the point location of the current iteration. In this case, the scaling factor and the offset of each iteration within the target iteration interval may be required to be calculated according to the same data bit width. The data bit width, the point location, the scaling factor, and the offset of each iteration within the target iteration interval may also be determined according to the data bit width, the point location, the scaling factor, and the offset of the current iteration. In this case, the quantization parameters of each iteration within the target iteration interval may not be required to be obtained by calculating.

In this embodiment, according to a data bit width of target data in a current iteration, a data bit width of target data in iterations within a target iteration interval may be determined, so that the neural network may determine a quantization parameter according to the data bit width of the target data in the iterations within the target iteration interval. A data bit width of each iteration within the target iteration interval may be determined according to the data bit width of the current iteration. Since a data variation range of the target data in each iteration within the target iteration interval meets a set condition, a quantization parameter that is obtained by calculating by using the same data bit width may ensure quantization precision of each iteration within the target iteration interval. Each iteration within the target iteration interval uses the same data bit width, which may also improve computation efficiency of the neural network. In this way, a balance between the accuracy of computation results of the neural network after quantization and the computation efficiency of the neural network may be achieved.

FIG. 2-18 is a flowchart illustrating a neural network quantization method, according to an embodiment of the present disclosure. As shown in FIG. 2-18, the neural network quantization method may further include the following.

In a step S90, a point location of target data in iterations within a target iteration interval may be determined according to a point location of target data in a current iteration.

In a quantization parameter, compared with a scaling factor and an offset, different point locations may have a great impact on quantization results of the same target data. The point location of the target data in the iterations within the target iteration interval may be determined according to the point location of the target data in the current iteration. If a data bit width may not be adjusted adaptively, a preset point location of the target data in the current iteration may be used as the point location of the target data in each iteration within the target iteration interval; or the point location of the target data in the current iteration that is obtained by calculating according to a preset data bit width may be used as the point location of the target data in each iteration within the target iteration interval. If the data bit width may be adjusted adaptively, the point location of the target data that is adjusted in the current iteration may be used as the point location of the target data in each iteration within the target iteration interval.

The point location of the target data in the iterations within the target iteration interval may be determined according to the point location of the target data in the current iteration, and at the same time, a scaling factor of the target data in the iterations within the target iteration interval may be determined according to a scaling factor of the target data in the current iteration; and/or an offset of the target data in the iterations within the target iteration interval may be determined according to an offset of the target data in the current iteration.

The point location of the target data in the iterations within the target iteration interval may be determined according to the point location of the target data in the current iteration, and at the same time, a data bit width of the target data in the iterations within the target iteration interval may be determined according to a data bit width of the target data in the current iteration, where the data bit width of the target data in the current iteration may be a preset data bit width of the current iteration or may be a data bit width after being adaptively adjusted.

In this embodiment, a point location of target data in iterations within a target iteration interval may be determined according to a point location of target data in a current iteration. The point location in each iteration within the target iteration interval may be determined according to the point location of the target data in the current iteration. Since a data variation range of the target data in each iteration within the target iteration interval meets a set condition, by using the same point location, quantization precision of each iteration within the target iteration interval may be ensured. Using the same point location in each iteration within the target iteration interval may also improve computation efficiency of the neural network. In this way, a balance between the accuracy of computation results of the neural network after quantization and the computation efficiency of the neural network may be achieved.

FIG. 2-19 is a flowchart illustrating a neural network quantization method, according to an embodiment of the present disclosure. As shown in FIG. 2-19, the step S60 of the neural network quantization method may include the following.

In a step S61, according to a point location of target data in a current iteration and a point location of target data in historical iterations corresponding to the current iteration determined according to a historical iteration interval, a moving mean value of target data in point locations of iteration intervals may be calculated.

In a step S62, a first data variation range may be obtained according to a first moving mean value of the point location of the target data in the current iteration and a second moving mean value of the target data in a point location in an iteration corresponding to a previous iteration interval;

A step S70 may include the following.

In a step S71, a target iteration interval corresponding to the target data may be determined according to the first data variation range to make the neural network update a quantization parameter of the target data according to the target iteration interval.

In a possible implementation, the historical iterations corresponding to the current iteration determined according to the historical iteration interval may be used as a historical iteration for calculating the target iteration interval. A correspondence between the current iteration and a corresponding target iteration interval may include the following.

The target iteration interval may be counted from the current iteration, and the target iteration interval may be recalculated from a next iteration after the target iteration interval corresponding to the current iteration. For example, if the current iteration is the 100th iteration, and the target iteration interval is 3, and the iterations within the target iteration interval include the 100th iteration, the 101st iteration, and the 102nd iteration, the target iteration interval corresponding to the 103rd iteration may be calculated in the 103rd iteration, and the first iteration within the target iteration interval may be calculated from the 103rd iteration. At this time, the current iteration is the 103rd iteration, and the historical iteration corresponding to the current iteration determined according to the historical iteration interval is the 100th iteration.

The target iteration interval may be counted from the next iteration after the current iteration, and the target iteration interval may be recalculated from the last iteration within the target iteration interval. For example, if the current iteration is the 100th iteration, and the target iteration interval is 3, and the iterations within the target iteration interval include the 101st iteration, the 102nd iteration, and the 103rd iteration, the target iteration interval corresponding to the 103rd iteration may be calculated in the 103rd iteration, and the first iteration within the target iteration interval may be calculated from the 104th iteration. At this time, the current iteration is the 103rd iteration, and the historical iteration corresponding to the current iteration determined according to the historical iteration interval is the 100th iteration.

The target iteration interval may be counted from a next iteration after the current iteration, and the target iteration interval may be recalculated from the next iteration after the target iteration interval. For example, if the current iteration is the 100th iteration, and the target iteration interval is 3, and the iterations within the target iteration interval include the 101st iteration, the 102nd iteration, and the 103rd iteration, the target iteration interval corresponding to the 104th iteration may be calculated in the 104th iteration, and the first iteration within the target iteration interval may be calculated from the 105th iteration. At this time, the current iteration is the 104th iteration, and the historical iteration corresponding to the current iteration determined according to the historical iteration interval is the 100th iteration.

Other correspondences between the current iteration and the target iteration interval may be determined according to requirements. For example, the target iteration interval may be counted from an N-th iteration after the current iteration, where N is greater than 1. This is not limited in the present disclosure.

It may be understood that the calculated moving mean value of the target data in the point locations of the iteration intervals may include the first moving mean value of the target data in the point location of the current iteration, and the second moving mean value of the target data in the point location of the iteration corresponding to the previous iteration interval. By using a formula (24), the first moving mean value m (t) of the point location corresponding to the current iteration may be calculated:

$$m^{(t)} \leftarrow \alpha \times s^{(t)} + (1-\alpha) \times m^{(t-1)}. \qquad \text{Formula (24)}$$

In this formula, t is the current iteration, and t−1 is the historical iteration determined according to the previous iteration interval, and $m^{(t-1)}$ is the second moving mean value of the historical iteration determined according to the previous iteration interval, and a is the point location of the current iteration, and a is a first parameter. The first parameter may be a hyper-parameter.

In this embodiment, a moving mean value of target data in point locations of iteration intervals may be calculated according to a point location of the target data in a current iteration and a point location in a historical iteration corresponding to the current iteration determined according to a historical iteration interval; and a first data variation range may be obtained according to a first moving mean value of the target data in the point location of the current iteration and a second moving mean value of the target data in the point location of the iteration corresponding to the previous iteration interval. A target iteration interval corresponding to the target data may be determined according to the first data variation range, so that the neural network may update a quantization parameter of the target data according to a target iteration interval. Since the first data variation range may be used to indicate a variation trend of the point location, the target iteration interval may vary with the variation trend of the point location of the target data, and the size of each calculated target iteration interval may also vary with the variation trend of the point location of the target data. Since the quantization parameter is determined according to the target iteration interval, the quantized data obtained according to the quantization parameter may be more in accordance with the variation trend of the point location of the target data, which may improve the computation efficiency of the neural network while ensuring the quantization precision.

FIG. 2-20 is a flowchart illustrating a neural network quantization method, according to an embodiment of the present disclosure. As shown in FIG. 2-20, the step S62 of the neural network quantization method may include the following.

In a step S621, a difference between a first moving mean value and a second moving mean value may be calculated.

In a step S622, an absolute value of the difference may be determined as a first data variation range.

By using a formula (25), the first data variation range $diff_{update1}$ may be calculated:

$$diff_{update1} = |m^{(t)} - m^{(t-1)}| = \alpha|s^{(t)} - m^{(t-1)}|. \quad \text{Formula (25)}$$

The target iteration interval corresponding to the target data may be determined according to the first data variation range, so that the neural network may update the quantization parameter of the target data according to the target iteration interval. According to a formula (26), the target iteration interval I may be calculated:

$$I = \frac{\beta}{diff_{update1}} - \gamma. \quad \text{Formula (26)}$$

In this formula, $\beta$ is a second parameter, and $\gamma$ is a third parameter. Both the second parameter and the third parameter may be hyper-parameters.

It may be understood that the first data variation range may be used to indicate the variation trend of the point location. The greater the first data variation range is, the more drastic the range variation of the quantized data will be, and in this case, when the quantization parameter is updated, a shorter target iteration interval I is required.

In this embodiment, a difference between a first moving mean value and a second moving mean value may be calculated; and an absolute value of the difference may be determined as a first data variation range. An accurate first data variation range may be obtained according to a difference between moving mean values.

FIG. 2-21 is a flowchart illustrating a neural network quantization method, according to an embodiment of the present disclosure. As shown in FIG. 2-21, the neural network quantization method may further include the following.

In a step S63, a second data variation range may be obtained according to target data and quantized data corresponding to the target data in a current iteration.

A step S70 may include the following.

In a step S72, a target iteration interval corresponding to the target data may be determined according to the first data variation range and the second data variation range of the target data to make the neural network update the quantization parameter of the target data according to the target iteration interval.

The second data variation range may be obtained according to the target data and the quantized data corresponding to the target data in the current iteration. The second data variation range may also be obtained according to the target data and the inverse-quantized data corresponding to the target data in the current iteration.

Similarly, according to a formula (23), the second data variation range $diff_{bit}$ of the target data and the inverse-quantized data corresponding to the target data in the current iteration may be calculated. The second data variation range $diff_{bit}$ of the target data and the inverse-quantized data corresponding to the target data may be also calculated by using other error calculation methods. This is not limited in the present disclosure.

$$diff_{bit} = \log_2\left(\frac{\sum_i |z_i^{(n)}| - \sum_i |z_i|}{\sum_i |z_i|} + 1\right). \quad \text{Formula (23)}$$

In this formula, $z_i$ is the target data, and $z_i^{(n)}$ is the inverse-quantized data corresponding to the target data. It may be understood that the second data variation range may be used to indicate a variation trend of the data bit width of the target data. The greater the second data variation range is, the more likely the target data is required to update the corresponding data bit width, and the shorter the iteration is required to be for updating. In other words, the greater the second data variation range is, the smaller the target iteration interval is required to be.

In this embodiment, the second data variation range may be obtained according to the target data and the quantized data corresponding to the target data in the current iteration. The target iteration interval corresponding to the target data may be determined according to the first data variation range and the second data variation range of the target data, so that the neural network may update the quantization parameter of the target data according to the target iteration interval. Since the second data variation range may be used to indicate the variation requirement of the data bit width, the target iteration interval obtained by calculating according to the first data variation range and the second data variation range may track the variation of the point location and the variation of the data bit width at the same time. In this case, the target iteration interval may better meet the data quantization requirement of the target data itself.

FIG. 2-22 is a flowchart illustrating a neural network quantization method, according to an embodiment of the present disclosure. As shown in FIG. 2-22, the step S63 of the neural network quantization method may include the following.

In a step S631, an error between target data and quantized data corresponding to the target data in a current iteration may be calculated.

In a step S632, a square of the error may be determined as a second data variation range.

By using a formula (27), the second data variation range $diff_{update2}$ may be obtained by calculating:

$$diff_{update2} = \delta * diff_{bit}^2. \quad \text{Formula (27)}$$

In this formula, $\delta$ is a fourth parameter which may be a hyper-parameter.

It may be understood that by using different data bit widths, different quantization parameters may be obtained, and different pieces of quantized data may further be obtained. In this case, different second data variation ranges may be generated. The second data variation range may be used to indicate a variation trend of the data bit width. The greater the second data variation range is, the shorter the target iteration interval is required to be for updating the data bit width more frequently; in other words, the smaller the target iteration interval is required to be.

FIG. 2-23 is a flowchart illustrating a neural network quantization method, according to an embodiment of the present disclosure. As shown in FIG. 2-23, the step S72 may include the following.

In a step S721, a target iteration interval corresponding to target data may be determined according to a maximum value between a first data variation range and a second data variation range.

According to a formula (28), the target iteration interval may be obtained by calculating:

$$I = \frac{\beta}{\max(diff_{update1}, diff_{update2})} - \gamma. \quad \text{Formula (28)}$$

In this formula, β is a second parameter, and γ is a third parameter. Both the second parameter and the third parameter may be hyper-parameters.

It may be understood that the target iteration interval obtained by using the first data variation range and the second data variation range may measure the variation trend of the data bit width and the variation trend of the point location at the same time. If one of the two variation trends is greater, the target iteration interval may vary accordingly. The target iteration interval may track the variation of the data bit width and the variation of the point location at the same time and make corresponding adjustments, so that the quantization parameter updated according to the target iteration interval may be more in accordance with the variation trend of the target data, and finally the quantized data obtained according to the quantization parameter may better meet the quantization requirement.

FIG. 2-24 is a flowchart illustrating a neural network quantization method, according to an embodiment of the present disclosure. As shown in FIG. 2-24, the step S60 of the neural network quantization method may include the following.

In a step S64, if a current iteration is out of an update period, the data variation range of the target data in the current iteration and the historical iterations may be obtained, where the update period includes at least one iteration.

In the training process and/or fine-tuning process of the neural network operation, the target data varies greatly in a plurality of iterations at the beginning of training or fine-tuning. If the target iteration interval is calculated in the plurality of iterations at the beginning of training or fine-tuning process, the calculated target iteration interval may lose corresponding usefulness. According to a preset update period, in each iteration within the update period, the target iteration interval may not be calculated, and it is not applicable that the target iteration interval enables the plurality of iterations to use the same data bit width or point location.

If the iteration goes out of the update period, or if the current iteration is out of the update period, the data variation range of the target data in the current iteration and the historical iterations may be obtained; and according to the variation range of the target data, the target iteration interval corresponding to the target data may be determined, so that the neural network may update the quantization parameter of the target data according to the target iteration interval. For example, if a preset update period is 100 iterations, the target iteration interval may not be calculated from the 1st iteration to the 100th iteration. If the iteration goes to the 101st iteration, or if the current iteration is the 101st iteration, the current iteration is out of the update period, and at this time, the target iteration interval corresponding to the target data in the 101st iteration may be determined according to the variation range of the target data in the 101st iteration and iterations from the 1st iteration to the 100th iteration, and the calculated target iteration interval may be used in the 101st iteration or an iteration at an interval of a preset count of iterations from the 101st iteration.

The update period may be counted from the preset count of iterations. For example, a plurality of iterations in the update period may be counted from the 1st iteration, or a plurality of iterations in the update period may be counted from the N-th iteration. This is not limited in the present disclosure.

In this embodiment, if an iteration goes out of the update period, the target iteration interval may be calculated and used, which may avoid the problem that the target iteration interval is of little significance due to the great variation of the target data in the early stage of the training process or fine-tuning process of the neural network operation and may further improve the computation efficiency of the neural network in the case of using the target iteration interval.

FIG. 2-25 is a flowchart illustrating a neural network quantization method, according to an embodiment of the present disclosure. As shown in FIG. 2-25, the neural network quantization method may further include the following.

In a step S100, if a current iteration is within a preset period, a period interval may be determined according to the current iteration, an iteration corresponding to the current iteration in a next period after the preset period, and an iteration interval corresponding to the current iteration;

In a step S110, the data bit width of the target data in an iteration within the period interval may be determined according to the data bit width of the target data in the current iteration; or the point location of the target data in the iteration within the period interval may be determined according to the point location of the target data in the current iteration.

There are a plurality of periods in the training process or fine-tuning process of the neural network operation, where each period may include a plurality of iterations. A process that data used for the neural network operation is completely calculated once is referred to as one period. During the training process, as the iteration progresses, the weight of the neural network tends to be stable. After the training is stable, the data to be quantized such as the neuron, the weight, the bias and the gradient may tend to be stable. When the target data tends to be stable, the data bit width and the quantization parameter of the target data also tend to be stable. Similarly, in the fine-tuning process, after the fine-tuning is stable, the data bit width and the quantization parameter of the target data also tend to be stable.

Therefore, a preset period may be determined according to a period in which the training is stable or the fine-tuning is stable. A period after the period in which the training is stable or the fine-tuning is stable may be determined as the preset period. For example, if the period in which the training is stable is the M-th period, a period after the M-th period may be determined as the preset period. In the preset period, one target iteration interval may be calculated at every one period, and the data bit width or the quantization parameter may be adjusted once according to the calculated target iteration interval, so as to reduce the number of times of updating the data bit width or the quantization parameter and improve the computation efficiency of the neural network.

For example, the preset period may be the period after the M-th period. In the M+1-th period, the target iteration interval obtained by calculating according to the P-th iteration in the M-th period ends at the Q-th iteration in the M+1-th period, and a corresponding target iteration interval $I_{m+1}$ may be obtained by calculating according to the $Q_{m+1}$-th iteration in the M+1-th period. In the M+2-th period, an iteration corresponding to the $Q_{m+1}$-th iteration in the M+1-th period may be the $Q_{m+2}$-th iteration. A period interval starts from the $Q_{m+1}$-th iteration in the M+1-th period and ends at the $Q_{m+2}+I_{m+1}$-th iteration in the M+2-th period. In each iteration within the period interval, the quantization parameter such as the data bit width or the point location determined according to the $Q_{m+1}$-th iteration in the M+1-th period may be used.

In this embodiment, a period interval may be set. After a training or fine-tuning stage of a neural network operation is stable, a quantization parameter such as a data bit width or a point location may be updated every period according to the period interval. After the training or fine-tuning stage is stable, the period interval may decrease the number of times of updating the data bit width or the point location, which may improve computation efficiency of a neural network while ensuring quantization precision.

It is required to be noted that, the aforementioned method embodiments, for the sake of conciseness, are all described as a series of action combinations, but those skilled in the art should know that since according to the present disclosure, the steps may be performed in a different order or simultaneously, the present disclosure is not limited by the described order of action. Secondly, those skilled in the art should also understand that the examples described in the specification are all optional, and the actions and units involved are not necessarily required for this disclosure.

Further, it is required to be further explained that though the steps in the flowcharts from FIG. 2-1 to FIG. 2-6 are shown by following the direction of arrows, yet these steps may not necessarily be performed according to the order indicated by the arrows. Unless clearly stated herein, the order for performing these steps is not strictly restricted, and these steps may be performed in a different order. Additionally, at least part of the steps shown in FIGS. 2-1 to 2-6 may include a plurality of sub-steps or a plurality of stages. These sub-steps or stages may not be necessarily required to be performed and completed at the same time, instead, these sub-steps or stages may be performed at different time. These sub-steps or stages may not be necessarily required to be performed sequentially either, instead, these sub-steps or stages may be performed in turn or alternately with at least part of other steps, or sub-steps of other steps, or stages.

FIG. 2-26 is a schematic diagram of a neural network quantization apparatus, according to an embodiment of the present disclosure. As shown in FIG. 2-26, the present disclosure provides a neural network quantization apparatus, where for any layer to be quantized in the neural network, and the apparatus includes:

- a quantization parameter determination unit 10 configured to determine a quantization parameter corresponding to each type of data to be quantized in a layer to be quantized, where the data to be quantized includes at least one type of data including a neuron, a weight, a bias and a gradient;
- a quantization unit 20 configured to quantize the data to be quantized according to a corresponding quantization parameter and obtain quantized data, so that the neural network is operated according to the quantized data.

In a possible implementation, the quantization parameter may include at least one of parameters including a point location, a scaling factor, and an offset, where

- the point location is a decimal point location after quantization;
- the scaling factor is a ratio between a maximum value of the quantized data and a maximum value of an absolute value of the data to be quantized; and
- the offset is an intermediate value of the data to be quantized.

FIG. 2-27 is a schematic diagram of a neural network quantization apparatus, according to an embodiment of the present disclosure. As shown in FIG. 2-27, a quantization parameter determination unit 10 may include:

- a first quantization parameter determination sub-unit 11 configured to determine a quantization parameter corresponding to each type of data to be quantized in a layer to be quantized by looking up a correspondence between data to be quantized and the quantization parameter.

In a possible implementation, the quantization parameter determination unit 10 may include:

- a second quantization parameter determination sub-unit 12 configured to obtain a corresponding quantization parameter by calculating according to each type of data to be quantized and a corresponding data bit width.

In a possible implementation, the second quantization parameter determination sub-unit 12 may include:

- a first point location calculation unit 121 configured to, if the quantization parameter does not include an offset, obtain a point location of target data according to a maximum value of an absolute value of the target data and the data bit width corresponding to the target data, where the target data is any type of data to be quantized.

In a possible implementation, the second quantization parameter determination sub-unit 12 may include:

- a first scaling factor calculation unit 122 configured to, if the quantization parameter does not include the offset, obtain a maximum value of quantized data of the target data according to the target data and the data bit width corresponding to the target data, where the target data may be any type of data to be quantized, and obtain a scaling factor of the target data according to the maximum value of the absolute value of the target data and the maximum value of the quantized data of the target data.

In a possible implementation, the second quantization parameter determination sub-unit 12 may include:

- a second point location calculation unit 123 configured to, if the quantization parameter includes the offset, obtain the point location of the target data according to the maximum value of the target data, the minimum value of the target data, and the data bit width corresponding to the target data, where the target data may be any type of data to be quantized.

In a possible implementation, the second quantization parameter determination sub-unit 12 may include:

- a second scaling factor calculation unit 124 configured to, if the quantization parameter includes the offset, obtain the maximum value of the quantized data of the target data according to the target data and the data bit width corresponding to the target data, where the target data may be any type of data to be quantized, and obtain the scaling factor of the target data according to the maximum value of the target data, the minimum value of the target data, and the maximum value of the quantized data of the target data.

In a possible implementation, the second quantization parameter determination sub-unit 12 may include:

- an offset calculation unit 125 configured to obtain the offset of the target data according to the maximum value of the target data and the minimum value of the target data, where the target data is any type of the data to be quantized.

FIG. 2-28 is a schematic diagram of a neural network quantization apparatus, according to an embodiment of the present disclosure. As shown in FIG. 2-28, in a possible implementation, the apparatus may further include:

a quantization error determination unit 30 configured to determine a quantization error of target data according to the target data and quantized data corresponding to the target data, where the target data is any type of the data to be quantized;

an adjusted bit width determination unit 40 configured to adjust a data bit width corresponding to target data according to a quantization error and an error threshold, and obtain an adjusted bit width corresponding to the target data; and an adjusted quantization parameter determination unit 50 configured to update the data bit width corresponding to the target data as the adjusted bit width and obtain a corresponding adjusted quantization parameter by calculating according to the target data and the adjusted bit width, so that the neural network is quantized according to the adjusted quantization parameter.

In a possible implementation, the adjusted bit width determination unit 40 may include:

a first adjusted bit width determination sub-unit 41 configured to, if the quantization error is greater than a first error threshold, increase the data bit width corresponding to the target data and obtain the adjusted bit width corresponding to the target data.

In a possible implementation, the adjusted bit width determination unit 40 may further include:

a first adjusted quantization error determination sub-unit 42 configured to calculate an adjusted quantization error of the target data according to the adjusted bit width and the target data; and a first adjusted bit width loop determination sub-unit 43 configured to continue to increase the adjusted bit width according to the adjusted quantization error and the first error threshold until the adjusted quantization error that is obtained by calculating according to the adjusted bit width and the target data is less than or equal to the first error threshold.

In a possible implementation, the adjusted bit width determination unit 40 may include:

a second adjusted bit width determination sub-unit 44 configured to, if the quantization error is less than the second error threshold, decrease the data bit width corresponding to the target data, where the second error threshold is less than the first error threshold.

In a possible implementation, the adjusted bit width determination unit 40 may further include:

a second adjusted quantization error determination sub-unit 45 configured to calculate the adjusted quantization error of the target data according to the adjusted bit width and the target data; and a second adjusted bit width loop determination sub-unit 46 configured to continue to decrease the adjusted bit width according to the adjusted quantization error and the second error threshold until the adjusted quantization error that is obtained according to the adjusted bit width and the target data is greater than or equal to the second error threshold.

FIG. 2-29 is a schematic diagram of a neural network quantization apparatus, according to an embodiment of the present disclosure. As shown in FIG. 2-29, in a possible implementation, during a fine-tuning stage and/or a training stage of a neural network operation, the apparatus may further include:

a data variation range determination unit 60 configured to obtain a data variation range of target data in a current iteration and historical iterations, where the historical iterations are iterations before the current iteration; and a target iteration interval determination unit 70 configured to determine a target iteration interval corresponding to the target data according to the data variation range of the target data, so that the neural network updates the quantization parameter of the target data according to the target iteration interval, where the target iteration interval includes at least one iteration, and the target data is any type of data to be quantized.

In a possible implementation, the apparatus may further include:

a first target iteration interval application unit 80 configured to determine the data bit width of the target data in iterations within the target iteration interval according to the data bit width of the target data in the current iteration, so that the neural network determines the quantization parameter according to the data bit width of the target data in the iterations within the target iteration interval.

In a possible implementation, the apparatus may further include:

a second target iteration interval application unit 90 configured to determine a point location of the target data in the iterations within the target iteration interval according to a point location of the target data in the current iteration.

In a possible implementation, the data variation range determination unit 60 may include:

a moving mean value calculation sub-unit 61 configured to calculate a moving mean value of the point locations of the target data in the iteration intervals according to the point location of the target data in the current iteration and the point locations in the historical iterations corresponding to the current iteration determined according to a historical iteration interval; and a first data variation range determination sub-unit 62 configured to obtain a first data variation range according to a first moving mean value of target data in a point location of a current iteration and a second moving mean value of target data in a point location in an iteration corresponding to a previous iteration interval.

The target iteration interval determination unit 70 may include:

a first target iteration interval determination sub-unit 71 configured to determine the target iteration interval corresponding to the target data according to the first data variation range, so that the neural network updates the quantization parameter of the target data according to the target iteration interval.

In a possible implementation, the first data variation range determination sub-unit 62 may include:

a first data variation range determination unit 621 configured to calculate a difference between a first moving mean value and a second moving mean value and determine an absolute value of the difference as the first data variation range.

In a possible implementation, the data variation range determination unit 60 may further include:

a second data variation range determination sub-unit 63 configured to obtain a second data variation range according to the target data and the quantized data corresponding to the target data in the current iteration.

The target iteration interval determination unit 70 may include:

a second target iteration interval determination sub-unit 72 configured to determine the target iteration interval corresponding to the target data according to the first data variation range and the second data variation range of the target data, so that the neural network updates the quantization parameter of the target data according to the target iteration interval.

In a possible implementation, the second data variation range determination unit 63 may include:

a second data variation range determination unit 631 configured to compute an error between the target data and the quantized data corresponding to the target data in the current iteration, and determine a square of the error as the second data variation range.

In a possible implementation, the second target iteration interval determination sub-unit 72 configured to determine the target iteration interval corresponding to the target data according to a maximum value of the first data variation range and the second data variation range.

In a possible implementation, the data variation range determination unit 60 may include:

a third data variation range determination sub-unit 64 configured to, if the current iteration is out of an update period, obtain the data variation range of the target data in the current iteration and the historical iterations, where the update period includes at least one iteration.

FIG. 2-30 is a schematic diagram of a neural network quantization apparatus, according to an embodiment of the present disclosure. As shown in FIG. 2-30, in a possible implementation, the apparatus may further include:

a period interval determination unit 100 configured to, if the current iteration is within a preset period, determine a period interval according to the current iteration, an iteration corresponding to the current iteration in a next period after the preset period, and an iteration interval corresponding to the current iteration;

a first period interval application unit 110 configured to determine the data bit width of the target data in an iteration within the period interval according to the data bit width of the target data in the current iteration; or a second period interval application unit 120 configured to determine a point location of the target data in the iteration within the period interval according to a point location of the target data in the current iteration.

In a possible implementation, the apparatus may further include:

a quantization parameter application unit 130 configured to use the quantization parameter of the layer to be quantized in one or more layers after the layer to be quantized.

It should be understood that the foregoing apparatus embodiments are only illustrative, and the apparatus of the present disclosure may also be implemented in other ways. For example, a division of the units/units in the foregoing embodiment is only a logical function division, and there may be other division methods in actual implementation. For example, a plurality of units, units, or components may be combined or integrated into another system, or some features may be omitted or not implemented.

The units or units described as detach components may be physically separated or not. The components described as units or units may or may not be physical units. In other words, the components may be located in one apparatus or may be distributed to a plurality of apparatuses. According to certain needs, some or all of the units may be selected for realizing the solutions of the embodiments of the present disclosure.

In addition, unless otherwise specified, the functional units/units in the various embodiments of the present disclosure may be integrated into one unit/unit. Alternatively, each unit/unit may exist alone physically. Alternatively, two or more units/units may be integrated together. The above-mentioned integrated units/units may be implemented in the form of hardware or in the form of software program units.

If the above-mentioned integrated units/units are implemented in the form of hardware, the hardware may be a digital circuit, an analog circuit, and the like. Physical implementation of the hardware structure may include but be not limited to, a transistor, a memristor, and the like. Unless otherwise specified, an artificial intelligence processor may be any appropriate hardware processor, such as a CPU, a GPU, a field-programmable gate array (FPGA), a digital signal processor (DSP), an application-specific integrated circuit (ASIC), and the like. Unless otherwise specified, a storage unit may be any suitable magnetic storage medium or magneto-optical storage medium, such as a resistive random access memory (RRAM), a dynamic random access memory (DRAM), a static random access memory (SRAM), an enhanced dynamic random access memory (EDRAM), a high-bandwidth memory (HBM), a hybrid memory cube (HMC), and the like.

If the integrated units/units are implemented in the form of software program units and sold or used as an independent product, the integrated units/units may be stored in a computer-readable memory. Based on such understanding, the essence of the technical solutions of the present disclosure, or a part of the present disclosure that contributes to the prior art, or all or part of technical solutions, may all or partly embodied in the form of a software product that is stored in a memory. The software product includes several instructions to enable a computer device (which may be a personal computer, a server, or a network device, and the like) to perform all or part of the steps of the method of the embodiments of the present disclosure. The foregoing memory includes: a USB flash drive, a read-only memory (ROM), a random access memory (RAM), a mobile hard disk, a magnetic disk, or an optical disc, and other media that may store program codes.

In a possible implementation, the present disclosure provides an artificial intelligence chip including the above-mentioned data synchronization apparatus.

In a possible implementation, the present disclosure provides a board card including a storage component, an interface apparatus, a control component, and the above-mentioned artificial intelligence chip. The artificial intelligence chip is connected to the storage component, the control component, and the interface apparatus, respectively; the storage component is configured to store data; the interface apparatus is configured to implement data transfer between the artificial intelligence chip and an external device; and the control component is configured to monitor a state of the artificial intelligence chip.

FIG. 2-31 is a structural block diagram of a board card, according to an embodiment of the present disclosure. Referring to FIG. 2-31, in addition to the above-mentioned chip 389, the board card may further include other supporting components. The supporting components may include but be not limited to, a storage component 390, an interface apparatus 391, and a control component 392.

The storage component 390 is connected to the artificial intelligence chip through a bus, and is configured to store data. The storage component may include a plurality of groups of storage units 393. Each group of storage units is connected to the artificial intelligence chip through the bus. It may be understood that each group of the storage units may be a DDR SDRAM.

A DDR may double the speed of SDRAM without increasing the clock frequency. The DDR allows data to be read on the rising and falling edges of the clock pulse. A speed of DDR is twice that of a standard SDRAM. In an embodiment, a storage apparatus may include 4 groups of storage units. Each group of storage units may include a plurality of DDR4 particles (chips). In an embodiment, four 72-bit DDR4 controllers may be arranged inside the artificial intelligence chip, where 64 bit of each 72-bit DDR4 controller is for data transfer and 8 bit is for an error checking and correcting (ECC) parity. It may be understood that if each group of the storage units adopts DDR4-3200 particles, theoretical bandwidth of data transfer may reach 25600 MB/s.

In an embodiment, each group of the storage units may include a plurality of DDR SDRAMs arranged in parallel. The DDR may transfer data twice per clock cycle. A DDR controller may be arranged inside the chip for controlling the data transfer and data storage of each storage unit.

The interface apparatus may be electrically connected to the artificial intelligence chip. The interface apparatus is configured to realize data transfer between the artificial intelligence chip and an external device (such as a server or a computer). In an embodiment, the interface apparatus may be a standard peripheral component interconnect express (PCIe). For instance, data to be processed may be transferred by a server through the standard PCIe to the chip, thereby realizing data transfer. Alternatively, if a PCIe 3.0×16 interface is adopted for transferring, theoretical bandwidth may reach 16000 MB/s. In another embodiment, the interface apparatus may also be other interfaces. The present disclosure does not restrict a specific form of the another interface as long as the interface unit may realize the transferring function. In addition, a computation result of the artificial intelligence chip may still be transferred by the interface apparatus to an external device (such as a server).

The control component is electrically connected to the artificial intelligence chip. The control component is configured to monitor a state of the artificial intelligence chip. Specifically, the artificial intelligence chip and the control component may be electrically connected through a serial peripheral interface (SPI). The control component may include an MCU (Micro Controller Unit). If the artificial intelligence chip includes a plurality of processing chips, a plurality of processing cores, or a plurality of processing circuits, the chip is capable of driving a plurality of loads. In this case, the artificial intelligence chip may be in different working states, such as a multi-load state and a light-load state. The working states of the plurality of processing chips, the plurality of processing cores, or a plurality of processing circuits may be regulated and controlled by the control component.

In a possible implementation, an electronic device is provided. The electronic device includes the artificial intelligence chip. The electronic device includes a data processing apparatus, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device.

The vehicle includes an airplane, a ship, and/or a car; the household appliance includes a television, an air conditioner, a microwave oven, a refrigerator, an electric rice cooker, a humidifier, a washing machine, an electric lamp, a gas cooker, and a range hood; and the medical device includes a nuclear magnetic resonance spectrometer, a B-ultrasonic scanner, and/or an electrocardiograph.

The foregoing may be better understood according to the following articles:

B1. A neural network quantization method, where for any layer to be quantized in a neural network, the method includes:

determining a quantization parameter corresponding to each type of data to be quantized in a layer to be quantized, where the data to be quantized includes at least one type of data including a neuron, a weight, a bias and a gradient; and quantizing the data to be quantized according to a corresponding quantization parameter and obtaining quantized data, so that the neural network is operated according to the quantized data.

B2. The method of article B1, where the quantization parameter includes at least one of parameters including a point location, a scaling factor, and an offset, where the point location is a decimal point location after quantization;

the scaling factor is a ratio between a maximum value of the quantized data and a maximum value of an absolute value of the data to be quantized; and the offset is an intermediate value of the data to be quantized.

B3. The method of article B1 or article B2, where determining the quantization parameter corresponding to each type of data to be quantized in the layer to be quantized includes:

determining the quantization parameter corresponding to each type of data to be quantized in the layer to be quantized by looking up a correspondence between the data to be quantized and the quantization parameter.

B4. The method of article B1 or article B2, where determining the quantization parameter corresponding to each type of data to be quantized in the layer to be quantized includes:

obtaining the corresponding quantization parameter by calculating according to each type of data to be quantized and a corresponding data bit width.

B5. The method of article B4, where obtaining the corresponding quantization parameter by calculating according to each type of data to be quantized and the corresponding data bit width includes:

if the quantization parameter does not include the offset, according to a maximum value of an absolute value of target data and a data bit width corresponding to the target data, obtaining a point location of the target data, where the target data is any type of data to be quantized.

B6. The method of article B4, where obtaining the corresponding quantization parameter by calculating according to each type of data to be quantized and the corresponding data bit width includes:

if the quantization parameter does not include the offset, according to target data and a data bit width corresponding to the target data, obtaining a maximum value of quantized data of the target data, where the target data is any type of data to be quantized; and according to a maximum value of an absolute value of the target data and a maximum value of quantized data of the target data, obtaining a scaling factor of the target data.

B7. The method of article B4, where obtaining the corresponding quantization parameter by calculating according to each type of data to be quantized and the corresponding data bit width includes:

if the quantization parameter includes the offset, according to a maximum value of target data, a minimum value of the target data, and a data bit width corresponding to the target data, obtaining a point location of the target data, where the target data is any type of data to be quantized.

B8. The method of article B4, where obtaining the corresponding quantization parameter by calculating according to each type of data to be quantized and the corresponding data bit width includes:

if the quantization parameter includes the offset, according to target data and a data bit width corresponding to the target data, obtaining a maximum value of quantized data of the target data, where the target data is any type of data to be quantized; and according to a maximum value of the target data, a minimum value of the target data, and the maximum value of the quantized data of the target data, obtaining a scaling factor of the target data.

B9. The method of article B4, where obtaining the corresponding quantization parameter by calculating according to each type of data to be quantized and the corresponding data bit width includes:

obtaining an offset of target data according to a maximum of the target data and a minimum value of the target data, where the target data is any type of the data to be quantized.

B10. The method of any one of articles B1 to B9, further comprising:

determining a quantization error of the target data according to the target data and the quantized data corresponding to the target data, where the target data is any type of the data to be quantized;

adjusting the data bit width corresponding to the target data according to a quantization error and an error threshold and obtaining an adjusted bit width corresponding to the target data; and updating the data bit width corresponding to the target data as an adjusted bit width and obtaining a corresponding adjusted quantization parameter by calculating according to the target data and the adjusted bit width, so that the neural network is quantized according to the adjusted quantization parameter.

B11. The method of article B10, where adjusting the data bit width corresponding to the target data according to the quantization error and the error threshold and obtaining the adjusted bit width corresponding to the target data include:

if the quantization error is greater than a first error threshold, increasing the data bit width corresponding to the target data and obtaining the adjusted bit width corresponding to the target data.

B12. The method of article B11, further comprising:

calculating an adjusted quantization error of the target data according to the adjusted bit width and the target data; and according to the adjusted quantization error and the first error threshold, continuing to increase the adjusted bit width until the adjusted quantization error obtained by calculating according to the adjusted bit width and the target data is less than or equal to the first error threshold.

B13. The method of article B10 or article B11, where adjusting the data bit width corresponding to the target data according to the quantization error and the error threshold includes:

if the quantization error is less than a second error threshold, decreasing the data bit width corresponding to the target data, where the second error threshold is less than the first error threshold.

B14. The method of article B13, further comprising:

calculating the adjusted quantization error of the target data according to the adjusted bit width and the target data; and according to the adjusted quantization error and the second error threshold, continuing to decrease the adjusted bit width until the adjusted quantization error obtained by calculating according to the adjusted bit width and the target data is greater than or equal to the second error threshold.

B15. The method of any one of articles B1 to B14, where during a fine-tuning stage and/or a training stage of a neural network operation, the method further includes:

obtaining a data variation range of the target data in a current iteration and historical iterations, where the historical iterations are iterations before the current iteration; and according to the data variation range of the target data, determining a target iteration interval corresponding to the target data, so that the neural network updates the quantization parameter of the target data according to a target iteration interval, where the target iteration interval includes at least one iteration, and the target data is any type of data to be quantized.

B16. The method of article B15, further comprising:

according to a data bit width of the target data in the current iteration, determining a data bit width of the target data in iterations within the target iteration interval, so that the neural network determines the quantization parameter according to the data bit width of the target data in the iterations within the target iteration interval.

B17. The method of article B15, further comprising:

determining a point location of the target data in the iterations within the target iteration interval according to a point location of the target data in the current iteration.

B18. The method of article B15, where obtaining the data variation range of the target data in the current iteration and the historical iterations includes:

according to a point location of the target data in the current iteration and a point location of the target data in a historical iteration corresponding to the current iteration determined according to a historical iteration interval, calculating a moving mean value of the target data in point locations of iteration intervals;

obtaining a first data variation range according to a first moving mean value of target data in a point location of a current iteration and a second moving mean value of target data in a point location in an iteration corresponding to a previous iteration interval, where determining the target iteration interval corresponding to the target data according to the data variation range of the target data, so that the neural network updates the quantization parameter of the target data according to the target iteration interval includes:

determining the target iteration interval corresponding to the target data according to the first data variation range, so that the neural network updates the quantization parameter of the target data according to the target iteration interval.

B19. The method of article B18, where obtaining the first data variation range according to the first moving mean value of the target data in the point location of the current iteration and the second moving mean value of the target data in the point location of the iteration corresponding to the previous iteration interval includes:

calculating a difference between a first moving mean value and a second moving mean value; and determining an absolute value of the difference as the first data variation range.

B20. The method of article B18, further comprising:

obtaining a second data variation range according to the target data and the quantized data corresponding to the target data in the current iteration, where determining the target iteration interval corresponding to the target data according to the data variation range of the target data, so that the neural network updates the quantization parameter of the target data according to the target iteration interval includes:

determining the target iteration interval corresponding to the target data according to the first data variation range and the second data variation range of the target data, so that the neural network updates the quantization parameter of the target data according to the target iteration interval.

B21. The method of article B20, where obtaining the second data variation range according to the target data and the quantized data corresponding to the target data in the current iteration includes:

calculating an error between the target data and the quantized data corresponding to the target data in the current iteration; and determining a square of the error as the second data variation range.

B22. The method of article B20, where determining the target iteration interval corresponding to the target data according to the first data variation range and the second data variation range of the target data includes:

determining the target iteration interval corresponding to the target data according to a maximum value of the first data variation range and the second data variation range.

B23. The method of any one of articles B15 to B22, wherein obtaining the data variation range of the target data in the current iteration and the historical iterations includes:

if the current iteration is out of an update period, obtaining the data variation range of the target data in the current iteration and the data variation range of the target data in the historical iterations, where the update period includes at least one iteration.

B24. The method of any one of articles B15 to B23, further comprising:

if the current iteration is within a preset period, determining a period interval according to the current iteration, an iteration corresponding to the current iteration in a next period after the preset period, and an iteration interval corresponding to the current iteration;

determining a data bit width of the target data in an iteration within the period interval according to the data bit width of the target data in the current iteration; or determining a point location of the target data in the iteration within the period interval according to the point location of the target data in the current iteration.

B25. The method of any one of articles B1 to B24, further comprising:

using the quantization parameter of the layer to be quantized in one or more layers after the layer to be quantized.

B26. A neural network quantization apparatus, where for any layer to be quantized in a neural network, the apparatus includes:

a quantization parameter determination unit configured to determine a quantization parameter corresponding to each type of data to be quantized in a layer to be quantized, where the data to be quantized includes at least one type of data including a neuron, a weight, a bias and a gradient; and a quantization unit configured to quantize the data to be quantized according to a corresponding quantization parameter and obtain quantized data, so that the neural network is operated according to the quantized data.

B27. The apparatus of article B26, where the quantization parameter includes at least one of parameters including a point location, a scaling factor, and an offset, where the point location is a decimal point location after quantization;

the scaling factor is a ratio between a maximum value of the quantized data and a maximum value of an absolute value of the data to be quantized; and the offset is an intermediate value of the data to be quantized.

B28. The apparatus of article B25 or article B27, where the quantization parameter determination unit includes:

a first quantization parameter determination sub-unit configured to determine the quantization parameter corresponding to each type of data to be quantized in the layer to be quantized by looking up a correspondence between the data to be quantized and the quantization parameter.

B29. The apparatus of article B26 or article B27, where the quantization parameter determination unit includes:

a second quantization parameter determination sub-unit configured to obtain the corresponding quantization parameter by calculating according to each type of data to be quantized and a corresponding data bit width.

B30. The apparatus of article B29, where the second quantization parameter determination sub-unit includes:

a first point location calculation unit configured to, if the quantization parameter does not include the offset, according to a maximum value of an absolute value of target data and a data bit width corresponding to the target data, obtain a point location of the target data, where the target data is any type of data to be quantized.

B31. The apparatus of article B29, where the second quantization parameter determination sub-unit includes:

a first scaling factor calculation unit configured to, if the quantization parameter does not include the offset, according to target data and a data bit width corresponding to the target data, obtain a maximum value of quantized data of the target data, where the target data is any type of data to be quantized, and according to a maximum value of an absolute value of the target data and a maximum value of quantized data of the target data, obtain a scaling factor of the target data.

B32. The apparatus of article B29, where the second quantization parameter determination sub-unit includes:

a second point location calculation unit configured to, if the quantization parameter includes the offset, according to a maximum value of target data, a minimum value of the target data, and a data bit width corresponding to the target data, obtain a point location of the target data, where the target data is any type of data to be quantized.

B33. The apparatus of article B29, where the second quantization parameter determination sub-unit includes:

a second scaling factor calculation unit configured to, if the quantization parameter includes the offset, according to target data and a data bit width corresponding to the target data, obtain a maximum value of quantized data of the target data, where the target data is any type of data to be quantized, and according to a maximum value of the target data, a minimum value of the target data, and the maximum value of the quantized data of the target data, obtain a scaling factor of the target data.

B34. The apparatus of article B29, where the second quantization parameter determination sub-unit includes:

an offset calculation unit configured to obtain an offset of target data according to a maximum of the target data and a minimum value of the target data, where the target data is any type of the data to be quantized.

B35. The apparatus of any one of articles B26 to B34, further comprising:

a quantization error determination unit configured to determine a quantization error of the target data according to the target data and the quantized data corresponding to the target data, where the target data is any type of the data to be quantized;

an adjusted bit width determination unit configured to adjust the data bit width corresponding to the target data according to a quantization error and an error threshold and obtain an adjusted bit width corresponding to the target data; and an adjusted quantization parameter determination unit configured to update the data bit width corresponding to the target data as an adjusted bit width and obtain a corresponding adjusted quantization parameter by calculating according to the target data and the adjusted bit width, so that the neural network is quantized according to the adjusted quantization parameter.

B36. The apparatus of article B35, where the adjusted bit width determination unit includes:

a first adjusted bit width determination sub-unit configured to, if the quantization error is greater than a first error threshold, increase the data bit width corresponding to the target data and obtain the adjusted bit width corresponding to the target data.

B37. The apparatus of article B36, where the adjusted bit width determination unit further includes:

a first adjusted quantization error determination sub-unit configured to calculate an adjusted quantization error of the target data according to the adjusted bit width and the target data; and a first adjusted bit width loop determination sub-unit configured to, according to the adjusted quantization error and the first error threshold, continue to increase the adjusted bit width until the adjusted quantization error obtained by calculating according to the adjusted bit width and the target data is less than or equal to the first error threshold.

B38. The apparatus of article B35 or article B36, where the adjusted bit width determination unit includes:

a second adjusted bit width determination sub-unit configured to, if the quantization error is less than a second error threshold, decrease the data bit width corresponding to the target data, where the second error threshold is less than the first error threshold.

B39. The apparatus of article B38, where the adjusted bit width determination unit further includes:

a second adjusted quantization error determination sub-unit configured to calculate the adjusted quantization error of the target data according to the adjusted bit width and the target data; and a second adjusted bit width loop determination sub-unit configured to, according to the adjusted quantization error and the second error threshold, continue to decrease the adjusted bit width until the adjusted quantization error obtained by calculating according to the adjusted bit width and the target data is greater than or equal to the second error threshold.

B40. The apparatus of any one of articles B26 to B39, where during a fine-tuning stage and/or a training stage of the neural network operation, the method further includes:

a data variation range determination unit configured to obtain a data variation range of the target data in a current iteration and historical iterations, where the historical iterations are iterations before the current iteration; and a target iteration interval determination unit configured to, according to the data variation range of the target data, determine a target iteration interval corresponding to the target data, so that the neural network updates the quantization parameter of the target data according to a target iteration interval, where the target iteration interval includes at least one iteration, and the target data is any type of data to be quantized.

B41. The apparatus of article B40, further comprising:

a first target iteration interval application unit configured to, according to a data bit width of the target data in the current iteration, determine a data bit width of the target data in iterations within the target iteration interval, so that the neural network determines the quantization parameter according to the data bit width of the target data in the iterations within the target iteration interval.

B42. The apparatus of article B40, further comprising:

a second target iteration interval application unit configured to determine a point location of the target data in the iterations within the target iteration interval according to a point location of the target data in the current iteration.

B43. The apparatus of article B40, where the data variation range determination unit includes:

a moving mean value calculation sub-unit configured to, according to a point location of the target data in the current iteration and a point location of the target data in a historical iteration corresponding to the current iteration determined according to a historical iteration interval, calculate a moving mean value of the target data in point locations of iteration intervals;

a first data variation range determination sub-unit configured to obtain a first data variation range according to a first moving mean value of target data in a point location of a current iteration and a second moving mean value of target data in a point location in an iteration corresponding to a previous iteration interval, where the target iteration interval determination unit includes:

a first target iteration interval determination sub-unit configured to determine the target iteration interval corresponding to the target data according to the first data variation range, so that the neural network updates the quantization parameter of the target data according to the target iteration interval.

B44. The apparatus of article B43, where the first data variation range determination sub-unit includes:

a first data variation range determination unit configured to calculate a difference between a first moving mean value and a second moving mean value, and determine an absolute value of the difference as the first data variation range.

B45. The apparatus of article B43, where the data variation range determination unit includes:

a second data variation range determination sub-unit configured to obtain a second data variation range according to the target data and the quantized data corresponding to the target data in the current iteration, where the target iteration interval determination unit includes:

a second target iteration interval determination sub-unit configured to determine the target iteration interval corresponding to the target data according to the first data variation range and the second data variation range of the target data, so that the neural network updates the quantization parameter of the target data according to the target iteration interval.

B46. The apparatus of article B45, where the second data variation range determination sub-unit includes:

a second data variation range determination unit configured to calculate an error between the target data and the quantized data corresponding to the target data in the current iteration, and determine a square of the error as the second data variation range.

B47. The apparatus of article B45, where the second target iteration interval determination sub-unit is configured to determine the target iteration interval corresponding to the target data according to a maximum value of the first data variation range and the second data variation range.

B48. The apparatus of any one of articles B40 to B47, where the data variation range determination unit includes:

a third data variation range determination sub-unit configured to, if the current iteration is out of an update period, obtain the data variation range of the target data in the current iteration and the data variation range of the target data in the historical iterations, where the update period includes at least one iteration.

B49. The apparatus of any one of articles B40 to B48, further comprising:

a period interval determination unit configured to, if the current iteration is within a preset period, determine a period interval according to the current iteration, an iteration corresponding to the current iteration in a next period after the preset period, and an iteration interval corresponding to the current iteration;

a first period interval application unit configured to determine a data bit width of the target data in an iteration within the period interval according to the data bit width of the target data in the current iteration; or a second period interval application unit configured to determine a point location of the target data in the iteration within the period interval according to the point location of the target data in the current iteration.

B50. The apparatus of any one of articles B26 to B49, further comprising:

a quantization parameter application unit configured to use the quantization parameter of the layer to be quantized in one or more layers after the layer to be quantized.

B51. An artificial intelligence chip comprising the neural network quantization apparatus of any one of articles B26 to B50.

B52. An electronic device comprising the artificial intelligence chip of article B51.

B53. A board card comprising a storage component, an interface apparatus, a control component, and the artificial intelligence chip of article B51, where the artificial intelligence chip is connected to the storage component, the control component, and the interface apparatus, respectively;

the storage component is configured to store data.

the interface apparatus is configured to implement data transfer between the artificial intelligence chip and an external device; and the control component is configured to monitor a state of the artificial intelligence chip.

B54. The board card of article B53, where the storage component includes a plurality groups of storage units, where each group of the storage units is connected to the artificial intelligence chip through a bus, and the storage units are DDR SDRAMs;

the chip includes a DDR controller configured to control data transfer and data storage of each storage unit; and the interface apparatus is a standard PCIe.

The embodiments of the present disclosure have been described above. The description above is exemplary rather than exhaustive, and is not limited to the disclosed embodiments. Without departing from the scope and spirit of the described embodiments, many modifications and changes are obvious to those of ordinary skill in the art. The choice of terms used herein is intended to best explain the principles, practical applications, or improvements on the current technology in the market of the embodiments, or to enable other ordinary skilled in the art to understand the embodiments disclosed herein.

A solution (CN201910505239.7) proposed to solve the problem of neural network quantization is described above.

To solve the problem of quantization parameter adjustment, a solution (CN201910528537.8) is proposed hereinafter. Specifically, a quantization parameter adjustment method, a quantization parameter adjustment apparatus, and related products are provided.

The present disclosure relates to the technical field of computer technology and specifically relates to a quantization parameter adjustment method, a quantization parameter adjustment apparatus and related products of a neural network.

With the continuous development of artificial intelligence technology, its application field has become more and more extensive, and especially it has been well applied in the fields of image recognition, speech recognition, natural language processing, and the like. However, as the complexity of artificial intelligence algorithms increases, data volume and data dimensions that are to be processed are increasing as well. The increasing data volume poses a great challenge to the data processing efficiency of the computation apparatus, the storage capacity and the memory access efficiency of the storage apparatus.

In order to solve the above technical problem, according to traditional technologies, a fixed bit width is used to quantize the computation data of the neural network; in other words, floating-point-type computation data is converted into fixed-point-type computation data, so as to realize the compression of the computation data of the neural network. However, there may be great differences between different computation data in the neural network. In traditional quantization methods, a same quantization parameter (such as a point location) is adopted for quantization for the entire neural network, which may often lead to low precision and affect data computation results.

In view of this, the present disclosure provides a quantization parameter adjustment method, a quantization parameter adjustment apparatus and related products of the neural network, which may improve the quantization precision of the neural network and ensure the correctness and reliability of the computation results.

The present disclosure provides a quantization parameter adjustment method of a neural network, and the method includes:

obtaining a data variation range of data to be quantized;

according to the data variation range of the data to be quantized, determining a target iteration interval, so as to adjust a quantization parameter in a neural network operation according to the target iteration interval, where the target iteration interval includes at least one iteration, and the quantization parameter of the neural network is configured to perform a quantization operation of the data to be quantized in the neural network operation.

The present disclosure also provides a quantization parameter adjustment apparatus of a neural network, including a memory and a processor, where the memory stores a computer program, and when the processor executes the computer program, steps of the aforementioned method are implemented. Specifically, when the processor executes the aforementioned computer program, the following operations are implemented:

obtaining a data variation range of data to be quantized;

according to the data variation range of the data to be quantized, determining a target iteration interval, so as to adjust a quantization parameter in a neural network computation according to the target iteration interval, where the target iteration interval includes at least one iteration, and the quantization parameter of the neural network is configured to perform a quantization operation of the data to be quantized in the neural network computation.

The present disclosure further provides a computer-readable storage medium, where the computer-readable storage medium stores a computer program, and when the computer program is executed, steps of the method of any one of the aforementioned articles are implemented. Specifically, when the computer program is executed, the following operations are implemented:

obtaining a data variation range of data to be quantized;

according to the data variation range of the data to be quantized, determining a target iteration interval, so as to adjust a quantization parameter in a neural network operation according to the target iteration interval, where the target iteration interval includes at least one iteration, and the quantization parameter of the neural network is configured to perform a quantization operation of the data to be quantized in the neural network operation.

The present disclosure further provides a quantization parameter adjustment apparatus of a neural network, and the apparatus includes:

an obtaining unit configured to obtaining a data variation range of data to be quantized;

an iteration interval determination unit configured to determine a target iteration interval according to the data variation range of the data to be quantized, so as to adjust a quantization parameter in a neural network operation according to the target iteration interval, where the target iteration interval includes at least one iteration, and the quantization parameter of the neural network is configured to perform a quantization operation of the data to be quantized in the neural network operation.

According to the quantization parameter adjustment method, the quantization parameter adjustment apparatus and related products of the neural network, by obtaining the data variation range of the data to be quantized and according to the data variation range of the data to be quantized, determining the target iteration interval, the quantization parameter of the neural network operation is adjusted according to the target iteration interval. In this case, quantization parameters of the neural network in different computation stages may be determined according to data distribution characteristics of the data to be quantized. Compared with a method of adopting a same quantization parameter for various computation data of a same neural network in the prior art, the method and apparatus of the present disclosure may improve the precision during the neural network quantization process and thus ensure the accuracy and reliability of the computation results. Further, the quantization efficiency may be improved by determining the target iteration interval.

The drawings involved in the present disclosure are included in the specification and constitute a part of the specification. Together with the specification, the drawings illustrate exemplary embodiments, features, and aspects of the present disclosure, and are used to explain the principles of the present disclosure.

FIG. 3-1 is a schematic diagram of application environment of a quantization parameter adjustment method, according to an embodiment of the present disclosure.

FIG. 3-2 is a schematic diagram of a correspondence between data to be quantized and quantized data, according to an embodiment of the present disclosure.

FIG. 3-3 is a schematic diagram of a conversion of data to be quantized, according to an embodiment of the present disclosure.

FIG. 3-4 is a flowchart illustrating a quantization parameter adjustment method, according to a first embodiment of the present disclosure.

FIG. 3-5 is a variation trend diagram of data to be quantized during a computation process, according to an embodiment of the present disclosure.

FIG. 3-6 is a flowchart illustrating a method for determining a target iteration interval in a parameter adjustment method, according to a first embodiment of the present disclosure.

FIG. 3-7 is a flowchart illustrating a method for determining a variation range of a point location, according to an embodiment of the present disclosure.

FIG. 3-8 is a flowchart illustrating a method for determining a second mean value, according to a first embodiment of the present disclosure.

FIG. 3-9 is a flowchart illustrating a data bit width adjustment method, according to a first embodiment of the present disclosure.

FIG. 3-10 is a flowchart illustrating a data bit width adjustment method, according to a second embodiment of the present disclosure.

FIG. 3-11 is a flowchart illustrating a data bit width adjustment method, according to a third embodiment of the present disclosure.

FIG. 3-12 is a flowchart illustrating a data bit width adjustment method, according to a fourth embodiment of the present disclosure.

FIG. 3-13 is a flowchart illustrating a method for determining a second mean value, according to a second embodiment of the present disclosure.

FIG. 3-14 is a flowchart illustrating a quantization parameter adjustment method, according to a second embodiment of the present disclosure;

FIG. 3-15 is a flowchart of adjusting a quantization parameter in a quantization parameter adjustment method, according to an embodiment of the present disclosure.

FIG. 3-16 is a flowchart illustrating a method for determining a target iteration interval in a parameter adjustment method, according to a second embodiment of the present disclosure.

FIG. 3-17 is a flowchart illustrating a method for determining a target iteration interval in a parameter adjustment method, according to a third embodiment of the present disclosure.

FIG. 3-18 is a flowchart illustrating a quantization parameter adjustment method, according to a third embodiment of the present disclosure.

FIG. 3-19 is a flowchart illustrating a quantization parameter adjustment method, according to a fourth embodiment of the present disclosure.

FIG. 3-20 is a structural block diagram of a quantization parameter adjustment apparatus, according to a first embodiment of the present disclosure.

FIG. 3-21 is a structural block diagram of a quantization parameter adjustment apparatus, according to a second embodiment of the present disclosure.

FIG. 3-22 is a structural block diagram of a quantization parameter adjustment apparatus, according to a third embodiment of the present disclosure.

FIG. 3-23 is a structural block diagram of a quantization parameter adjustment apparatus, according to a fourth embodiment of the present disclosure.

FIG. 3-24 is a structural block diagram of a quantization parameter adjustment apparatus, according to a fifth embodiment of the present disclosure.

FIG. 3-25 is a structural block diagram of a board card, according to an embodiment of the present disclosure.

To solve the problem of quantization parameter adjustment, a solution (201910528537.8) is proposed hereinafter. Technical solutions of embodiments of the present disclosure will be described clearly and completely hereinafter with reference to the drawings in the embodiments of the present disclosure. Obviously, the embodiments to be described are merely some rather than all embodiments of the present disclosure. All other embodiments obtained by those skilled in the art based on the embodiments of the present disclosure without creative efforts shall fall within the protection scope of the present disclosure.

It should be understood that terms such as "first" and "second" in the claims, the specification, and the drawings are used for distinguishing different objects rather than describing a specific order. It should be understood that terms "including" and "comprising" used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiments rather than limiting the present disclosure. As being used in the specification and the claims of the disclosure, unless the context clearly indicates otherwise, singular forms such as "a", "an", and "the" are intended to include plural forms. It should also be understood that a term "and/or" used in the specification and the claims refers to any and all possible combinations of one or more of relevant listed items and includes these combinations.

As the complexity of artificial intelligence algorithms increases, data volume and data dimensions of data to be processed are constantly increasing as well. However, since traditional neural network algorithms usually use a floating-point number format to perform a neural network operation, the ever-increasing data volume poses a great challenge to the data processing efficiency of the computation apparatus, the storage capacity and memory access efficiency of the storage apparatus, and the like. In order to solve the above problem, computation data involved in the neural network operation process may be quantized; in other words, computation data represented by floating-points may be converted into computation data represented by fixed points, thereby reducing the storage capacity and the memory access efficiency of the storage apparatus and improving the computation efficiency of the computation apparatus. However, according to traditional quantization methods, a same data bit width and a same quantization parameter (such as a decimal point location) are used to quantize different pieces of computation data of the neural network during the entire training process of the neural network. Due to the difference of different pieces of computation data, or the difference of the computation data at different stages in the training process, by adopting the above quantization method for quantization, insufficient accuracy may be generated, which may further affect the computation results.

Based on this, the present disclosure provides a quantization parameter adjustment method of a neural network, and the method may be applied to a quantization parameter adjustment apparatus including a memory 110 and a processor 120. FIG. 3-1 is a structural block diagram of a quantization parameter adjustment apparatus 100. The processor 120 of the quantization parameter adjustment apparatus 100 may be a general-purpose processor or an artificial intelligence processor, or may include the general-purpose processor and the artificial intelligence processor. This is not limited herein. The memory 110 may be configured to store computation data in a neural network operation process. The computation data may be one or more of data including neuron data, weight data or gradient data. The memory 110 may also be configured to store a computer program. When the computer program is executed by the processor 120, the quantization parameter adjustment method of the embodiments of the present disclosure may be performed. The method may be applied to a training or a fine-tuning process of the neural network and used to dynamically adjust the quantization parameter of the computation data according to the distribution characteristics of the computation data at different stages of the training or the fine-tuning process of the neural network, thereby improving the precision of the quantization process of the neural network and further ensuring the accuracy and reliability of the computation results.

Unless otherwise specified, the artificial intelligence processor may be any appropriate hardware processor, such as a CPU, a GPU, an FPGA, a DSP, an ASIC, and the like. Unless otherwise specified, the memory may be any suitable magnetic storage medium or magneto-optical storage medium, such as a RRAM, a DRAM, an SRAM, an EDRAM, an HBM), or an HMC, and the like.

In order to better understand the content of the present disclosure, the following first introduces the quantization process and the quantization parameter involved in the quantization process in the embodiments of the present disclosure.

In the embodiments of the present disclosure, quantization is to convert computation data with a first data format into computation data with a second data format. The computation data with the first data format may be computation data represented by floating-points, and the computation data of the second data format may be computation data represented by fixed points. Since the computation data represented by the floating-points usually occupies a large storage space, therefore, by converting the computation data represented by the floating-points into the computation data represented by the fixed-points, the storage space may be saved, and the memory access efficiency and the computation efficiency of the computation data may be improved.

Optionally, the quantization parameter in the quantization process may include a point location and/or a scaling factor, where the point location is a decimal point location of computation data after quantization. The scaling factor is a ratio between a maximum value of the quantized data and a maximum value of an absolute value of the data to be quantized. Further, the quantization parameter may also include an offset. The offset is for asymmetric data to be quantized and refers to an intermediate value of a plurality of elements in the data to be quantized. Specifically, the offset may be a midpoint value of the plurality of elements in the data to be quantized. If the data to be quantized is symmetrical data to be quantized, the quantization parameter may not include the offset. In this case, the quantization parameter such as the point location and/or the scaling factor may be determined according to the data to be quantized.

As shown in FIG. 3-2, the data to be quantized is data that is symmetric with respect to an origin. It is assumed that $Z_1$ is the maximum value of the absolute value of the elements of the data to be quantized, and the data bit width corresponding to the data to be quantized is n, and A is the maximum value that may be represented by the quantized data after the data to be quantized is quantized according to the data bit width n, and A 为 $2^s(2^{n-1}-1)$, and A is required to include $Z_1$, and $Z_1$ must be greater than-Therefore, there is a constraint of formula (1):

$$2^2(2^{n-1}-1) \geq Z_1 > 2^{s-1}(2^{n-1}-1). \quad \text{Formula (1)}$$

The processor may obtain a point location s by calculating according to the maximum value of the absolute value $Z_1$ and the data bit width n of the data to be quantized. For example, by using the following formula (2), a point location s corresponding to the data to be quantized may be obtained by calculating:

$$s = \text{ceil}\left(\log_2\left(\frac{Z_1}{2^{n-1}-1}\right)\right). \quad \text{Formula (2)}$$

In this formula, ceil denotes rounding up, and $z_1$ denotes the maximum value of the absolute value of the data to be quantized, and s denotes the point location, and n denotes the data bit width.

If the point location s is used to quantize the data to be quantized, the data to be quantized $F_x$ represented by a floating-point may be expressed as $F_x \sim I_x \times 2^s$, where $I_x$ refers to a quantized n-bit binary representation value, and s refers to the point location. In this formula, the quantized data corresponding to the data to be quantized may be:

$$I_x = \text{round}\left(\frac{F_x}{2^s}\right). \quad \text{Formula (3)}$$

In this formula, s denotes the point location, and $I_x$ denotes the quantized data, and $F_x$ denotes the data to be quantized, and round denotes a rounding off operation. It may be understood that other rounding operation methods, such as rounding up, rounding down, and rounding to zero, may also be used to replace the rounding off operation in the formula (3). It may be understood that if the data bit width is constant, for the quantized data obtained according to the point location, the more the decimal places are, the greater the quantization precision of the data to be quantized will be.

Further, intermediate representation data $F_{x1}$ corresponding to the data to be quantized may be:

$$F_{x1} = \text{round}\left(\frac{F_x}{2^2}\right) \times 2^s. \quad \text{Formula (4)}$$

In this formula, s denotes a point location determined according to the formula (2), and $F_x$ denotes the data to be quantized, and round denotes the rounding off operation. $F_{x1}$ may be data obtained by quantizing inversely the quantized data $I_x$. A data representation format of the intermediate representation data $F_{x1}$ is consistent with a data representation format of the data to be quantized $F_x$, and the intermediate representation data $F_{x1}$ may be used to calculate the quantization error, as detailed below. An inverse quantization refers to the inverse process of quantization.

Optionally, the scaling factor may include a first scaling factor, which may be calculated according to the following formula (5):

$$i.\ f_1 = \frac{Z_1}{A} = \frac{Z_1}{2^s(2^{n-1}-1)}. \quad \text{Formula (5)}$$

In this formula, $Z_1$ is the maximum value of the absolute value of the data to be quantized, and A is a maximum value that may be represented by the quantized data after quantizing the data to be quantized with the data bit width n, and A 为 $2^s(2^{n-1}-1)$.

a. At this time, the processor may quantize the data to be quantized $F_x$ by using a method of combining the point location and the first scaling factor and the quantized data may be obtained.

$$I_x = \text{round}\left(\frac{F_x}{2^s \times f_1}\right). \quad \text{Formula (6)}$$

In this formula, s denotes the point location determined according to the formula (2), and $f_1$ denotes the first scaling factor, and $I_x$ denotes the quantized data, and $F_x$ denotes the data to be quantized, and round denotes the rounding off operation. It may be understood that other rounding operation methods, such as rounding up, rounding down, and rounding to zero, may also be used to replace the rounding off operation in the formula (6).

Further, intermediate representation data $F_{x1}$ corresponding to the data to be quantized may be:

$$F_{x1} = \text{round}\left(\frac{F_x}{2^s \times f_1}\right) \times 2^s \times f_1. \quad \text{Formula (7)}$$

In this formula, s denotes a point location determined according to the formula (2), and $f_1$ denotes the scaling factor, and $F_x$ denotes the data to be quantized, and round denotes the rounding off operation. $F_{x1}$ may be data obtained by quantizing inversely the quantized data $I_x$. The data representation format of the intermediate representation data $F_{x1}$ is consistent with the data representation format of the data to be quantized $F_x$, and the intermediate representation data $F_{x1}$ may be used to compute the quantization error, as detailed below. The inverse quantization refers to the inverse process of quantization.

Optionally, the first scaling factor may also include a second scaling factor which may be calculated according to the following formula:

$$f_2 = \frac{Z_1}{(2^{n-1} - 1)}. \quad \text{Formula (8)}$$

The processor may quantize the data to be quantized $F_x$ by using the second scaling factor separately and the quantized data may be obtained:

$$I_x = \text{round}\left(\frac{F_x}{f_2}\right) \quad \text{Formula (9)}$$

In this formula, $f_2$ denotes the second scaling factor, and $I_x$ denotes the quantized data, and $F_x$ denotes the data to be quantized, and round denotes the rounding off operation. It may be understood that other rounding operation methods, such as rounding up, rounding down, and rounding to zero, may also be used to replace the rounding off operation in the formula (9). It may be understood that if the data bit width is constant, different scaling factors may be used to adjust the numerical range of the quantized data.

Further, intermediate representation data $F_{x1}$ corresponding to the data to be quantized may be:

$$F_{x1} = \text{round}\left(\frac{F_x}{f_2}\right) \times f_2. \quad \text{Formula (10)}$$

In this formula, $f_2$ denotes the second scaling factor, and $F_x$ denotes the data to be quantized, and round denotes the rounding off operation. $F_{x1}$ may be data obtained by quantizing inversely the quantized data $I_x$. The data representation format of the intermediate representation data $F_{x1}$ is consistent with the data representation format of the data to be quantized $F_x$, and the intermediate representation data $F_{x1}$ may be used to compute the quantization error, as detailed below. The inverse quantization refers to the inverse process of quantization.

Further, the second scaling factor may be determined according to the point location and the first scaling factor $f_1$. The second scaling factor may be calculated according to the following formula:

$$f_2 = 2^s \times f_1. \quad \text{Formula (11)}$$

In this formula, s denotes the point location determined according to the formula (2), and $f_1$ denotes the first scaling factor obtained according to the formula (5).

Optionally, the quantization method of the embodiment of the present disclosure may realize the quantization of symmetric data and also the quantization of asymmetric data. At this point, the processor may convert asymmetric data into symmetric data, so as to avoid an "overflow" of data. Specifically, the quantization parameter may also include an offset. The offset may be a midpoint value of the data to be quantized and may be used to indicate the offset of the midpoint value of the data to be quantized relative to the origin. As shown in FIG. 3-3, the processor may perform statistical analysis on the data distribution of the data to be quantized, and obtain a minimum value $Z_{min}$ among all elements in the data to be quantized and a maximum value $Z_{max}$ among all elements in the data to be quantized. The processor may obtain the above-mentioned offset by calculating according to the minimum value $Z_{min}$ and the maximum value $Z_{max}$. A detailed method of calculating the offset is as follows:

$$o = \frac{Z_{max} + Z_{min}}{2}. \quad \text{Formula (12)}$$

In this formula, o represents the offset, and $Z_{min}$ denotes the minimum value among all the elements of the data to be quantized, and $Z_{max}$ represents the maximum value among all the elements of the data to be quantized.

Further, the processor may determine a maximum value of the absolute value $Z_2$ in the data to be quantized according to the minimum value $Z_{min}$ and the maximum value $Z_{max}$ among all the elements of the data to be quantized.

$$i.Z_2 = \frac{Z_{max} + Z_{min}}{2}. \quad \text{Formula (13)}$$

In this way, the processor may translate the data to be quantized according to an offset o and convert the asymmetric data to be quantized into symmetric data to be quantized as shown in FIG. 3-3. The processor may further determine the point location s according to the maximum value of the absolute value $Z_2$ in the data to be quantized, where the point location may be calculated according to the follow formula:

$$s = \text{ceil}\left(\log_2\left(\frac{Z_2}{2^{n-1} - 1}\right)\right). \quad \text{Formula (14)}$$

In this formula, ceil denotes rounding up, and s denotes the point location, and n denotes the data bit width.

After that, the processor may quantize the data to be quantized according to the offset and the corresponding point location and the quantized data may be obtained:

$$I_x = \text{round}\left(\frac{F_x - o}{2^s}\right). \quad \text{Formula (15)}$$

In this formula, s denotes the point location determined according to the formula (14), and o is the offset, and $I_x$ denotes the quantized data, and $F_x$ denotes the data to be quantized, and round denotes the rounding off operation. It may be understood that other rounding operation methods, such as rounding up, rounding down, and rounding to zero, may also be used to replace the rounding off operation in the formula (15).

Further, intermediate representation data $F_{x1}$ corresponding to the data to be quantized may be:

$$F_{x1} = \text{round}\left(\frac{F_x - o}{2^s}\right) \times 2^s + o. \qquad \text{Formula (16)}$$

In this formula, s denotes a point location determined according to the formula (14), and o denotes the offset, and $F_x$ denotes the data to be quantized, and round denotes the rounding off operation. $F_{x1}$ may be data obtained by quantizing inversely the quantized data $I_x$. A data representation format of the intermediate representation data $F_{x1}$ is consistent with a data representation format of the data to be quantized $F_x$, and the intermediate representation data $F_{x1}$ may be used to compute the quantization error, as detailed below. An inverse quantization refers to the inverse process of quantization.

Further optionally, the processor may further determine the point location s and the first scaling factor $f_1$ according to the maximum value of the absolute value $Z_2$ in the data to be quantized, where a detailed method for calculating the point location s may be referred to the formula (14). The first scaling factor $f_1$ may be calculated according to the following formula:

$$f_1 = \frac{Z_2}{A} = \frac{Z_2}{2^s(2^{n-1} - 1)}. \qquad \text{Formula (17)}$$

The processor may quantize the data to be quantized according to the offset and the corresponding first scaling factor $f_1$ and the point location s, and the quantized data may be obtained:

$$I_x = \text{round}\left(\frac{F_x - o}{2^s \times f_1}\right). \qquad \text{Formula (18)}$$

In this formula, $f_1$ denotes the first scaling factor, and s denotes the point location determined according to the formula (14), and o is the offset, and $I_x$ denotes the quantized data, and $F_x$ denotes the data to be quantized, and round denotes the rounding off operation. It may be understood that other rounding operation methods such as rounding up, rounding down, and rounding to zero may also be used to replace the rounding off operation in the formula (18).

Further, intermediate representation data $F_{x1}$ corresponding to the data to be quantized may be:

$$F_{x1} = \text{round}\left(\frac{F_x - o}{2^s \times f_1}\right) \times 2^s \times f_1 + o. \qquad \text{Formula (19)}$$

In this formula, $f_1$ denotes the first scaling factor, and s denotes the point location determined according to the formula (14), and o denotes the offset, and $F_x$ denotes the data to be quantized, and round denotes the rounding off operation. $F_{x1}$ may be data obtained by quantizing inversely the quantized data $I_x$. The data representation format of the intermediate representation data $F_{x1}$ is consistent with the data representation format of the data to be quantized $F_x$, and the intermediate representation data $F_{x1}$ may be used to compute the quantization error, as detailed below. The inverse quantization refers to the inverse process of quantization.

Optionally, the first scaling factor may also include a second scaling factor which may be calculated according to the following formula:

$$f_2 = \frac{Z_2}{(2^{n-1} - 1)}. \qquad \text{Formula (20)}$$

The processor may quantize the data to be quantized $F_x$ by using the second scaling factor separately and the quantized data may be obtained:

$$I_x = \text{round}\left(\frac{F_x}{f_2}\right). \qquad \text{Formula (21)}$$

In this formula, $f_2$ denotes the second scaling factor, and $I_x$ denotes the quantized data, and $F_x$ denotes the data to be quantized, and round denotes the rounding off operation. It may be understood that other rounding operation methods, such as rounding up, rounding down, and rounding to zero, may also be used to replace the rounding off operation in the formula (21). It may be understood that if the data bit width is constant, different scaling factors may be used to adjust the numerical range of the quantized data.

Further, intermediate representation data $F_{x1}$ corresponding to the data to be quantized may be:

$$F_{x1} = \text{round}\left(\frac{F_x}{f_2}\right) \times f_2. \qquad \text{Formula (22)}$$

In this formula, $f_2$ denotes the second scaling factor, and $F_x$ denotes the data to be quantized, and round denotes the rounding off operation. $F_{x1}$ may be data obtained by quantizing inversely the quantized data $I_x$. The data representation format of the intermediate representation data $F_{x1}$ is consistent with the data representation format of the data to be quantized $F_x$, and the intermediate representation data $F_{x1}$ may be used to compute the quantization error, as detailed below. The inverse quantization refers to the inverse process of quantization.

Further, the second scaling factor may be determined according to the point location and the first scaling factor $f_1$. The second scaling factor may be calculated according to the following formula:

$$f_2 = 2^s \times f_1. \qquad \text{Formula (23)}$$

In this formula, s denotes the point location determined according to the formula (14), and $f_1$ denotes the first scaling factor obtained according to the formula (17).

Optionally, the processor may also quantize the data to be quantized according to the offset o, and at this time, the point location s and/or the scale factor may be preset values. At this time, the processor may quantize the data to be quantized according to the offset and the quantized data may be obtained:

$$I_x = \text{round}\ (F_x - o). \qquad \text{Formula (24)}$$

In this formula, o denotes the offset, an $I_x$ denotes the quantized data, and $F_x$ denotes the data to be quantized, and round denotes the rounding off operation. It may be understood that other rounding operation methods, such as rounding up, rounding down, and rounding to zero, may also be used to replace the rounding off operation in the formula (24). It may be understood that if the data bit width is constant, different scaling factors may be used to adjust the offset between the value of data after quantization and data before the quantization.

Further, intermediate representation data $F_{x1}$ corresponding to the data to be quantized may be:

$$F_{x1} = \text{round}\ (F_x - o) + o. \qquad \text{Formula (25)}$$

In this formula, o denotes the offset, and $F_x$ denotes the data to be quantized, and round denotes the rounding off operation. $F_{x1}$ may be data obtained by quantizing inversely the quantized data $I_x$. The data representation format of the intermediate representation data $F_{x1}$ is consistent with the data representation format of the data to be quantized $F_x$, and the intermediate representation data $F_{x1}$ may be used to calculate the quantization error, as detailed below. The inverse quantization refers to the inverse process of quantization.

The quantization operation of the present disclosure can be used not only for realizing the quantization of the floating-point data described above, but also for realizing the quantization of fixed-point data. Optionally, the computation data in the first data format may also be computation data represented by fixed points, and the computation data in the second data format may also be computation data represented by fixed points. The computation data in the second data format has a data representation range less than that of the data in the first data format, and the decimal places in the second data format is more than that in the first data format. In other words, the computation data in the second data format has higher precision than the computation data in the first data format. For example, the computation data in the first data format may be floating-point computation data occupying 16 bits, and the computation data in the second data format may be fixed-point computation data occupying 8 bits. In an embodiment of the present disclosure, the quantization processing can be performed on the computation data represented by fixed points, thereby further reducing the storage space occupied by the computation data, and improving the efficiency of accessing the computation data and the computation efficiency.

The quantization parameter adjustment method of the neural network in an embodiment of the present disclosure can be applied to the training or fine-tuning process of the neural network, so as to dynamically adjust the quantization parameter of the computation data in the operation of the neural network during the training or fine-tuning process of the neural network, thereby improving the quantization precision of the neural network. The neural network may be a deep neural network or a convolutional neural network, etc., which is not specifically limited herein.

It should be clear that the training of a neural network refers to a process of performing a plurality of iteration operations on the neural network (where the weight of the neural network may be a random number), so that the weight of the neural network can satisfy a preset condition. An iteration operation generally includes a forward computation, a reverse operation and a weight update operation. The forward computation refers to a process of forward inference based on input data of the neural network to obtain a forward computation result. The reverse operation is a process of determining a loss value according to the forward computation result and a preset reference value, and determining a gradient value of a weight and/or a gradient value of the input data according to the loss value. The weight update operation refers to the process of adjusting the weight of the neural network according to the gradient value of the weight. Specifically, the training process of the neural network is: the processor may use the neural network with a weight of a random number to perform a forward computation on the input data to obtain a forward computation result. The processor then determines a loss value according to the forward computation result and a preset reference value, and determines a gradient value of a weight and/or a gradient value of the input data according to the loss value. Finally, the processor may update the gradient value of the neural network according to the gradient value of the weight and obtain a new weight to complete an iteration operation. The processor recurrently executes a plurality of iteration operations until the forward computation result of the neural network satisfy the preset condition. For example, when the forward computation result of the neural network converges to the preset reference value, the training ends. Alternatively, when the forward computation result of the neural network and the loss value determined according to the preset reference value are less than or equal to a preset precision, the training ends.

The fine tuning refers to a process of performing a plurality of iteration operations on the neural network (where the weight of the neural network is already in a convergent state rather than a random number), so that the precision of the neural network can meet a preset requirement. The fine tuning process is basically the same as the training process, and can be regarded as a process of retraining the neural network in a convergent state. Inference refers to a process of performing a forward computation using the neural network of which the weight meets a preset condition to realize functions such as recognition or classification, for example, recognizing images using the neural network, etc.

In an embodiment of the present disclosure, in the training or fine tuning process of the neural network, different quantization parameters can be used to quantize the computation data of the neural network at different stages of the neural network operation, and perform the iteration operation according to the quantized data, thereby reducing the data storage space during the operation of the neural network and improving the data access efficiency and the computation efficiency. As shown in FIG. 3-4, the neural network quantization method may include the following.

In a step S100, a data variation range of data to be quantized may be obtained.

Optionally, the processor may directly read the data variation range of the data to be quantized, which may be input by a user.

Optionally, the processor may compute the data variation range of the data to be quantized according to data to be quantized in a current iteration and data to be quantized in a historical iteration. The current iteration refers to an iteration operation currently performed, and the historical iteration refers to an iteration operation performed before the current iteration. For example, the processor can obtain the a maximum value and a mean value of the elements among the data to be quantized in the current iteration, and a maximum value and a mean value of the elements among the data to be quantized in each historical iteration, and determine a variation range of the data to be quantized according to the maximum value and the mean value of the elements in each iteration. If the maximum value of the elements among the data to be quantized in the current iteration is close to the maximum value of the elements among the data to be quantized in a preset number of historical iterations, and if the mean value of the elements among the data to be quantized in the current iteration is close to the mean value of the elements among the data to be quantized in the preset number of historical iterations, it can be determined that the data variation range of the data to be quantized is small. Otherwise, it can be determined that the data variation range of the data to be quantized is large. For another example, the data variation range of the data to be quantized can be represented by a moving mean value or variance of the data to be quantized, or the like, which is not specifically limited herein.

In an embodiment of the present disclosure, the data variation range of the data to be quantized can be used to determine whether the quantization parameter of the data to be quantized needs to be adjusted. For example, if the data variation range of the data to be quantized is large, the quantization parameter needs to be adjusted in time to ensure the quantization precision. If the data variation range of the data to be quantized is small, the quantization parameters in the historical iterations can be used in the current verify iteration and a certain number of iterations after the current verify iteration, thereby avoiding frequent adjustment of the quantization parameter and improving the quantization efficiency.

Each iteration involves at least one piece of data to be quantized, where the data to be quantized may be computation data represented by floating-point or computation data represented by fixed points. Optionally, the data to be quantized in each iteration may be at least one of neuron data, weight data and gradient data, and the gradient data may also include neuron gradient data, weight gradient data, and the like.

In a step S200, according to the variation range of the data to be quantized, a target iteration interval may be determined to adjust a quantization parameter in the neural network operation according to the target iteration interval, where the target iteration interval includes at least one iteration, and the quantization parameter of the neural network is configured to implement quantization of the data to be quantized in the neural network operation.

Optionally, the quantization parameter may include the location and/or the scaling factor, where the scaling factor may include a first scaling factor and a second scaling factor. The method of computing the point location may refer to the formula (2), and the method of computing the scaling factor may refer to the formula (5) or formula (8), which will not be repeated herein. Optionally, the quantization meter may also include an offset. The method of computing the offset refers to the formula (12). Furthermore, the processor may also determine the point location according to the formula (14) and determine the scaling factor according to the formula (17) or formula (20). In an embodiment of the present disclosure, the processor may update at least one of the point location, the scaling factor and the offset according to the target iteration interval to adjust the quantization parameter in the neural network operation. In other words, the quantization parameter in the neural network operation can be updated according to the data variation range of the data to be quantized in the neural network operation, so that the quantization precision can be guaranteed.

It is understandable that a data variation curve of the data to be quantized can be obtained by performing statistics and analysis on a variation trend of the computation data during the training or fine tuning process of the neural network. As shown in FIG. 3-5, it can be seen from the data variation curve that in an initial stage of the training or fine tuning of the neural network, the data variation of the data to be quantized in different iterations is relatively severe, and as the training or fine tuning operation progresses, the data variation of the data to be quantized in different iterations gradually tends to be gentle. Therefore, in the initial stage of the training or fine tuning of the neural network, the quantization parameter can be adjusted frequently, and in middle and late stages of the training or fine tuning of the neural network, the quantization parameter can be adjusted at intervals of a plurality of iterations or cycles. The method of the present disclosure is to determine a suitable iteration interval to achieve a balance between quantization precision and quantization efficiency.

Specifically, the processor may determine the target iteration interval according to the data variation range of the data to be quantized, so as to adjust the quantization parameter in the neural network according to the target iteration interval. Optionally, the target iteration interval may increase as the data variation range of the data to be quantized decreases. In other words, when the data variation range of the data to be quantized is greater, the target iteration interval is smaller, and this indicates that the quantization parameter is adjusted more frequently. When the data variation range of the data to be quantized is smaller, the target iteration interval is greater, and this indicates that the quantization parameter is adjusted less frequently. In other embodiments, the target iteration interval may be a hyperparameter. For example, the target iteration interval may be customized by a user.

Optionally, various data to be quantized, such as the weight data, the neuron data and the gradient data, may have different iteration intervals. Correspondingly, the processor may respectively obtain the data variation ranges corresponding to the various data to be quantized, so as to determine the target iteration interval corresponding to the respective types of data to be quantized according to the data variation range of each type of data to be quantized. In other words, the quantization process of various data to be quantized can be performed asynchronously. In an embodiment of the present disclosure, due to the difference between different types of data to be quantized, data variation ranges of different data to be quantized can be used to determine the corresponding target iteration interval, and determine the corresponding quantization parameter according to the corresponding target iteration interval, so that the quantization precision of the data to be quantized can be guaranteed, and the correctness of the computation result of the neural network can be ensured.

In other embodiments, a same target iteration interval may be determined for different types of data to be quantized, so as to adjust the quantization parameter corresponding to the data to be quantized according to the target iteration interval.

For example, the processor may respectively obtain the data variation ranges of the various data to be quantized, and determine the target iteration interval according to the largest data variation range of the data to be quantized, and respectively determine quantization parameters of the various data to be quantized according to the target iteration interval. Further more, different types of data to be quantized may use the same quantization parameter.

Further optionally, the neural network may include at least one operation layer, and the data to be quantized may be at least one of neuron data, weight data, and gradient data involved in each operation layer. At this time, the processor can obtain the data to be quantized involved in a current operation layer, and determine the data variation ranges of various data to be quantized in the current operation layer and the corresponding target iteration interval using the above method.

Optionally, the processor can determine the data variation range of the data to be quantized once in each iteration operation process, and determine the target iteration interval once according to the data variation range of the corresponding data to be quantized. In other words, the processor can compute the target iteration interval once in each iteration. The specific computation method of the target iteration interval can be seen in the description below. Further, the processor may select a verify iteration from each iteration according to the preset condition, determine the variation range of the data to be quantized at each verify iteration, and update and adjust the quantization parameter and the like according to the target iteration interval corresponding to the verify iteration. At this time, if the iteration is not the selected verify iteration, the processor may ignore the target iteration interval corresponding to the iteration.

Optionally, each target iteration interval may correspond one verify iteration, and the verify iteration may be a starting iteration of the target iteration interval or an ending iteration of the target iteration interval. The processor can adjust the quantization parameter of the neural network at the verify iteration of each target iteration interval, so as to adjust the quantization parameter of the neural network according to the target iteration interval. The verify iteration may be a point in time for verifying whether the current quantization parameter meets the requirement of the data to be quantized. The quantization parameter before the adjustment may be the same as the quantization parameter after the adjustment, or may be different from the quantization parameter after the adjustment. Optionally, the interval between adjacent verify iterations may be greater than or equal to a target iteration interval.

For example, the target iteration interval may compute the number of iterations from the current verify iteration, and the current verify iteration may be the starting iteration of the target iteration interval. For example, if the current verify iteration is a 100th iteration, the processor may determine that the target iteration interval is 3 according to the data variation range of the data to be quantized, and the processor may determine that the target iteration interval includes 3 iterations, which are respectively the 100th iteration, a 101st iteration, and a 102nd iteration. The processor may adjust the quantization parameter in the neural network operation at the 100th iteration. The current verify iteration is the corresponding iteration when the processor is currently performing the update and adjustment of the quantization parameter.

Optionally, the target iteration interval may compute the number of iterations from the next iteration of the current verify iteration, and the current verify iteration may be the ending iteration of the previous iteration interval of the current verify iteration. For example, if the current verify iteration is a 100th iteration, the processor may determine that the target iteration interval is 3 according to the data variation range of the data to be quantized, and the processor may determine that the target iteration interval includes 3 iterations, which are respectively a 101st iteration, a 102nd iteration, and a 103rd iteration. The processor may adjust the quantization parameter in the neural network operation at the 100th iteration and the 103rd iteration. The method for determining the target iteration interval is not limited here.

In an embodiment, it can be seen from the computation formula of the point location, the scaling factor, and the offset that the quantization parameter is usually related to the data to be quantized. Therefore, in the step S100, the data variation range of the data to be quantized may be determined indirectly by the variation range of the quantization parameter, and the data variation range of the data to be quantized may be indicated by the variation range of the quantization parameter. Specifically, as shown in FIG. 3-6, the step S100 includes:

a step S110: obtaining a variation range of the point location, where the variation range of the point location can be used to indicate the data variation range of the data to be quantized, and the variation range of the point location is positively correlated with the data variation range of the data to be quantized.

Optionally, the variation range of the point location can indirectly reflect the variation range of the data to be quantized. The variation range of the point location may be determined according to the point location of the current verify iteration and the point location of at least one historical iteration. The point location of the current verify iteration and the point locations of the respective historical iterations can be determined using the formula (2). Of course, the point location of the current verify iteration and the point locations of the respective historical iterations can also be determined using the formula (14).

For example, the processor can compute a variance of the point location of the current the point verify iteration and the point locations of the historical iterations, and determine the variation range of the point location according to the variance. For another example, the processor can determine the variation range of the point location according to a mean value of the point location of the current the point verify iteration and the point locations of the historical iterations. Specifically, as shown in FIG. 3-7, the step S110 includes:

a step S111: determining a first mean value according to a point location corresponding to a previous verify iteration before the current verify iteration, and point locations of the historical iterations before the previous verify iteration, where the previous verify iteration is the iteration when the quantization parameter is adjusted the last time, and there is at least one iteration interval between the previous verify iteration and the current verify iteration.

Optionally, at least one historical iteration may belong to at least one iteration interval, each iteration interval may correspond to one verify iteration, and two adjacent verify iterations may have one iteration interval. The previous verify iteration in the step S111 may be the verify iteration corresponding to the previous iteration interval before the target iteration interval.

Optionally, the first mean value may be computed according to the following formula:

$$M1 = a1\times s^{t-1} + a2\times s^{t-2} + a3\times s^{t-3} + \ldots + am\times s^{1} \quad \text{Formula (26)}$$

$$\text{diff\_update1} = |M2 - M1| = \beta|s\hat{}((t)) - M1|$$

where a1~am denote the computation weights corresponding to the point locations of respective iterations, $s^{t-1}$ denotes the point location corresponding to the previous verify iteration, $s^{t-2}$, $s^{t-3}$ . . . $s^1$ denote the point locations corresponding to the historical iterations before the previous verify iteration, and M1 denotes the first mean value. Further, according to the distribution characteristics, the farther the historical iteration is from the previous verify iteration, the smaller the influence on the distribution and variation range of the point location near the previous verify iteration. Therefore, the computation weights can be sequentially reduced in the order of a1~am.

For example, the previous verify iteration is the 100th iteration of the neural network operation, and the historical iterations may be the 1st iteration to the 99th iteration, and the processor may obtain the point location of the 100th iteration (i.e., $s^{t-1}$), and obtain the point locations of the historical iterations before the 100th iteration, in other words, $s^1$ can refer to the point location corresponding to the 1st iteration of the neural network . . . , $s^{t-3}$ can refer to the point location corresponding to the 98th iteration of the neural network, and $s^{t-2}$ can refer to the point location corresponding to the 99th iteration of the neural network. Further, the processor can obtain the first mean value according to the above formula.

Furthermore, the first mean value can be computed according to the point location of the verify iteration corresponding to each iteration interval. For example, the first mean value may be computed according to the following formula:

$$M1 = a1\times s^{t-1} + a2\times s^{t-2} + a3\times s^{t-3} + \ldots + am\times s^{1}$$

$$M2 = b1\times s\hat{}t + b2\times s\hat{}(t-1) + b3\times s\hat{}(t-2) + \ldots + bm\times s\hat{}1,$$

where a1~am denote the computation weights corresponding to the point locations of respective iterations, $s^{t-1}$ denotes the point location corresponding to the previous verify iteration, $s^{t-2}$, $s^{t-3}$ . . . $s^1$ denote the point locations corresponding to verify iterations of a preset number of iteration intervals before the previous verify iteration, and M1 denotes the first mean value.

For example, the previous verify iteration is the 100th iteration of the neural network operation, and the historical iterations may be the 1st iteration to the 99th iteration, where the 99th iteration may belong to 11 iteration intervals. For example, the 1st iteration to the 9th iteration belong to the 1st iteration interval, the 10th iteration to the 18th iteration belong to the 2nd iteration interval, . . . , and the 90th iteration to the 99th iteration belong to the 11th iteration interval. The processor can obtain the point location of the 100th iteration (i.e., $s^{t-1}$) and obtain the point location of the verify iteration in the iteration interval before the 100th iteration, in other words, s1 can refer to the point location corresponding to the verify iteration of the 1st iteration interval of the neural network (for example, $s^1$ can refer to the point location corresponding to the 1st iteration of the neural network), . . . , $s^{t-3}$ can refer to the point location corresponding to the verify iteration of the 10th iteration interval of the neural network (for example, $s^{t-3}$ can refer to the point location corresponding to the 81th iteration of the neural network), and $s^{t-2}$ can refer to the point location corresponding to the verify iteration of the 11th iteration interval of the neural network (for example, $s^{t-2}$ can refer to the point location corresponding to the 90th iteration of the neural network). Further, the processor can obtain the first mean value M1 according to the above formula.

In an embodiment of the present disclosure, for the convenience of illustration, it is assumed that the iteration intervals include the same number of iterations. However, in actual use, the iteration intervals may include different numbers of iterations. Optionally, the number of iterations included in the iteration intervals increases with the increase of iterations, in other words, as the training or fine tuning of the neural network proceeds, the iteration intervals may become larger and larger.

Furthermore, in order to simplify the computation and reduce the storage space occupied by the data, the first mean value M1 can be computed using the following formula:

$$M1 = \alpha\times s^{t-1} + (1-\alpha)\times M0 \quad \text{Formula (27)}$$

$$\text{diff\_update1} = |M2 - M1| = \beta|s\hat{}((t)) - M1|$$

where α refers to the computation weight of the point location corresponding to the previous verify iteration, $s^{t-1}$ refers to the point location corresponding to the previous verify iteration, and M0 refers to the moving mean value corresponding to the verify iteration before the previous verify iteration, where the method for computing M0 may refer to the method for computing M1, which will not be repeated here.

The step S110 further includes:

A step S112: determining a second mean value according to a point location corresponding to current verify iteration and the point locations of the historical verify iterations before current verify iteration, where the point location corresponding to the current verify iteration may be determined according to a target data bit width of the current verify iteration and the data to be quantized.

Optionally, the second mean value M2 may be computed according to the following formula:

$$M2 = b1\times s^{t} + b2\times s^{t-1} + b3\times s^{t-2} + \ldots + bm\times s^{1} \quad \text{Formula (28)}$$

$$\text{diff\_update1} = |M2 - M1| = \beta|s\hat{}((t)) - M1|$$

where b1~bm denote the computation weights corresponding to the point locations of respective iterations, $s^t$ denotes the point location corresponding to the previous verify iteration, $s^{t-1}$, $s^{t-2}$ . . . $s^1$ denote the point locations corresponding to the historical iterations before the current verify iteration, and M2 denotes the second mean value. Further, according to the distribution characteristics, the farther the historical iteration is from the current verify iteration, the smaller the influence on the distribution and variation range of the point location near the current verify iteration. Therefore, the computation weights can be sequentially reduced in the order of b1~bm.

For example, the current verify iteration is the 101st iteration of the neural network operation, and the historical iterations before the current verify iteration refer to the 1st iteration to the 100th iteration. The processor may obtain the point location of the 101st iteration (i.e., $s^t$), and obtain the point locations of the historical iterations before the 101st iteration, in other words, $s^1$ can refer to the point location corresponding to the 1st iteration of the neural network . . . , $s^{t-2}$ can refer to the point location corresponding to the 99th iteration of the neural network, and $s^{t-1}$ can refer to the point location corresponding to the 100th iteration of the neural network. Further, the processor can obtain the second mean value M2 according to the above formula.

Optionally, the second mean value can be computed according to the point location of the verify iteration corresponding to each iteration interval. Specifically, as shown in FIG. 3-8, the step S112 includes:

a step S1121: obtaining a preset number of intermediate moving mean values, where each intermediate moving mean value is determined according to the preset number of verify iterations before the current verify iteration, and the verify iteration is the iteration when adjusting the parameter in the neural network quantization process; and a step S1122: determining the second mean value according the point location of current verify iteration and the preset number of intermediate moving mean values.

For example, the second mean value may be computed according to the following formula:

$$M2 = b1 \times s^t + b2 \times s^{t-1} + b3 \times s^{t-2} + \ldots + bm \times s^1$$

$$M2 = b1 \times s\hat{\ }t + b2 \times s\hat{\ }(t-1) + b3 \times s\hat{\ }(t-2) + \ldots + bm \times s\hat{\ }1,$$

where b1~bm denote the computation weights corresponding to the point locations of respective iterations, $s^t$ denotes the point location corresponding to the previous verify iteration, $s^{t-1}$, $s^{t-2}$ . . . $s^1$ denote the point locations corresponding to the verify iterations before the current verify iteration, and M2 denotes the second mean value.

For example, the current verify iteration is the 100th iteration, and the historical iterations may be the 1st iteration to the 99th iteration, where the 99th iteration may belong to 11 iteration intervals. For example, the 1st iteration to the 9th iteration belong to the 1st iteration interval, the 10th iteration to the 18th iteration belong to the 2nd iteration interval, . . . , and the 90th iteration to the 99th iteration belong to the 11th iteration interval. The processor can obtain the point location of the 100th iteration (i.e., $s^t$) and obtain the point location of the verify iteration in the iteration interval before the 100th iteration, in other words, s1 can refer to the point location corresponding to the verify iteration of the 1st iteration interval of the neural network (for example, $s^1$ can refer to the point location corresponding to the 1st iteration of the neural network), . . . , $s^{t-2}$ can refer to the point location corresponding to the verify iteration of the 10th iteration interval of the neural network (for example, $s^{t-2}$ can refer to the point location corresponding to the 81th iteration of the neural network), and $s^{t-1}$ can refer to the point location corresponding to the verify iteration of the 11th iteration interval of the neural network (for example, $s^{t-1}$ can refer to the point location corresponding to the 90th iteration of the neural network). Further, the processor can obtain the second mean value M2 according to the above formula.

In an embodiment of the present disclosure, for the convenience of illustration, it is assumed that the iteration intervals include the same number of iterations. However, in actual use, the iteration intervals may include different numbers of iterations. Optionally, the number of iterations included in the iteration intervals increases with the increase of iterations, in other words, as the training or fine tuning of the neural network proceeds, the iteration intervals may become larger and larger.

Furthermore, in order to simplify the computation and reduce the storage space occupied by the data, the processor determine the second mean value according to the point location corresponding to the current verify iteration and the first mean value. In other words, the second mean value can be computed using the following formula:

$$M2 = \beta \times s^t + (1-\beta) \times M1 \qquad \text{Formula (29)}$$

$$\text{diff\_update1} = |M2 - M1| = \beta|s\hat{\ }((t)) - M1|,$$

where β denotes the computation weight of the point location corresponding to the current verify iteration, and M1 denotes the first mean value.

The step S110 further includes:

a step S113: determining a first error according to the first mean value and the second mean value, where the first error is used to indicate the variation range of point locations of the current verify iteration and the historical iterations.

Optionally, the first error may be equal to an absolute value of the difference between the second mean value and the first mean value. Optionally, the first error may be computed according to the following formula:

$$diff_{update1} = |M2 - M1| = \beta\left|s^{(t)} - M1\right| \qquad \text{Formula (30)}$$

$$\text{diff\_update1} = |M2 - M1| = \beta|s\hat{\ }((t)) - M1|$$

Optionally, the point location of the current verify iteration may be determined according to the data to be quantized of the current verify iteration and the target data bit width corresponding to the current verify iteration. The method for computing the point location may refer to the formula (2) or the formula (14). The target data bit width corresponding to the current verify iteration may be a hyperparameter. Further optionally, the target data bit width corresponding to the current verify iteration may be user-defined input. Optionally, the data bit width corresponding to the data to be quantized in the process of training or fine-tuning of the neural network may be constant, in other words, the same type of data to be quantized of the same neural network may be quantized with one data bit width. For example, the neuron data in respective iterations of the neural network may be quantized with the data bit width of 8 bits.

Optionally, the data bit width corresponding to the data to be quantized in the process of training or fine-tuning of the neural network may be variable to guarantee that the data bit width may meet the quantization requirements of the data to be quantized. In other words, the processor may adaptively adjust the data bit width corresponding to the data to be quantized according to the data to be quantized to obtain the target data bit width corresponding to the data to be quantized. Specifically, the processor may determine the target data bit width corresponding to the current verify iteration firstly, and then determine the point location corresponding to the current verify iteration according to the target data bit width corresponding to the current verify iteration and the data to be quantized corresponding to the current verify iteration.

Specifically, as shown in FIG. 3-9, the step S110 includes:

a step S114: determining a quantization error according to the data to be quantized of the current verify iteration and the quantized data of the current verify iteration, where the quantized data of the current verify iteration is obtained by quantizing the data to be quantized of the current verify iteration.

Optionally, the processor may quantize the data to be quantized with an initial data bit width to obtain the quantized data. The initial data bit width of the current verify iteration may be a hyper-parameter, or may be determined according to the data to be quantized of the previous verify iteration before the current verify iteration.

Specifically, the processor may determine an intermediate representation data according to the data to be quantized of the current verify iteration and the quantized data of the current verify iteration. Optionally, the intermediate representation data may be constant with the representation format of the data to be quantized. For example, the processor may inversely quantize the quantized data to obtain the intermediate represent data that is constant with the representation format of the data to be quantized, where the inverse quantization refers to the inverse process of quantization. For example, the quantized data may be obtained according to the formula (3), and the processor may inversely quantize the quantized data according to the formula (4) to obtain the corresponding intermediate representation data and to determine the quantization error according to the data to be quantized and the intermediate representation data.

Further, the processor may compute the quantization error according to the data to be quantized and the corresponding intermediate representation data. It is assumed that the data to be quantized of the current verify iteration is $F_x=[z_1, z_2 \ldots, z_m]$, and the intermediate representation data corresponding to the data to be quantized is $F_{x1}=[z_1^{(n)}, z_2^{(n)} \ldots, z_m^{(n)}]$. The processer may determine an error term according to the data to be quantized $F_x$ and the corresponding intermediate representation data $F_{x1}$ and determine the quantization error according the error term.

Optionally, the processor may determine the error term according to the sum of the elements of the intermediate representation data $F_{x1}$ and the sum of the elements of the data to be quantized $F_x$, and the error term may be the difference between the sum of the elements of the intermediate representation data $F_{x1}$ and the sum of the elements of the data to be quantized $F_x$. Later, the processor may determine the quantization error according to the error term. The specific quantization error may be determined according to the following formula:

$$diff_{bit} = \log_2\left(\frac{\sum_i |z_i^{(n)}| - \sum_i |z_i|}{\sum_i |z_i|} + 1\right) \quad \text{Formula (31)}$$

$$\text{diff\_update1} = |M2 - M1| = \beta|s^\wedge((t)) - M1|,$$

where $z_i$ are the elements of the data to be quantized, $z_i^{(n)}$ are the elements of the intermediate representation data $F_{x1}$.

Optionally, the processor may compute the difference between an element of the data to be quantized and the corresponding element of the intermediate representation data $F_{x1}$ respectively, obtain m differences, and determine the sum of the m differences as the error sum. Later, the processor may determine the quantization error according to the error term. The specific quantization error may be determined according to the following formula:

$$diff_{bit} = \log_2\left(\frac{\sum_i |z_i^{(n)} - z_i|}{\sum_i |z_i|} + 1\right) \quad \text{Formula (32)}$$

$$\text{diff\_update1} = |M2 - M1| = \beta|s^\wedge((t)) - M1|,$$

where $z_i$ are the elements of the data to be quantized, $z_i^{(n)}$ are the elements of the intermediate representation data $F_{x1}$.

Optionally, the difference between the element of the data to be quantized and the corresponding element of the intermediate representation data $F_{x1}$ may be approximately equal to $2^{s-1}$. Therefore, the quantization error may be determined according to the following formula:

$$diff_{bit} = \log_2\left(\frac{2^{s-1} * m}{\sum_i |z_i|}\right) \quad \text{Formula (33)}$$

$$\text{diff\_update1} = |M2 - M1| = \beta|s^\wedge((t)) - M1|,$$

where m is the amount of the intermediate representation data $F_{x1}$ corresponding to the target data, s is the point location and $z_i$ are the elements of the data to be quantized.

Optionally, the intermediate representation data may also be consistent with the representation format of the quantized data and may determine the quantization error according to the intermediate representation data and the quantized data. For example, if the data to be quantized is represented as: $F_x \approx I_x \times 2^s$, the intermediate representation data $$I_{x1} \approx \frac{F_x}{2^s}$$

may be determined, and the intermediate representation data $I_{x1}$ may have the same data representation format with the quantized data. At this time, the processor may determine the quantization error according to the intermediate representation data $I_{x1}$ and $$I_x = \text{round}\left(\frac{F_x}{2^s}\right)$$

computed by using the formula (3). The specific method for determining the quantization error may refer to the formula (31)~formula (33).

The step S110 further includes:

a step S115: determining the target data bit width corresponding to the current verify iteration according to the quantization error.

Specifically, the processor may adjust adaptively the data bit width corresponding to the current verify iteration according to the quantization error to determine the target data bit width after adjusting the current verify iteration. When the quantization error meets the preset condition, the data bit width corresponding to the current verify iteration may be constant, in other words, the target data bit width of the current verify iteration may be equal to the initial data bit width. When the quantization error does not meet the preset condition, the processor may adjust the data bit width corresponding to the data to be quantized of the current verify iteration to obtain the target data bit width corresponding to the current verify iteration. When the processor quantizes the data to be quantized of the current verify iteration with the target data bit width, the quantization error meets the preset condition. Optionally, the preset condition may be a user-defined preset threshold.

Specifically, as shown in FIG. 3-10, the step S115 includes:

A step S1150: judging, by the processor, whether the quantization error is greater than or equal to a first preset threshold.

When the quantization error is greater than or equal to the first preset threshold, a step S1151 may be operated, in other words, the data bit width corresponding to the current verify iteration may be increased to obtain the target data bit width of the current verify iteration. When the quantization error is less than the first preset threshold, the data bit width of the current verify iteration remains unchanged.

Further optionally, the processor may obtain the target data bit width after adjusting once. For example, the initial data bit width of the current iteration is n1, and the processor may determine the target data bit width n2=n1+t after adjusting once, where t is the adjustment value of the data bit width. When the data to be quantized of the current verify iteration is quantized with the target data bit width n2, the quantization error may be less than the first preset threshold.

Further optionally, the processor may obtain the target data bit width after adjusting for a plurality of times until the quantization error is less than the first preset threshold, and determine the data bit width when the quantization error is less than the first preset threshold as the target data bit width. Specifically, if the quantization error is greater than or equal to the first preset threshold, a first intermediate data bit width may be determined according to a first bit width stride; then the processor may quantize the data to be quantized of the current verify iteration according to the first intermediate data bit width to obtain the quantized data, and may determine the quantization error according to the data to be quantized of the current verify iteration and the quantized data of the current verify iteration, until the quantization error is less than the first preset threshold. The processor may determine the corresponding data bit width when the quantization error is less than the first preset threshold as the target data bit width.

For example, if the initial data bit width of the current verify iteration is n1, the processor may quantize the data to be quantized A of the current verify iteration with the initial data bit width n1 to obtain the quantized data B1, and may compute the quantization error C1 according to the data to be quantized A and the quantized data B1. When the quantization error C1 is greater than or equal to the first preset threshold, the processor may determine the first intermediate data bit width n2=n1+t1, where t1 is the first preset bit width stride. Later, the processor may quantize the data to be quantized of the current verify iteration according to the first intermediate data bit width n2 to obtain the quantized data B2 of the current verify iteration, and may compute the quantization error C2 according the data to be quantized A and the quantized data B2. When the quantization C2 is greater than or equal to the first preset threshold, the processor may determine the first data bit width n2=n1+t1+t1, and later may quantize the data to be quantized A of the current verify iteration according to a new first intermediate data bit width and compute the corresponding quantization error until the quantization error is less the first preset threshold. If the quantization error C1 is less than the first preset threshold, the initial data bit width n1 may be constant.

Further more, the first preset bit width stride may be constant. For example, when the quantization error is greater than the first preset threshold, the processor may increase the data bit width corresponding to the current verify iteration by a same bit width value. Optionally, the first preset bit width stride may also be variable. For example, the processor may compute the difference between the quantization parameter and the first preset threshold, and the smaller the difference is, the smaller the first preset bit width stride value will be.

Optionally, as shown in FIG. 3-11, the step S115 further includes:

- a step S1152: judging, by the processor, whether the quantization error is less than or equal to a first preset threshold.

When the quantization error is less than or equal to the second preset threshold, a step S1153 may be operated, in other words, the data bit width corresponding to the current verify iteration may be decreased to obtain the target data bit width of the current verify iteration. When the quantization error is greater than the second preset threshold, the data bit width of the current verify iteration remains unchanged.

Further optionally, the processor may obtain the target data bit width after adjusting once. For example, the initial data bit width of the current iteration is n1, and the processor may determine the target data bit width n2=n1−t after adjusting once, where t is the adjustment value of the data bit width. When the data to be quantized of the current verify iteration is quantized with the target data bit width n2, the quantization error may be greater than the second preset threshold.

Further optionally, the processor may obtain the target data bit width after adjusting for a plurality of times until the quantization error is greater than the second preset threshold, and determine the data bit width when the quantization error is greater than the second preset threshold as the target data bit width. Specifically, if the quantization error is less than or equal to the first preset threshold, a second intermediate data bit width may be determined according to a second bit width stride; then the processor may quantize the data to be quantized of the current verify iteration according to the second intermediate data bit width to obtain the quantized data, and may determine the quantization error according to the data to be quantized of the current verify iteration and the quantized data of the current verify iteration, until the quantization error is greater than the second preset threshold. The processor may determine the corresponding data bit width when the quantization error is greater than the second preset threshold as the target data bit width.

For example, if the initial data bit width of the current verify iteration is n1, the processor may quantize the data to be quantized A of the current verify iteration with the initial data bit width n1 to obtain the quantized data B1, and may compute the quantization error C1 according to the data to be quantized A and the quantized data B1. When the quantization error C1 is less than or equal to the second preset threshold, the processor may determine the second intermediate data bit width n2=n1-t2, where t2 is the second preset bit width stride. Later, the processor may quantize the data to be quantized of the current verify iteration according to the second intermediate data bit width n2 to obtain the quantized data B2 of the current verify iteration, and may compute the quantization error C2 according to the data to be quantized A and the quantized data B2. When the quantization C2 is less than or equal to the first preset threshold, the processor may determine the second data bit width n2=n1−t2−t2, and later may quantize the data to be quantized A of the current verify iteration according to a new second intermediate data bit width and compute the corresponding quantization error until the quantization error is greater the first preset threshold. If the quantization error C1 is greater than the second preset threshold, the initial data bit width n1 may be constant.

Furthermore, the second preset bit width stride may be constant. For example, when the quantization error is less than the second preset threshold, the processor may decrease the data bit width corresponding to the current verify iteration by a same bit width value. Optionally, the second preset bit width stride may also be variable. For example, the processor may compute the difference between the quantization parameter and the second preset threshold, and the smaller the difference is, the smaller the second preset bit width stride value will be.

Optionally, as shown in FIG. 3-12, when the processor determines that the quantization error is less than the first preset threshold and greater than the second preset threshold, the data bit width of the current verify iteration may be constant, where the first preset threshold is greater than the second preset threshold. In other words, the target data bit width of the current verify iteration may be equal to the initial data bit width. FIG. 3-12 just illustrates the method for determining the data bit width in an embodiment of the present disclosure. The operation order in FIG. 3-12 may be adjusted adaptively, which is not limited herein.

In an embodiment of the present disclosure, when the data bit width of the current verify iteration changes, the point location will change correspondingly. But the change of the point location is not caused by the change of the data to be quantized. The target iteration interval computed with the first error determined according to the formula (30) may be inaccurate and affect the quantization precision. Therefore, when the data bit width of the current verify iteration changes, the second mean value may be adjusted correspondingly to guarantee the first error may reflect the variation range of the point location accurately, so as to guarantee the accuracy and reliability of the target iteration interval. Specifically, as shown in FIG. 3-13, the method further includes:

a step S116: determining the data bit width adjustment value of the current verify iteration according to the target data bit width.

Specifically, the processor may determine the data bit width adjustment value of the current verify iteration according to the target data bit width of the current verify iteration and the initial data bit width. The data bit width adjustment value=the target data bit width−the initial data bit width. Of course, the processor may obtain the data bit width adjustment value of the current verify iteration directly.

The method further includes:

a step S117: determining the data bit width adjustment value of the current verify iteration and updating the second mean value.

Specifically, when the data bit width adjustment value is greater than the preset parameter (for example, the preset parameter may be zero), in other words, when the data bit width of the current verify iteration increases, the processor may decrease the second mean value correspondingly. When the data bit width adjustment value is less than the preset parameter (for example, the preset parameter may be zero), in other words, when the data bit width of the current verify iteration decreases, the processor may increase the second mean value correspondingly. When the data bit width adjustment value is equal to the preset parameter, in other words, when the data bit width adjustment value is zero, the data to be quantized corresponding to the current iteration is not changed, the updated second mean value is equal to the second mean value before updating, and the second mean value before updating is computed according to the formula (29). Optionally, when the data bit width adjustment value is equal to the preset parameter, in other words, when the data bit width adjustment value is 0, the processor may not update the second mean value, in other words, the processor may not perform the operation S117.

For example, the second mean value before updating $M2=\beta\times s^t+(1-\beta)\times M1$; when the target data bit width corresponding to the current verify iteration n2=the initial data bit width n1+Δn, where Δn denotes the data bit width adjustment value, the updated second mean value $M2=\beta\times(s^t-\Delta n)+(1-\beta)\times(M1-\Delta n)$. When the target data bit width corresponding to the current verify iteration n2=the initial data bit width n1−Δn, where Δn denotes the data bit width adjustment value, the updated second mean value $M2=\beta\times(s^t-\Delta n)+(1-\beta)\times(M1+\Delta n)$, where $s^t$ denotes the point location of the current verify iteration determined according to the target data bit width.

For another example, the second mean value before updating $M2=\beta\times s^t+(1-\beta)\times M1$; when the target data bit width corresponding to the current verify iteration n2=the initial data bit width n1+Δn, where Δn denotes the data bit width adjustment value, the updated second mean value $M2=\beta\times s^t+(1-\beta)\times M1-\Delta n$. For another example, when the target data bit width corresponding to the current verify iteration n2=the initial data bit width n1−Δn, where Δn denotes the data bit width adjustment value, the updated second mean value $M2=\beta\times s^t+(1-\beta)\times M1+\Delta n$, where $s^t$ denotes the point location of the current verify iteration determined according to the target data bit width.

Further, as shown in FIG. 3-6, the step S200 includes:

a step S210: determining the target iteration interval according to the variation range of the point location, where the target iteration interval is negatively correlated with the variation range of the point location. In other words, the greater the variation range of the point location is, the smaller the target iteration interval will be. The smaller the variation range of the point location is, the greater the target iteration interval will be.

As described above, the first error may represent the variation range of the point location, thereby, as shown in FIG. 3, the step S210 includes:

a step S211: determining the target iteration interval, by the processor, according to the first error, where the target iteration interval is negatively correlated with the first error. In other words, the greater the first error is, the variation range of the point location will be greater, which further indicates that the data variation range of the data to be quantized is greater. At this time, the target iteration interval is smaller.

Specifically, the processor may compute the target iteration interval I according to the following formula:

$$I=\frac{\delta}{diff_{update1}}-\gamma \qquad \text{Formula (31)}$$

$$\text{diff\_update1}=|M2-M1|=\beta|s^{\wedge}((t))-M1|$$

where I is the target iteration interval, $diff_{update1}$ denotes the first error, and δ和γ may be a hyperparameters.

It should be understood that the first error can be used to measure the variation range of the point location. The greater the first error is, the greater the variation range of the point location is, which further indicates that the data variation range of the data to be quantized is greater and the target iteration interval needs to be set smaller. In other words, the greater the first error is, the more frequent the adjustment of the quantization parameter is.

In the embodiment, the target iteration interval is determined by computing the variation range (the first error) of the point location and according to the variation range of the point location. Since the quantization parameter is determined according to the target iteration interval, the quantized data obtained according to the quantization parameter may be more in accordance with the variation trend of the point location of the target data, which may improve the computation efficiency of the neural network while ensuring the quantization precision.

Optionally, after determining the target iteration interval in the current verify iteration, the processor may further determine the quantization parameter corresponding to the target iteration interval and the parameters such as the data bit width in the current verify iteration so as to update the quantization parameter according to the target iteration interval. The quantization parameter may include a point location and/or a scaling factor. Further, the quantization parameter may also include an offset. The specific computation method of the quantization parameter refers to the description above. As shown in FIG. 3-14, the method further includes:

a step S300: adjusting the quantization parameter in the neural network operation, by the processor, according to the target iteration interval.

Specifically, the processor may determine the verify iteration according to the target iteration interval, update the target iteration interval in each verify iteration and update the quantization parameter in each verify iteration. For example, when the data bit width of the neural network operation is constant, the processor may update the quantization parameter such as the point location according to the data to be quantized of the verify iteration in each verify iteration. For another example, when the data bit width of the neural network operation is variable, the processor may update the data bit width in each verify iteration and adjust the quantization parameter such as the point location according to the updated data bit width and the data to be quantized of the verify iteration.

In an embodiment of the present disclosure, the processor updates the quantization parameter in each verify iteration to guarantee that the current quantization parameter may meet the quantization requirements of the data to be quantized. The target iteration interval before updating may be the same as or different from the updated target iteration interval. The data bit width before updating may be the same as or different from the updated data bit width; in other words, the data bit width of different iteration intervals may be the same or different. The quantization parameter before updating may be the same as or be different from the updated quantization parameter; in other words, the quantization parameter of different iteration intervals may be the same or different.

Optionally, in the step S300, the processor can determine the quantization parameter of the target iteration interval in the verify iteration to adjust the quantization parameter of the neural network operation.

In one case, the data bit width corresponding to the respective iterations of the neural network operation remains unchanged, in other words, the data bit width corresponding to the respective iterations of the neural network operation is the same. At this time, the processor may determine the quantization parameters such as the point location in the target iteration interval to realize the purpose that the quantization parameter of the neural network operation may be adjusted according to the target iteration interval. The quantization parameters corresponding to the respective iterations in the target iteration interval may be consistent. In other words, the respective iterations of the target iteration interval use a same point location and only update and determine the quantization parameters such as the point location in each verify iteration, thereby avoiding updating and adjusting the quantization parameter in each iteration, decreasing the computation quantity in the quantization process and improving the quantization efficiency.

Optionally, for the case where the data bit width remains unchanged, the point locations corresponding to the respective iterations of the target iteration interval may be consistent. Specifically, the processor may determine the point location corresponding to the current verify iteration according to the data to be quantized of the current verify iteration and the target data bit width corresponding to the current verify iteration, and determine the point location corresponding to the current verify iteration as the point location corresponding to the target iteration interval. The respective iterations in the target iteration interval may apply the point location corresponding to the current verify iteration. Optionally, the target data bit width corresponding to the current verify iteration may be a hyperparameter. For example, the target data bit width corresponding to the current verify iteration may be user-defined input. The point location corresponding to the current verify iteration may be computed referring to the formula (2) or formula (14).

In one case, the data bit width corresponding to the respective iterations of the neural network operation may be changed, in other words, the data bit width corresponding to different target iteration interval may be inconsistent, but the data bit width of the respective iterations in the target iteration interval remains unchanged. The data bit width of the iteration in the target iteration interval may be a hyperparameter, for example, the data bit width corresponding to the iteration of the target iteration interval may be user-defined input. In one case, the data bit width corresponding to the iteration in the target iteration interval may be computed by the processor, for example, the processor may determine the target data bit width corresponding to the current verify iteration according to the data to be quantized of the current verify iteration, and determine the data bit width corresponding to the current verify iteration as the data bit width corresponding to the target iteration interval.

At this time, to simplify the computation quantity in the quantization process, the corresponding quantization parameters such as the point location and the like in the target iteration interval can also remain unchanged. In other words, the respective iterations of the target iteration interval use a same point location and only update and determine the quantization parameters such as the point location and the data bit width in each verify iteration, thereby avoiding updating and adjusting the quantization parameter in each iteration, decreasing the computation quantity in the quantization process and improving the quantization efficiency.

Optionally, for the case where the data bit width corresponding to the target iteration interval remains unchanged, the point locations corresponding to the respective iterations of the target iteration interval may be consistent. Specifically, the processor may determine the point location corresponding to the current verify iteration according to the data to be quantized of the current verify iteration and the target data bit width corresponding to the current verify iteration, and determine the point location corresponding to the current verify iteration as the point location corresponding to the target iteration interval. The respective iterations in the target iteration interval may apply the point location corresponding to the current verify iteration. Optionally, the target data bit width corresponding to the current verify iteration may be a hyperparameter. For example, the target data bit width corresponding to the current verify iteration may be user-defined input. The point location corresponding to the current verify iteration may be computed referring to the formula (2) or formula (14).

Optionally, the scaling factors corresponding to the respective iterations in the target iteration interval may be consistent. The processor may determine the scaling factor corresponding to the current verify iteration according to the data to be quantized of the current verify iteration, and determine the scaling factor corresponding to the current verify iteration as the scaling factor of the respective iterations in the target iteration interval. The scaling factors corresponding to the respective iterations in the target iteration interval are consistent.

Optionally, the offsets corresponding to the respective iterations in the target iteration interval may be consistent. The processor may determine the offset corresponding to the current verify iteration according to the data to be quantized of the current verify iteration, and determine the offset corresponding to the current verify iteration as the offset of the respective iterations in the target iteration interval. Further, the processor may also determine the minimum value and the maximum value among all elements of the data to be quantized, and further determine the quantization parameters such as the point location, the scaling factor and the like. See details in descriptions above. The offsets corresponding to the respective iterations in the target iteration interval are consistent.

For example, the target iteration interval may compute the number of iterations from the current verify iteration, in other words, the verify iteration corresponding to the target iteration interval may be the starting iteration of the target iteration interval. For example, if the current verify iteration is a 100th iteration, the processor may determine that the target iteration interval is 3 according to the data variation range of the data to be quantized, and the processor may determine that the target iteration interval includes 3 iterations, which are respectively the 100th iteration, a 101st iteration, and a 102nd iteration. Therefore, the processor may determine the quantization parameters such as the point location corresponding to the 100th iteration according to the data to be quantized and the target data bit width corresponding to the 100th iteration, and may quantize the 100th iteration, the 101st iteration and the 102nd iteration with the quantization parameters such as the point location corresponding to the 100th iteration. In this way, the processor does not need to compute the quantization parameters such as the point location in the 101st iteration and the 102nd iteration, thereby decreasing the computation quantity in the quantization process and improving the quantization efficiency.

Optionally, the target iteration interval may compute the number of iterations from the next iteration of the current verify iteration, in other words, the verify iteration corresponding to the target iteration interval may be the ending iteration of the target iteration interval. For example, if the current verify iteration is a 100th iteration, the processor may determine that the target iteration interval is 3 according to the data variation range of the data to be quantized, and the processor may determine that the target iteration interval includes 3 iterations, which are respectively a 101st iteration, a 102nd iteration, and a 103rd iteration. Therefore, the processor may determine the quantization parameters such as the point location corresponding to the 100th iteration according to the data to be quantized and the target data bit width corresponding to the 100th iteration, and may quantize the 101st iteration, the 102nd iteration, and the 103rd iteration with the quantization parameters such as the point location corresponding to the 100th iteration. In this way, the processor does not need to compute the quantization parameters such as the point location in the 102nd iteration and the 103rd iteration, thereby decreasing the computation quantity in the quantization process and improving the quantization efficiency.

In an embodiment of the present disclosure, the data bit width and the quantization parameters corresponding to the respective iterations in one target iteration interval are consistent, in other words, the data bit width, the point location, the scaling factor and the offset corresponding to the respective iterations in one target iteration interval remains unchanged, thereby avoiding, in the process of training or fine-tuning stage of the neural network, adjusting the quantization parameters of the data to be quantized frequently, decreasing the computation quantity in the quantization process, and improving the quantization efficiency. In addition, the quantization parameters may be adjusted dynamically according to the data variation range in different stages of the training or fine-tuning to ensure the quantization precision.

In another case, the data bit width corresponding to the respective iterations of the neural network operation may be changed, but the data bit width of the respective iterations in the target iteration interval remains unchanged. At this time, the quantization parameters such as the point location corresponding to the respective iterations in the target iteration interval may be inconsistent. The processor may determine the data bit width corresponding to the target iteration interval according to the target data bit width corresponding to the current verify iteration, where the data bit width corresponding to the respective iterations in the target iteration interval is consistent. Later, the processor may adjust the quantization parameters such as the point location in the process of the neural network operation according to the data bit width corresponding to the target iteration interval and the point location iteration interval. Optionally, as shown in FIG. 3-15, the step S300 further includes:

a step S310: determining the data bit width corresponding to the target iteration interval according to the data to be quantized of the current verify iteration, where the data bit width corresponding to the respective iterations in the target iteration interval is consistent. In other words, the data bit width in the process of neural network operation may be updated once every other target iteration interval. Optionally, the data bit width corresponding to the target iteration interval may be the data bit width of the current verify iteration. The target data bit width of the current verify iteration may refer to the step S114 and the step S115, which will not be repeated here.

For example, the target iteration interval may compute the number of iterations from the current verify iteration, in other words, the verify iteration corresponding to the target iteration interval may be the starting iteration of the target iteration interval. For example, if the current verify iteration is a 100th iteration, the processor may determine that the target iteration interval is 6 according to the data variation range of the data to be quantized, and the processor may determine that the target iteration interval includes 6 iterations, which are respectively the 100th iteration to the 105th iteration. At this time, the processor may determine the target data bit width of the 100th iteration, and the 101st iteration to the 105th iterations may use the target data bit width corresponding to the 100th iteration and do not need to compute the target data bit width, thereby decreasing the computation quantity and improving quantization efficiency and computation efficiency. Later, the 106th iteration may be determined as the current verify iteration and repeat the operation of determining the target iteration interval and updating the data bit width.

Optionally, the target iteration interval may compute the number of iterations from the next iteration of the current verify iteration, in other words, the verify iteration corresponding to the target iteration interval may be the ending iteration of the target iteration interval. For example, if the current verify iteration is a 100th iteration, the processor may determine that the target iteration interval is 6 according to the data variation range of the data to be quantized, and the processor may determine that the target iteration interval includes 6 iterations, which are respectively the 101st iteration to the 106th iteration. At this time, the processor may determine the target data bit width of the 100th iteration, and the 101st iteration to the 106th iterations may use the target data bit width corresponding to the 100th iteration and do not need to compute the target data bit width, thereby decreasing the computation quantity and improving quantization efficiency and computation efficiency. Later, the 106th iteration may be determined as the current verify iteration and repeat the operation of determining the target iteration interval and updating the data bit width.

S320, adjusting, by the processor, the point location corresponding to the iteration of the target iteration interval according to the obtained point location iteration interval and the data bit width corresponding to the target iteration interval, to adjust the quantization parameters such as the point location of the neural network operation.

The point location iteration interval may include at least one iteration, and the point locations of the respective iterations in the point location iteration interval are consistent. Optionally, the point location iteration interval may be a hyperparameter, for example, the point location iteration interval may be user-defined input.

Optionally, the point location iteration interval may be less than or equal to a target iteration interval. When the point location iteration interval is equal to the target iteration interval, the processor may update the quantization parameters such as the data bit width and the point location in the current verify iteration synchronously. Further optionally, the scaling factors corresponding to the respective iterations in the target iteration interval may be consistent. Further more, the offsets corresponding to the respective iterations in the target iteration interval are consistent. At this time, the quantization parameters such as the data bit width and the point location corresponding to the respective iterations in the target iteration interval are the same, thereby decreasing the computation quantity and improving the quantization efficiency and computation efficiency. The specific implementation process is basically the same as the foregoing embodiments, which may refer to the description above and will not be repeated here.

When the point location iteration interval is less than the target iteration interval, the processor may update the quantization parameters such as the data bit width and the point location in the verify iteration corresponding to the target iteration interval, and update the quantization parameters such as the point location in a sub verify iteration determined by the point location iteration interval. Since in the case that the data bit width remains unchanged, the quantization parameters such as the point location may be fine-tuned according to the data to be quantized, the quantization parameters such as the point location may be adjusted in one target iteration interval to further improve the quantization precision.

Specifically, the processor may determine a sub verify iteration according to the current verify iteration and the point location iteration interval. The sub verify iteration is used to adjust the point location, and the sub verify iteration may be an iteration of the target iteration interval. Further, the processor may adjust the point location corresponding to the iteration of the target iteration interval according to the data to be quantized of the sub verify iteration and the data bit width corresponding to the target iteration interval, where the determination method of the point location may refer to the formula (2) or the formula (14), which will not be repeater here.

For example, if the current verify iteration is a 100th iteration, the target iteration interval is 6, the iterations included in the target iteration interval are the 100th iteration to the 105th iteration, and the point location iteration interval obtained by the processor $I_{s1}=3$, the point location may be adjusted every three iterations starting from the current verify iteration. Specifically, the processor may determine the 100th iteration as the sub verify iteration, and compute the point location s1 corresponding to the 100th iteration, then share the point location s1 for the quantization in the 100th iteration, the 101st iteration and the 102nd iteration. Later, the processor may determine the 103rd iteration as the sub verify iteration according to the point location iteration interval $I_{s1}$, and at the same time, the processor may determine a point location s2 corresponding to the second point location iteration interval according to the data to be quantized corresponding to the 103rd iteration and the data bit width n corresponding to the target iteration interval, then share the point location s2 for the quantization in the 103rd iteration to the 105th iteration. In an embodiment of the present disclosure, the value of the point location s1 before updating and the value of the updated point location s2 may be the same or different. Further, the processor may determine the next target iteration interval and the quantization parameters such as the data bit width and the point location corresponding to the next target iteration interval according to the data variation range of the data to be quantized in the 106th iteration.

For another example, if the current verify iteration is a 100th iteration, the target iteration interval is 6, the iterations included in the target iteration interval are the 100th iteration to the 106th iteration, and the point location iteration interval obtained by the processor $I_{s1}=3$, the point location may be adjusted every three iterations starting from the current verify iteration. Specifically, the processor may determine the point location s1 corresponding to the first point location iteration interval according to the data to be quantized of the current verify iteration and the target data bit width n1 corresponding to the current verify iteration, and share the point location s1 for the quantization in the 101st iteration, the 102nd iteration and the 103rd iteration. Later, the processor may determine the 104th iteration as the sub verify iteration according to the point location iteration interval $I_{s1}$, and at the same time, the processor may determine a point location s2 corresponding to the second point location iteration interval according to the data to be quantized corresponding to the 104th iteration and the data bit width n1 corresponding to the target iteration interval, then share the point location s2 for the quantization in the 104th iteration to the 106th iteration. In an embodiment of the present disclosure, the value of the point location s1 before updating and the value of the updated point location s2 may be the same or different. Further, the processor may determine the next target iteration interval and the quantization parameters such as the data bit width and the point location corresponding to the next target iteration interval according to the data variation range of the data to be quantized in the 106th iteration.

Optionally, the point location iteration interval may be 1, in other words, the point location may be updated once in each iteration. Optionally, the point location iteration interval may be the same or different. For example, the at least one point location iteration interval included in the target iteration interval may be increased in sequence. The implementation method of the embodiment is illustrated here, which is not used to limiting present disclosure.

Optionally, the scaling factors corresponding to the respective iterations in the target iteration interval may be inconsistent. Further optionally, the offset may be updated synchronizing with the point location, in other words, the iteration interval corresponding to the scaling factor may be equal to the point location iteration interval. In other words, every time the processor updates and determines the point location, the scaling factor will be updated and determined correspondingly.

Optionally, the offsets corresponding to the respective iterations in the target iteration interval may be inconsistent. Further, the offset may be updated synchronously with the point location, in other words, the iteration interval corresponding to the offset may be equal to the point location iteration interval. In other words, every time the processor updates and determines the point location, the offset will be updated and determined correspondingly. Of course, the offset may be updated asynchronously with the point location or data bit width, which is not specifically limited herein. Further, the processor may also determine the minimum value and the maximum value among all elements of the data to be quantized, and further determine the quantization parameters such as the point location, the scaling factor and the like. See details in descriptions above.

In another embodiment, the processor may synthetically determine the data variation range of the data to be quantized according to the variation range of the point location and the change of the data bit width of the data to be quantized, and determine the target iteration interval according to the data variation range of the data to be quantized, where the target iteration interval may be used to update and determine the data bit width, in other words, the processor may determine the data bit width in the verify iteration of each target iteration interval. Since the point location can reflect the precision of the fixed-point data and the data bit width can reflect the data representation range of the fixed-point data, integrating the variation range of the point location and the change of the data bit width of the data to be quantized may guarantee that the quantized data has a high precision and can satisfy the data representation range. Optionally, the variation range of the point location may be represented with the first error, and the change of the data bit width may be determined according to the quantization error. Specifically, as shown in FIG. 3-16, the method further includes:

- a step S400: obtaining a first error, where the first error may represent the variation range of the point location, and the variation range of the point location may denote the data variation range of the data to be quantized; specifically, the computation method of the first error may refer to the description in the step S110, which will not be repeated here.

The method further includes:

- a step S500: obtaining a second error, where the second error may represent the change of the data bit width.

Optionally, the second error may be determined according to the quantization error and is positively correlated with the quantization error. Specifically, as shown in FIG. 3-16, the step S500 includes:

The method further includes:

- a step S510: determining a quantization error according to the data to be quantized of the current verify iteration and the quantized data of the current verify iteration, where the quantized data of the current verify iteration is obtained by the initial data bit width quantizing the data to be quantized of the current verify iteration. The specific determination method of the quantization error may refer to the description in the step S114, which will not be repeated here.

The method further includes:

- a step S520: determining a second error according to the quantization error, where the second error is positively correlated with the quantization error.

Optionally, the second error may be computed according to the following formula:

$$diff_{update2}=\theta*diff_{bit}^{2}\ diff\_update1=|M2-M1|=\beta|s\hat{}((t))-M1|$$

Formula (34), where $diff_{update2}$ denotes the second error, $diff_{bit}$ denotes the quantization error, and θ may be a hyperparameter.

The method further includes:

- a step S600: determining the target iteration interval according to the second error and the first error.

Specifically, the processor may compute the target error according to the first error and the second error and determine the target iteration interval according to the target error. Optionally, the target error may be obtained by performing a weighted mean computation on the first error and the second error. For example, the target error=K* the first error+(1−K)* the second error, where K is a hyperparameter. Then the processor may determine the target iteration interval according to the target error, and the target iteration interval is negatively correlated with the target error. In other words, the greater the target error is, the smaller the target iteration interval will be.

Optionally, the target error may also be determined according to the maximum value of the first error and the second error, at the time, the weight of the first error or the second error is 0. Specifically, as shown in FIG. 3-17, the step S600 includes:

- a step S610: determining the maximum value of the first error and the second error as the target error.

Specifically, the processor may compare the first error $diff_{update1}$ with the second errordiff$_{update2}$. When the first errordiff$_{update1}$ is greater than the second errordiff$_{update2}$, the target error is equal to the first errordiff$_{update1}$. When the first errordiff$_{update1}$ is less than the second error, the target error is equal to the second error $diff_{update2}$. When the first errordiff$_{update1}$ is equal to the second error, the target error may be the first errordiff$_{update1}$ or the second errordiff$_{update2}$. In other words, the target errordiff$_{update}$ may be determined according to the following formula:

$$diff_{update} = \max\left(diff_{update1}, diff_{update2}\right) \quad \text{Formula (35)}$$

$$\text{diff\_update1} = |M2 - M1| = \beta|s\hat{}((t)) - M1|$$

diff$_{update}$ denotes the target error, diff$_{update1}$ denotes the first error, and diff$_{update2}$ denotes the second error.

The step S600 includes:

a step S620: determining the target iteration interval according to the target error, where the target error is negatively correlated with the target iteration interval. Specifically, the target iteration interval may be determined according to the following method, and may be computed based on the following formula:

$$I = \frac{\beta}{diff_{update}} - \gamma \quad \text{Formula (36)}$$

$$\text{diff\_update1} = |M2 - M1| = \beta|s\hat{}((t)) - M1|,$$

where I denotes the target iteration interval, diff$_{update}$ denotes the target error, and δ and γ may be hyperparameters.

Optionally, in the embodiment, the data bit width of the neural network may be variable, and the variation trend of the data bit width may be indicated by the second error. In this case, as shown in FIG. 3-17, after determining the target iteration interval, the processor can perform a step S630: determining the data bit width corresponding to the iteration in the target iteration interval, where the data bit width corresponding to the iteration in the target iteration interval is consistent. Specifically, the processor may determine the data bit width corresponding to the target iteration interval according to the data to be quantized of the current verify iteration. In other words, the data bit width in the process of neural network operation may be updated once every other target iteration interval. Optionally, the data bit width corresponding to the target iteration interval may be the data bit width of the current verify iteration. The target data bit width of the current verify iteration may refer to the step S114 and the step S115, which will not be repeated here.

For example, the target iteration interval may compute the number of iterations from the current verify iteration, in other words, the verify iteration corresponding to the target iteration interval may be the starting iteration of the target iteration interval. For example, if the current verify iteration is a 100th iteration, the processor may determine that the target iteration interval is 6 according to the data variation range of the data to be quantized, and the processor may determine that the target iteration interval includes 6 iterations, which are respectively the 100th iteration to the 105th iteration. At this time, the processor may determine the target data bit width of the 100th iteration, and the 101st iteration to the 105th iterations may use the target data bit width corresponding to the 100th iteration and do not need to compute the target data bit width, thereby decreasing the computation quantity and improving quantization efficiency and computation efficiency. Later, the 106th iteration may be determined as the current verify iteration and repeat the operation of determining the target iteration interval and updating the data bit width.

Optionally, the target iteration interval may compute the number of iterations from the next iteration of the current verify iteration, in other words, the verify iteration corresponding to the target iteration interval may be the ending iteration of the target iteration interval. For example, if the current verify iteration is a 100th iteration, the processor may determine that the target iteration interval is 6 according to the data variation range of the data to be quantized, and the processor may determine that the target iteration interval includes 6 iterations, which are respectively the 101st iteration to the 106th iteration. At this time, the processor may determine the target data bit width of the 100th iteration, and the 101st iteration to the 106th iterations may use the target data bit width corresponding to the 100th iteration and do not need to compute the target data bit width, thereby decreasing the computation quantity and improving quantization efficiency and computation efficiency. Later, the 106th iteration may be determined as the current verify iteration and repeat the operation of determining the target iteration interval and updating the data bit width.

Further more, the processor can determine the quantization parameter of the target iteration interval in the verify iteration to adjust the quantization parameter of the neural network operation according to the target iteration interval. In other words, the quantization parameters such as the point location of the neural network operation may be updated synchronously with the data bit width.

In one case, the quantization parameters corresponding to the respective iterations in the target iteration interval may be consistent. Optionally, the processor may determine the point location corresponding to the current verify iteration according to the data to be quantized of the current verify iteration and the target data bit width corresponding to the current verify iteration, and determine the point location corresponding to the current verify iteration as the point location corresponding to the target iteration interval, where the point locations corresponding to the respective iterations in the target iteration interval are consistent. In other words, the respective iterations of the target iteration interval use the quantization parameters such as the point location of the current verify iteration, thereby avoiding updating and adjusting the quantization parameter in each iteration, decreasing the computation quantity in the quantization process and improving the quantization efficiency.

Optionally, the scaling factors corresponding to the respective iterations in the target iteration interval may be consistent. The processor may determine the scaling factor corresponding to the current verify iteration according to the data to be quantized of the current verify iteration, and determine the scaling factor corresponding to the current verify iteration as the scaling factor of the respective iterations in the target iteration interval. The scaling factors corresponding to the respective iterations in the target iteration interval are consistent.

Optionally, the offsets corresponding to the respective iterations in the target iteration interval are consistent. The processor may determine the offset corresponding to the current verify iteration according to the data to be quantized of the current verify iteration, and determine the offset corresponding to the current verify iteration as the offset of the respective iterations in the target iteration interval. Further, the processor may also determine the minimum value and the maximum value among all elements of the data to be quantized, and further determine the quantization parameters such as the point location, the scaling factor and the like. See details in descriptions above. The offsets corresponding to the respective iterations in the target iteration interval are consistent.

For example, the target iteration interval may compute the number of iterations from the current verify iteration, in other words, the verify iteration corresponding to the target iteration interval may be the starting iteration of the target iteration interval. For example, if the current verify iteration is a 100th iteration, the processor may determine that the target iteration interval is 3 according to the data variation range of the data to be quantized, and the processor may determine that the target iteration interval includes 3 iterations, which are respectively the 100th iteration, a 101st iteration, and a 102nd iteration. Therefore, the processor may determine the quantization parameters such as the point location corresponding to the 100th iteration according to the data to be quantized and the target data bit width corresponding to the 100th iteration, and may quantize the 100th iteration, the 101st iteration and the 102nd iteration with the quantization parameters such as the point location corresponding to the 100th iteration. In this way, the processor does not need to compute the quantization parameters such as the point location in the 101st iteration and the 102nd iteration, thereby decreasing the computation quantity in the quantization process and improving the quantization efficiency.

Optionally, the target iteration interval may compute the number of iterations from the next iteration of the current verify iteration, in other words, the verify iteration corresponding to the target iteration interval may be the ending iteration of the target iteration interval. For example, if the current verify iteration is a 100th iteration, the processor may determine that the target iteration interval is 3 according to the data variation range of the data to be quantized, and the processor may determine that the target iteration interval includes 3 iterations, which are respectively a 101st iteration, a 102nd iteration, and a 103rd iteration. Therefore, the processor may determine the quantization parameters such as the point location corresponding to the 100th iteration according to the data to be quantized and the target data bit width corresponding to the 100th iteration, and may quantize the 101st iteration, the 102nd iteration, and the 103rd iteration with the quantization parameters such as the point location corresponding to the 100th iteration. In this way, the processor does not need to compute the quantization parameters such as the point location in the 102nd iteration and the 103rd iteration, thereby decreasing the computation quantity in the quantization process and improving the quantization efficiency.

In an embodiment of the present disclosure, the data bit width and the quantization parameters corresponding to the respective iterations in one target iteration interval are consistent, in other words, the data bit width, the point location, the scaling factor and the offset corresponding to the respective iterations in one target iteration interval remains unchanged, thereby avoiding, in the process of training or fine-tuning stage of the neural network, adjusting the quantization parameters of the data to be quantized frequently, decreasing the computation quantity in the quantization process and improving the quantization efficiency. In addition, the quantization parameters may be adjusted dynamically according to the data variation range in different stages of the training or fine-tuning to ensure the quantization precision.

In another case, the processor may also determine the quantization parameter of the target iteration interval according to the point location iteration interval corresponding to the quantization parameters such as the point location so as to adjust the quantization parameter of the neural network operation. In other words, the quantization parameters such as the point location of the neural network operation may be updated asynchronously with the data bit width. The processor may update the quantization parameters such as the data bit width and the point location in the verify iteration of the target iteration interval, or may update solely the point location corresponding to the iteration in the target iteration interval according to the point location iteration interval.

Specifically, the processor may determine the data bit width corresponding to the target iteration interval according to the target data bit width corresponding to the current verify iteration, where the data bit width corresponding to the respective iterations in the target iteration interval is consistent. Later, the processor may adjust the quantization parameters such as the point location in the process of the neural network operation according to the data bit width corresponding to the target iteration interval and the point location iteration interval. In other words, as shown in FIG. 3-17, after determining the data bit width corresponding to the target iteration interval, the processor may perform a step S640: adjusting the point location corresponding to the iteration of the target iteration interval according to the obtained point location iteration interval and the data bit width corresponding to the target iteration interval so as to adjust the point location of the neural network operation. The point location iteration interval may include at least one iteration, and the point locations of the respective iterations in the point location iteration interval are consistent. Optionally, the point location iteration interval may be a hyperparameter, for example, the point location iteration interval may be user-defined input.

Optionally, the point location iteration interval may be less than or equal to a target iteration interval. When the point location iteration interval is equal to the target iteration interval, the processor may update the quantization parameters such as the data bit width and the point location in the current verify iteration synchronously. Further optionally, the scaling factors corresponding to the respective iterations in the target iteration interval may be consistent. Furthermore, the offsets corresponding to the respective iterations in the target iteration interval are consistent. At this time, the quantization parameters such as the data bit width and the point location corresponding to the respective iterations in the target iteration interval are the same, thereby decreasing the computation quantity and improving the quantization efficiency and computation efficiency. The specific implementation process is basically the same as the foregoing embodiments, which may refer to the description above and will not be repeated here.

When the point location iteration interval is less than the target iteration interval, the processor may update the quantization parameters such as the data bit width and the point location in the verify iteration corresponding to the target iteration interval, and update the quantization parameters such as the point location in a sub verify iteration determined by the point location iteration interval. Since in the case that the data bit width remains unchanged, the quantization parameters such as the point location may be fine-tuned according to the data to be quantized, the quantization parameters such as the point location may be adjusted in one target iteration interval to further improve the quantization precision.

Specifically, the processor may determine a sub verify iteration according to the current verify iteration and the point location iteration interval. The sub verify iteration is used to adjust the point location, and the sub verify iteration may be an iteration of the target iteration interval. Further, the processor may adjust the point location corresponding to the iteration of the target iteration interval according to the data to be quantized of the sub verify iteration and the data bit width corresponding to the target iteration interval, where the determination method of the point location may refer to the formula (2) or the formula (14), which will not be repeater here.

For example, if the current verify iteration is a 100th iteration, the target iteration interval is 6, the iterations included in the target iteration interval are the 100th iteration to the 105th iteration, and the point location iteration interval obtained by the processor $I_{s1}=3$, the point location may be adjusted every three iterations starting from the current verify iteration. Specifically, the processor may determine the 100th iteration as the sub verify iteration, and compute the point location s1 corresponding to the 100th iteration, then share the point location s1 for the quantization in the 100th iteration, the 101st iteration and the 102nd iteration. Later, the processor may determine the 103rd iteration as the sub verify iteration according to the point location iteration interval $I_{s1}$, and at the same time, the processor may determine a point location s2 corresponding to the second point location iteration interval according to the data to be quantized corresponding to the 103rd iteration and the data bit width n corresponding to the target iteration interval, then share the point location s2 for the quantization in the 103rd iteration to the 105th iteration. In an embodiment of the present disclosure, the value of the point location s1 before updating and the value of the updated point location s2 may be the same or different. Further, the processor may determine the next target iteration interval and the quantization parameters such as the data bit width and the point location corresponding to the next target iteration interval according to the data variation range of the data to be quantized in the 106th iteration.

For another example, if the current verify iteration is a 100th iteration, the target iteration interval is 6, the iterations included in the target iteration interval are the 100th iteration to the 106th iteration, and the point location iteration interval obtained by the processor $I_{s1}=3$, the point location may be adjusted every three iterations starting from the current verify iteration. Specifically, the processor may determine the point location s1 corresponding to the first point location iteration interval according to the data to be quantized of the current verify iteration and the target data bit width n1 corresponding to the current verify iteration, and share the point location s1 for the quantization in the 101st iteration, the 102nd iteration and the 103rd iteration. Later, the processor may determine the 104th iteration as the sub verify iteration according to the point location iteration interval $I_{s1}$, and at the same time, the processor may determine a point location s2 corresponding to the second point location iteration interval according to the data to be quantized corresponding to the 104th iteration and the data bit width n1 corresponding to the target iteration interval, then share the point location s2 for the quantization in the 104th iteration to the 106th iteration. In an embodiment of the present disclosure, the value of the point location s1 before updating and the value of the updated point location s2 may be the same or different. Further, the processor may determine the next target iteration interval and the quantization parameters such as the data bit width and the point location corresponding to the next target iteration interval according to the data variation range of the data to be quantized in the 106th iteration.

Optionally, the point location iteration interval may be 1, in other words, the point location may be updated once in each iteration. Optionally, the point location iteration interval may be the same or different. For example, the at least one point location iteration interval included in the target iteration interval may be increased in sequence. The implementation method of the embodiment is illustrated here, which is not used to limiting present disclosure.

Optionally, the scaling factors corresponding to the respective iterations in the target iteration interval may be inconsistent. Further optionally, the offset may be updated synchronously with the point location, in other words, the iteration interval corresponding to the scaling factor may be equal to the point location iteration interval. In other words, every time the processor updates and determines the point location, the scaling factor will be updated and determined correspondingly.

Optionally, the offsets corresponding to the respective iterations in the target iteration interval may be inconsistent. Further, the offset may be updated synchronously with the point location, in other words, the iteration interval corresponding to the offset may be equal to the point location iteration interval. In other words, every time the processor updates and determines the point location, the offset will be updated and determined correspondingly. Of course, the offset may be updated asynchronously with the point location or data bit width, which is not specifically limited herein. Further, the processor may also determine the minimum value and the maximum value among all elements of the data to be quantized, and further determine the quantization parameters such as the point location, the scaling factor and the like. See details in descriptions above.

In other optional embodiments, the point location, the scaling factor and the offset may be asynchronous, in other words, one or three of the point location iteration interval, the scaling factor iteration interval and the offset iteration interval may be different, where the point location iteration interval and the offset iteration interval are both greater than or equal to the target iteration interval. The offset iteration interval can be smaller than the target iteration interval. Since the offset is only correlated with the distribution of the data to be quantized, in a possible implementation, the offset may be completely asynchronous with the target iteration interval, in other words, the offset iteration interval may also be greater than the target iteration interval.

In an optional embodiment, the method may be used in the training or fine-tuning process of the neural network to implement the adjustment for the quantization parameter of the computation data involved in the fine-tuning or training process of the neural network, thereby improving the quantization precision and efficiency of the computation data involved in the process of neural network operation. The computation data may be at least one of neuron data, weight data, and gradient data. As shown in FIG. 3-5, it can be seen from the data variation curve of the data to be quantized that in an initial stage of the training or fine tuning of the neural network, since the difference between the data to be quantized in the respective iterations is greater, the data variation of the data to be quantized is relatively severe. At this time, the value of the target iteration interval may be small so that the quantization parameter of the target iteration interval may be updated in time to guarantee the quantization precision. In the middle stage of the training or fine tuning, the data variation of the data to be quantized gradually tends to be gentle. At this time, the value of the target iteration interval may be increased so as to avoid the quantization parameter being updated frequently and improve the quantization efficiency and computation efficiency. In the late stage of the training or fine tuning, the training or fine tuning of the neural network tends to be stable (in other words, when the forward computation result of the neural network is close to the preset reference value, the training or fine tuning of the neural network tends to be stable). At this time, the value of the target iteration interval may be increased continuously to further improve the quantization efficiency and computation efficiency. Based on the data variation trend, different ways may be used in different stages of the training or fine tuning of the neural network to determine the target iteration interval to improve the quantization efficiency and computation efficiency while ensuring the quantization precision.

Specifically, as shown in FIG. 3-18, when the method is used in the process of training or fine tuning of the neural network, the method further includes:

a step S710: determining, by the processor, whether a current iteration is greater than a first preset iteration;

where the current iteration refers to an iteration operation currently performed. Optionally, the first preset iteration may be a hyperparameter, which may be determined according to the data variation curve of the data to be quantized or be customized by a user. Optionally, the first preset iteration may be less than a total of the iterations included in a training epoch, where a training epoch denoted that all the data to be quantized in a dataset performs a forward computation and a reverse operation.

When the current iteration is less than or equal to the first preset iteration, the processor may perform a step S711: determining the first preset iteration interval as the target iteration interval and adjusting the quantization parameter according to the first preset iteration interval.

Optionally, the processor may read the first preset iteration input by a user, and determine the first preset iteration interval according to the correspondence between the first preset iteration and the first preset iteration interval. Optionally, the first preset iteration interval may be a hyperparameter or may be customized by a user. At this time, the processor may read directly the first preset iteration and the first preset iteration interval input by a user, and update the quantization parameter of the neural network operation according to the first preset iteration interval. In an embodiment of the present disclosure, the processor does not need to determine the target iteration interval according to the data variation range of the data to be quantized.

For example, if the first preset iteration input by a user is a 100th iteration and the first preset iteration interval is 5, the quantization parameter may be updated according to the first preset iteration interval when the current iteration is less than or equal to the 100th iteration. In other words, the processor may determine that in the 1st iteration to the 100th iteration of the training or fine tuning of the neural network, the quantization parameter may be updated every other 5 iterations. Specifically, the processor may determine the quantization parameters corresponding to the 1st iteration such as the data bit width n1 and the point location s1, and quantize the data to be quantized in the 1st iteration to the 5th iteration with the data bit width n1 and the point location s1, in other words, a same quantization parameter may be used in the 1st iteration to the 5th iteration. Later, the processor may determine the quantization parameters corresponding to the 6th iteration such as the data bit width n2 and the point location s2, and quantize the data to be quantized in the 6th iteration to the 10th iteration with the data bit width n2 and the point location s2, in other words, a same quantization parameter may be used in the 6th iteration to the 10th iteration. Similarly, the processor may complete the quantization in the 100th iteration according to the above-mentioned quantization method. The determination method of the quantization parameters such as the data bit width and the point location in each iteration interval may refer to the description above, which will not be repeated here.

For another example, if the first preset iteration input by a user is a 100th iteration and the first preset iteration interval is 1, the quantization parameter may be updated according to the first preset iteration interval when the current iteration is less than or equal to the 100th iteration. In other words, the processor may determine that in the 1st iteration to the 100th iteration of the training or fine tuning of the neural network, the quantization parameter may be updated every other iteration. Specifically, the processor may determine the quantization parameters corresponding to the 1st iteration such as the data bit width n1 and the point location s1, and quantize the data to be quantized in the 1st iteration with the data bit width n1 and the point location s1. Later, the processor may determine the quantization parameters corresponding to the 2nd iteration such as the data bit width n2 and the point location s2, and quantize the data to be quantized in the 2nd iteration with the data bit width n2 and the point location s2 . . . . Similarly, the processor may determine the quantization parameters corresponding to the 100th iteration such as the data bit width n100 and the point location $100, and quantize the data to be quantized in the 100th iteration with the data bit width n100 and the point location s100. The determination method of the quantization parameters such as the data bit width and the point location in each iteration interval may refer to the description above, which will not be repeated here.

The above just illustrates the method which the data bit width and the quantization parameter are updated synchronously. In another optional embodiment, in each target iteration interval, the processor may determine the point location iteration interval according to the variation range of the point location, and update the quantization parameters such as point location according to the point location iteration interval.

Optionally, when the current iteration is greater than the first preset iteration, it indicates that the training or fine tuning of the neural network is in the middle stage, and at this time, the data variation range of the data to be quantized of the historical iterations may be obtained, and the target iteration interval may be determined according to the data variation range of the data to be quantized, where the target iteration interval may be greater than the first preset iteration interval to decrease the updating count of the quantization parameter and improve the quantization efficiency and computation efficiency. Specifically, when the current iteration is greater than the first preset iteration, the processor may perform the step S713: determining the target iteration interval according to the data variation range of the data to be quantized, and adjusting the quantization parameter according to the target iteration interval.

Following the example above, if the first preset iteration input by a user is a 100th iteration and the first preset iteration interval is 1, the quantization parameter may be updated according to the first preset iteration interval when the current iteration is less than or equal to the 100th iteration. In other words, the processor may determine that in the 1st iteration to the 100th iteration of the training or fine tuning of the neural network, the quantization parameter may be updated every other iteration. The specific implementation may refer to the description above. When the current iteration is greater than the 100th iteration, the processor may determine the data variation range of the data to be quantized according to the data to be quantized of the current iteration and the data to be quantized of the historical iterations before the current iteration, and determine the target iteration interval according to the data variation range of the data to be quantized. Specifically, when the current iteration is greater than the 100th iteration, the processor may adjust adaptively the data bit width corresponding to the current iteration to obtain the target data bit width corresponding to the current iteration, and determine the target data bit width corresponding to the current iteration as the data bit width of the target iteration interval, where the data bit width corresponding to the iterations in the target iteration interval is consistent. At the same time, the processor may determine the point location corresponding to the current iteration according to the target data bit width corresponding to the current iteration and the data to be quantized, and determine the first error according to the point location corresponding to the current iteration. The processor may determine a quantization error according to the data to be quantized corresponding to the current iteration, and determine a second error according to the quantization error. Then the processor may determine a target iteration interval according to the first error and the second error, where the target iteration interval may be greater than the first preset iteration interval. Further, the processor may determine the quantization parameters such as the point location and the scaling factor of the target iteration interval. The specific implementation method may refer to the description above.

For example, if the current verify iteration is a 100th iteration, the processor may determine that the target iteration interval is 3 according to the data variation range of the data to be quantized, and the processor may determine that the target iteration interval includes 3 iterations, which are respectively the 100th iteration, a 101st iteration, and a 102nd iteration. The processor may also determine the quantization parameter according to the data to be quantized of the 100th iteration, determine the second error and the target data bit width corresponding to the 100th iteration according to the quantization error, and then determine the data bit width as the data bit width corresponding to the target iteration interval, where the data bit width corresponding to the 100th iteration, the 101st iteration and the 102nd iteration is the target data bit width corresponding to the 100th iteration. The processor may also determine the quantization parameters such as the point location and the scaling factor corresponding to the 100th iteration according to data to be quantized of the 100th iteration and the target data bit width corresponding to the 100th iteration. Then the 100th iteration, the 101st iteration and the 102nd iteration may be quantized with the quantization parameters corresponding to the 100th iteration.

Further, as shown in FIG. 3-19, the method further includes:

when the current iteration is greater than the first preset iteration, performing, by the processor, a step S712, in other words, the processor may further determine whether the current iteration is greater than a second preset iteration, where the second preset iteration is greater than the first preset iteration, and the second preset iteration interval is greater than the first preset iteration interval. Optionally, the second preset iteration may be a hyperparameter and may be greater than the total of the iterations of at least one training epoch. Optionally, the second preset iteration may be determined according to the data variation curve of the data to be quantized. Optionally, the second preset iteration may also be customized by a user.

When the current iteration is greater than or equal to the second preset iteration, the processor may perform a step S714: determining the second preset iteration interval as the target iteration interval and adjusting the quantization parameter in the quantization process of the neural network according to the second preset iteration interval. When the current iteration is greater than the first preset iteration and is less than the second preset iteration, the processor can perform the step S713, in other words, determining the target iteration interval according to the data variation range of the data to be quantized, and adjust the quantization parameter according to the target iteration interval.

Optionally, the processor may read the second preset iteration input by a user, and determine the second preset iteration interval according to the correspondence between the second preset iteration and the second preset iteration interval, where the second preset iteration interval is greater than the first preset iteration interval. Optionally, when the convergence of the neural network meets the preset conditions, it can be determined that the current iteration is greater than or equal to the second preset iteration. For example, when the forward computation result of the current iteration is close to the preset reference value, it can be determined that the convergence of the neural network meets the preset conditions and at this time the current iteration is greater than or equal to the second preset iteration. Or when a loss value corresponding to the current iteration is less than or equal to the preset threshold, it can be determined that the convergence of the neural network meets the preset conditions.

Optionally, the second preset iteration interval may be a hyperparameter and may be greater than or equal to the total of the iterations of at least one training epoch. Optionally, the second preset iteration interval may also be customized by a user. The processor may read directly the second preset iteration and the second preset iteration interval input by a user, and update the quantization parameter of the neural network operation according to the second preset iteration interval. For example, the second preset iteration interval can be equal to the total of the iterations of one training epoch, in other words, the quantization parameter may be updated once in each training epoch.

Further, the method above may also include:

when the current iteration is greater than or equal to the second preset iteration, determining, by the processor in each verify iteration, whether the current data bit width needs to be adjusted. If the current data bit width needs to be adjusted, the processor may switch from the step S714 to the step S713 to re-determine the data bit width, so that the data bit width can meet the requirements of the data to be quantized.

Specifically, the processor may determine whether the data bit width needs to be adjusted according to the second error. The processor may also perform the step S715 to determine whether the second error is greater than the preset error value. When the current iteration is greater than or equal to the second preset iteration and the second error is greater than the preset error value, the step S713 may be performed, in other words, the iteration interval may be determined according to the data variation range of the data to be quantized so as to re-determine the data bit width according to the iteration interval. When the current iteration is greater than or equal to the second preset iteration and the second error is less than or equal to the preset error value, the step S714 may be performed continuously, in other words, the second preset iteration interval may be determined as the target iteration interval and the quantization parameters in the quantization process of the neural network may be adjusted according to the second preset iteration interval. The preset error value may be determined according to the preset threshold corresponding to the quantization error. When the second error is greater than the preset error value, it indicates that the data bit width needs to be further adjusted. The processor may determine the iteration interval according to the data variation range of the data to be quantized so that the data bit width may be re-determined according to the iteration interval.

For example, the second preset iteration interval can be a total of the iterations of one training epoch. When the current iteration is greater than or equal to the second preset iteration, the processor may update the quantization parameter according to the second preset iteration interval, in other words, the processor may update the quantization parameter once in each training epoch. At this time, a starting iteration of each training epoch may be a verify iteration, where the processor may determine the quantization error according to the data to be quantized of the verify iteration, determine the second error according to the quantization error, and determine whether the second error is greater than the preset error value according to the following formula:

$$\text{diff}_{update2}=0*\text{diff}_{bit2}>T$$

$\text{diff}_{update2}$ denotes the second error, $\text{diff}_{bit}$ denotes the quantization error, θ denotes a hyperparameter, and T denotes the preset error value. Optionally, the preset error value may be equal to the first preset threshold divided by the hyperparameter. Of course, the preset error value may be a hyperparameter. For example, the preset error value may be computed according to the following formula: T=th/10, where th denotes the first preset threshold, and the value of the hyperparameter is 10.

If the second errordiff$_{update2}$ is greater than the preset error value T, it indicates that the data bit width may not meet the preset requirements. At this time, the quantization parameter may not be updated with the second preset iteration interval, and the processor may determine the target iteration interval according to the data variation range of the data to be quantized to ensure that the data bit width can meet the preset requirements. In other words, when the second error-diff$_{update2}$ is greater than the preset error value T, the processor may switch form the step S714 to the step S713.

Of course, in another embodiment, the processor may determine whether the data bit width needs to be adjusted according to the quantization error. For example, the second preset iteration interval can be a total of the iterations of one training epoch. When the current iteration is greater than or equal to the second preset iteration, the processor may update the quantization parameter according to the second preset iteration interval, in other words, the processor may update the quantization parameter once in each training epoch. The starting iteration of each training epoch may be a verify iteration. In the starting iteration of each training epoch, the processor may determine the quantization error according to the data to be quantized of the verify iteration. When the quantization error is greater than or equal to the first preset threshold, it indicates that the data bit width may not meet the preset requirements, in other words, the processor may switch form the step S714 to the step S713.

In an optional embodiment, the quantization parameters such as the point location, the scaling factor and the offset may be displayed with a display device. At this time, a user may obtain the quantization parameters in the process of the neural network operation through the display device, and a user can modify adaptively the quantization parameters determined by the processor. Similarly, the data bit width, the target iteration interval and the like may also be displayed through the display device. At this time, a user may obtain the parameters such as the target iteration interval and the data bit width in the process of the neural network operation through the display device, and a user can modify adaptively the parameters such as the target iteration interval and the data bit width determined by the processor.

It should be noted that, the foregoing embodiments of method, for the sake of conciseness, are all described as a series of action combinations, but those skilled in the art should know that since according to the present disclosure, the steps may be performed in a different order or simultaneously, the disclosure is not limited by the described order of action. Secondly, those skilled in the art should also understand that the examples described in the specification are all optional, and the actions and units involved are not necessarily required for this disclosure.

An embodiment of the present disclosure also provides a quantization parameter adjustment device 200 for the neural network, which may be set in a processor. For example, the quantization parameter adjustment device 200 may be set in a general-purpose processor or an artificial intelligence processor. As shown in FIG. 3-20, the device 200 may include:

- an obtaining unit 210 configured to obtaining a data variation range of data to be quantized;
- an iteration interval determination unit 220 configured to determine a target iteration interval according to the data variation range of the data to be quantized so as to adjust a quantization parameter in the neural network operation according to the target iteration interval, where the target iteration interval includes at least one iteration, and the quantization parameter of the neural network is configured to implement quantization of the data to be quantized in the neural network operation.

Optionally, the quantization parameters include a point location, where the point location refers to the location of the decimal point of the quantized data corresponding to the data to be quantized. As shown in FIG. 3-21, the device may further include:

- a quantization parameter determination unit 230 configured to determine the point location corresponding to the iteration of the target iteration interval according to the target data bit width corresponding to the current verify iteration and the data to be quantized of the current verify iteration so as to the adjust the point location in the neural network operation;

The point locations corresponding to the respective iterations in the target iteration interval are consistent.

Optionally, the quantization parameters include a point location, where the point location refers to the location of the decimal point of the quantized data corresponding to the data to be quantized. As shown in FIG. 3-23 or FIG. 3-24, the device may further include:

- a data bit width determination unit 240 configured to determine the data bit width corresponding to the target iteration interval according to the target data bit width corresponding to the current verify iteration, where the data bit width corresponding to the respective iterations in the target iteration interval is consistent;

a quantization parameters determination unit 230 configured to adjust the point location corresponding to the iteration of the target iteration interval according to the obtained point location iteration interval and the data bit width corresponding to the target iteration interval, to adjust the point location of the neural network operation;

where the point location iteration interval may include at least one iteration, and the point locations of the respective iterations in the point location iteration interval are consistent.

Optionally, the point location iteration interval may be less than or equal to a target iteration interval.

Optionally, the quantization parameters may include a scaling factor, and the scaling factor and the point location are updated synchronously.

Optionally, the quantization parameters may include an offset, and the offset and the point location are updated synchronously.

Optionally, as shown in FIG. 3-24, the data bit width determination unit 240 includes:

a quantization error determination unit 241 configured to determine a quantization error according to the data to be quantized of the current verify iteration and the quantized data of the current verify iteration, where the quantized data of the current verify iteration is obtained by quantizing the data to be quantized of the current verify iteration;

a data bit width determination unit 242 configured to determine the target data bit width corresponding to the current verify iteration according to the quantization error.

Optionally, the data bit width determination unit 242 configured to determine the target data bit width corresponding to the current verify iteration according to the quantization error, is specifically configured to:

when the quantization error is greater than or equal to the first preset threshold, increase the data bit width corresponding to the current verify iteration to obtain the target data bit width corresponding to the current verify iteration; or, when the quantization error is less than or equal to the second preset threshold, decrease the data bit width corresponding to the current verify iteration to obtain the target data bit width of the current verify iteration.

Optionally, the data bit width determination unit 242 configured to, when the quantization error is greater than or equal to the first preset threshold, increase the data bit width corresponding to the current verify iteration to obtain the target data bit width corresponding to the current verify iteration, is specifically configured to:

when the quantization error is greater than or equal to the first preset threshold, determine a first intermediate data bit width according to a first preset bit width stride;

return to determine the quantization error according to the data to be quantized of the current verify iteration and the quantized data of the current verify iteration until the quantization error is less than the first preset threshold, where the quantized data of the current verify iteration is obtained by quantizing the data to be quantized of the current verify iteration according to the first intermediate data bit width.

Optionally, the data bit width determination unit 242 configured to, when the quantization error is less than or equal to the second preset threshold, decrease the data bit width corresponding to the current verify iteration to obtain the target data bit width of the current verify iteration, is specifically configured to:

when the quantization error is less than or equal to the second preset threshold, determine a second intermediate data bit width according to a second preset bit width stride;

return to determine the quantization error according to the data to be quantized of the current verify iteration and the quantized data of the current verify iteration until the quantization error is greater than the second preset threshold, where the quantized data of the current verify iteration is obtained by quantizing the data to be quantized of the current verify iteration according to the second intermediate data bit width.

Optionally, the obtaining unit 210 may include:

a first obtaining unit 211 configured to obtain a variation range of the point location, where the variation range of the point location can be used to indicate the data variation range of the data to be quantized, and the variation range of the point location is positively correlated with the data variation range of the data to be quantized.

Optionally, as shown in FIG. 3-23 or FIG. 3-24, the first obtaining unit 211 includes:

a first mean value determination unit 2110 configured to determine a first mean value according to a point location corresponding to a previous verify iteration before the current verify iteration, and point locations of the historical iterations before the previous verify iteration, where the previous verify iteration refers to the verify iteration corresponding to the previous iteration interval before the target iteration interval;

a second mean value determination unit 2111 configured to determine a second mean value according to a point location corresponding to current verify iteration and the point locations of the historical verify iterations before current verify iteration, where the point location corresponding to the current verify iteration is determined according to the target data bit width corresponding to the current verify iteration and the data to be quantized;

a first error determination unit 2112 configured to determine a first error according to the first mean value and the second mean value, where the first error is used to indicate the variation range of the point location.

Optionally, the second mean value determination unit 2111 is specifically configured to:

obtain a preset number of intermediate moving mean values, where each intermediate moving mean value is determined according to the preset number of verify iterations before the current verify;

determine the second mean value according the point location of current verify iteration and the preset number of intermediate moving mean values.

Optionally, the second mean value determination unit 2111 is specifically configured to determine the second mean value according the point location corresponding to the current verify iteration and the first mean value.

Optionally, the second mean value determination unit 2111 is also configured to update the second mean value according to the obtained data bit width adjustment value of the current verify iteration, where the data bit width adjustment value of the current verify iteration is determined according to the target data bit width of the current verify iteration and the initial data bit width.

Optionally, the second mean value determination unit 2111 configured to update the second mean value according to the obtained data bit width adjustment value of the current verify iteration, is specifically configured to:

when the data bit width adjustment value of the current verify iteration is greater than the preset parameter, decrease the second mean value according to the data bit width adjustment value of the current verify iteration; and when the data bit width adjustment value of the current verify iteration is less than the preset parameter, increase the second mean value according to the data bit width adjustment value of the current verify iteration.

Optionally, the iteration interval determination unit 220 is configured to determine the target iteration interval according to the first error, where the target iteration interval is negatively correlated with the first error.

Optionally, the obtaining unit 210 may further include:

a second obtaining unit 212 configured to obtain a variation range of the data bit width and to determine the data variation range of the data to be quantized according to the variation range of the point location and the variation range of the data bit width.

Optionally, the iteration interval determination unit 220 is configured to determine the target iteration interval according to the first error and the second error, where the first error is used to indicate the variation range of the point location, and the second error is used to indicate the variation range of the data bit width.

Optionally, the iteration interval determination unit 220 configured to determine the target iteration interval according to the first error and the second error, is specifically configured to:

determine a maximum value of the first error and the second error as the target error;

determine the target iteration interval according to the target error, where the target error is negatively correlated with the target iteration interval.

Optionally, the second error is determined according to the quantization error, where the quantization error is determined according to the data to be quantized of the current verify iteration and the quantized data of the current verify iteration, and the second error is positively correlated with the quantization error.

Optionally, the device is configured to implement the training or fine tuning of the neural network; and the iteration interval determination unit 220 is also configured to:

when the current iteration is greater than the first preset iteration, determine the target iteration interval according to the data variation range of the data to be quantized, and adjust the quantization parameter according to the target iteration interval.

Optionally, the iteration interval determination unit 220 is also configured to: when the current iteration is less than or equal to the first preset iteration, determine the first preset iteration interval as the target iteration interval and adjust the quantization parameter according to the first preset iteration interval.

Optionally, the iteration interval determination unit 220 is also configured to:

when the current iteration is greater than or equal to the second preset iteration, determine the second preset iteration interval as the target iteration interval and adjust the quantization parameter according to the second preset iteration interval;

when the convergence of the neural network meets the preset conditions, it can be determined that the current iteration is greater than or equal to the second preset iteration;

The second preset iteration is greater than the first preset iteration, and the second preset iteration interval is greater than the first preset iteration interval.

Optionally, the iteration interval determination unit 220 is also configured to: when the current iteration is greater than or equal to the second preset iteration and the second error is greater than the preset error value, determine the iteration interval according to the data variation range of the data to be quantized so as to re-determine the data bit width according to the iteration interval.

To be specific, the operating principles of the respective units or units in an embodiment of the present is basically the same as the implementation process in the steps of the methods above, which may refer to the description above and will not be repeated here. It should be understood that the foregoing device embodiments are only illustrative, and the device of the present disclosure may also be implemented in other ways. For example, the division of the units/units in the foregoing embodiment is only a logical function division, and there may be other division methods in actual implementation. For example, a plurality of units, units, or components may be combined or integrated into another system, or some features may be omitted or not implemented. The above-mentioned integrated units/units can be implemented in the form of hardware or in the form of software program units. When the above-mentioned integrated units/units are implemented in the form of hardware, the hardware may be a digital circuit, an analog circuit, and the like. Physical implementation of the hardware structure may include, but is not limited to, a transistor, a memristor, and the like.

If the integrated units/units are implemented in the form of software program units and sold or used as an independent product, the product can be stored in a computer-readable memory. Based on such understanding, the essence of the technical solutions of the present disclosure, or a part of the present disclosure that contributes to the prior art, or all or part of technical solutions, can all or partly embodied in the form of a software product that is stored in a memory. The software product includes several instructions to enable a computer device (which may be a personal computer, a server, or a network device, etc.) to perform all or part of the steps of the methods described in the embodiments of the present disclosure. The foregoing memory includes: a USB flash drive, a read-only memory (ROM), a random access memory (RAM), a mobile hard disk, a magnetic disk, or an optical disc, and other media that can store program codes.

In an embodiment, the present disclosure provides a computer readable storage medium.

A computer program may be stored in the storage medium. The computer program may implement the steps of any of the methods above when the computer program is executed by a processor or a device. Specifically, the steps below may be implemented when the computer program is performed by the processor or the device:

obtaining a data variation range of data to be quantized; and according to the variation range of the data to be quantized, determining a target iteration interval so as to adjust a quantization parameter in the neural network operation according to the target iteration interval, where the target iteration interval includes at least one iteration, and the quantization parameter of the neural network is configured to implement quantization of the data to be quantized in the neural network operation.

To be specific, the implementation of the respective operations in an embodiment of the present is basically the same as the implementation process in the steps of the methods above, which may refer to the description above and will not be repeated here.

In the examples above, the description of each embodiment has its own emphasis. For a part that is not described in detail in one embodiment, reference may be made to related descriptions in other embodiments. Each technical features of the embodiments above can be randomly combined. For conciseness, not all possible combinations of the technical features of the embodiments above are described. Yet, provided that there is no contradiction, combinations of these technical features fall within the scope of the description of the present specification.

A possible implementation provides an artificial intelligence chip including the above-mentioned quantization parameter adjustment device.

A possible implementation provides a board card including a storage component, an interface apparatus, a control component, and the above-mentioned artificial intelligence chip. The artificial intelligence chip is connected to the storage component, the control component, and the interface apparatus, respectively; the storage component is configured to store data; the interface apparatus is configured to implement data transfer between the artificial intelligence chip and an external device; and the control component is configured to monitor a state of the artificial intelligence chip.

FIG. 3-25 is a structural block diagram of a board card according to an embodiment of the present disclosure. Referring to FIG. 3-25, in addition to the above-mentioned chip 389, the board card may further include other matching components. The matching components may include, but are not limited to, a storage component 390, an interface apparatus 391, and a control component 392;

The storage component 390 is connected to the artificial intelligence chip through a bus, and is configured to store data. The storage component may include a plurality of groups of storage units 393. Each group of storage units is connected to the artificial intelligence chip through the bus. It can be understood that each group of the storage units may be a DDR SDRAM (Double Data Rate Synchronous Dynamic Random Access Memory).

DDR can double the speed of SDRAM without increasing the clock frequency. DDR allows data to be read on the rising and falling edges of the clock pulse. A speed of DDR is twice that of standard SDRAM. In an embodiment, the memory device may include 4 groups of storage units. Each group of storage units may include a plurality of DDR4 particles (chips). In an embodiment, four 72-bit DDR4 controllers may be arranged inside the artificial intelligence chip, where 64 bit of each 72-bit DDR4 controller is for data transfer and 8 bit is for ECC parity. It can be understood that when each group of the storage units adopts DDR4-3200 particles, theoretical bandwidth of data transfer may reach 25600 MB/s.

In an embodiment, each group of the storage units may include a plurality of DDR SDRAMs arranged in parallel. DDR can transfer data twice per clock cycle. A DDR controller may be arranged inside the chip for controlling the data transfer and data storage of each storage unit.

The interface apparatus may be electrically connected to the artificial intelligence chip. The interface apparatus is configured to realize data transfer between the artificial intelligence chip and an external device (such as a server or a computer). In an embodiment, the interface apparatus may be a standard PCIE interface. For instance, data to be processed may be transferred by a server through the standard PCIE interface to the chip, thereby realizing data transfer. Alternatively, when a PCIE 3.0×16 interface is adopted for transferring, theoretical bandwidth may reach 16000 MB/s. In another embodiment, the interface apparatus may also be other interfaces. A specific representation of the other interfaces is not limited herein, as long as the interface unit can realize a switching function. In addition, a computation result of the artificial intelligence chip may still be transferred by the interface apparatus to an external device (such as a server).

The control component is electrically connected to the artificial intelligence chip. The control component is configured to monitor a state of the artificial intelligence chip. Specifically, the artificial intelligence chip and the control component can be electrically connected through an SPI interface. The control component may include an MCU (Micro Controller Unit). If the artificial intelligence chip includes a plurality of processing chips, a plurality of processing cores, or a plurality of processing circuits, the chip is capable of driving a plurality of loads. In this case, the artificial intelligence chip can be in different working state such as multi-load state and light-load state. The working state of the plurality of processing chips, the plurality of processing cores, and/or a plurality of processing circuits can be regulated and controlled by the control device.

In a possible implementation, an electronic device is provided. The electronic device includes the artificial intelligence chip. The electronic device includes a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device.

The vehicle includes an airplane, a ship, and/or a car; the household electrical appliance may include a television, an air conditioner, a microwave oven, a refrigerator, an electric rice cooker, a humidifier, a washing machine, an electric lamp, a gas cooker, and a range hood; and the medical equipment may include a nuclear magnetic resonance spectrometer, a B-ultrasonic scanner, and/or an electrocardiograph.

The foregoing can be better understood according to the following articles:

C1. A quantization parameter adjustment method of a neural network, and the method includes:

obtaining a data variation range of data to be quantized;

according to the variation range of the data to be quantized, determining a target iteration interval so as to adjust a quantization parameter in the neural network operation according to the target iteration interval, where the target iteration interval includes at least one iteration, and the quantization parameter of the neural network is configured to implement quantization of the data to be quantized in the neural network operation.

C2. The method of article C1, wherein the quantization parameter includes a point location, and the point location refers to the location of the decimal point of the quantized data corresponding to the data to be quantized; the method further includes:

determining the point location corresponding to the iteration of the target iteration interval according to the target data bit width corresponding to the current verify iteration and the data to be quantized of the current verify iteration so as to the adjust the point location in the neural network operation, where the point locations corresponding to the respective iterations in the target iteration interval are consistent.

C3. The method of article C1, wherein the quantization parameter includes a point location, and the point location refers to the location of the decimal point of the quantized data corresponding to the data to be quantized; the method further includes:

determining the data bit width corresponding to the target iteration interval according to the target data bit width corresponding to the current verify iteration, where the data bit width corresponding to the respective iterations in the target iteration interval is consistent;

adjusting the point location corresponding to the iteration of the target iteration interval according to the obtained point location iteration interval and the data bit width corresponding to the target iteration interval, to adjust the point location of the neural network operation, where the point location iteration interval may include at least one iteration, and the point locations of the respective iterations in the point location iteration interval are consistent.

C4. The method of article C2 or C3, the point location iteration interval may be less than or equal to the target iteration interval.

C5. The method of any one of articles C1-C4, the quantization parameters may include a scaling factor, and the scaling factor and the point location are updated synchronously.

C6. The method of any one of articles C1-C5, the quantization parameters may include an offset, and the offset and the point location are updated synchronously.

C7. The method of any one of articles C1-C6, further comprising:

determining a quantization error according to the data to be quantized of the current verify iteration and the quantized data of the current verify iteration, where the quantized data of the current verify iteration is obtained by quantizing the data to be quantized of the current verify iteration;

determining the target data bit width corresponding to the current verify iteration according to the quantization error.

C8. The method of articles C1-C7, wherein determining the target data bit width corresponding to the current verify iteration according to the quantization error, includes:

when the quantization error is greater than or equal to the first preset threshold, increasing the data bit width corresponding to the current verify iteration to obtain the target data bit width corresponding to the current verify iteration; or, when the quantization error is less than or equal to the second preset threshold, decreasing the data bit width corresponding to the current verify iteration to obtain the target data bit width of the current verify iteration.

C9. The method of article C8, wherein, when the quantization error is greater than or equal to the first preset threshold, increasing the data bit width corresponding to the current verify iteration to obtain the target data bit width corresponding to the current verify iteration, includes:

when the quantization error is greater than or equal to the first preset threshold, determining a first intermediate data bit width according to a first preset bit width stride;

returning to determine the quantization error according to the data to be quantized of the current verify iteration and the quantized data of the current verify iteration until the quantization error is less than the first preset threshold, where the quantized data of the current verify iteration is obtained by quantizing the data to be quantized of the current verify iteration according to the first intermediate data bit width.

C10. The method of articles C8, wherein determining the target data bit width corresponding to the current verify iteration according to the quantization error, includes:

when the quantization error is less than or equal to the second preset threshold, determining a second intermediate data bit width according to a second preset bit width stride;

returning to determine the quantization error according to the data to be quantized of the current verify iteration and the quantized data of the current verify iteration until the quantization error is greater than the second preset threshold, where the quantized data of the current verify iteration is obtained by quantizing the data to be quantized of the current verify iteration according to the second intermediate data bit width.

C11. The method of any one of articles C1-C10, wherein obtaining the data variation range of the data to be quantized includes:

obtaining a variation range of the point location, where the variation range of the point location can be used to indicate the data variation range of the data to be quantized, and the variation range of the point location is positively correlated with the data variation range of the data to be quantized.

C12. The method of articles C1-C11, wherein obtaining the variation range of the point location, includes:

determining a first mean value according to a point location corresponding to a previous verify iteration before the current verify iteration, and point locations of the historical iterations before the previous verify iteration, where the previous verify iteration refers to the verify iteration corresponding to the previous iteration interval before the target iteration interval;

determining a second mean value according to a point location corresponding to current verify iteration and the point locations of the historical verify iterations before current verify iteration, where the point location corresponding to the current verify iteration is determined according to the target data bit width corresponding to the current verify iteration and the data to be quantized;

determining a first error according to the first mean value and the second mean value, where the first error is used to indicate the variation range of the point location.

C13. The method of article C12, wherein determining a second mean value according to a point location corresponding to current verify iteration and the point locations of the historical verify iterations before current verify iteration, includes:

obtaining a preset number of intermediate moving mean values, where each intermediate moving mean value is determined according to the preset number of verify iterations before the current verify;

determining the second mean value according the point location of current verify iteration and the preset number of intermediate moving mean values.

C14. The method of article C12, wherein determining a second mean value according to a point location corresponding to current verify iteration and the point locations of the historical verify iterations before current verify iteration, includes:

determining the second mean value according the point location of current verify iteration and the preset number of intermediate moving mean values.

C15. The method of article C12, further comprising:

updating the second mean value according to the obtained data bit width adjustment value of the current verify iteration, where the data bit width adjustment value of the current verify iteration is determined according to the target data bit width of the current verify iteration and the initial data bit width.

C16. The method of article C15, wherein determining the data bit width adjustment value of the current verify iteration and updating the second mean value, includes:

when the data bit width adjustment value of the current verify iteration is greater than the preset parameter, decreasing the second mean value according to the data bit width adjustment value of the current verify iteration; and when the data bit width adjustment value of the current verify iteration is less than the preset parameter, increasing the second mean value according to the data bit width adjustment value of the current verify iteration.

C17. The method of article C12, wherein determining the target iteration interval according to the data variation range of the data to be quantized includes, includes:

determining the target iteration interval according to the first error, where the target iteration interval is negatively correlated with the first error.

C18. The method of any one of articles C11-C17, wherein obtaining the data variation range of the data to be quantized includes:

obtaining the variation range of the data bit width; and determining the data variation range of the data to be quantized according to the variation range of the point location and the variation trend of the data bit width.

C19. The method of article C18, wherein determining the target iteration interval according to the data variation range of the data to be quantized includes, includes:

determining the target iteration interval according to the first error and the second error, where the first error is used to indicate the variation range of the point location, and the second error is used to indicate the variation range of the data bit width.

C20, the method of article C19, wherein determining the target iteration interval according to the second error and the first, includes:

determining a maximum value of the first error and the second error as the target error;

determining the target iteration interval according to the target error, where the target error is negatively correlated with the target iteration interval.

C21, the method of article C19 or C20, determining the second error according to the quantization error, where the quantization error is determined according to the data to be quantized of the current verify iteration and the quantized data of the current verify iteration, and the second error is positively correlated with the quantization error.

C22. The method of any one of articles C1-C21, the method is used in the training or fine tuning of the neural network, and the method further includes:

when the current iteration is greater than the first preset iteration, determining the target iteration interval according to the data variation range of the data to be quantized, and adjusting the quantization parameter according to the target iteration interval.

C23. The method of article C22, further comprising:

when the current iteration is less than or equal to the first preset iteration, determining the first preset iteration interval as the target iteration interval and adjusting the quantization parameter according to the first preset iteration interval;

C24. The method of article C22 or C23, further comprising:

when the current iteration is greater than or equal to the second preset iteration, determining the second preset iteration interval as the target iteration interval and adjusting the quantization parameter according to the second preset iteration interval, where the second preset iteration is greater than the first preset iteration, and the second preset iteration interval is greater than the first preset iteration interval.

C25. The method of article C24, further comprising:

when the convergence of the neural network meets the preset conditions, it can be determined that the current iteration is greater than or equal to the second preset iteration.

C26. The method of article C24, further comprising:

when the current iteration is greater than or equal to the second preset iteration and the second error is greater than the preset error value, determining the iteration interval according to the data variation range of the data to be quantized so as to re-determine the data bit width according to the iteration interval.

C27. The method of any one of articles C1-C26, wherein the data to be quantized may be at least one of neuron data, weight data or gradient data.

C28. A quantization parameter adjustment device of a neural network, which includes a memory and a processor. A computer program may be stored in the memory. The steps of the method of any one of articles C1-C27 may be implemented when the processor executes the computer program.

C29. A computer readable storage medium. A computer program may be stored in the computer readable storage medium. The steps of the method of any one of articles C1-C27 may be implemented when the computer program is executed.

C30. A quantization parameter adjustment device of a neural network. The device includes:

an obtaining unit configured to obtaining a data variation range of data to be quantized;

an iteration interval determination unit configured to determine a target iteration interval according to the data variation range of the data to be quantized so as to adjust a quantization parameter in the neural network operation according to the target iteration interval, where the target iteration interval includes at least one iteration, and the quantization parameter of the neural network is configured to implement quantization of the data to be quantized in the neural network operation.

C31. The device of article C30, wherein the quantization parameter includes a point location, and the point location refers to the location of the decimal point of the quantized data corresponding to the data to be quantized; the device further includes:

a quantization parameter determination unit configured to determine the point location corresponding to the iteration of the target iteration interval according to the target data bit width corresponding to the current verify iteration and the data to be quantized of the current verify iteration so as to the adjust the point location in the neural network operation;

where the point locations corresponding to the respective iterations in the target iteration interval are consistent.

C32. The device of article C30, wherein the quantization parameter includes a point location, and the point location refers to the location of the decimal point of the quantized data corresponding to the data to be quantized; the device further includes:

a data bit width determination unit configured to determine the data bit width corresponding to the target iteration interval according to the target data bit width corresponding to the current verify iteration, where the data bit width corresponding to the respective iterations in the target iteration interval is consistent;

a quantization parameters determination unit configured to adjust the point location corresponding to the iteration of the target iteration interval according to the obtained point location iteration interval and the data bit width corresponding to the target iteration interval, to adjust the point location of the neural network operation;

where the point location iteration interval may include at least one iteration, and the point locations of the respective iterations in the point location iteration interval are consistent.

C33. The device of article C32, the point location iteration interval may be less than or equal to the target iteration interval.

C34. The device of any one of articles C31-C33, the quantization parameters may include a scaling factor, and the scaling factor and the point location are updated synchronously.

C35. The device of any one of articles C31-C33, the quantization parameters may include an offset, and the offset and the point location are updated synchronously.

C36. The device of any one of articles C31-C33, the data bit width determination unit includes:

a quantization error determination unit configured to determine a quantization error according to the data to be quantized of the current verify iteration and the quantized data of the current verify iteration, where the quantized data of the current verify iteration is obtained by quantizing the data to be quantized of the current verify iteration;

a data bit width determination unit configured to determine the target data bit width corresponding to the current verify iteration according to the quantization error.

C37. The device of article C36, the data bit width determination unit configured to determine the target data bit width corresponding to the current verify iteration according to the quantization error, is specifically configured to:

when the quantization error is greater than or equal to the first preset threshold, increase the data bit width corresponding to the current verify iteration to obtain the target data bit width corresponding to the current verify iteration; or, when the quantization error is less than or equal to the second preset threshold, decrease the data bit width corresponding to the current verify iteration to obtain the target data bit width of the current verify iteration.

C38 The device of article C37, the data bit width determination unit configured to, when the quantization error is greater than or equal to the first preset threshold, increase the data bit width corresponding to the current verify iteration to obtain the target data bit width corresponding to the current verify iteration, is specifically configured to:

when the quantization error is greater than or equal to the first preset threshold, determine a first intermediate data bit width according to a first preset bit width stride;

return to determine the quantization error according to the data to be quantized of the current verify iteration and the quantized data of the current verify iteration until the quantization error is less than the first preset threshold, where the quantized data of the current verify iteration is obtained by quantizing the data to be quantized of the current verify iteration according to the first intermediate data bit width.

C39. The device of article C37, the data bit width determination unit configured to, when the quantization error is less than or equal to the second preset threshold, decrease the data bit width corresponding to the current verify iteration to obtain the target data bit width corresponding to the current verify iteration, is specifically configured to:

when the quantization error is less than or equal to the second preset threshold, determine a second intermediate data bit width according to a second preset bit width stride;

return to determine the quantization error according to the data to be quantized of the current verify iteration and the quantized data of the current verify iteration until the quantization error is greater than the second preset threshold, where the quantized data of the current verify iteration is obtained by quantizing the data to be quantized of the current verify iteration according to the second intermediate data bit width.

C40. The device of any one of articles C30-C39, the obtaining unit includes:

a first obtaining unit configured to obtain a variation range of the point location, where the variation range of the point location can be used to indicate the data variation range of the data to be quantized, and the variation range of the point location is positively correlated with the data variation range of the data to be quantized.

C41. The method of article C40, the first obtaining unit includes:

a first mean value determination unit configured to determine a first mean value according to a point location corresponding to a previous verify iteration before the current verify iteration, and point locations of the historical iterations before the previous verify iteration, where the previous verify iteration refers to the verify iteration corresponding to the previous iteration interval before the target iteration interval;

a second mean value determination unit configured to determine a second mean value according to a point location corresponding to current verify iteration and the point locations of the historical verify iterations before current verify iteration, where the point location corresponding to the current verify iteration is determined according to the target data bit width corresponding to the current verify iteration and the data to be quantized;

a first error determination unit configured to determine a first error according to the first mean value and the second mean value, where the first error is used to indicate the variation range of the point location.

C42. The device of article C41, the second mean value determination unit is specifically configured to:

obtain a preset number of intermediate moving mean values, where each intermediate moving mean value is determined according to the preset number of verify iterations before the current verify;

determine the second mean value according the point location of current verify iteration and the preset number of intermediate moving mean values.

C43. The device of article C41, the second mean value determination unit is specifically configured to determine the second mean value according the point location corresponding to the current verify iteration and the first mean value.

C44. The device of article C41, the second mean value determination unit is also configured to update the second mean value according to the obtained data bit width adjustment value of the current verify iteration, where the data bit width adjustment value of the current verify iteration is determined according to the target data bit width of the current verify iteration and the initial data bit width.

C45. The device of article C44, wherein the second mean value determination unit 2111 is configured to update the second mean value according to the obtained data bit width adjustment value of the current verify iteration, and the second mean value determination unit 2111 is specifically configured to:

when the data bit width adjustment value of the current verify iteration is greater than the preset parameter, decrease the second mean value according to the data bit width adjustment value of the current verify iteration; and when the data bit width adjustment value of the current verify iteration is less than the preset parameter, increase the second mean value according to the data bit width adjustment value of the current verify iteration.

C46. The device of article C41, the iteration interval determination unit is configured to determine the target iteration interval according to the first error, where the target iteration interval is negatively correlated with the first error.

C47. The device of article C40, the obtaining unit further includes:

a second obtaining unit configured to obtain a variation range of the data bit width and to determine the data variation range of the data to be quantized according to the variation range of the point location and the variation range of the data bit width.

C48. The device of article C47, the iteration interval determination unit is configured to determine the target iteration interval according to the first error and the second error, where the first error is used to indicate the variation range of the point location, and the second error is used to indicate the variation range of the data bit width.

C49. The device of article C48, the iteration interval determination unit configured to determine the target iteration interval according to the first error and the second error, is specifically configured to:

determine a maximum value of the first error and the second error as the target error;

determine the target iteration interval according to the target error, where the target error is negatively correlated with the target iteration interval.

C50, the device of article C48 or C49, the second error is determined according to the quantization error, where the quantization error is determined according to the data to be quantized of the current verify iteration and the quantized data of the current verify iteration, and the second error is positively correlated with the quantization error.

C51. The device of any one of articles C30-C50, the device is configured to implement the training or fine tuning of the neural network; and the iteration interval determination unit is also configured to:

when the current iteration is greater than the first preset iteration, determining the target iteration interval according to the data variation range of the data to be quantized, and adjusting the quantization parameter according to the target iteration interval.

C52. The device of article C51, the iteration interval determination unit is also configured to: when the current iteration is less than or equal to the first preset iteration, determine the first preset iteration interval as the target iteration interval and adjust the quantization parameter according to the first preset iteration interval.

C51. The device of articles C51 or C52, the iteration interval determination unit is also configured to:

when the current iteration is greater than or equal to the second preset iteration, determining the second preset iteration interval as the target iteration interval and adjusting the quantization parameter according to the second preset iteration interval, when the convergence of the neural network meets the preset conditions, it can be determined that the current iteration is greater than or equal to the second preset iteration;

The second preset iteration is greater than the first preset iteration, and the second preset iteration interval is greater than the first preset iteration interval.

C54. The device of article C53, the iteration interval determination unit is also configured to: when the current iteration is greater than or equal to the second preset iteration and the second error is greater than the preset error value, determine the iteration interval according to the data variation range of the data to be quantized so as to re-determine the data bit width according to the iteration interval.

The embodiments of the present disclosure have been described above. The description above is exemplary rather than exhaustive, and is not limited to the disclosed embodiments. Without departing from the scope and spirit of the described embodiments, many modifications and changes are obvious to those of ordinary skill in the art. The choice of terms used herein is intended to best explain the principles, implementations, or improvements on the current technology in the market of the embodiments, or to enable other ordinary skilled in the art to understand the embodiments disclosed herein.

The schemes (CN201910528537.8) to solve the problem for adjusting the quantization parameter are described above.

What is claimed is:

1. A quantization parameter adjustment method of a neural network, comprising:

during a fine-tuning stage or a training stage of a neural network operation, obtaining a variation range of the data to be quantized in a current verify iteration and historical iterations; and determining a target iteration interval according to the data variation range of the data to be quantized, so as to adjust a quantization parameter in a neural network operation according to the target iteration interval, wherein the target iteration interval comprises at least one iteration, and the quantization parameter of the neural network is configured to implement quantization of the data to be quantized in the neural network operation;

wherein the obtaining of the data variation range of the data to be quantized comprises:

obtaining a variation range of a point location, wherein the variation range of the point location is used to indicate the data variation range of the data to be quantized, and the variation range of the point location is positively correlated with the data variation range of the data to be quantized;

wherein the obtaining of the variation range of the point location comprises:

determining a first mean value according to a point location corresponding to a previous verify iteration before the current verify iteration, and point locations of historical iterations before the previous verify iteration, wherein the previous verify iteration refers to a verify iteration corresponding to a previous iteration interval before the target iteration interval;

determining a second mean value according to a point location corresponding to the current verify iteration and point locations of historical verify iterations before the current verify iteration, wherein the point location corresponding to the current verify iteration is determined according to a target data bit width corresponding to the current verify iteration and the data to be quantized; and determining a first error according to the first mean value and the second mean value, wherein the first error is used to indicate the variation range of the point location.

2. The method of claim 1, wherein the quantization parameter comprises a point location, and the point location refers to a location of a decimal point of quantized data corresponding to the data to be quantized; wherein the method further comprises:

determining a point location corresponding to the at least one iteration of the target iteration interval according to a target data bit width corresponding to a current verify iteration and data to be quantized of the current verify iteration so as to adjust the point location in the quantization parameter, wherein point locations corresponding to respective iterations in the target iteration interval are consistent.

3. The method of claim 1, wherein the quantization parameter comprises a point location, and the point location refers to a location of a decimal point of quantized data corresponding to the data to be quantized; wherein the method further comprises:

determining a data bit width corresponding to the target iteration interval according to a target data bit width corresponding to a current verify iteration, wherein the data bit width corresponding to respective iterations in the target iteration interval are consistent;

adjusting a point location corresponding to the at least one iteration of the target iteration interval according to an obtained point location iteration interval and the data bit width corresponding to the target iteration interval, to adjust the point location of the quantization parameter, wherein the point location iteration interval comprises at least one iteration, and point locations corresponding to the respective iterations in the point location iteration interval are consistent, and the point location iteration interval is less than or equal to the target iteration interval.

4. The method of claim 2, wherein the quantization parameter comprises a scaling factor, and the scaling factor and the point location of the quantization parameter are updated synchronously.

5. The method of claim 4, wherein the quantization parameter comprises an offset, and the offset and the point location of the quantization parameter are updated synchronously.

6. The method of claim 2, further comprising:

determining a quantization error according to the data to be quantized of the current verify iteration and quantized data of the current verify iteration, wherein the quantized data of the current verify iteration is obtained by quantizing the data to be quantized of the current verify iteration; and determining the target data bit width corresponding to the current verify iteration according to the quantization error.

7. The method of claim 6, wherein the determining of the target data bit width corresponding to the current verify iteration according to the quantization error comprises:

increasing a data bit width corresponding to the current verify iteration to obtain the target data bit width corresponding to the current verify iteration, when the quantization error is greater than or equal to a first preset threshold; or decreasing the data bit width corresponding to the current verify iteration to obtain the target data bit width of the current verify iteration, when the quantization error is less than or equal to a second preset threshold.

8. The method of claim 1, wherein the determining of the second mean value according to the point location corresponding to the current verify iteration and the point locations of the historical verify iterations before the current verify iteration comprises:

obtaining a preset number of intermediate moving mean values, wherein each intermediate moving mean value is determined according to a preset number of verify iterations before the current verify iteration; and determining the second mean value according to the point location of the current verify iteration and the preset number of intermediate moving mean values.

9. The method of claim 1, wherein the determining of the second mean value according to the point location corresponding to the current verify iteration and the point locations of the historical verify iterations before the current verify iteration comprises:

determining the second mean value according to the point location of the current verify iteration and the first mean value.

10. The method of claim 1, further comprising:

updating the second mean value according to an obtained data bit width adjustment value of the current verify iteration, wherein the data bit width adjustment value of the current verify iteration is determined according to the target data bit width of the current verify iteration and initial data bit width.

11. The method of claim 10, wherein the updating of the second mean value according to the obtained data bit width adjustment value of the current verify iteration comprises:

decreasing the second mean value according to the data bit width adjustment value of the current verify iteration, when the data bit width adjustment value of the current verify iteration is greater than a preset parameter; or increasing the second mean value according to the data bit width adjustment value of the current verify iteration, when the data bit width adjustment value of the current verify iteration is less than the preset parameter.

12. The method of claim 1, wherein the determining of the target iteration interval according to the data variation range of the data to be quantized comprises:

determining the target iteration interval according to the first error, wherein the target iteration interval is negatively correlated with the first error.

13. The method of claim 1, wherein the obtaining of the data variation range of the data to be quantized further comprises:

obtaining variation trend of a data bit width; and determining the data variation range of the data to be quantized according to the variation range of the point location and the variation trend of the data bit width.

14. The method of claim 13, wherein determining the target iteration interval according to the data variation range of the data to be quantized comprises: determining the target iteration interval according to an obtained first error and an obtained second error, wherein the first error is used to indicate the variation range of the point location, and the second error is used to indicate the variation trend of the data bit width.

15. The method of claim 14, wherein the determining of the target iteration interval according to the obtained second error and the obtained first error comprises:

determining a maximum value between the first error and the second error as a target error; and determining the target iteration interval according to the target error, wherein the target error is negatively correlated with the target iteration interval;

wherein the second error is determined according to a quantization error, and the quantization error is determined according to the data to be quantized of the current verify iteration and quantized data of the current verify iteration, and the second error is positively correlated with the quantization error.

16. The method of claim 1, wherein the method is used for training or fine tuning of the neural network, and the method further comprises:

when a current iteration is greater than a first preset iteration, determining the target iteration interval according to the data variation range of the data to be quantized, and adjusting the quantization parameter according to the target iteration interval;

when the current iteration is less than or equal to the first preset iteration, determining a first preset iteration interval as the target iteration interval and adjusting the quantization parameter according to the first preset iteration interval; and when the current iteration is greater than or equal to a second preset iteration, determining a second preset iteration interval as the target iteration interval and adjusting the quantization parameter according to the second preset iteration interval;

wherein the second preset iteration is greater than the first preset iteration, and the second preset iteration interval is greater than the first preset iteration interval; and when a convergence of the neural network meets preset conditions, the current iteration is determined to be greater than or equal to the second preset iteration.

17. A non-transitory computer readable storage medium, in which a computer program is stored, wherein the method of claim 1 is implemented when the computer program is executed.

18. A quantization parameter adjustment device of a neural network, comprising:

an obtaining unit configured during a fine-tuning stage or a training stage of a neural network operation, to obtain a data variation range of data to be quantized; and an iteration interval determination unit configured to determine a target iteration interval according to the data variation range of the data to be quantized so as to adjust a quantization parameter in the neural network operation according to the target iteration interval, wherein the target iteration interval comprises at least one iteration, and the quantization parameter of the neural network is configured to implement quantization of the data to be quantized in the neural network operation;

wherein the obtaining of the data variation range of the data to be quantized comprises:

obtaining a variation range of a point location, wherein the variation range of the point location is used to indicate the data variation range of the data to be quantized, and the variation range of the point location is positively correlated with the data variation range of the data to be quantized;

wherein the obtaining of the variation range of the point location comprises:

determining a first mean value according to a point location corresponding to a previous verify iteration before a current verify iteration, and point locations of historical iterations before the previous verify iteration, wherein the previous verify iteration refers to a verify iteration corresponding to a previous iteration interval before the target iteration interval;

determining a second mean value according to a point location corresponding to the current verify iteration and point locations of historical verify iterations before the current verify iteration, wherein the point location corresponding to the current verify iteration is determined according to a target data bit width corresponding to the current verify iteration and the data to be quantized; and determining a first error according to the first mean value and the second mean value, wherein the first error is used to indicate the variation range of the point location.

* * * * *